US012444852B1

(12) United States Patent
Polyakov et al.

(10) Patent No.: US 12,444,852 B1
(45) Date of Patent: Oct. 14, 2025

(54) DEPLOYABLE SYMMETRICAL REFLECTOR ANTENNA

(71) Applicant: PIPL LIMITED, Limassol (CY)

(72) Inventors: Maxym Polyakov, Edinburgh (GB); Elguja Medzmariashvili, Tbilisi (GE)

(73) Assignee: PIPL LIMITED, Limassol (CY)

(*) Notice: Subject to any disclaimer, the term of this patent is extended or adjusted under 35 U.S.C. 154(b) by 0 days.

(21) Appl. No.: 19/244,025

(22) Filed: Jun. 20, 2025

(51) Int. Cl.
*H01Q 1/12* (2006.01)
*H01Q 1/28* (2006.01)
*H01Q 15/16* (2006.01)

(52) U.S. Cl.
CPC ................................. *H01Q 15/161* (2013.01)

(58) Field of Classification Search
CPC .. H01Q 1/12; H01Q 1/28; H01Q 7/02; H01Q 15/16; H01Q 15/161; H01Q 15/20
See application file for complete search history.

(56) References Cited

U.S. PATENT DOCUMENTS

| | | | | |
|---|---|---|---|---|
| 9,660,351 | B2 * | 5/2017 | Medzmariashvili | H01Q 15/161 |
| 10,153,559 | B1 * | 12/2018 | Jandzio | H01Q 15/163 |
| 10,516,216 | B2 | 12/2019 | Harless et al. | |
| 11,081,775 | B2 * | 8/2021 | Reveles-Wilson | H01Q 1/1235 |
| 11,784,415 | B2 * | 10/2023 | Mora Plaza | H01Q 1/08 343/840 |
| 11,791,563 | B1 * | 10/2023 | Zhang | H01Q 1/1235 343/702 |
| 11,929,549 | B1 * | 3/2024 | Polyakov | H01Q 1/288 |

FOREIGN PATENT DOCUMENTS

| | | | |
|---|---|---|---|
| WO | 03003517 | A1 | 1/2003 |
| WO | 2022219364 | A1 | 10/2022 |

OTHER PUBLICATIONS

Elguja Medzmariashvili et al., Technical Assessment of Large Deployable Structures (TALDES). Antenna Reflectors Baseline Definition. 2010. Technical Note 1.1 on WP 1000. Ref.: Tn 1.1.2-TUM/GTU-13/01/11-07D-1. Issue 01. Georgian Technical University Institute of Constructions, Tbilisi, Georgia.

(Continued)

*Primary Examiner* — Tho G Phan
(74) *Attorney, Agent, or Firm* — Georgiy L. Khayet

(57) ABSTRACT

A deployable reflector antenna is provided. An example antenna includes a deployable ring including a plurality of internal combined arms, a plurality of external combined arms, and a plurality of joints arranged circumferentially in a predetermined number of tiers from a bottom of the deployable ring to a top of the deployable ring. Each of the plurality of joints connects, in a scissor linkage configuration, at least one internal arm and at least one external arm. The antenna includes torsion springs configured to bias the deployable ring towards an open position, with at least one of the torsion springs coupled to one or more of the joints. The antenna includes a plurality of tension, each connecting two joints positioned within the same tier. The antenna includes a flexible reflector mounted on the deployable ring. The flexible reflector includes an upper concave mesh, a lower convex mesh, and connecting flexible rods.

20 Claims, 117 Drawing Sheets

(56) References Cited

OTHER PUBLICATIONS

Elguja Medzmariashvili. New Closed and Open. Transformable Pantographic Rod Structures Designed on Single and Double Curvature Surfaces. 2023. Engineering. Bulletin of the Georgian National Academy of Sciences, vol. 17, No. 2. Georgia.

Elguja Medzmariashvili. Transformable Pantographic Structures Built on Surfaces with Different Curvatures. 2023. UDC 629.7. Scopus Code 2202. ISSN 1512-0996. Georgian Technical University. "WORKS" No. 4(530). Abstract, p. 122. Tbilisi, Georgia.

* cited by examiner

DEPLOYABLE SYMMETRICAL REFLECTOR ANTENNA

TECHNICAL FIELD

The present invention relates generally to deployable antenna structures, and more particularly to deployable reflector antennas for use in space-based applications, including folding ring assemblies and tensioned mesh reflectors supported by mechanical linkages.

BACKGROUND

Deployable antennas are widely used in satellite and aerospace applications where compact stowage and efficient deployment in orbit are essential. Conventional reflector antennas may rely on rigid mechanical components or membrane-based surfaces that fold or collapse into compact volumes. However, such systems can be complex, heavy, or prone to deformation and misalignment during deployment. There is a need for an improved deployable reflector antenna that provides structural integrity, reliable unfolding mechanisms, and compatibility with precision reflector surfaces. The disclosure provides a reflector antenna structure with a geometrically stable deployable ring, interconnected tensioned rods, and support mechanisms that enable consistent and controllable deployment in space environments.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

Generally, the present disclosure is directed to deployable reflector antennas for use in space-based applications.

According to one example embodiment of the present disclosure, a deployable symmetrical reflector antenna is provided. The antenna includes a deployable ring and a flexible reflector mounted on the deployable ring. The deployable ring includes a plurality of internal combined arms, a plurality of external combined arms, and a plurality of joints arranged circumferentially in a predetermined number of tiers from a bottom of the deployable ring to a top of the deployable ring. At least one of the plurality of joints connects, in a scissor linkage configuration, at least one internal arm of the plurality of internal combined arms and at least one external arm of the plurality of external combined arms. The deployable ring includes a plurality of torsion springs configured to bias the deployable ring towards an open position. At least one of the plurality of torsion springs is coupled to one or more joints of the plurality of joints. The deployable ring includes a plurality of tension cables. A tension cable of the plurality of tension cables connects a first joint and a second joint positioned within the same tier.

The flexible reflector includes an upper concave mesh secured to the top of the deployable ring. The upper concave mesh includes a plurality of first flexible rods and a plurality of first nodes. The flexible reflector further includes a lower convex mesh secured to the bottom of the deployable ring. The lower convex mesh includes a plurality of second flexible rods and a plurality of second nodes. The flexible reflector also includes a plurality of third flexible rods. A third flexible rod of the plurality of third flexible rods connects a second node of lower convex mesh to a first node of the upper concave mesh.

According to another example embodiment of the present disclosure, a method of manufacturing a deployable symmetrical reflector antenna is provided. The method includes providing the deployable ring and mounting the flexible reflector onto the deployable ring.

Other example embodiments and aspects will become apparent from the following description taken in conjunction with the following drawings.

BRIEF DESCRIPTION OF THE DRAWINGS

Exemplary embodiments are illustrated by way of example and not limitation in the figures of the accompanying drawings, in which like references indicate similar elements.

DETAILED DESCRIPTION

Figure 1:
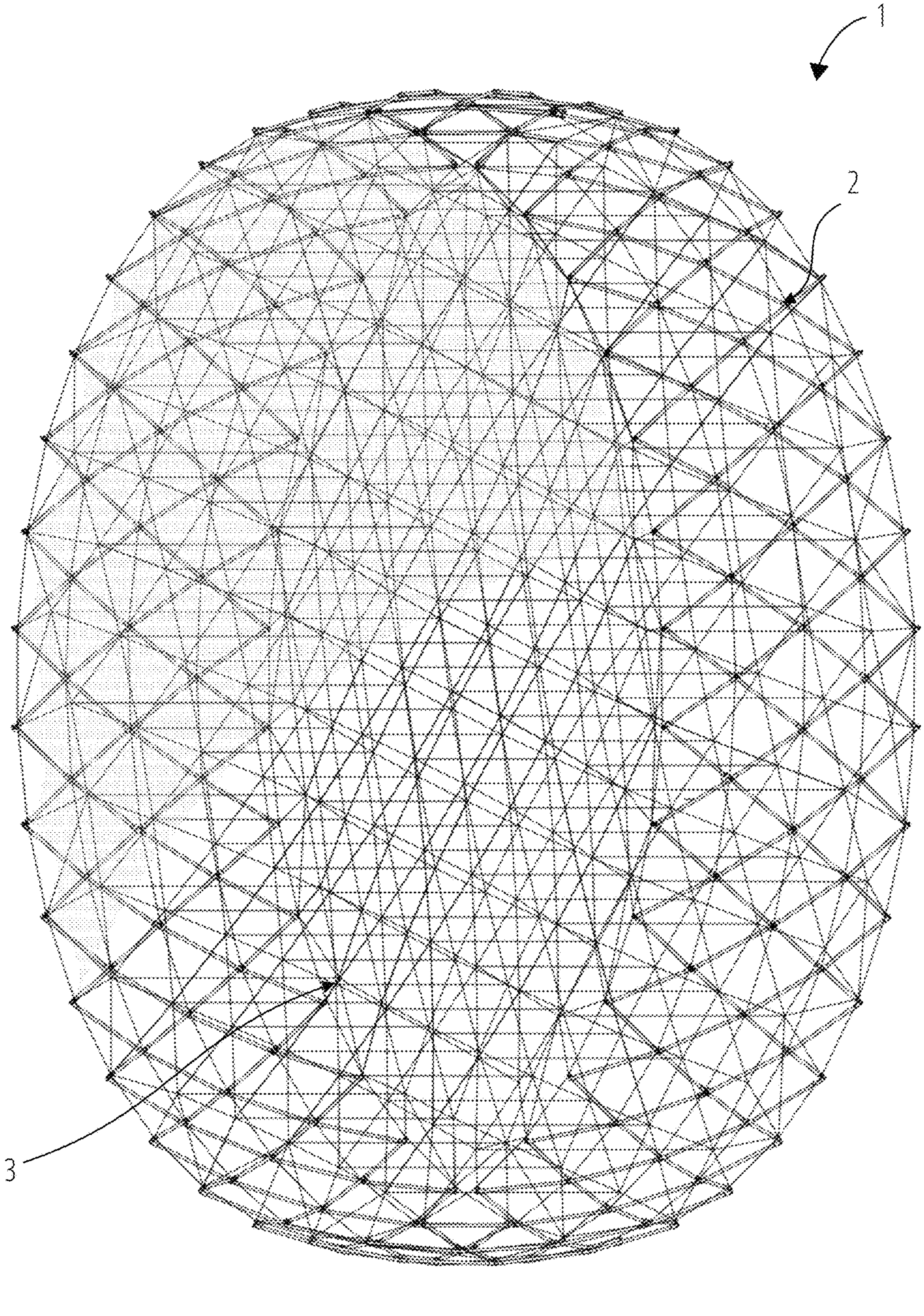
FIG. 1 shows the overall deployable symmetrical reflector antenna, including a deployable ring and a flexible reflector, according to an example embodiment.

The following detailed description of embodiments includes references to the accompanying drawings, which form a part of the detailed description. Approaches described in this section are not prior art to the claims and are not admitted to be prior art by inclusion in this section. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and operational changes can be made without departing from the scope of what is claimed. The following detailed description is, therefore, not to be taken in a limiting sense, and the scope is defined by the appended claims and their equivalents.

Generally, the embodiments of this disclosure relate to deployable reflector antennas for space applications. Deployable reflector antennas for space applications face several challenges related to structural complexity, deployment reliability, and precise shape retention. Existing designs often rely on pantographic ring structures formed from intersecting rods with double cylindrical joints, which increase weight, assembly difficulty, and mechanical instability. These dual-hinge nodes are susceptible to deformation and misalignment, particularly during deployment or under spaceborne thermal and dynamic loads.

Further, known mesh-based reflector systems require substantial depth between concave and convex components to achieve proper parabolic geometry, particularly for large-aperture reflectors (10-12 meters or more). This results in increased stowage volume and mechanical demands. Attempts to simplify joint configurations, such as using single composite pins, have had limited success due to manufacturing difficulties and insufficient structural modularity.

Embodiments of the present disclosure address the problems of deployable reflector antennas by introducing a unified modular system for building symmetrical deployable space reflector antennas, with following key modifications to both structural composition and geometric organization:

Single-Axis Cylindrical Joints with Straight Rods. The proposed system replaces complex double-hinge joints with universal cylindrical nodes using a single, straight pin at each connection point. These joints are designed for straight, intersecting rods arranged in a pantographic configuration—enabling simplified manufacturing, reduced mass, and enhanced stability.

Pantographic Ring Formed on Spherical Surfaces. The intersecting rods define nodal points aligned along spherical tiers, ensuring a consistent geometric envelope while allowing the pantograph system to fold efficiently. Multiple geometries are supported, including symmetric and asymmetric rings, with rods of equal or varied lengths.

Hybrid Structural Composition: Rigid+Tensioned Elements The invention leverages a combination of rigid rods and tensioned cables to reduce weight and increase deployment control. Tension elements are used not only to stabilize ring joints but also to form flexible central reflector meshes. This hybrid approach results in a tensegrity-like system that can maintain shape with minimal weight.

Mesh Configuration Using Hyperbolic and Parabolic Surfaces. The antenna reflector surface is formed by combining a concave parabolic mesh with a convex hyperbolic mesh, connected via tension rods. The dual-curvature system enables reduced height h of the deployable ring the concave parabolic mesh with a convex hyperbolic mesh are attached to and compact stowing while preserving reflective accuracy. Unlike existing systems, this design reduces the need for additional arch-like support rings.

Universal Node Design Enables Mass Production and Reconfiguration. By standardizing the node architecture across different reflector configurations, the system supports modular reassembly, mass production, and flexible scaling. Structures can be adapted for small, medium, or large reflectors using the same base elements, streamlining fabrication and logistics.

Optimized for Deployment Reliability and Spacecraft Integration. The deployable ring and central mesh are compatible with various deployment mechanisms, including torsion springs, motors, cable guides, and telescopic posts. This facilitates smooth, sequential deployment and integration with diverse spacecraft platforms, minimizing launch risk.

Referring now to the drawings, various embodiments are described in which reference numerals represent like parts and assemblies throughout the several views. It should be noted that the reference to various embodiments does not limit the scope of the claims attached hereto. Additionally, any examples outlined in this specification are not intended to be limiting and merely set forth some of the many possible embodiments for the appended claims.

FIG. 1 shows the overall deployable symmetrical reflector antenna 1, including a deployable ring 2 and a flexible reflector 3, according to an example embodiment. Deployable ring 2 is configured to unfold from a compact, stowed configuration into a rigid geometric frame that supports the surface of flexible reflector 3.

Figure 2:
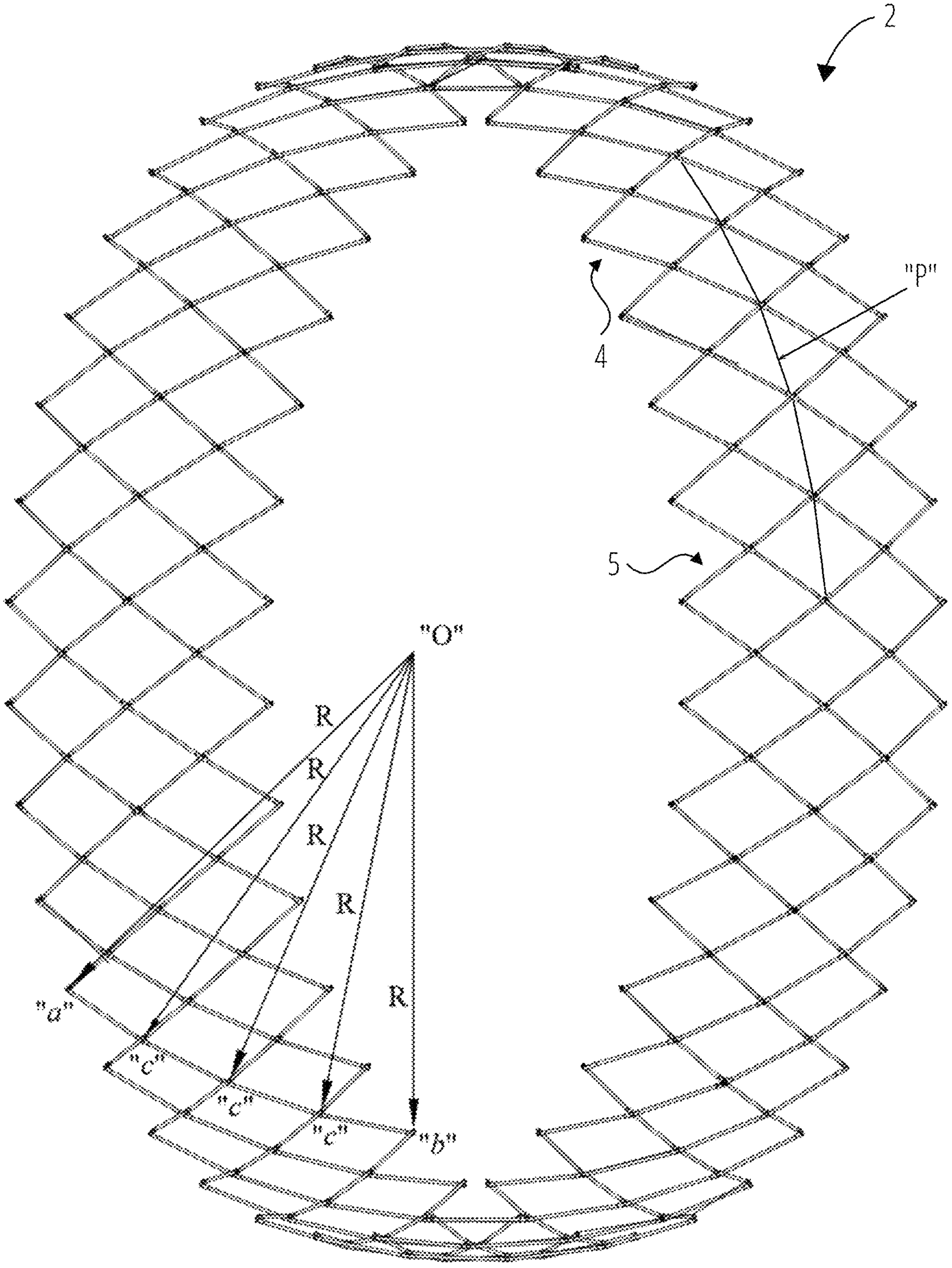
FIG. 2 illustrates the layout of internal combined arms and external combined arms in the unfolded configuration of the deployable ring, according to an example embodiment.

FIG. 2 illustrates the layout of internal combined arms 4 and external combined arms 5 in the unfolded configuration of deployable ring 2, according to an example embodiment. As shown in FIG. 2, the deployable ring 2 is formed from internal combined arms 4 and external combined arms 5, each having a zigzag or angular profile. The internal combined arms 4 are oriented rightward, while the external combined arms 5 are oriented leftward. The arms are arranged in a scissor-like, overlapping configuration, resembling a Nuremberg scissors structure.

Figure 3:
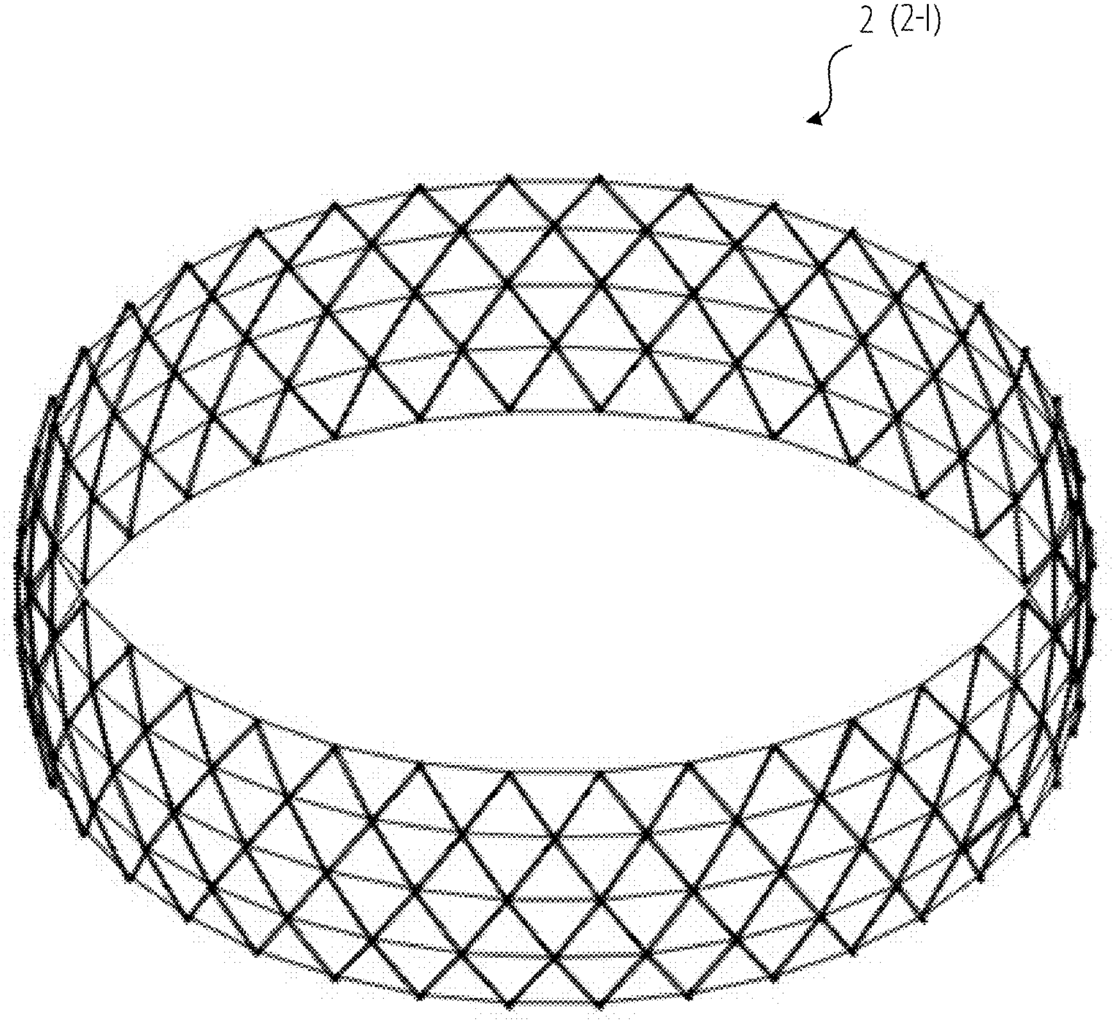
FIG. 3 illustrates the deployable ring, according to an example embodiment.

FIG. 3 illustrates deployable ring 2, according to another example embodiment. Specifically, FIG. 3 depicts deployable ring 2 in configuration 2-III. In this configuration, the deployable ring 2 is symmetrical and includes five tiers of joints arranged circumferentially.

Figure 4:
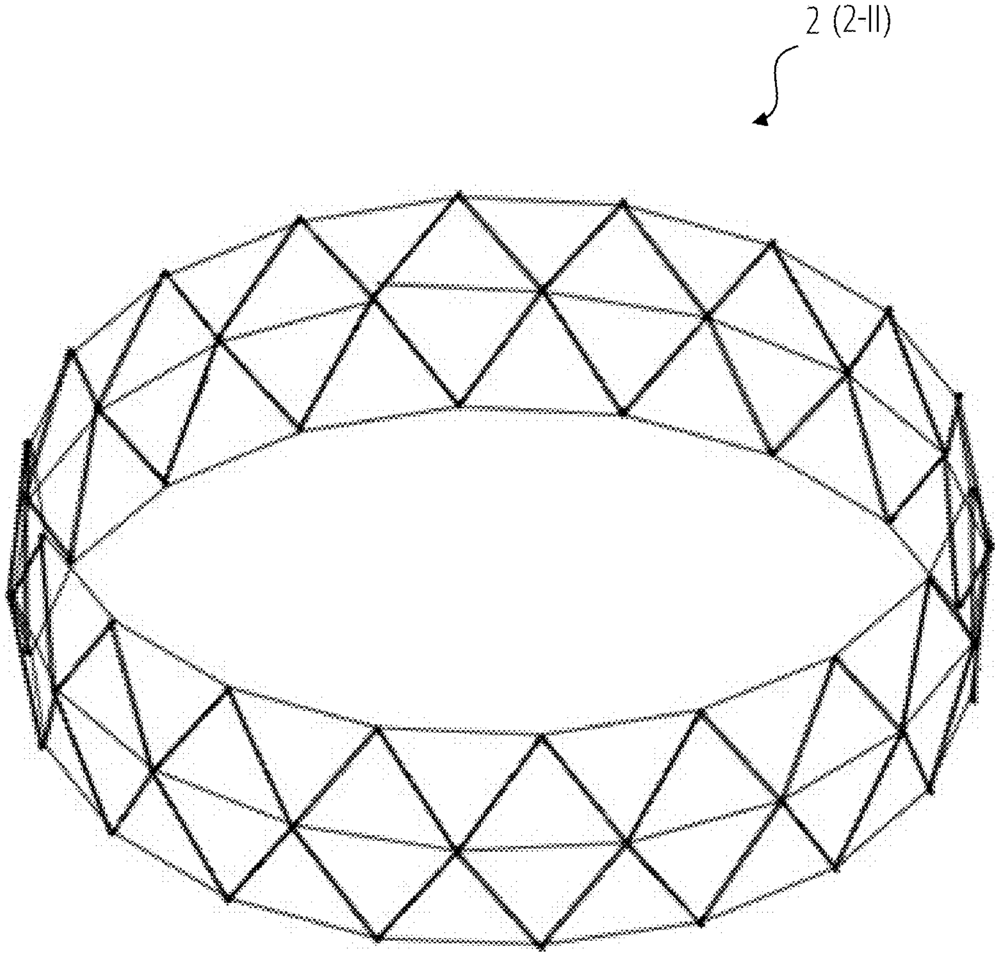
FIG. 4 illustrates the deployable ring, according to another example embodiment.

FIG. 4 illustrates deployable ring 2, according to another example embodiment. Specifically, FIG. 4 depicts deployable ring 2 in configuration 2-II. In this configuration, deployable ring 2 is symmetrical and includes three tiers of joints arranged circumferentially.

Figure 5:
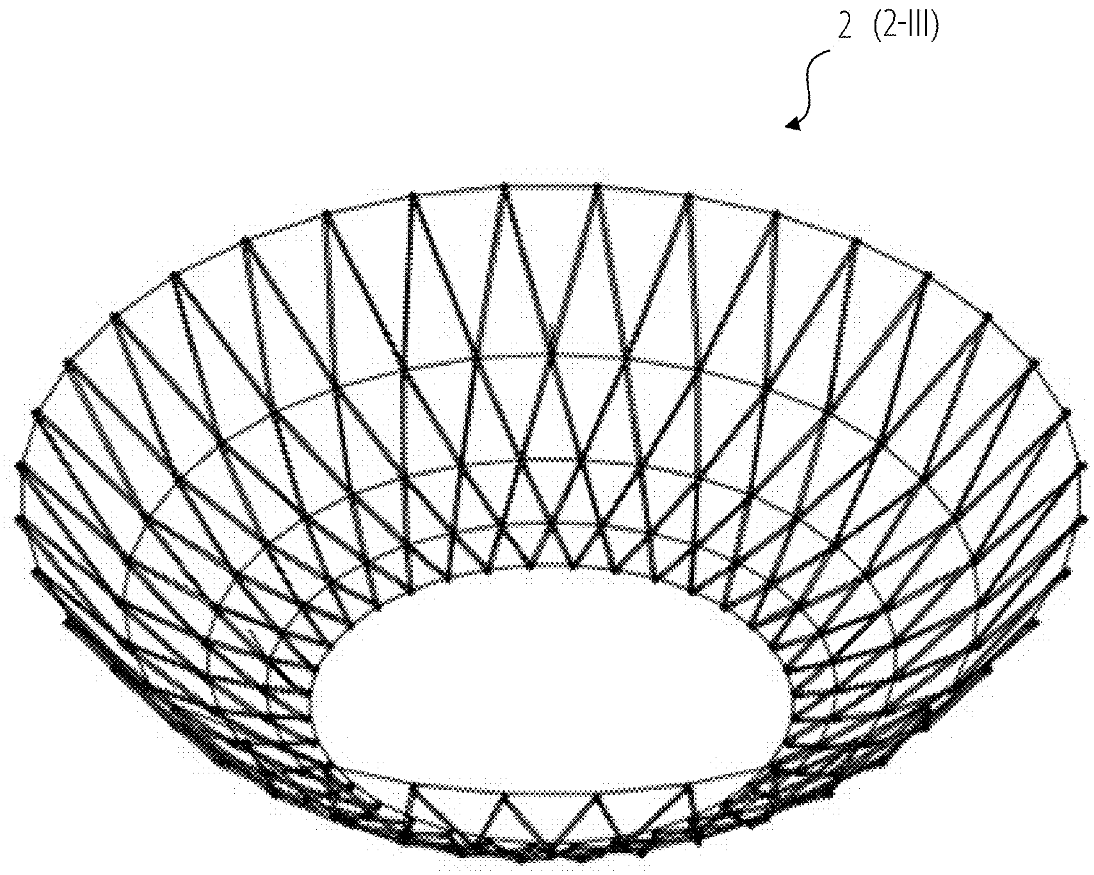
FIG. 5 illustrates the deployable ring, according to yet another example embodiment.

FIG. 5 illustrates deployable ring 2, according to yet another example embodiment. Specifically, FIG. 5 depicts deployable ring 2 in configuration 2-III. In this configuration, the deployable ring 2 is asymmetrical and includes five tiers of joints arranged circumferentially.

Figure 6:
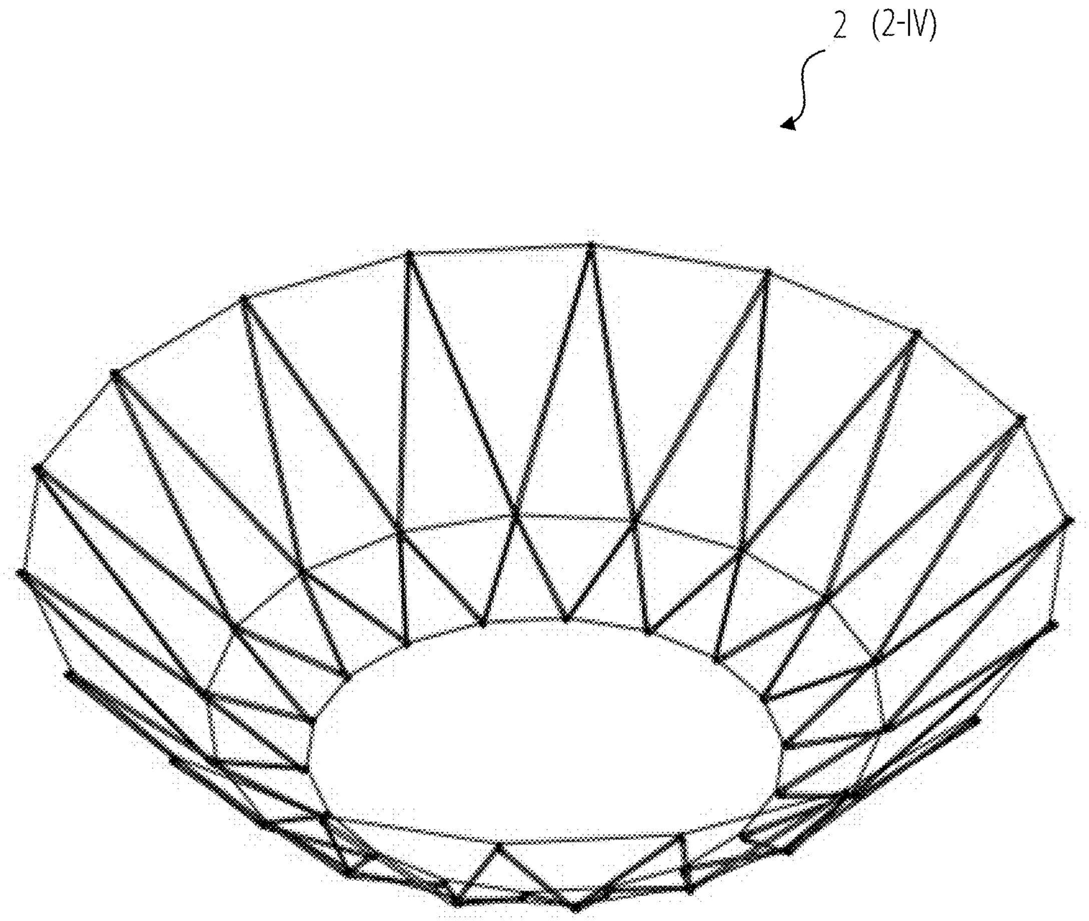
FIG. 6 illustrates the deployable ring, according to an example embodiment.

FIG. 6 illustrates deployable ring 2, according to an example embodiment. Specifically, FIG. 6 depicts deployable ring 2 in configuration 2-IV. In this configuration, deployable ring 2 is asymmetrical and includes three tiers of joints arranged circumferentially.

Figure 7:
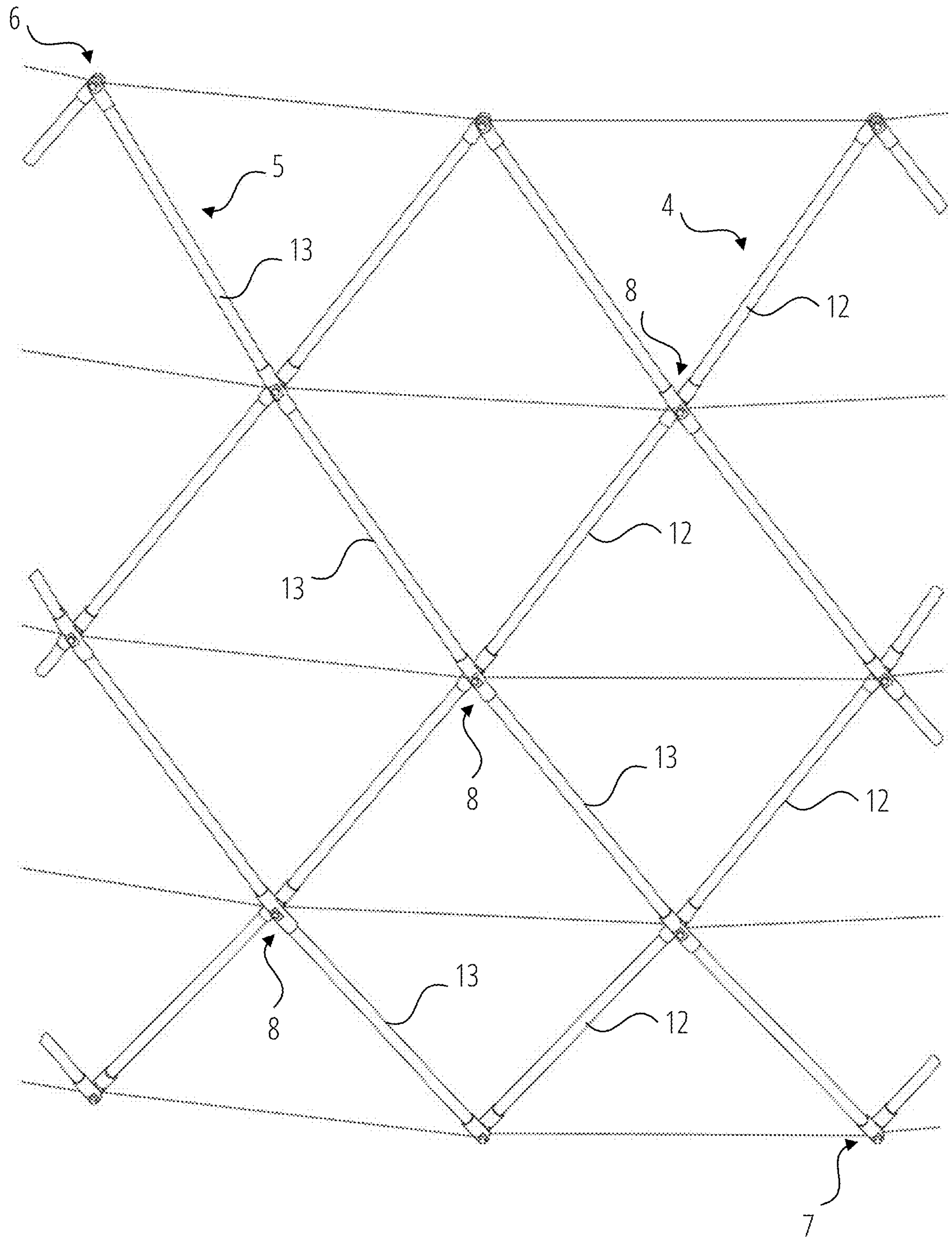
FIG. 7 illustrates various joints formed at intersections of arms, according to an example embodiment.

FIG. 7 illustrates various joints formed at intersections of arms, according to an example embodiment. Specifically, FIG. 7 depicts the following components: internal combined arms 4, an external combined arms 5, an internal arm 12, an external arm 13, an intermediate cylindrical joint 8, a bottom cylindrical joint 7, and a top cylindrical joint 6.

Figure 8:
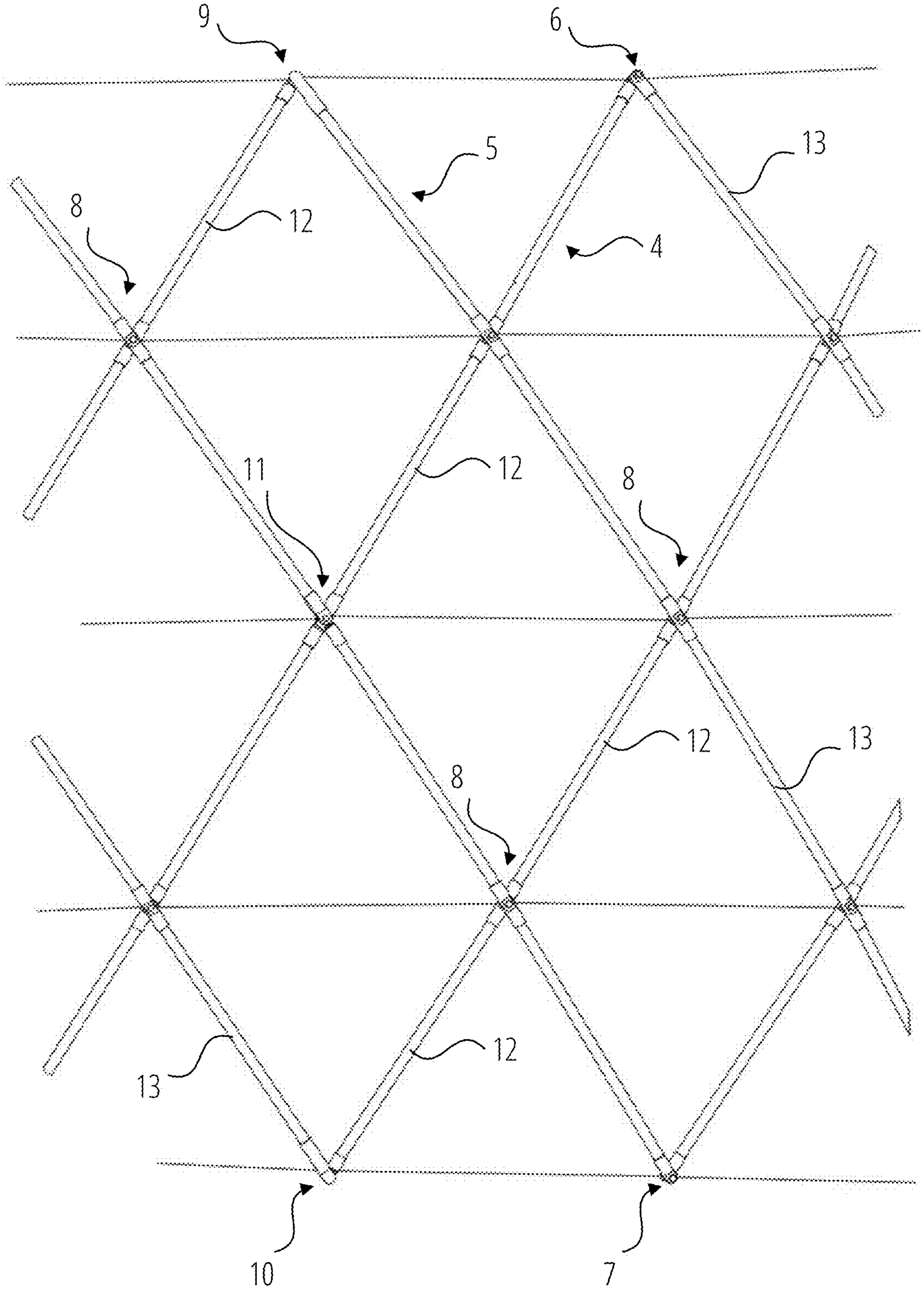
FIG. 8 illustrates various joints formed at intersections of arms, according to an example embodiment.

FIG. 8 illustrates various joints formed at intersections of arms, according to an example embodiment. Specifically, FIG. 8 depicts the following components: an internal combined arms 4, an external combined arms 5, an internal arm 12, an external arm 13, an intermediate cylindrical joint 8, a bottom cylindrical joint 7, a top cylindrical joint 6, a top spherical joint 9, a bottom spherical joint 10, and a double intermediate cylindrical joint 11.

Figure 9:
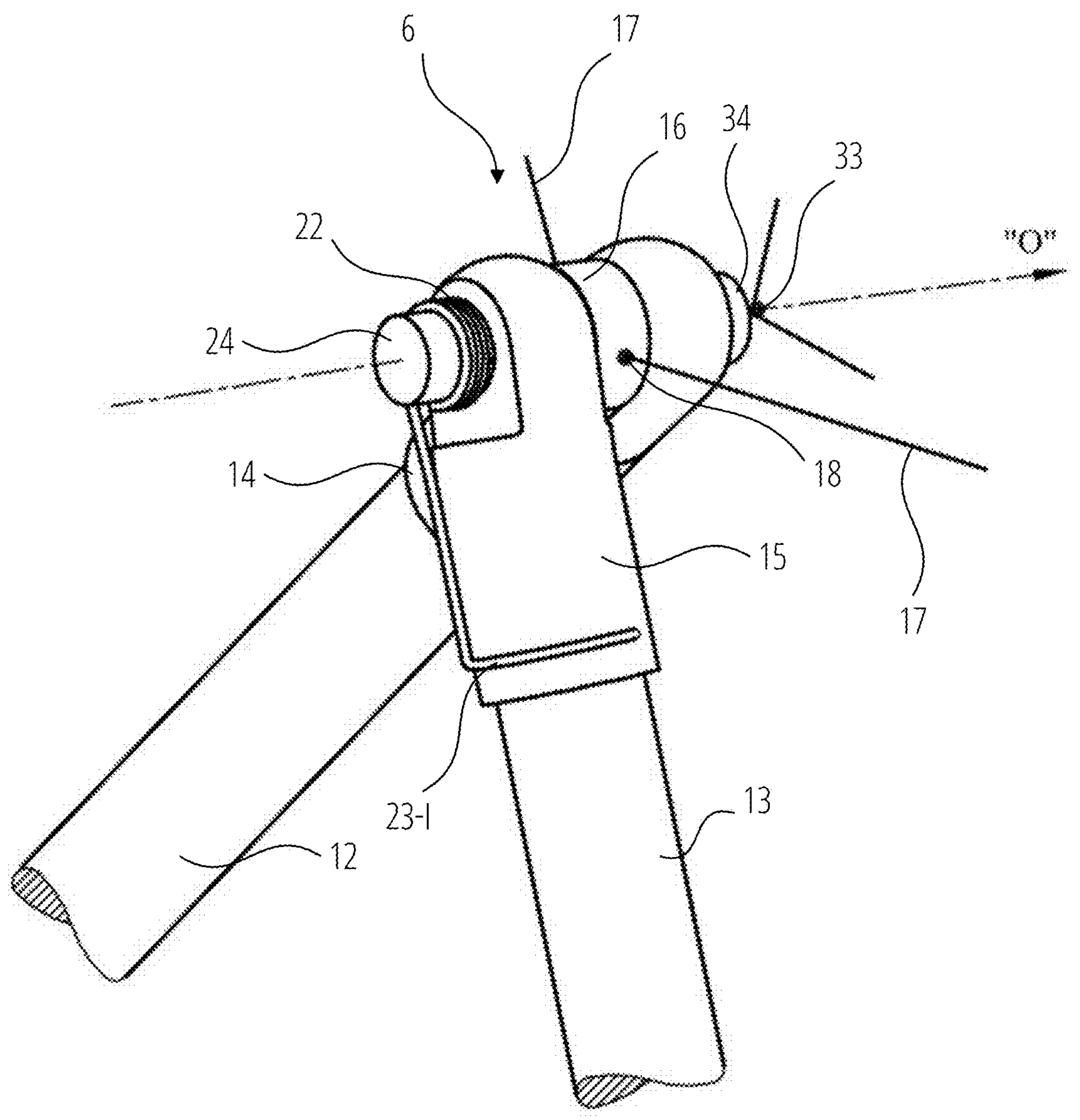
FIG. 9 illustrates a top cylindrical joint, according to an example embodiment.

FIG. 9 illustrates a top cylindrical joint, according to an example embodiment. Specifically, FIG. 9 depicts the following components: an internal arm 12, an external arm 13, a top cylindrical joint 6, a tension cable 17, an edge 24, a torsion spring 22, an internal pin 16, an edge 34, a holder 33, an end 23-I, a sleeve 15, a sleeve 14, and a holder 18.

Figure 10:
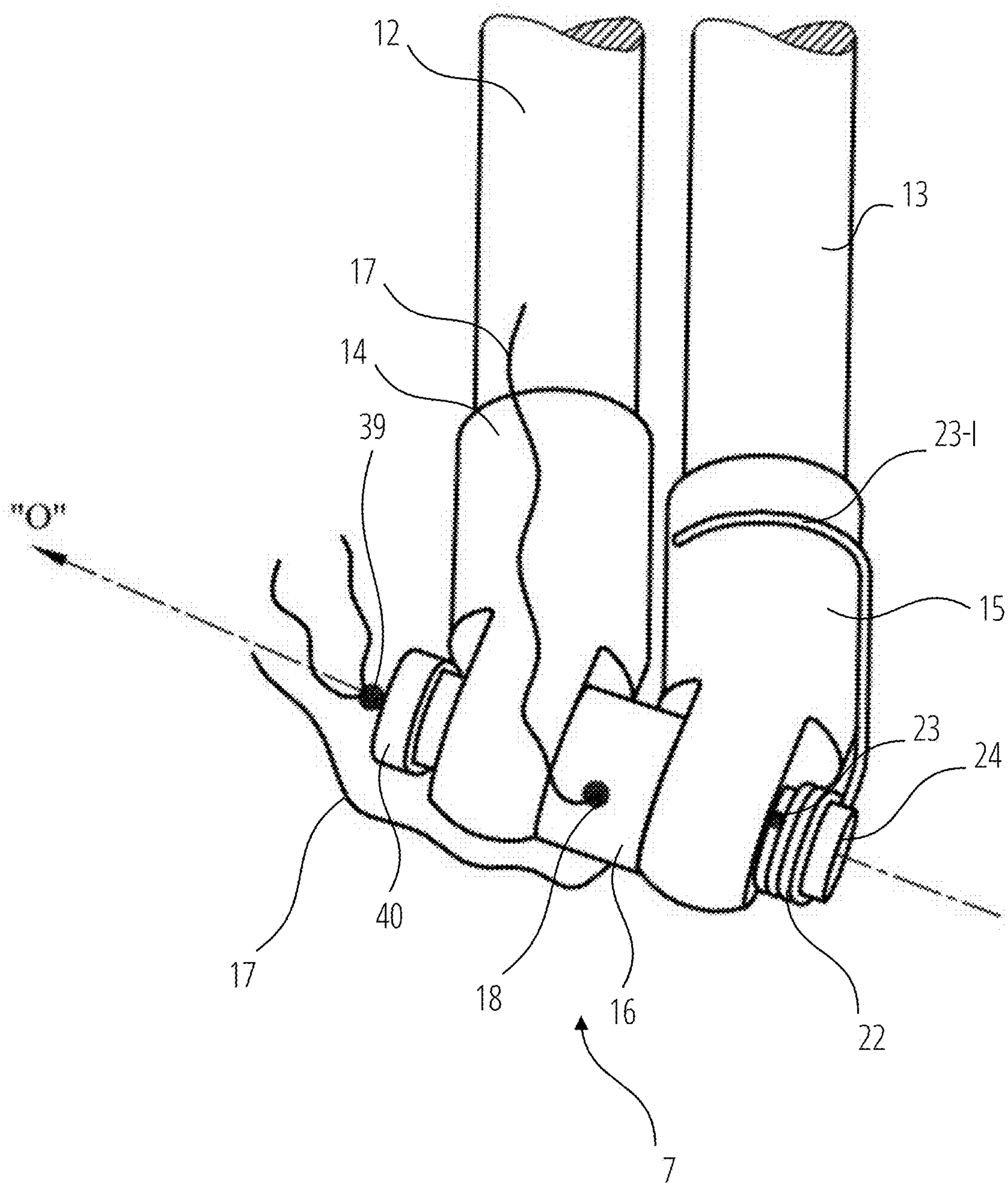
FIG. 10 illustrates a bottom cylindrical joint, according to an example embodiment.

FIG. 10 illustrates a bottom cylindrical joint 7, according to an example embodiment. Specifically, FIG. 10 depicts the following components: an internal arm 12, an external arm 13, a bottom cylindrical joint 7, a tension cable 17, an edge 24, a torsion spring 22, an internal pin 16, an end 23-I, a sleeve 15, a sleeve 14, a holder 18, an end 23, an edge 40, and a holder 39.

Figure 11:
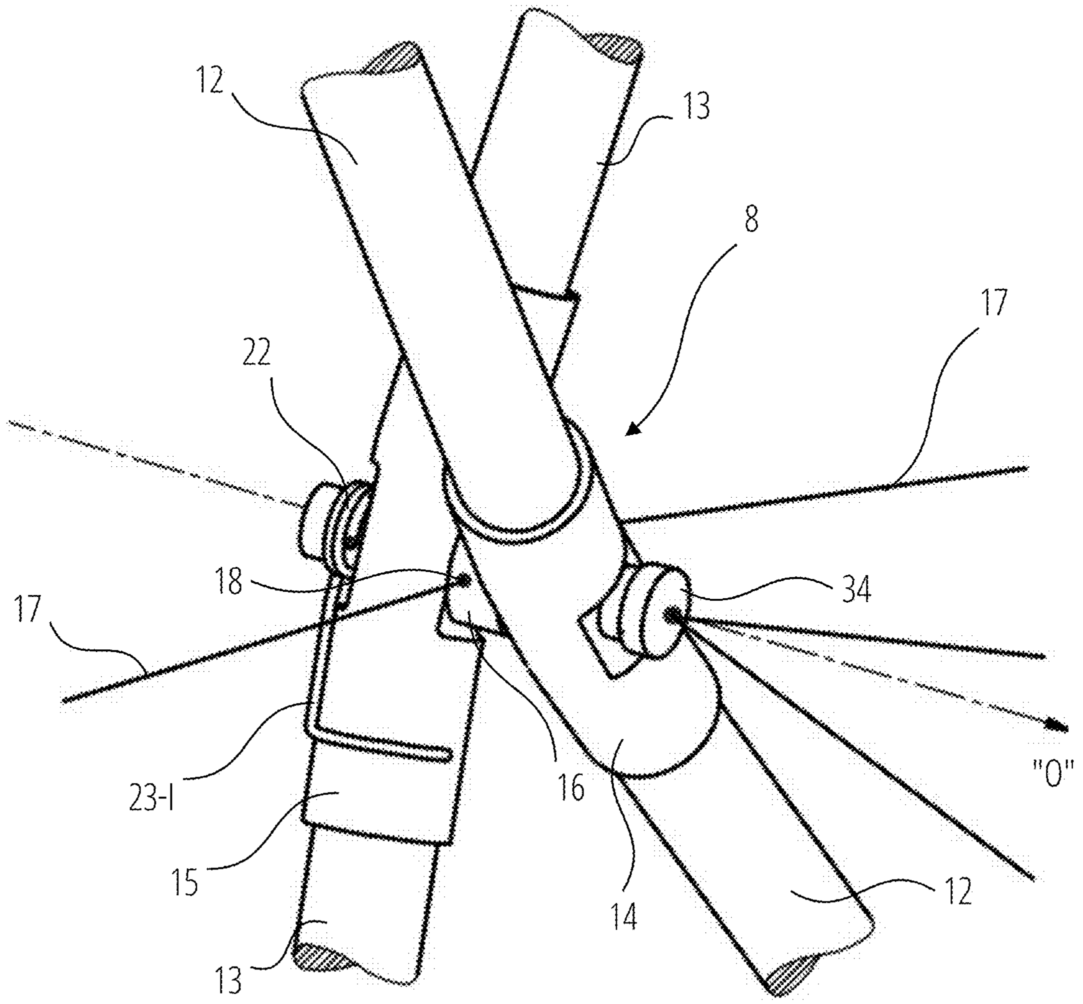
FIG. 11 illustrates an intermediate cylindrical joint, according to an example embodiment.

FIG. 11 illustrates an intermediate cylindrical joint 8, according to an example embodiment. Specifically, FIG. 11 depicts the following components: an internal arm 12, an external arm 13, an intermediate cylindrical joint 8, a tension cable 17, a torsion spring 22, an internal pin 16, an edge 34, an end 23-I, a sleeve 15, a sleeve 14, and a holder 18.

Figure 12:
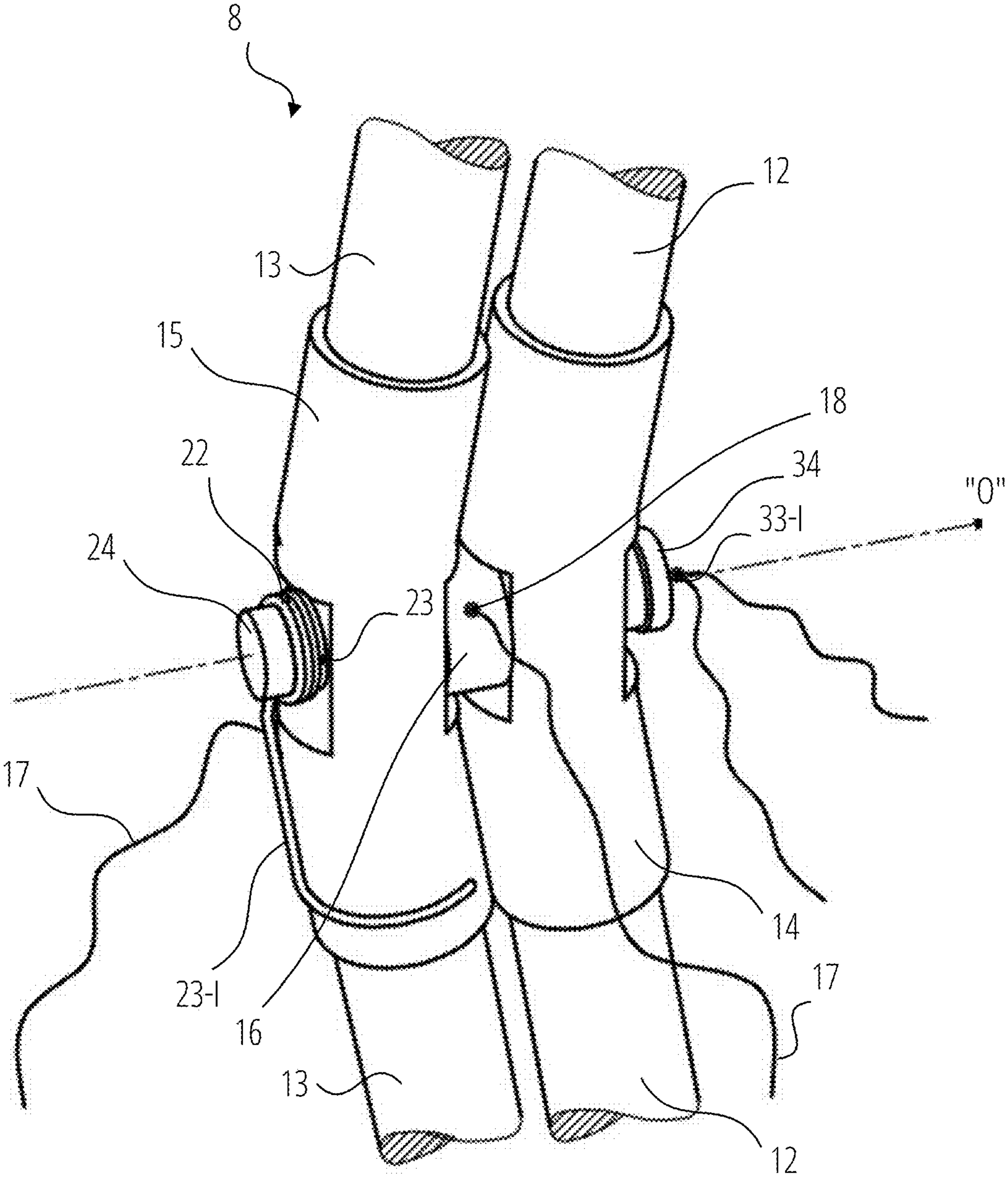
FIG. 12 illustrates an intermediate cylindrical joint in a folded configuration, according to an example embodiment.

FIG. 12 illustrates an intermediate cylindrical joint 8 in a folded configuration, according to an example embodiment. Specifically, FIG. 12 depicts the following components: an internal arm 12, an external arm 13, an intermediate cylindrical joint 8, a tension cable 17, an edge 24, a torsion spring 22, an internal pin 16, an edge 34, an end 23-I, a sleeve 15, a sleeve 14, a holder 18, an end 23, and a holder 33-I.

Figure 13:
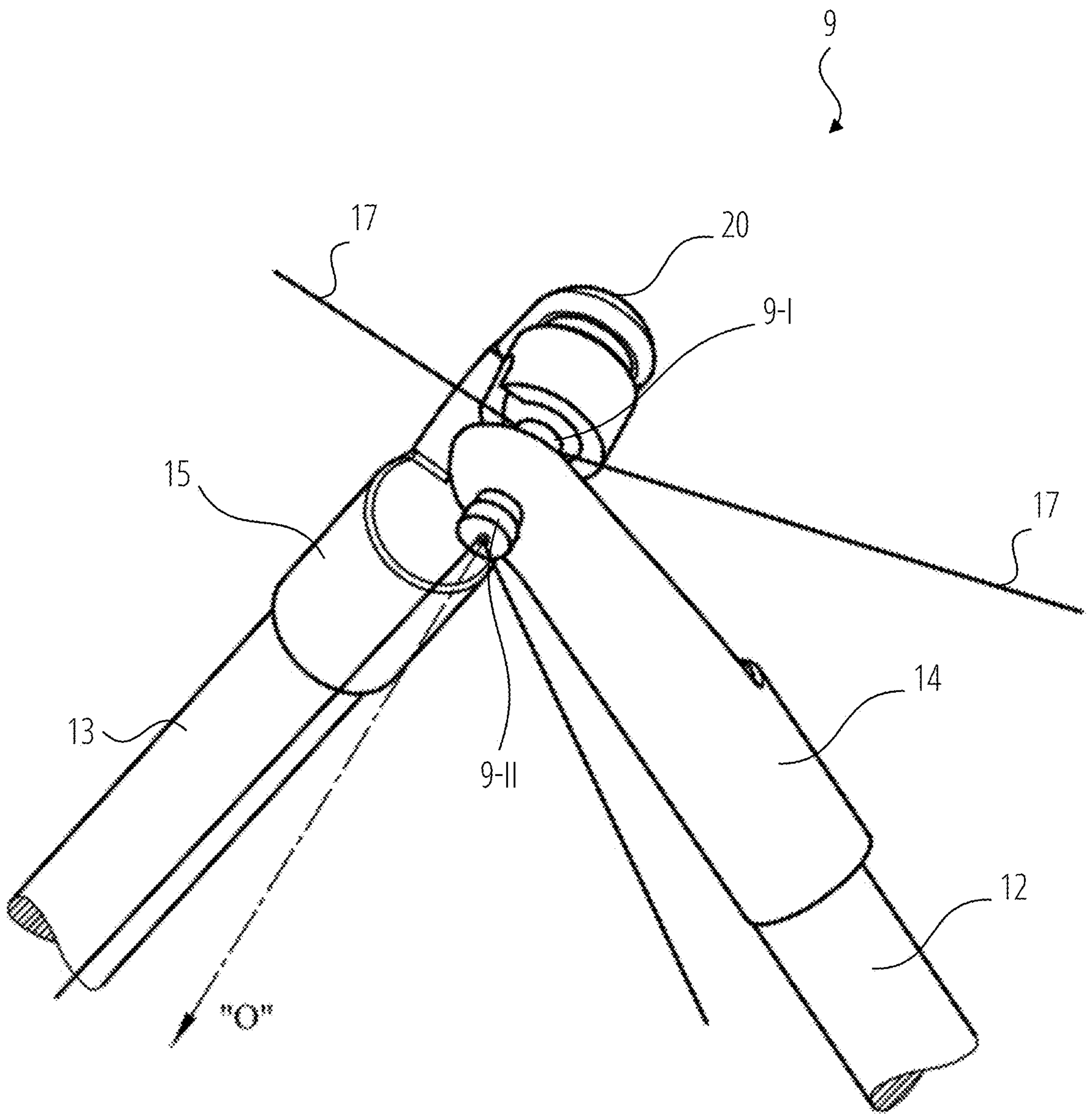
FIG. 13 shows a top spherical joint, according to an example embodiment.

FIG. 13 shows a top spherical joint 9, according to an example embodiment. Specifically, FIG. 13 depicts the following components: an internal arm 12, an external arm 13, a top spherical joint 9, a tension cable 17, a sleeve 15, a sleeve 14, an outer housing 20, a rod 9-I, and a rod 9-II.

Figure 14:
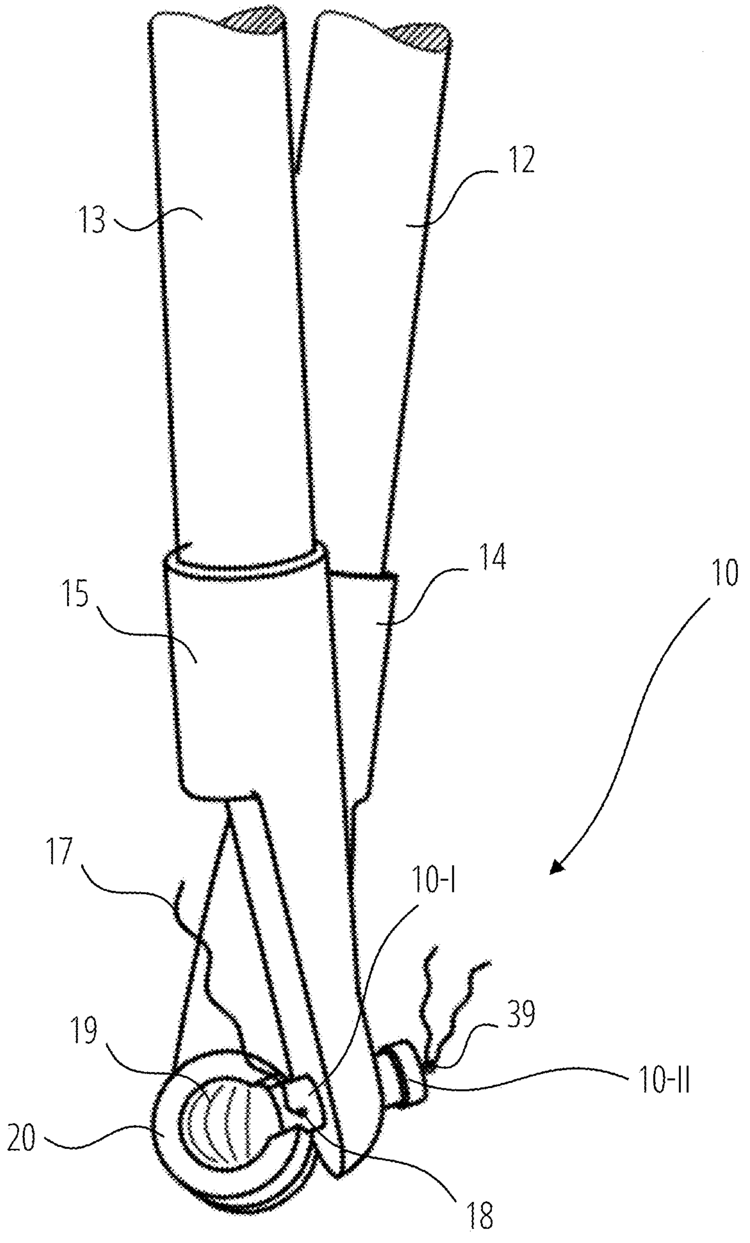
FIG. 14 shows a bottom spherical joint, according to an example embodiment.

FIG. 14 shows a bottom spherical joint 10, according to an example embodiment. Specifically, FIG. 14 depicts the following components: an internal arm 12, an external arm 13, a bottom spherical joint 10, a tension cable 17, a sleeve 15, a sleeve 14, a holder 18, a holder 39, an outer housing 20, a ball 19, a rod 10-I, and a rod 10-II.

Figure 15:
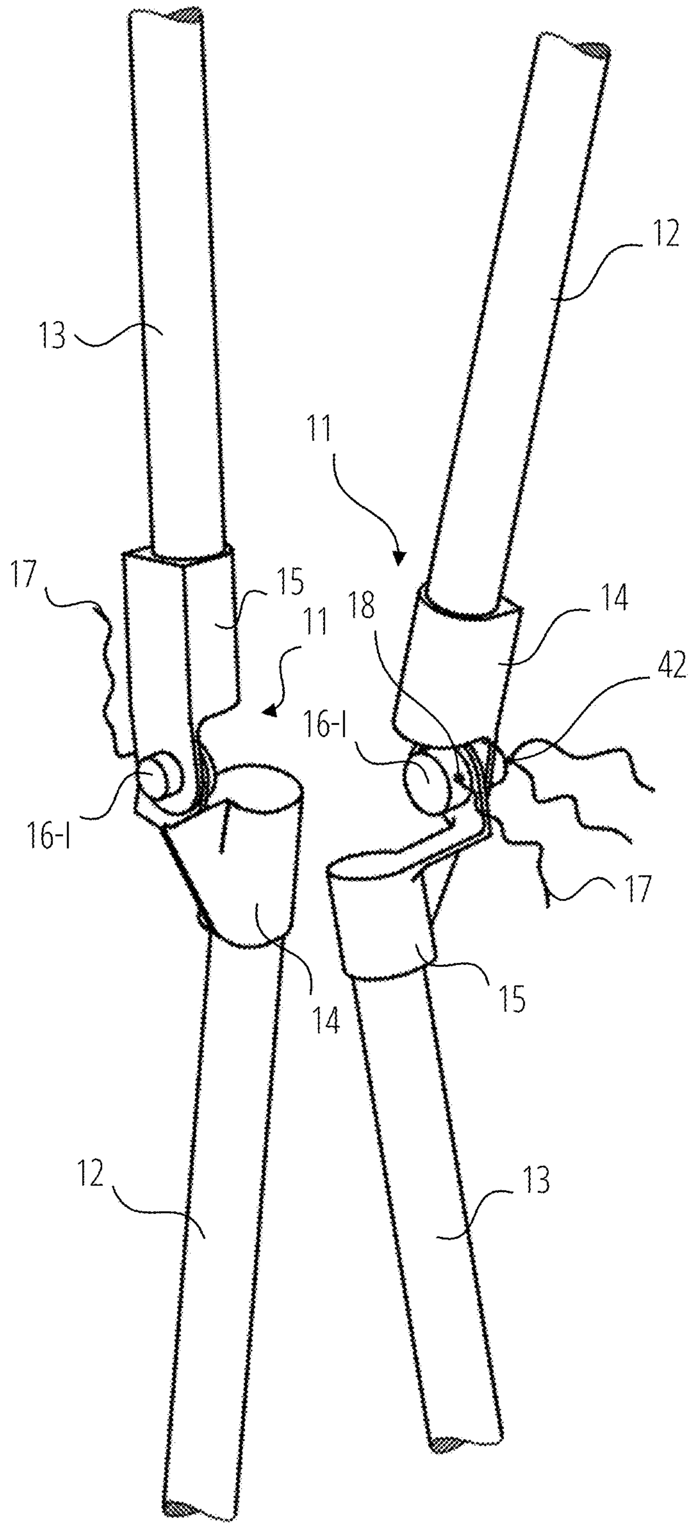
FIG. 15 illustrates a double intermediate cylindrical joint, according to an example embodiment.

FIG. 15 illustrates a double intermediate cylindrical joint 11 in the partially deployed ring 2, according to an example embodiment. Specifically, FIG. 15 depicts the following components: an internal arm 12, an external arm 13, a double intermediate cylindrical joint 11, a tension cable 17, a sleeve 15, a sleeve 14, a holder 18, a short pin 16-I, and a holder 42.

Figure 16:
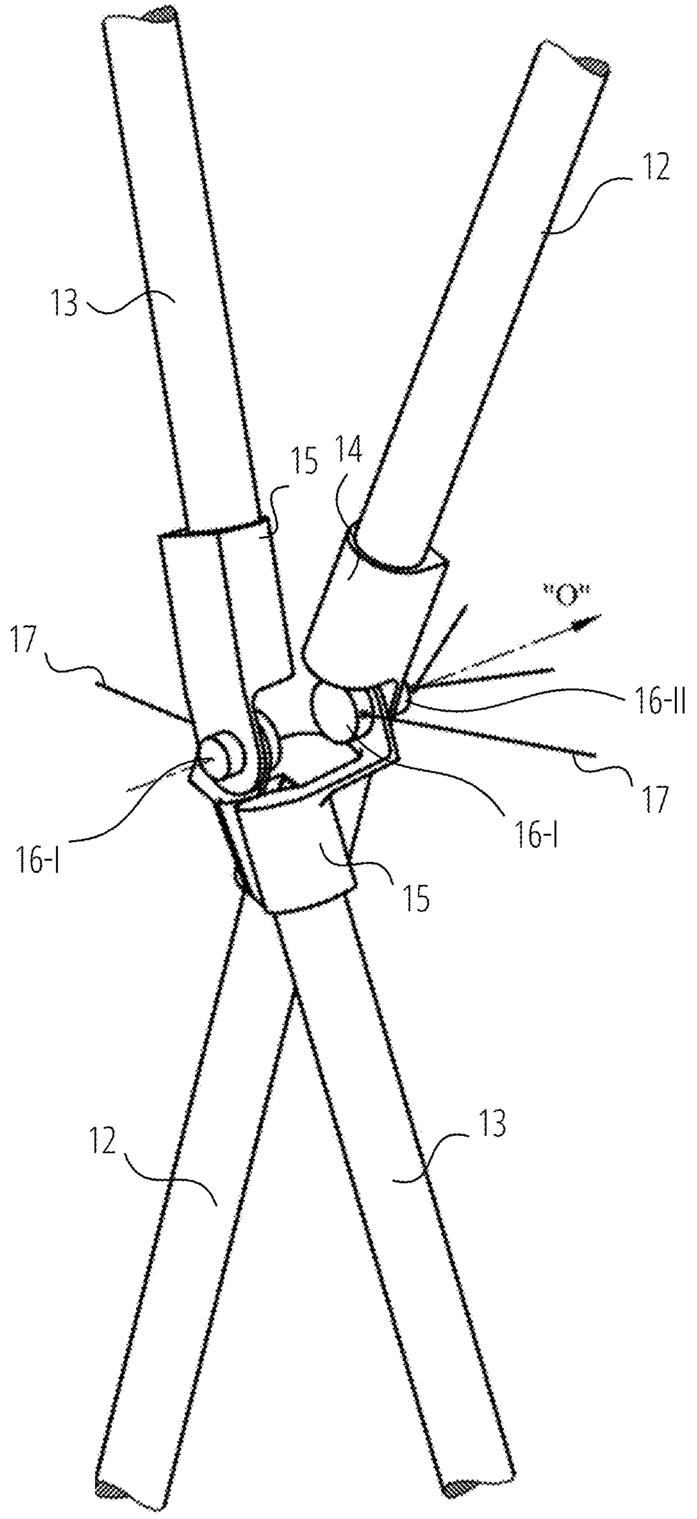
FIG. 16 illustrates another view of a double intermediate cylindrical joint, according to an example embodiment.

FIG. 16 illustrates a double intermediate cylindrical joint 11 in the deployed ring 2, according to an example embodiment. Specifically, FIG. 16 depicts the following components: an internal arm 12, an external arm 13, a tension cable 17, a sleeve 15, a sleeve 14, a short pin 16-I, and an edge 16-II.

Figure 17:
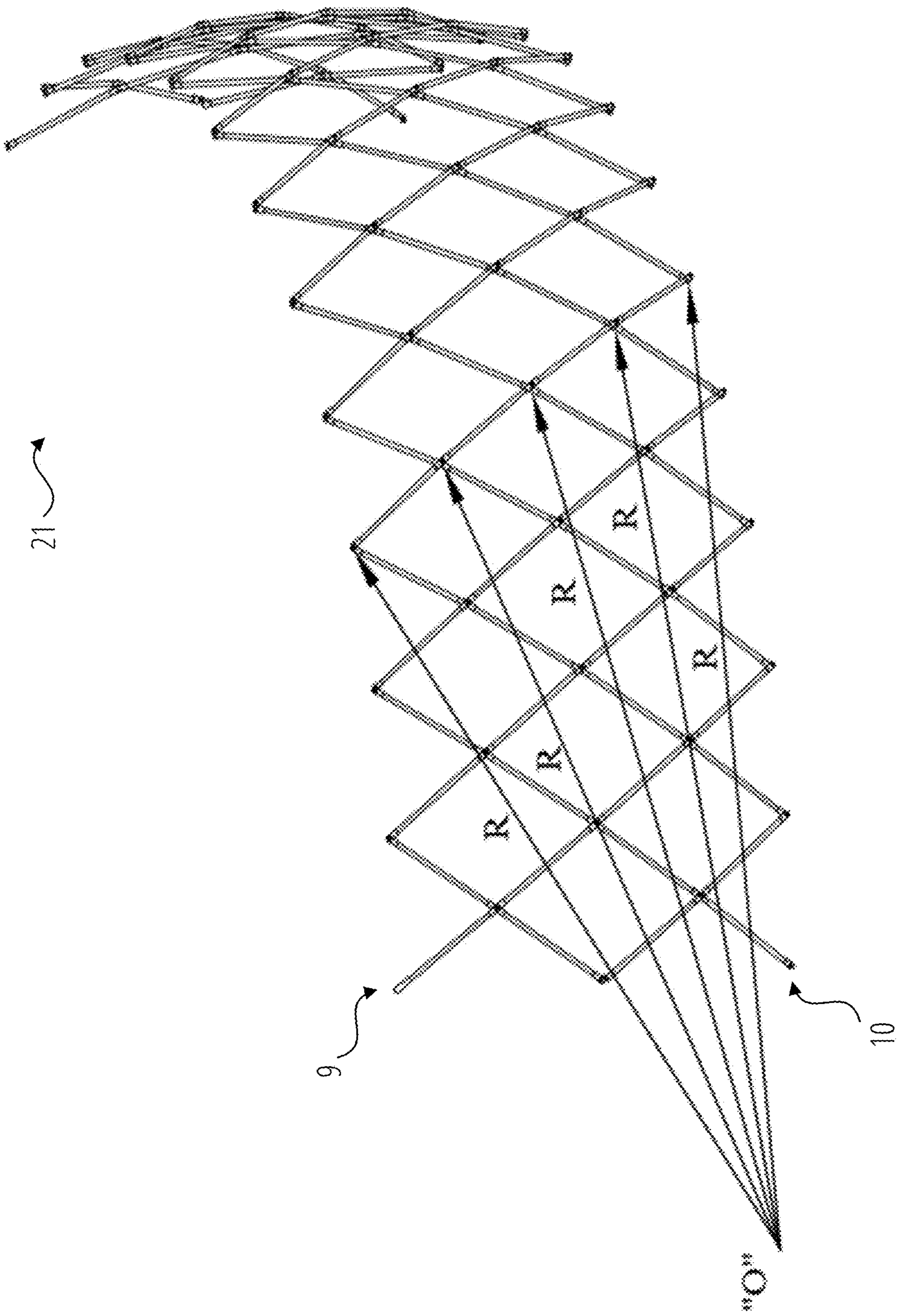
FIG. 17 illustrates a pantographic system formed by arms, according to an example embodiment.

FIG. 17 illustrates pantographic system 21 formed by arms, according to an example embodiment. Additionally, FIG. 17 depicts positions of a top spherical joint 9 and a bottom spherical joint 10 in a pantographic system 21.

Figure 18:
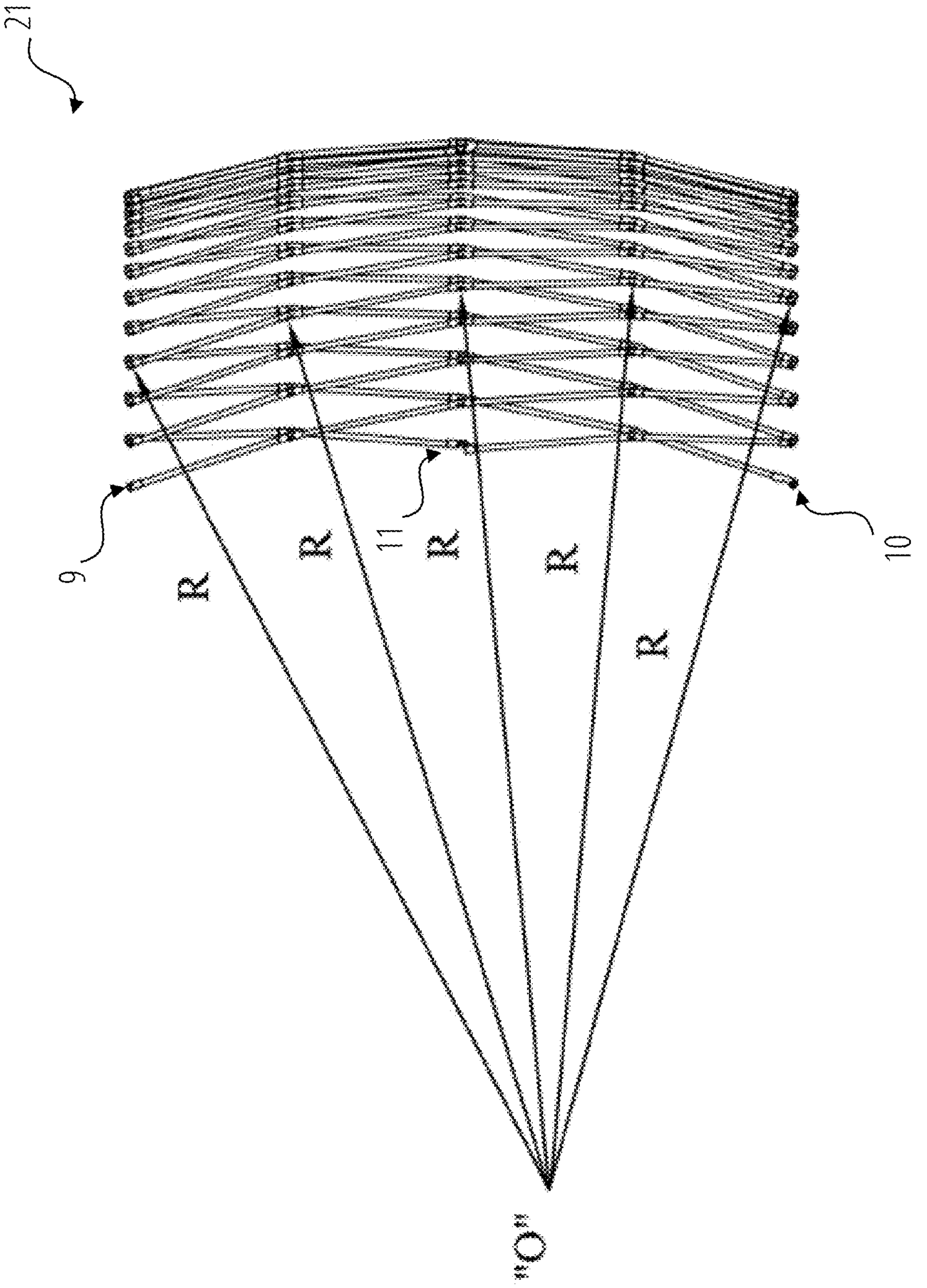
FIG. 18 illustrates the pantographic system in a folded state, according to an example embodiment.

FIG. 18 illustrates pantographic system 21 in folded state, according to an example embodiment. Additionally, FIG. 18 depicts positions of a top spherical joint 9, a bottom spherical joint 10, and a double intermediate cylindrical joint 11 in pantographic system 21.

Figure 19:
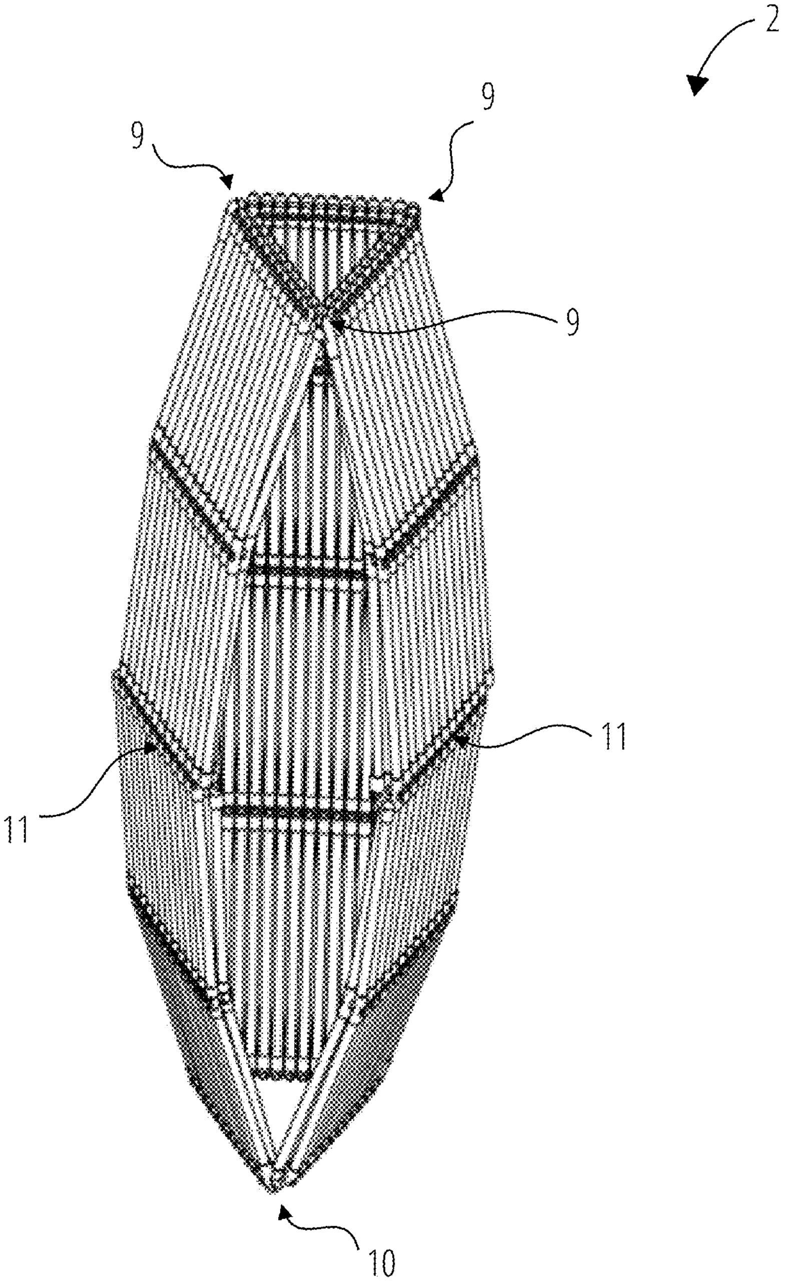
FIG. 19 illustrates the deployable ring in the folded state, according to an example embodiment.

FIG. 19 illustrates deployable ring 2 in folded state, according to an example embodiment. Additionally, FIG. 19 depicts positions of a top spherical joint 9, a bottom spherical joint 10, and a double intermediate cylindrical joint 11 in deployable ring 2.

Figure 20:
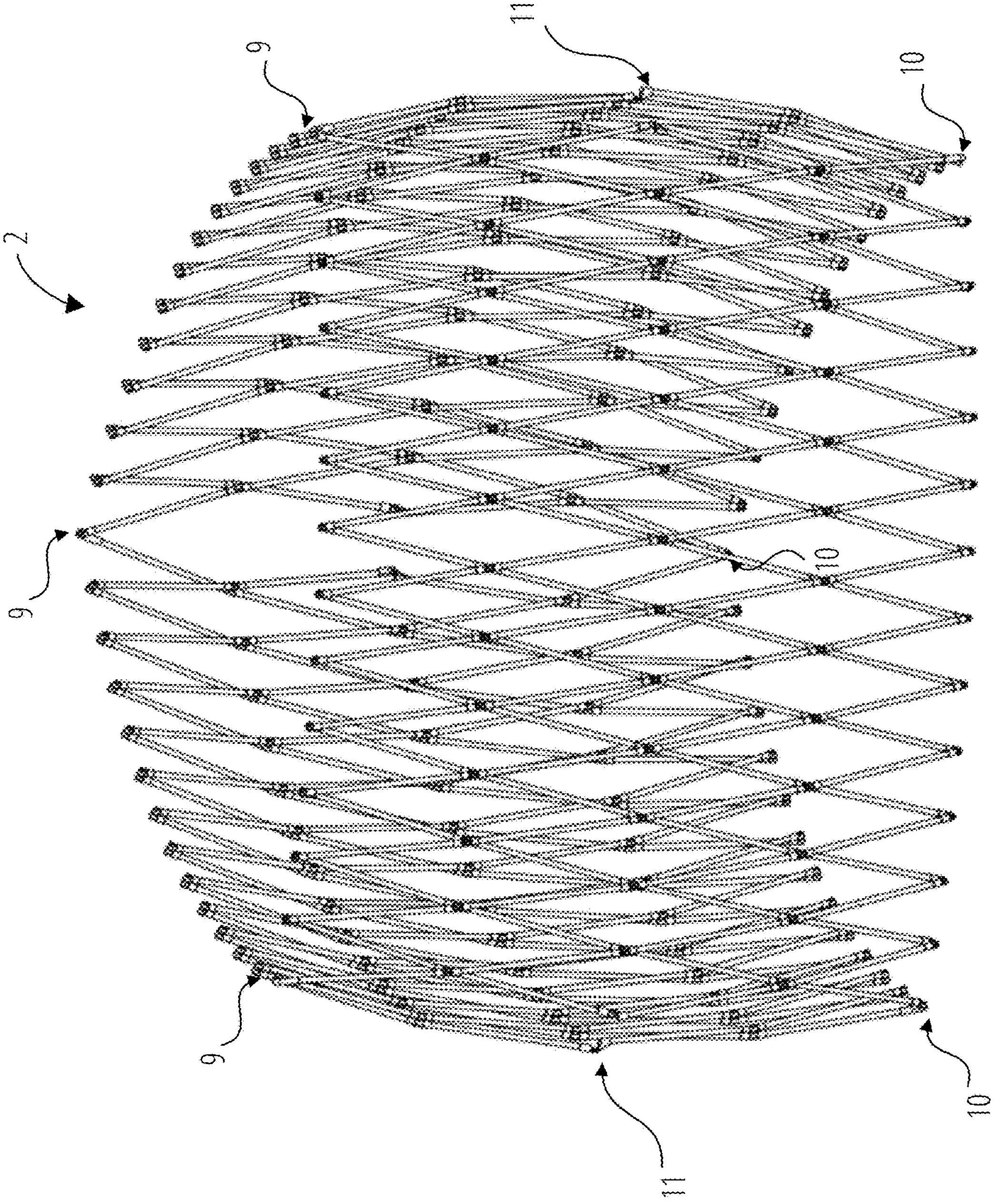
FIG. 20 illustrates the deployable ring in the process of deployment, according to an example embodiment.

FIG. 20 illustrates deployable ring 2 in the process of deployment, according to an example embodiment. Additionally, FIG. 20 depicts positions of a top spherical joint 9, a bottom spherical joint 10, and a double intermediate cylindrical joint 11 in deployable ring 2.

Figure 21:
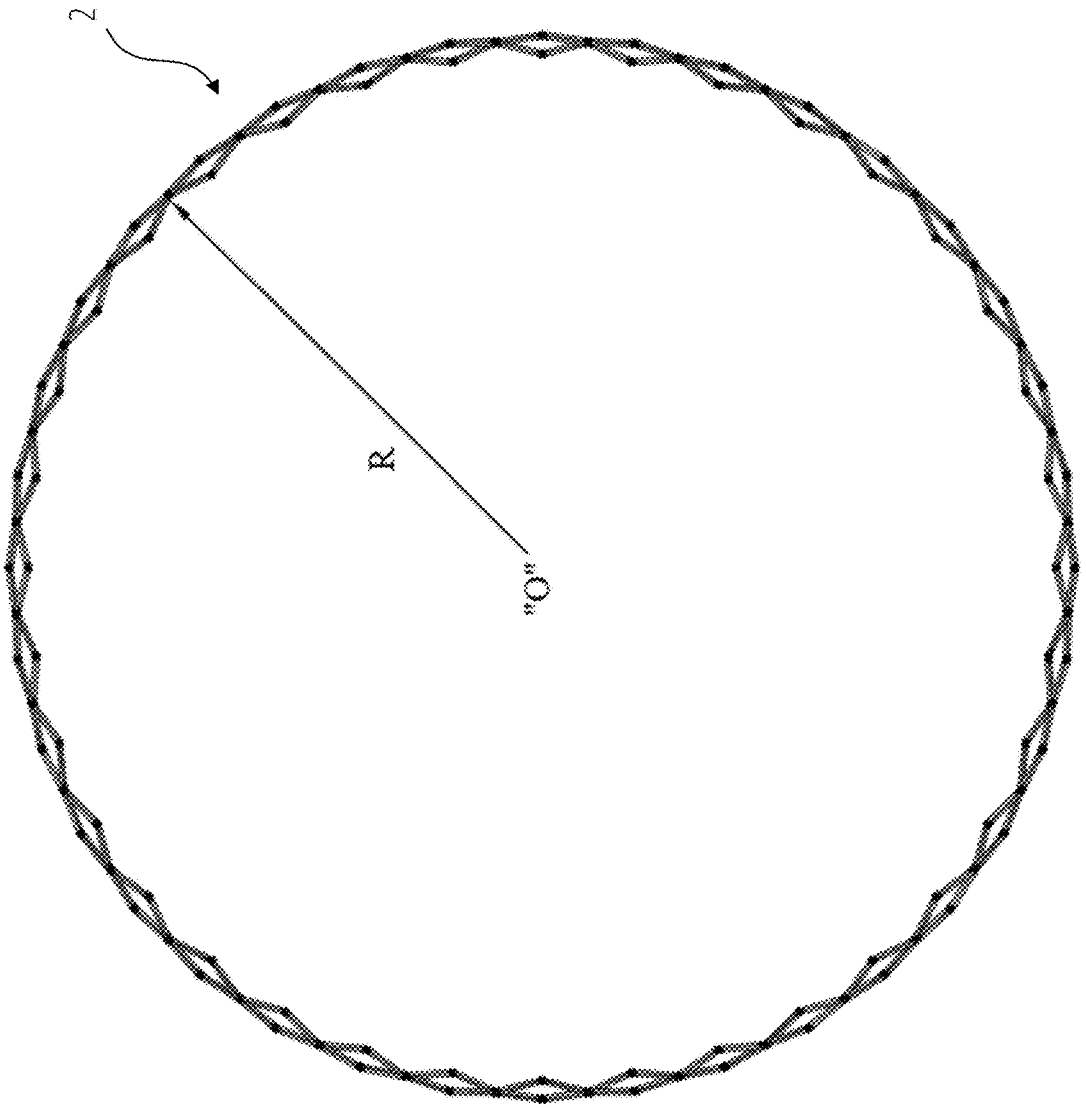
FIG. 21 is a top view of the deployable ring in the unfolded state, according to an example embodiment.

FIG. 21 is a top view of deployable ring 2 in unfolded state, according to an example embodiment.

Figure 22:
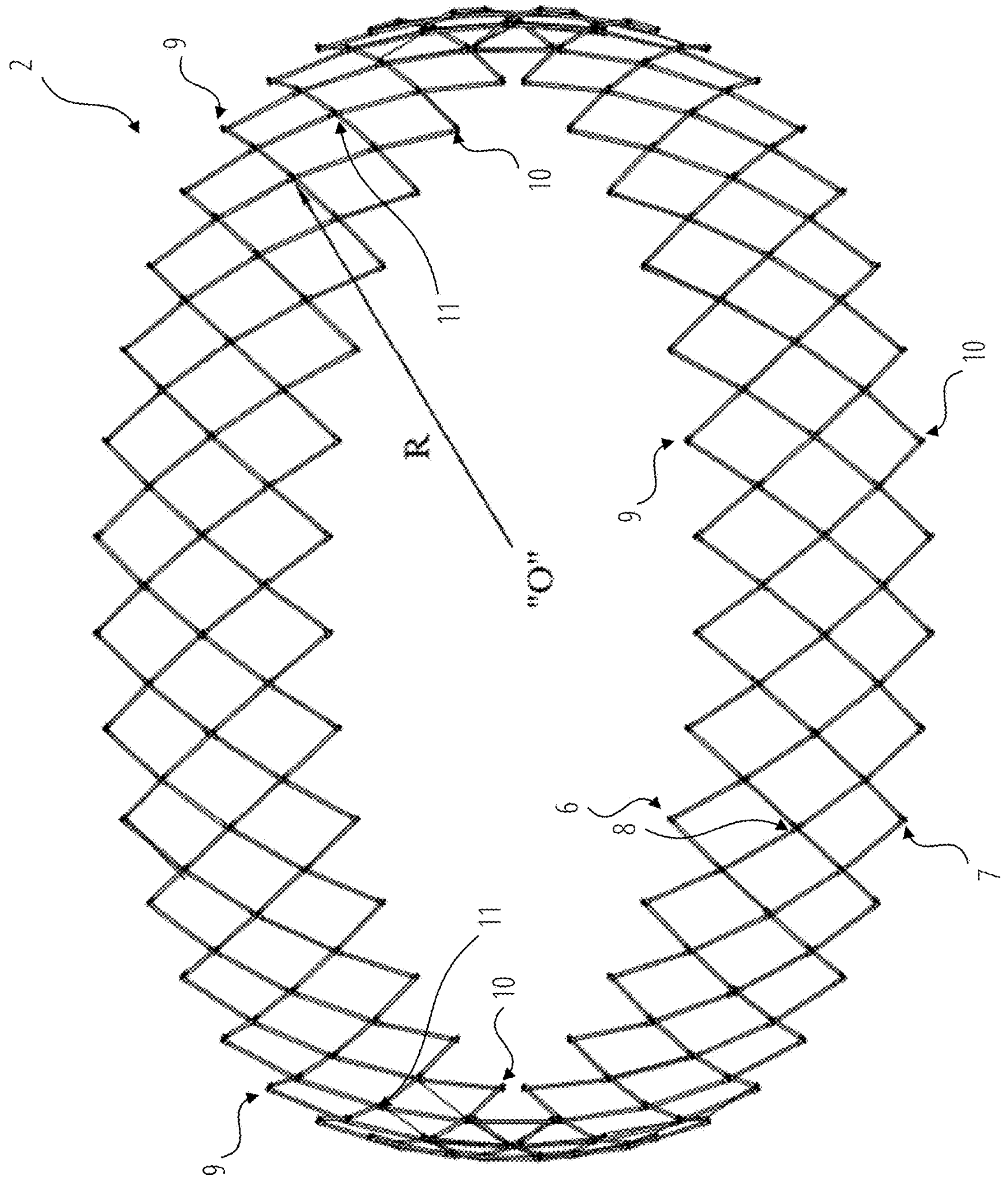
FIG. 22 illustrates the deployable ring in the unfolded state, according to an example embodiment.

FIG. 22 illustrates deployable ring 2 in unfolded state, according to an example embodiment. Additionally, FIG. 22 depicts positions of an intermediate cylindrical joint 8, a bottom cylindrical joint 7, a top cylindrical joint 6, a top spherical joint 9, a bottom spherical joint 10, and a double intermediate cylindrical joint 11 in deployable ring 2.

Figure 23:
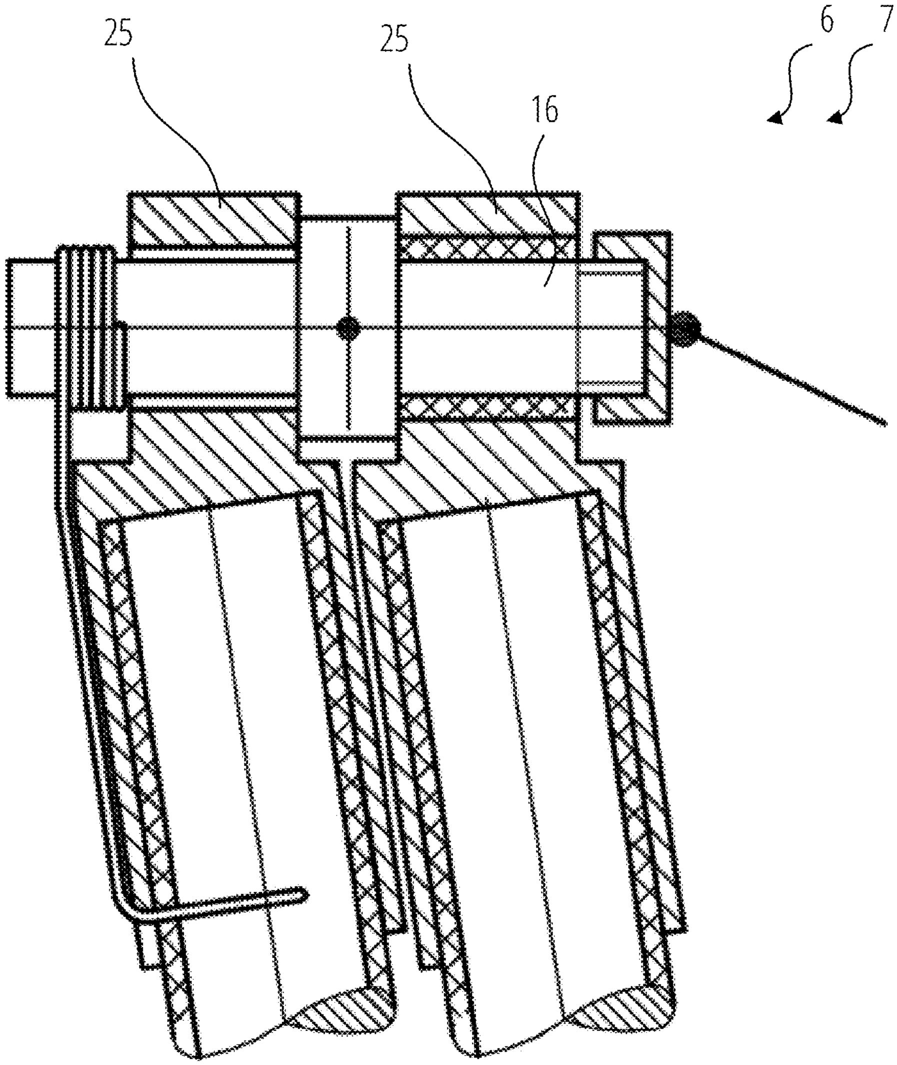
FIG. 23 is a cross-section view of a top cylindrical joint and a bottom cylindrical joint, according to an example embodiment.

FIG. 23 is a cross-section view of a top cylindrical joint 6 or a bottom cylindrical joint 7, according to an example embodiment. Additionally, FIG. 23 depicts an internal pin 16 and an inner socket 25.

Figure 24:
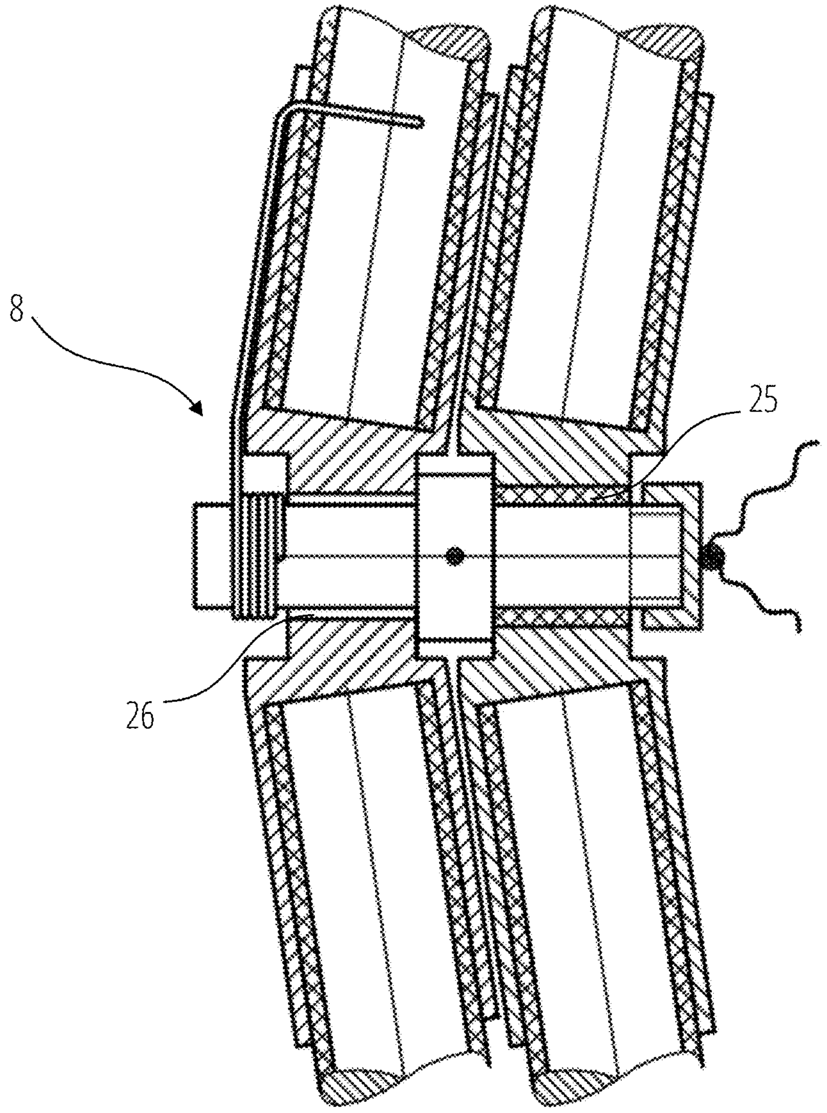
FIG. 24 is a cross-section view of an intermediate cylindrical joint, according to an example embodiment.

FIG. 24 is a cross-section view of an intermediate cylindrical joint 8, according to an example embodiment. Additionally, FIG. 24 depicts an inner socket 25 and an outer socket 26.

Figure 25:
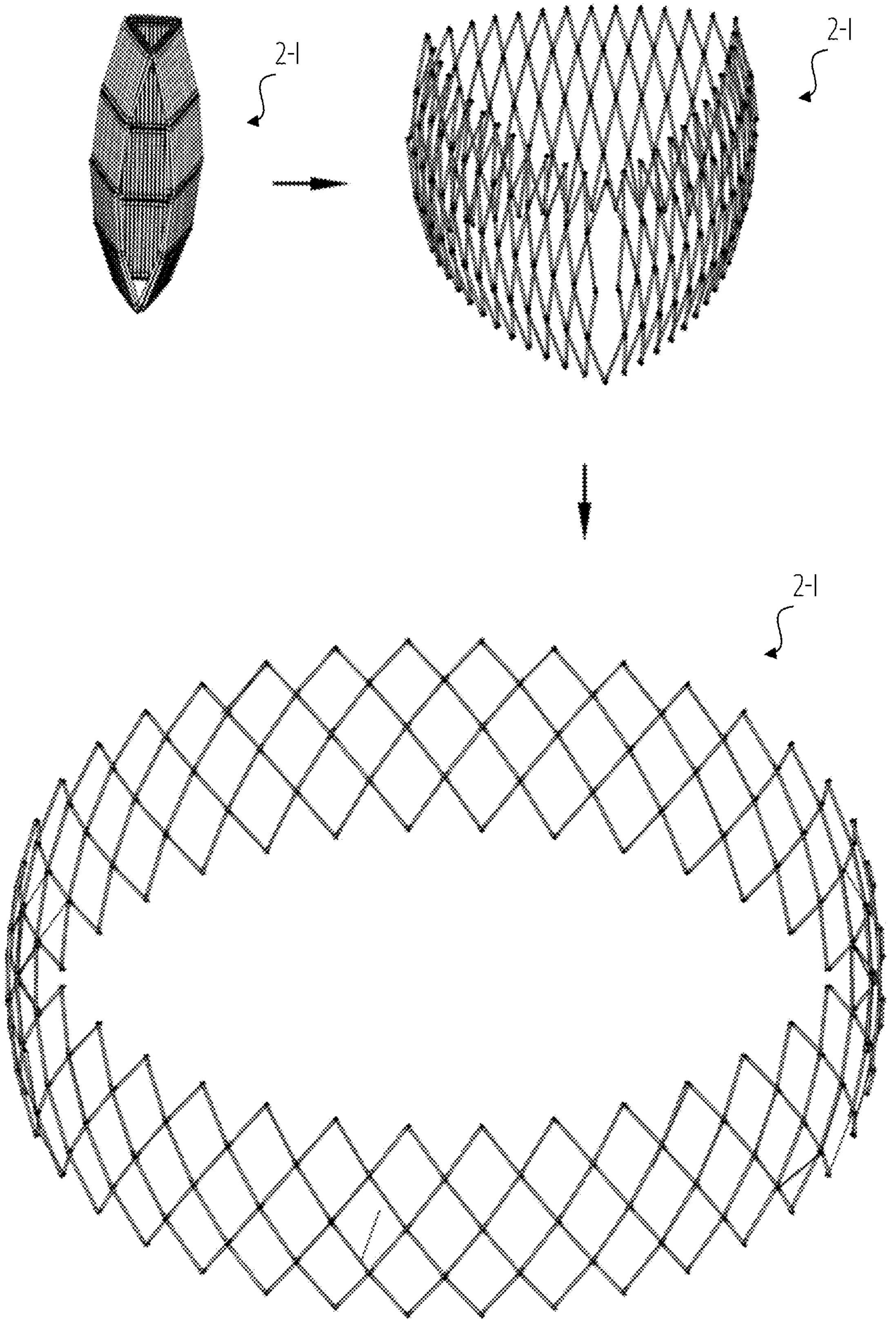
FIGS. 25-28 depict different folding states of the deployable ring, according to example embodiments.

FIG. 25 depicts different folding states of the deployable ring of configuration 2-I, according to an example embodiment.

Figure 26:
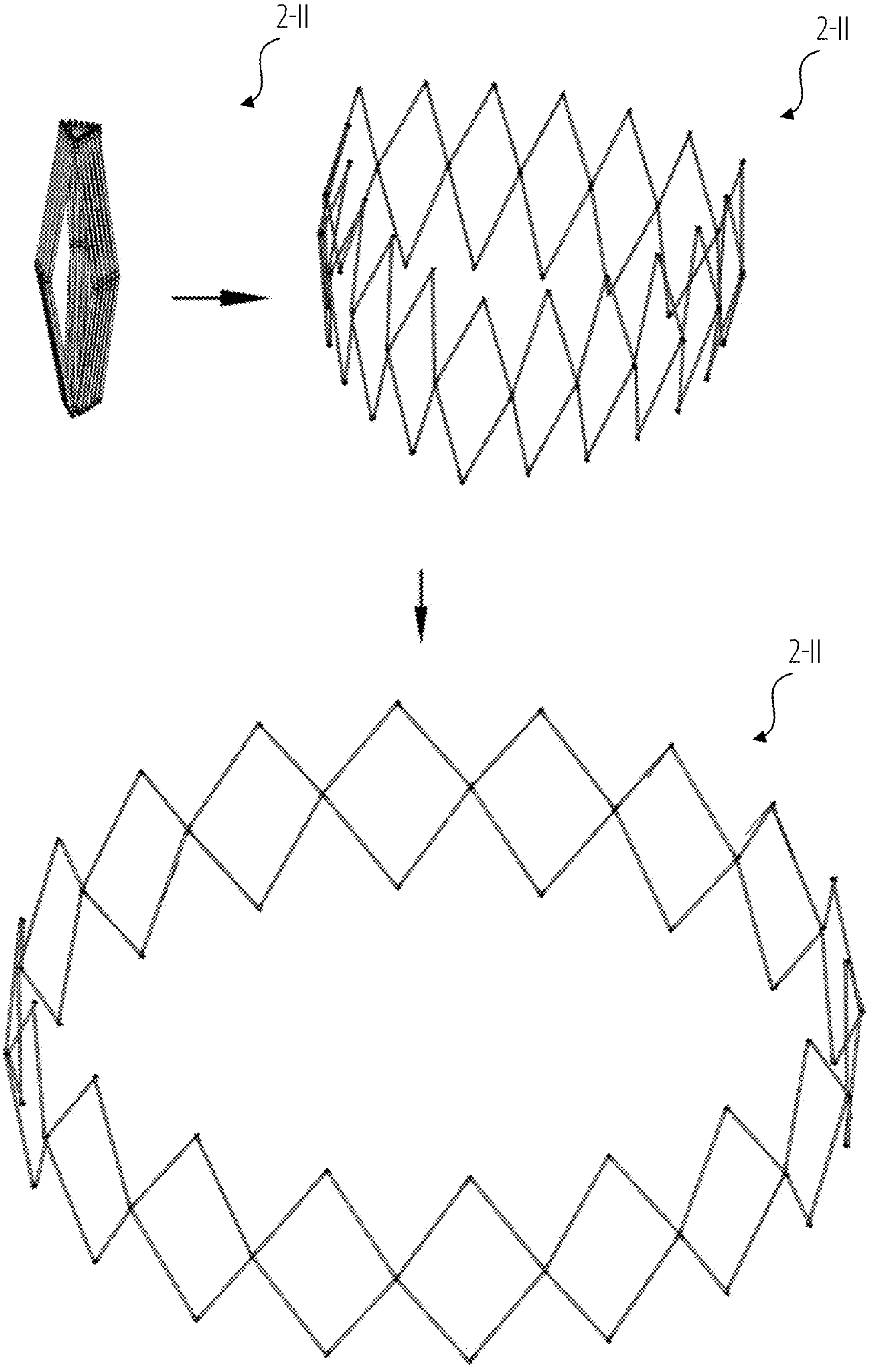

FIG. 26 depicts different folding states of the deployable ring of configuration 2-II, according to an example embodiment.

Figure 27:
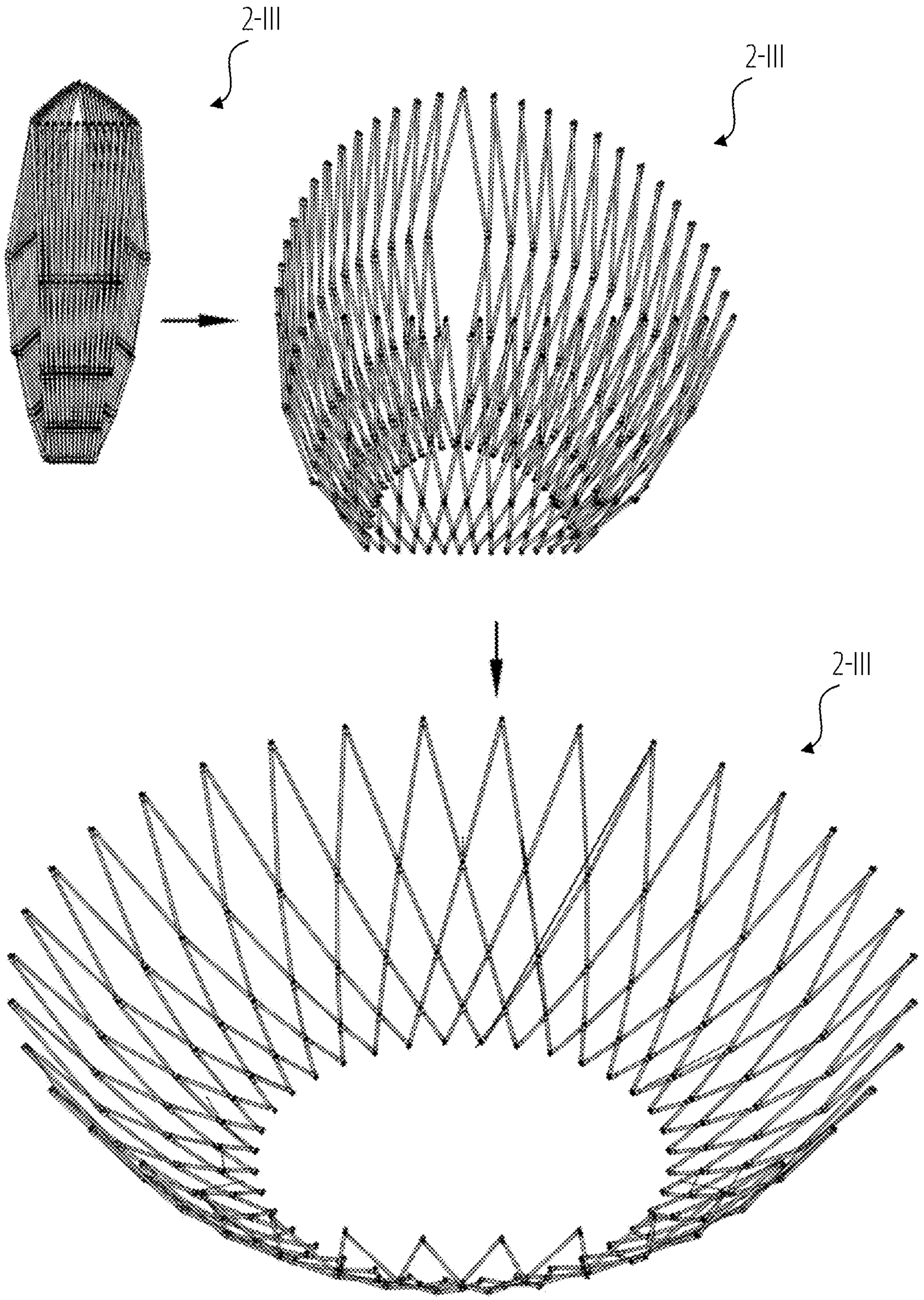

FIG. 27 depicts different folding states of the deployable ring of configuration 2-III, according to an example embodiment.

Figure 28:
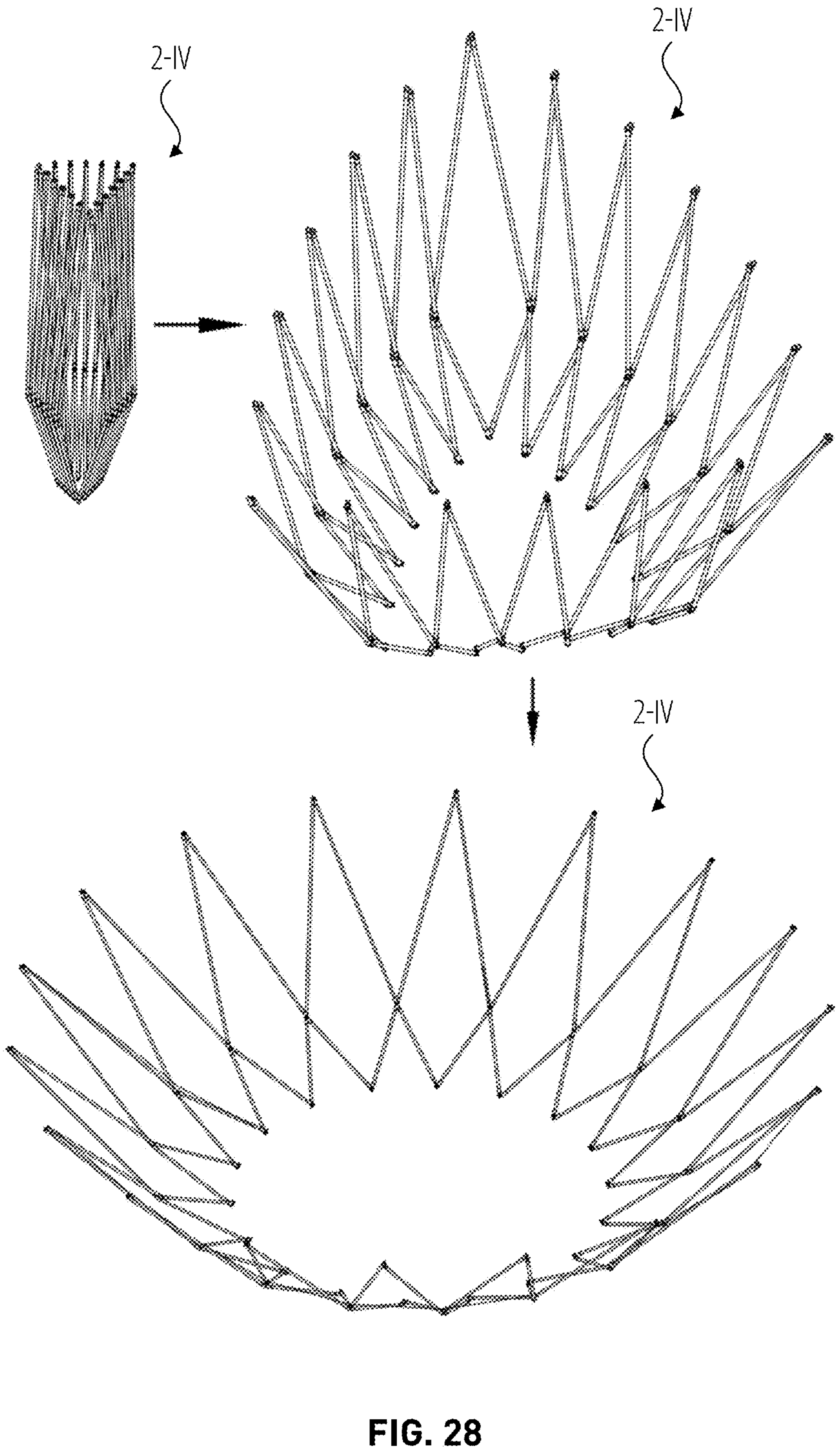

FIG. 28 depicts different folding states of the deployable ring of configuration 2-IV, according to an example embodiment.

Figure 29:
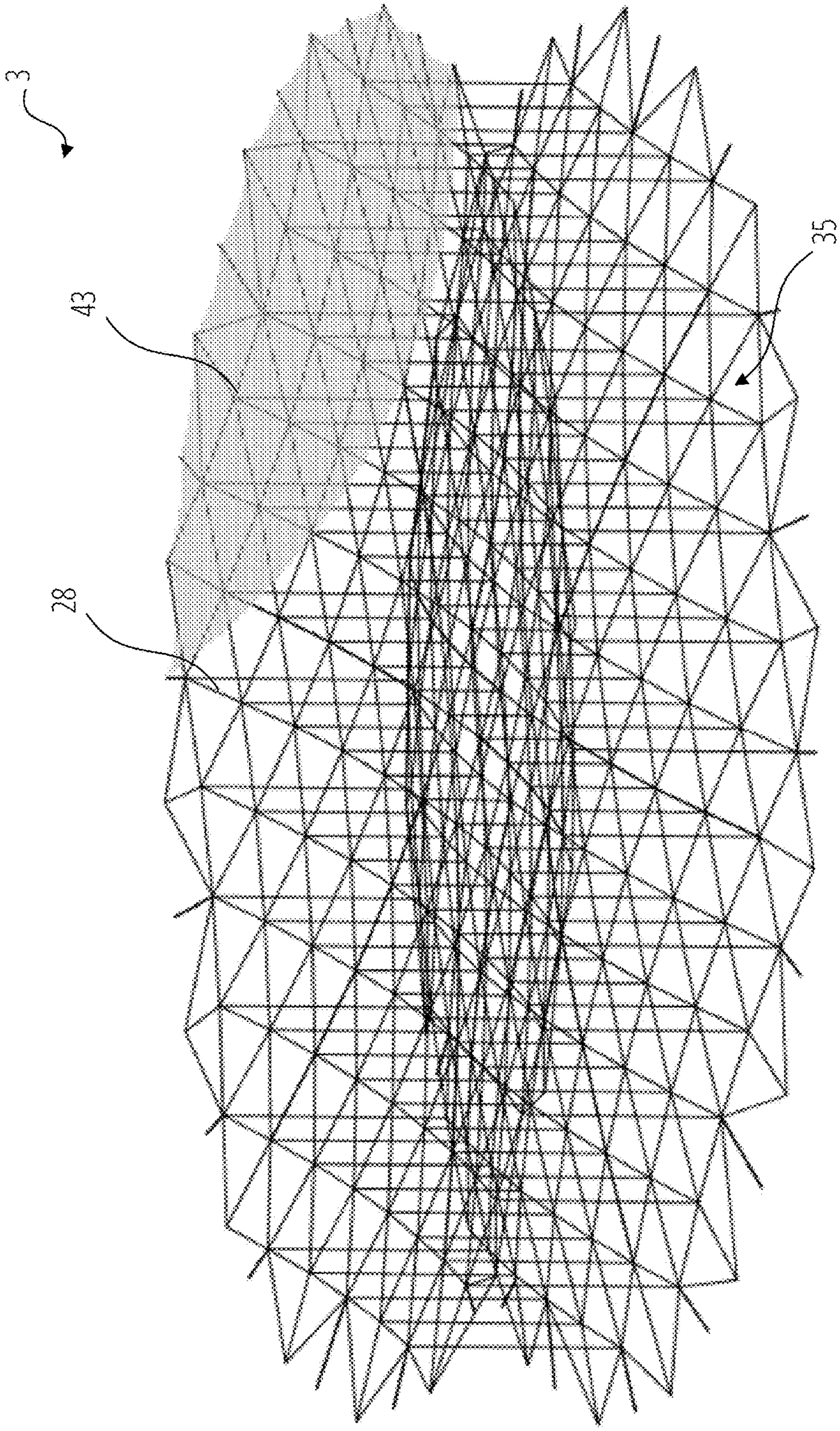
FIG. 29 shows flexible reflector, according to an example embodiment.

FIG. 29 shows flexible reflector 3, according to an example embodiment. Specifically, FIG. 29 depicts the following components: a tensioned screen 43, an upper concave mesh 28, and a lower convex mesh 35.

Figure 30:
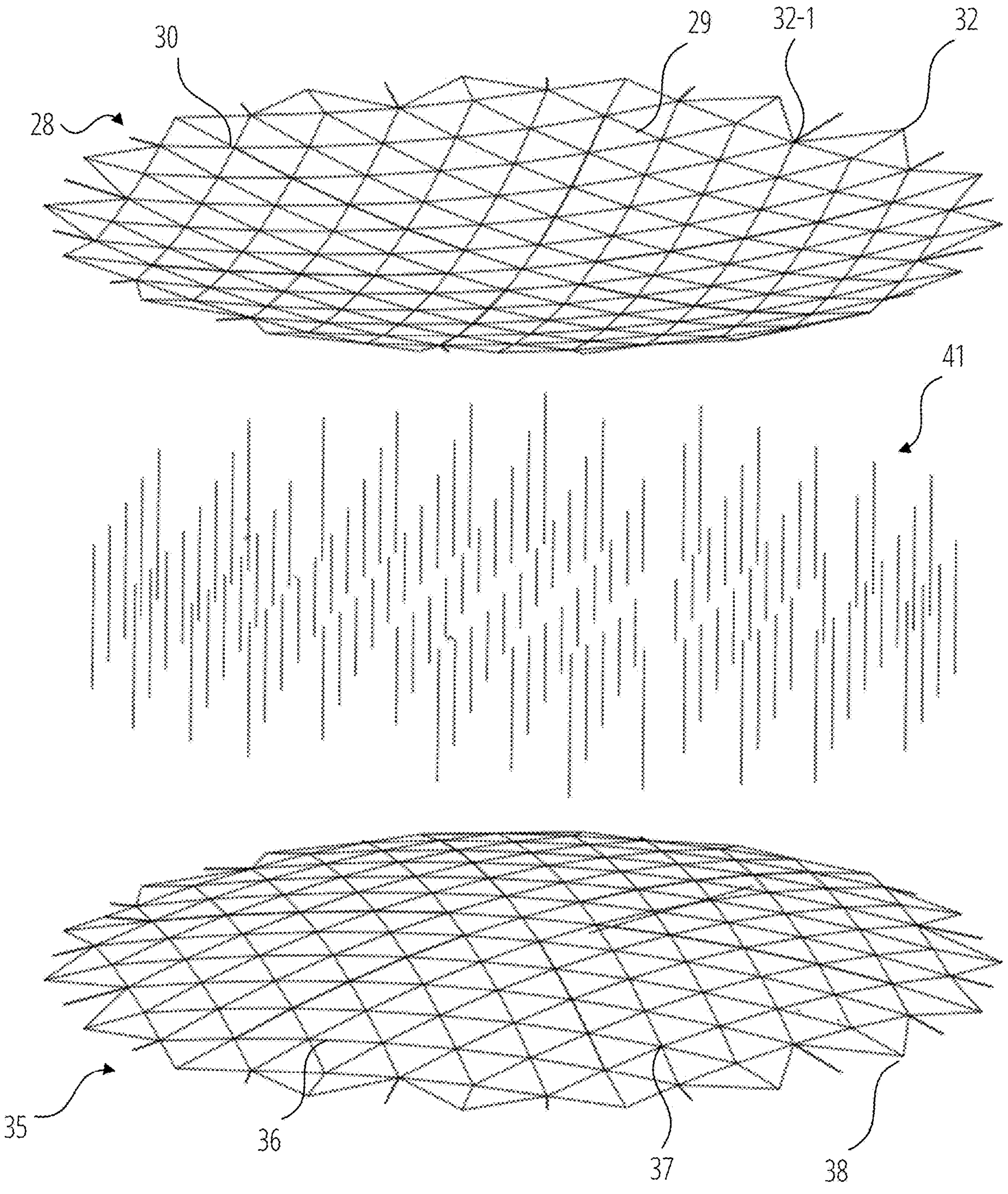
FIG. 30 illustrates components of a flexible reflector of FIG. 29, according to an example embodiment.

FIG. 30 illustrates components of a flexible reflector 3 of FIG. 29, according to an example embodiment. Specifically, FIG. 29 depicts the following components: an upper concave mesh 28, a lower convex mesh 35, an intermediate node 30, a flexible rod 29, a peripheral node 32, a flexible rod 41, a flexible rod 36, an intermediate node 37, a peripheral node 38, and an edge node 32-1.

Figure 31:
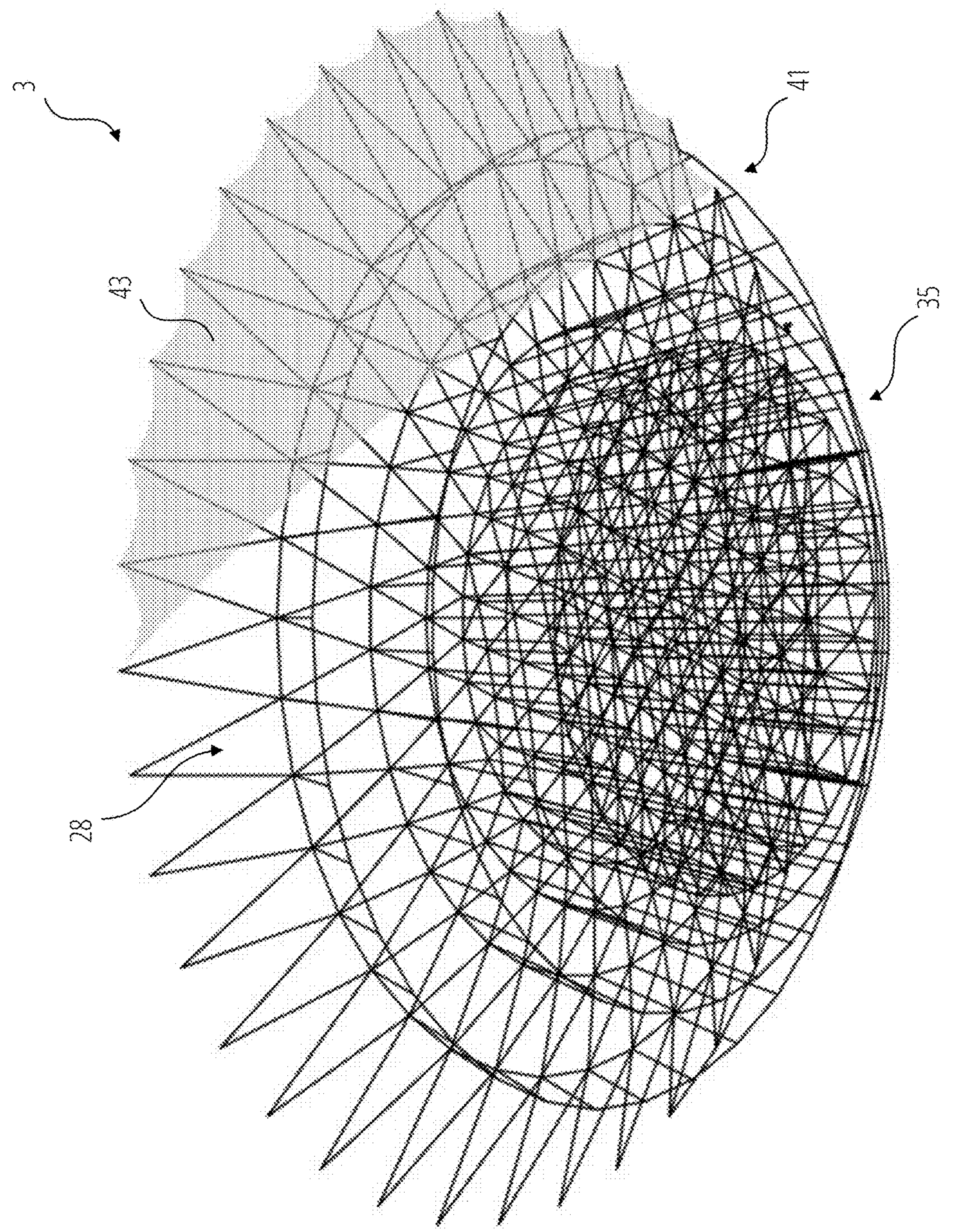
FIG. 31 illustrates flexible reflector, according to an example embodiment.

FIG. 31 illustrates flexible reflector 3, according to an example embodiment. Specifically, FIG. 31 depicts flexible reflector 3 mounted to deployable ring 2 of configuration 2-III. Additionally, FIG. 31 shows the following components: a tensioned screen 43, an upper concave mesh 28, a lower convex mesh 35, and a flexible rod 41.

Figure 32:
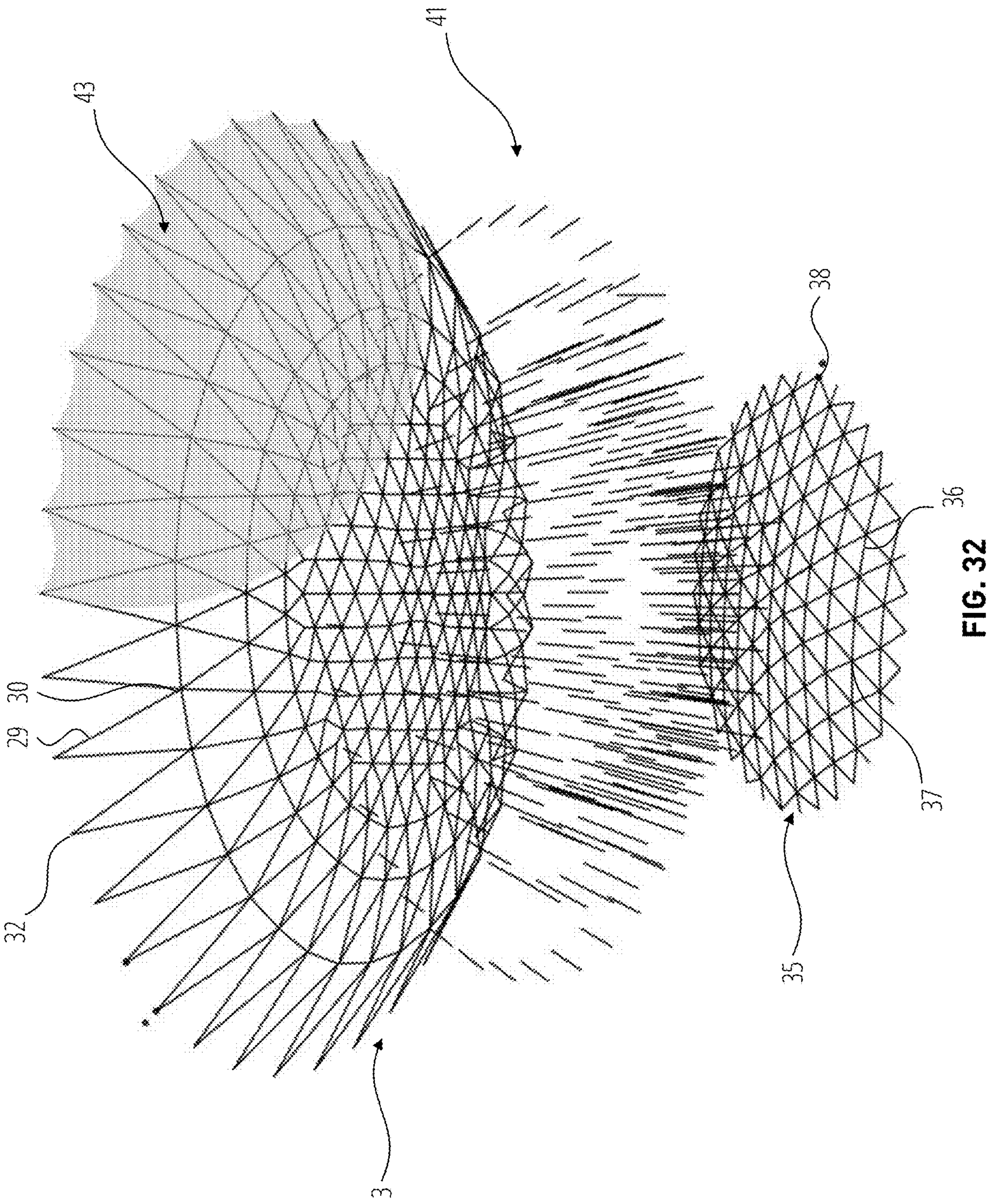
FIG. 32 illustrates an exploded view flexible reflector, according to an example embodiment.

FIG. 32 illustrates an exploded view flexible reflector 3, according to an example embodiment. Specifically, FIG. 32 depicts flexible reflector 3 used with deployable ring 2 of configuration 2-III. Additionally, FIG. 31 shows the following components: a tensioned screen 43, a lower convex mesh 35, an intermediate node 30, a flexible rod 29, a peripheral node 32, a flexible rod 41, a flexible rod 36, an intermediate node 37, and a peripheral node 38.

Figure 33:
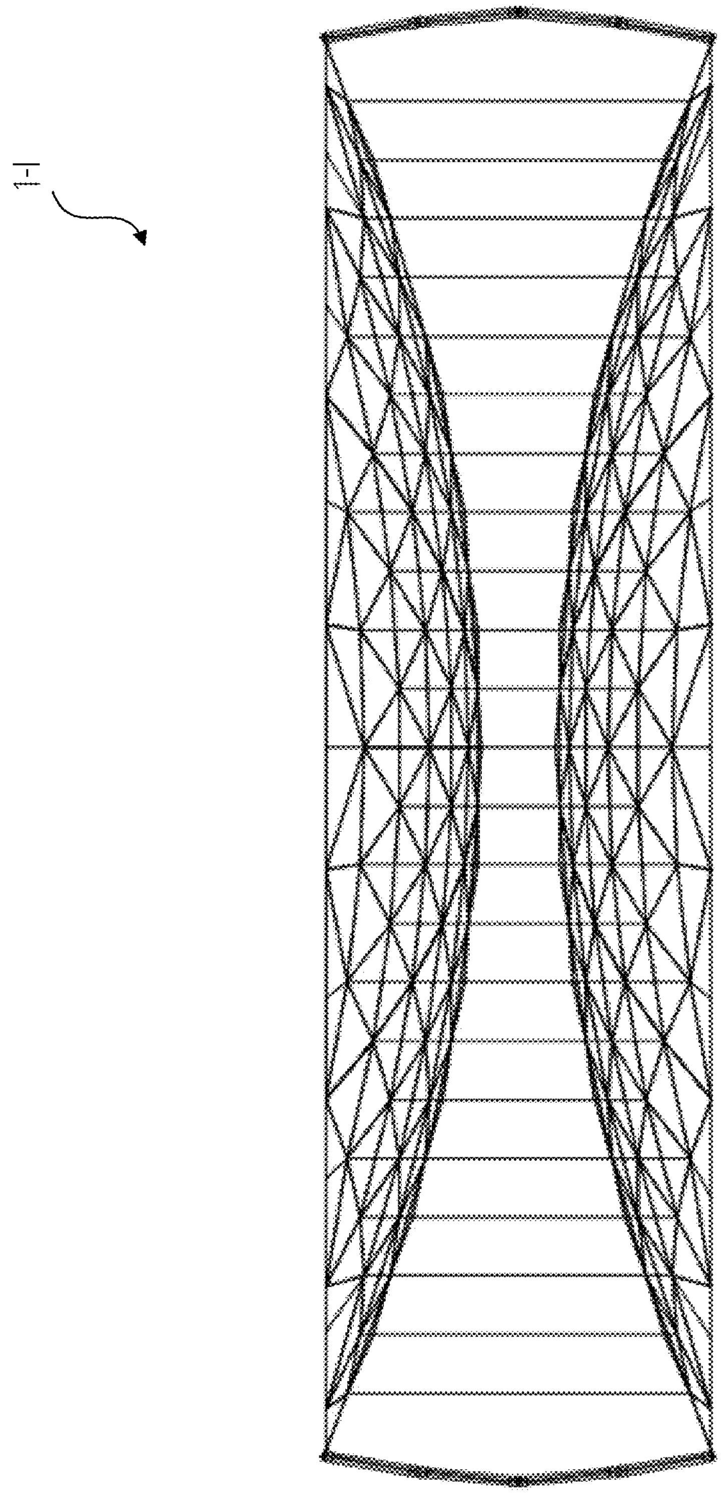
FIGS. 33-45 shows various structures of an antenna, according to example embodiments.

FIG. 33 shows the structure of antenna 1, according to an example embodiment. Antenna 1 of FIG. 33 corresponds to deployable ring 2 in configuration 2-I.

Figure 34:
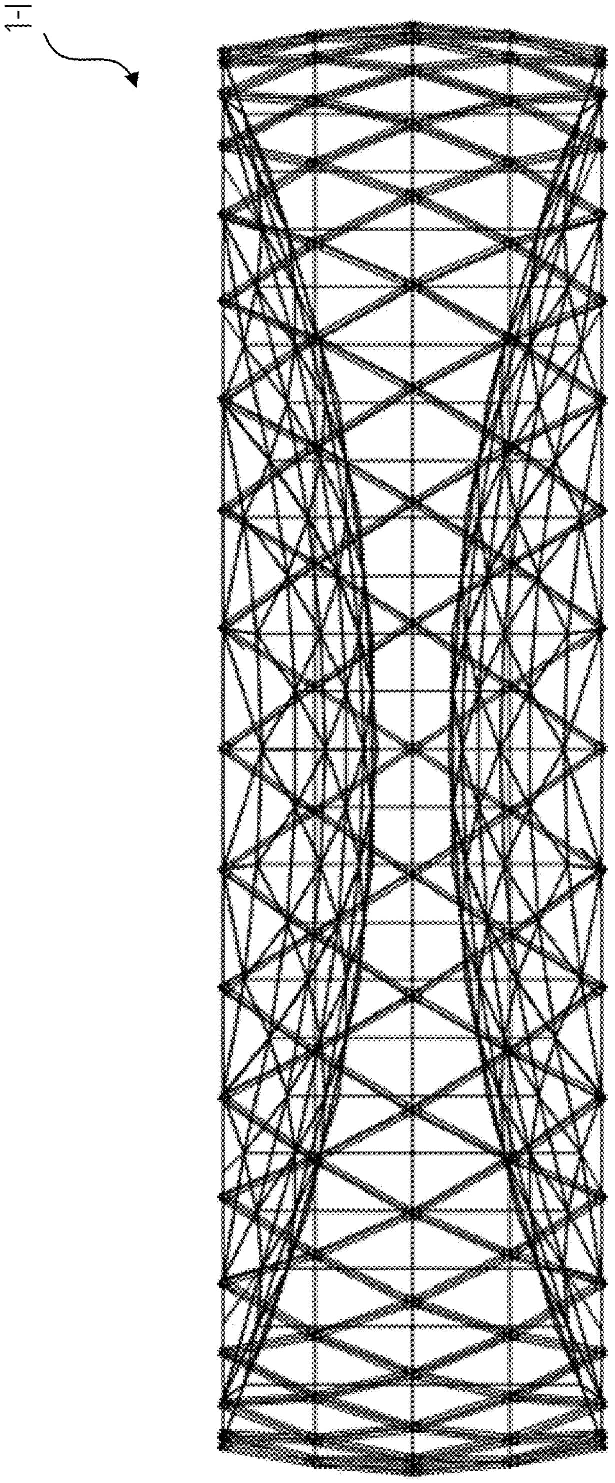

FIG. 34 shows the structure of antenna 1, according to an example embodiment. Antenna 1 of FIG. 34 corresponds to deployable ring 2 in configuration 2-I.

Figure 35:
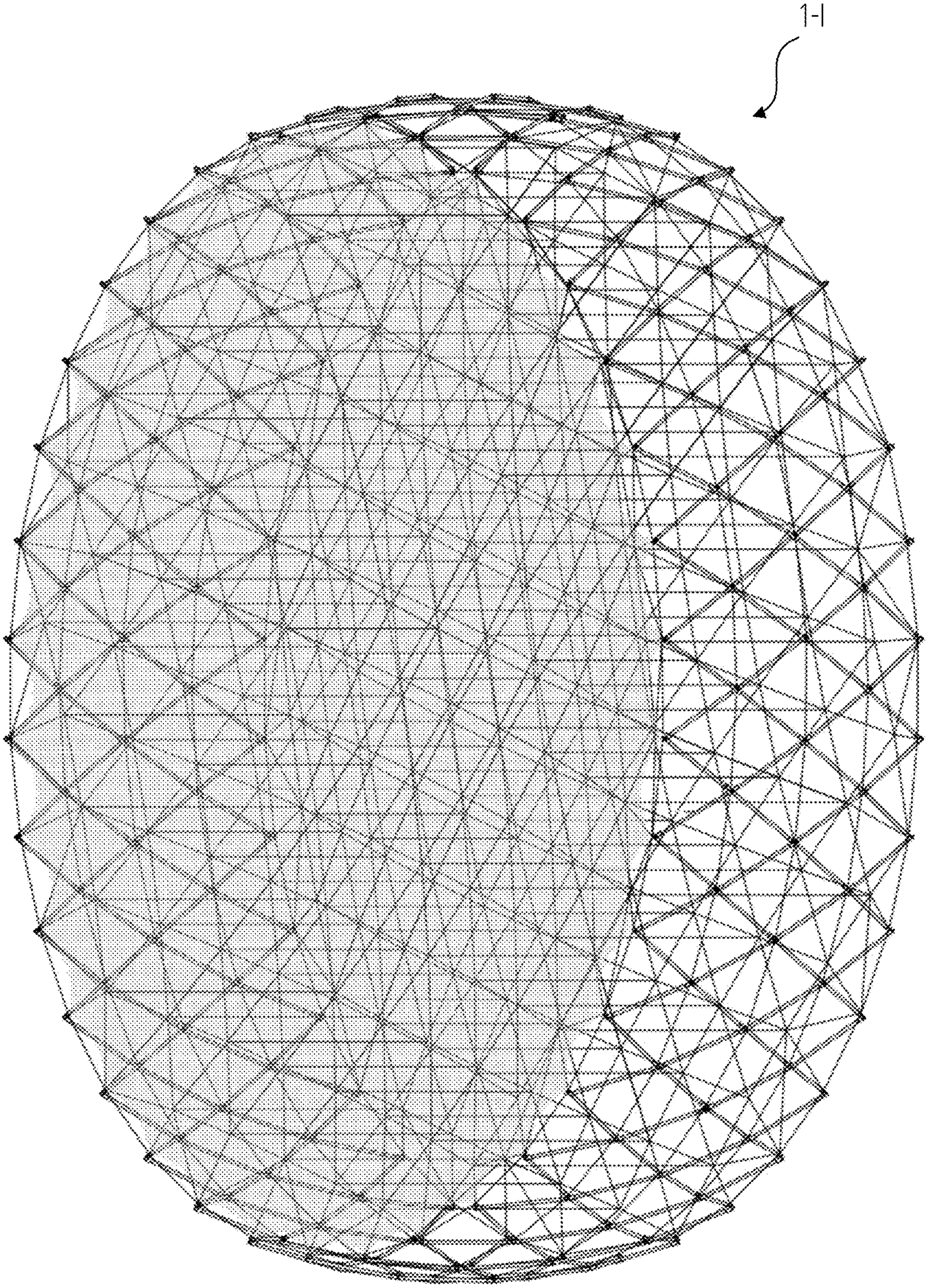

FIG. 35 shows the structure of antenna 1, according to an example embodiment. Antenna 1 of FIG. 35 corresponds to deployable ring 2 in configuration 2-I.

Figure 36:
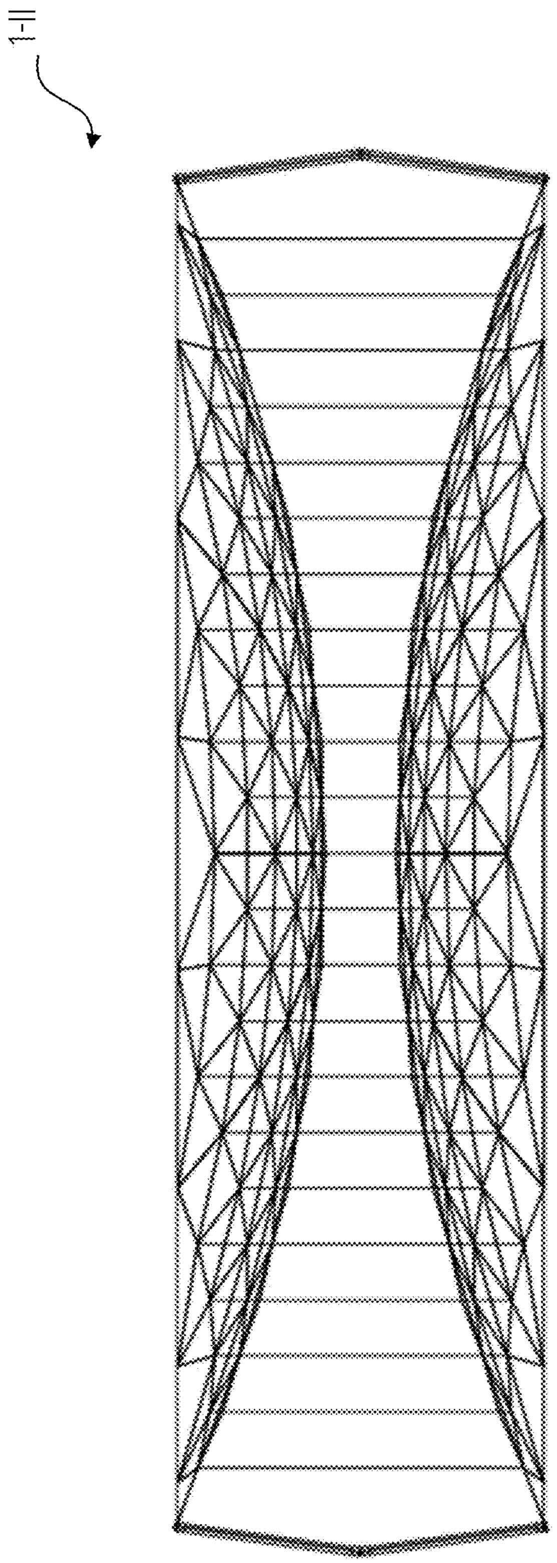

FIG. 36 shows the structure of antenna 1, according to an example embodiment. Antenna 1 of FIG. 37 corresponds to deployable ring 2 in configuration 2-II.

Figure 37:
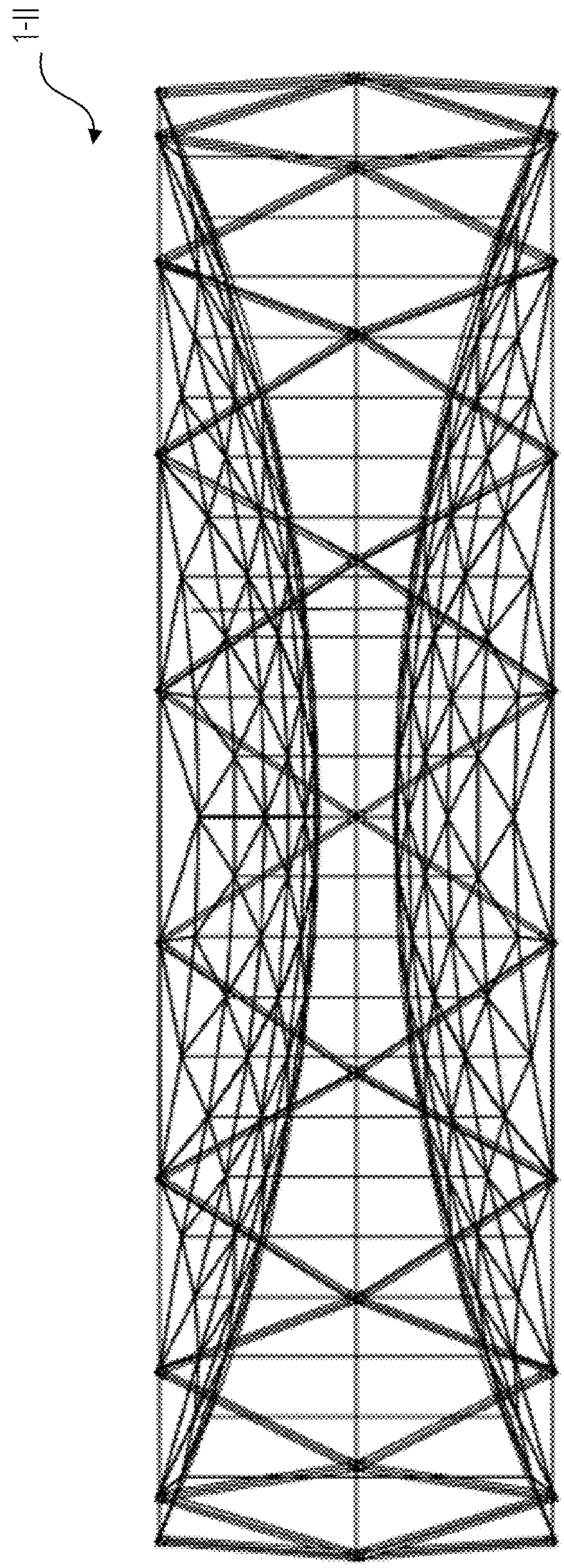

FIG. 37 shows the structure of antenna 1, according to an example embodiment. Antenna 1 of FIG. 37 corresponds to deployable ring 2 in configuration 2-II.

Figure 38:
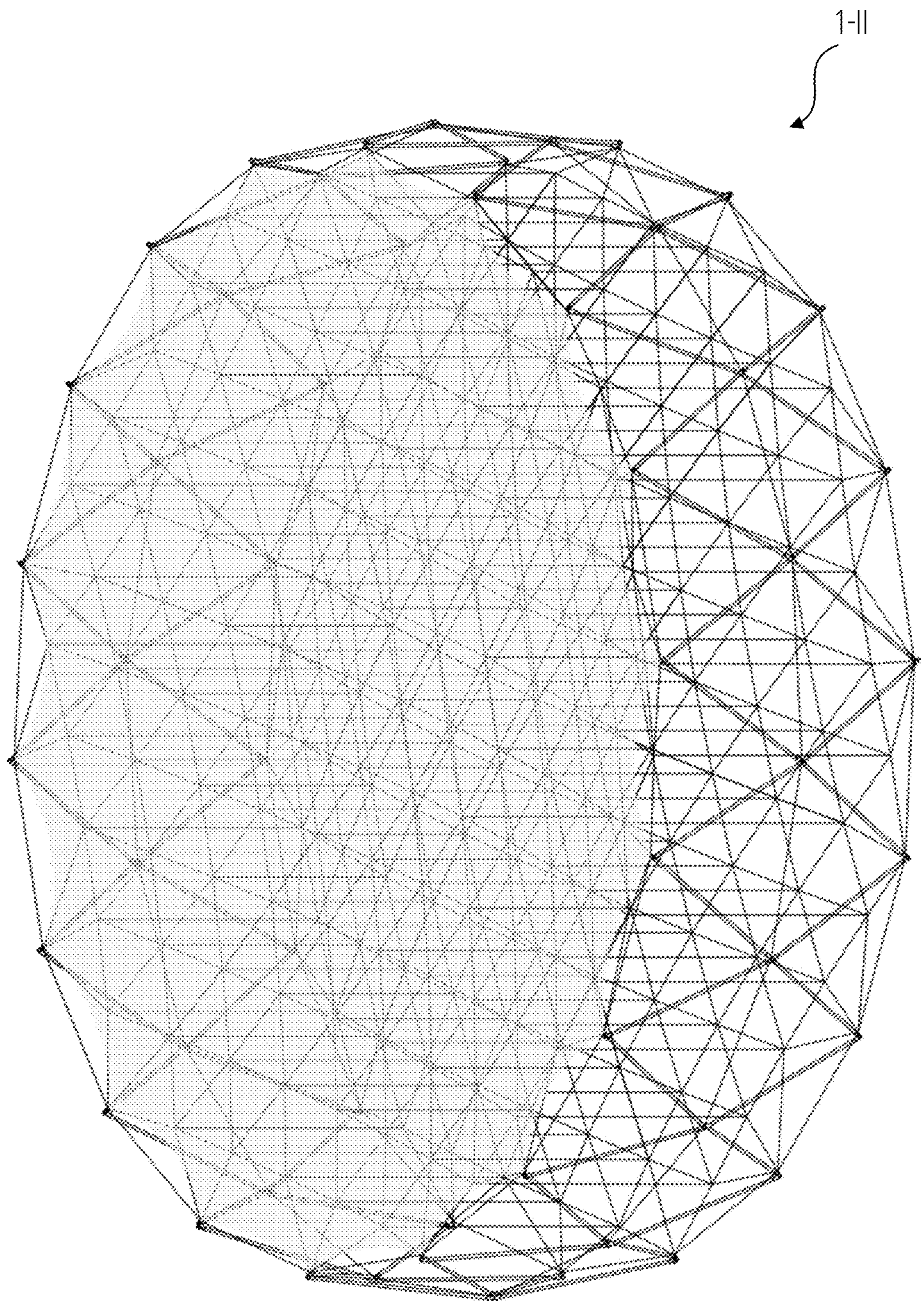

FIG. 38 shows the structure of antenna 1, according to an example embodiment. Antenna 1 of FIG. 38 corresponds to deployable ring 2 in configuration 2-II.

Figure 39:
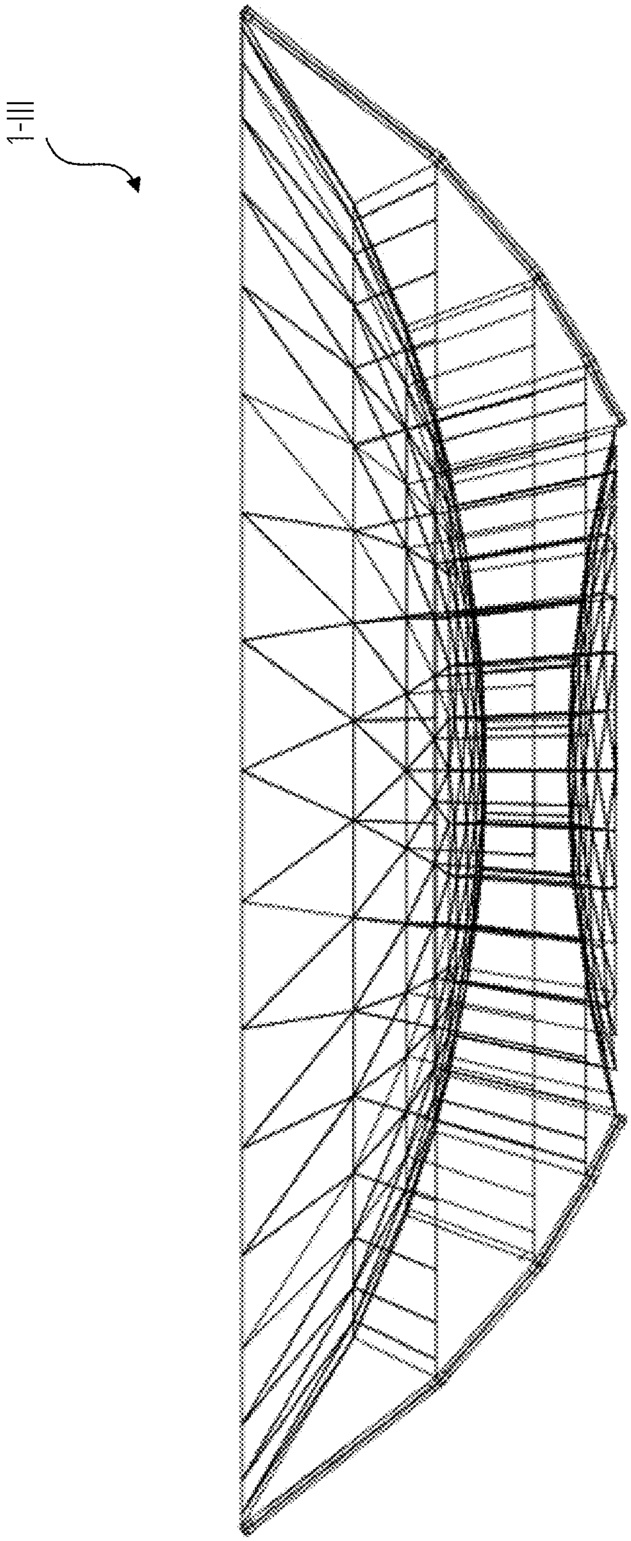

FIG. 39 shows the structure of antenna 1, according to an example embodiment. Antenna 1 of FIG. 39 corresponds to deployable ring 2 in configuration 2-III.

Figure 40:
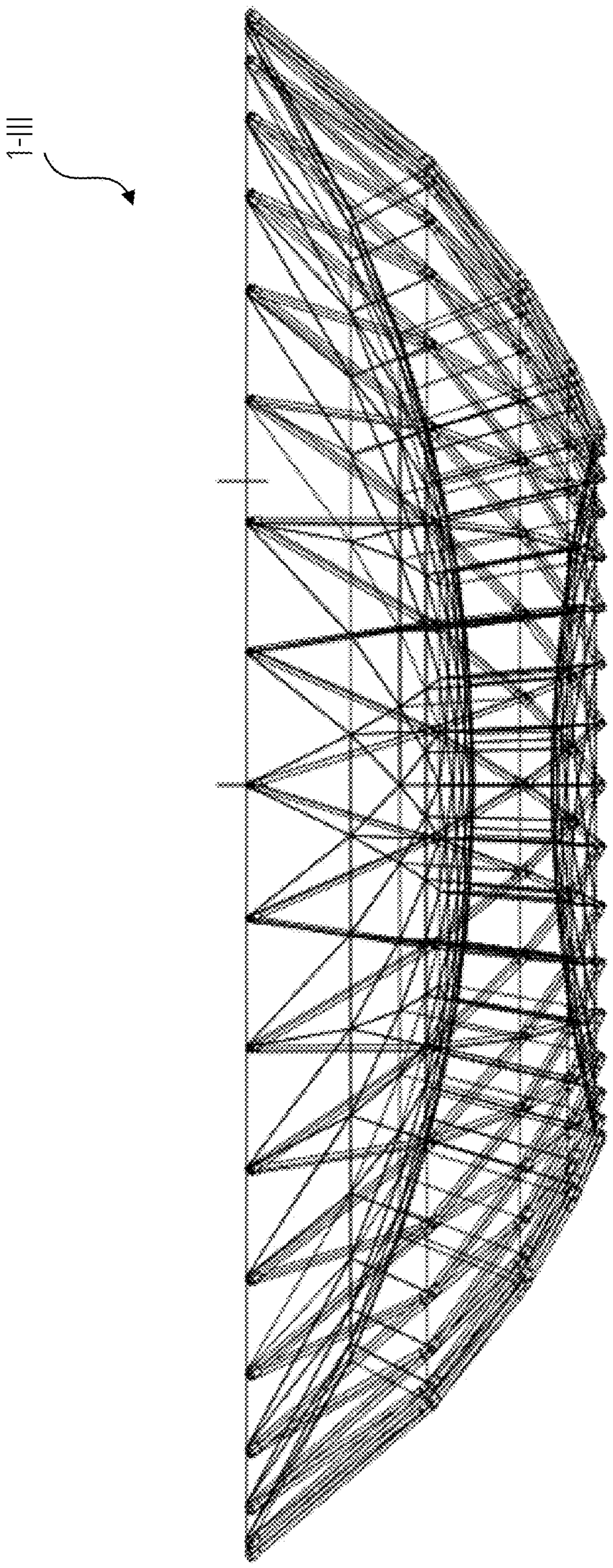

FIG. 40 shows the structure of antenna 1, according to an example embodiment. Antenna 1 of FIG. 40 corresponds to deployable ring 2 in configuration 2-III.

Figure 41:
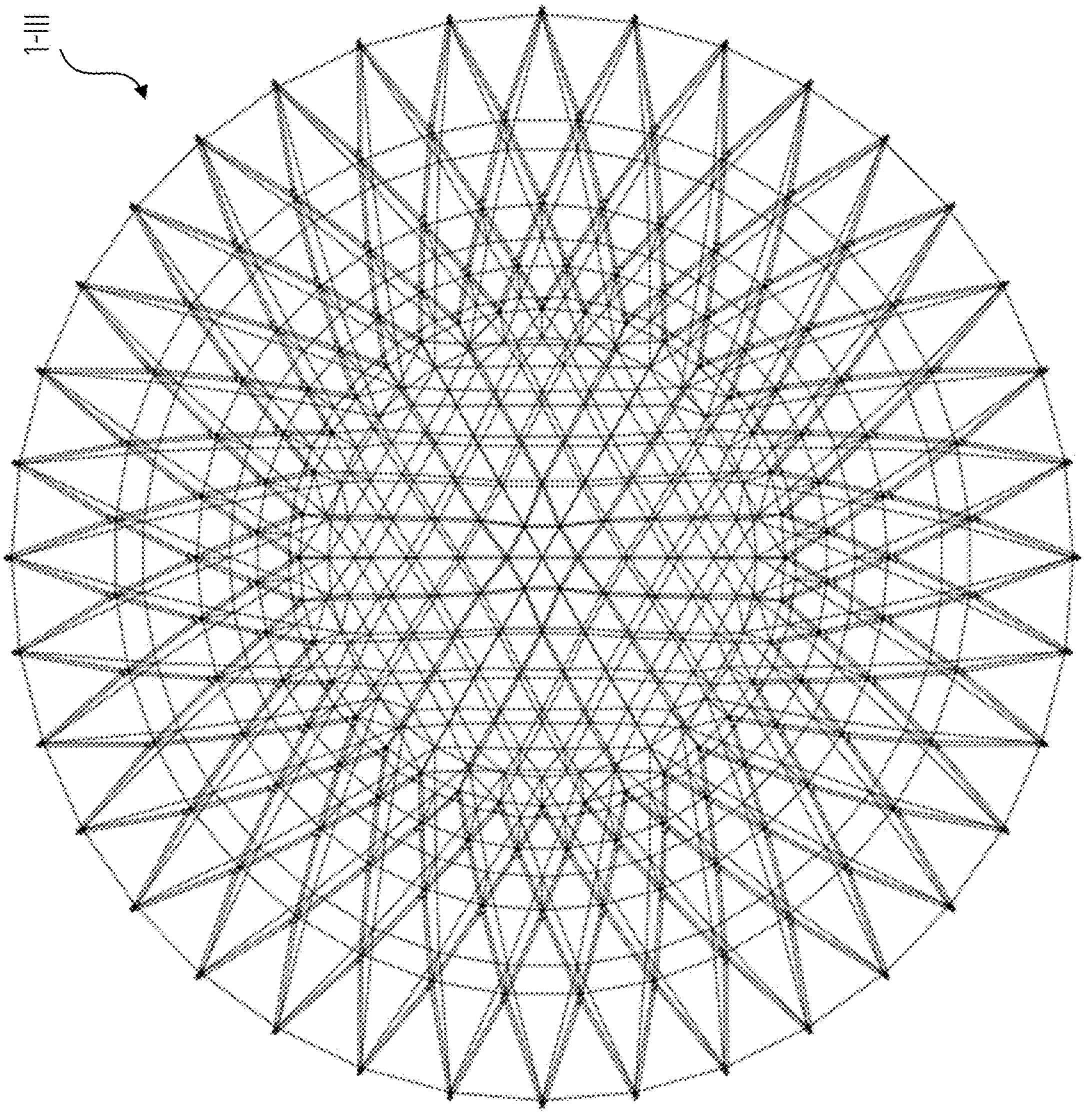

FIG. 41 shows the structure of antenna 1, according to an example embodiment. Antenna 1 of FIG. 41 corresponds to deployable ring 2 in configuration 2-III.

Figure 42:
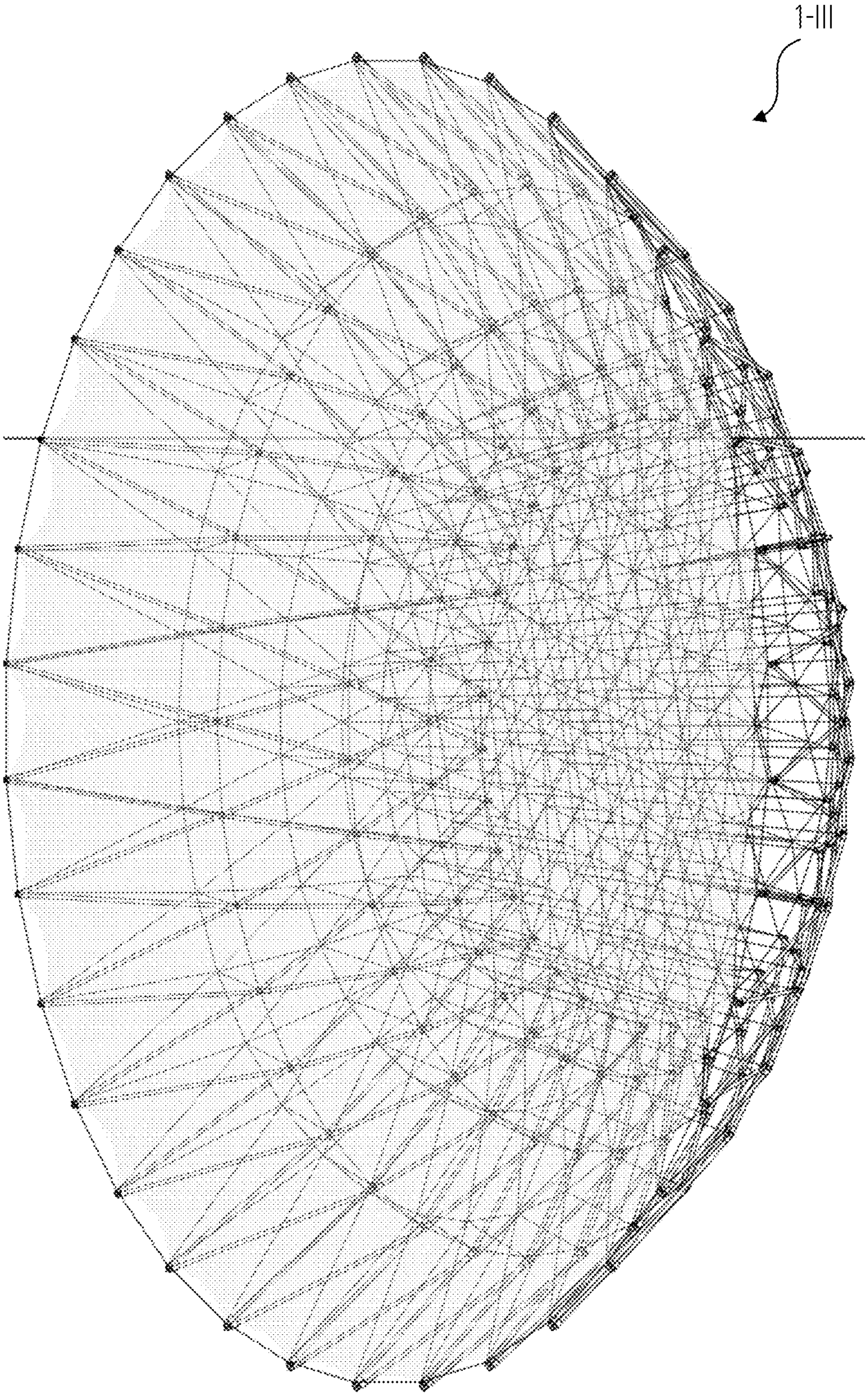

FIG. 42 shows the structure of antenna 1, according to an example embodiment. Antenna 1 of FIG. 42 corresponds to deployable ring 2 in configuration 2-III.

Figure 43:
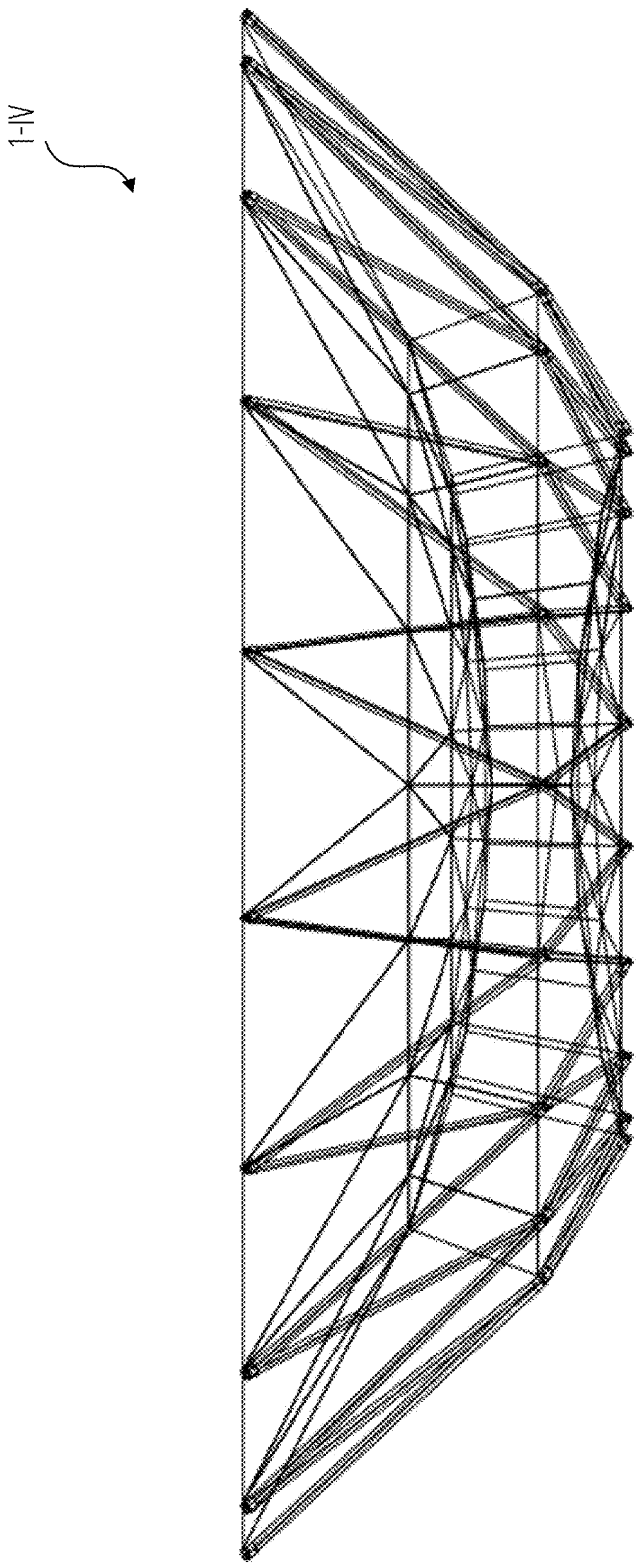

FIG. 43 shows the structure of antenna 1, according to an example embodiment. Antenna 1 of FIG. 43 corresponds to deployable ring 2 in configuration 2-IV.

Figure 44:
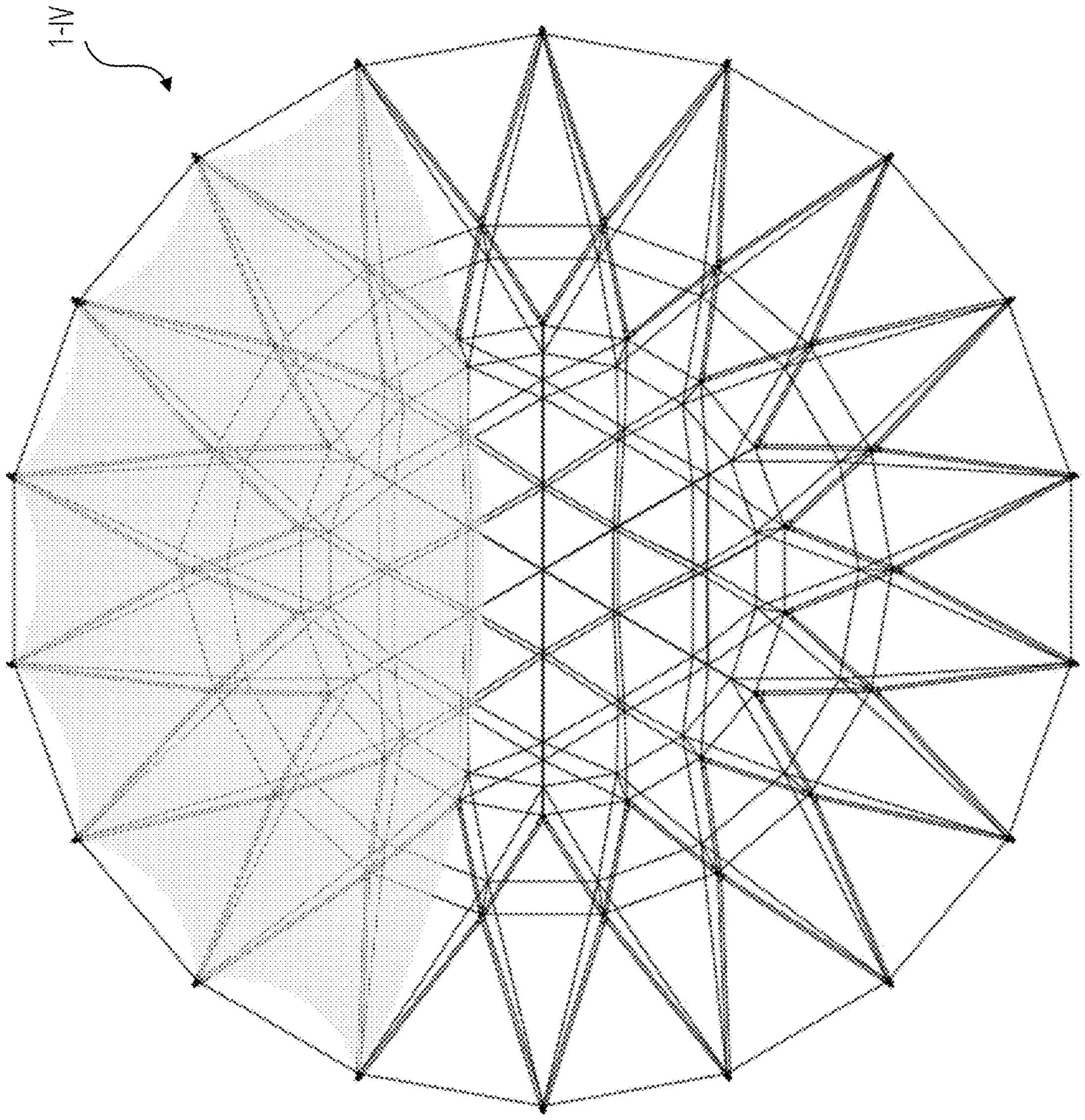

FIG. 44 shows the structure of antenna 1, according to an example embodiment. Antenna 1 of FIG. 43 corresponds to deployable ring 2 in configuration 2-IV.

Figure 45:
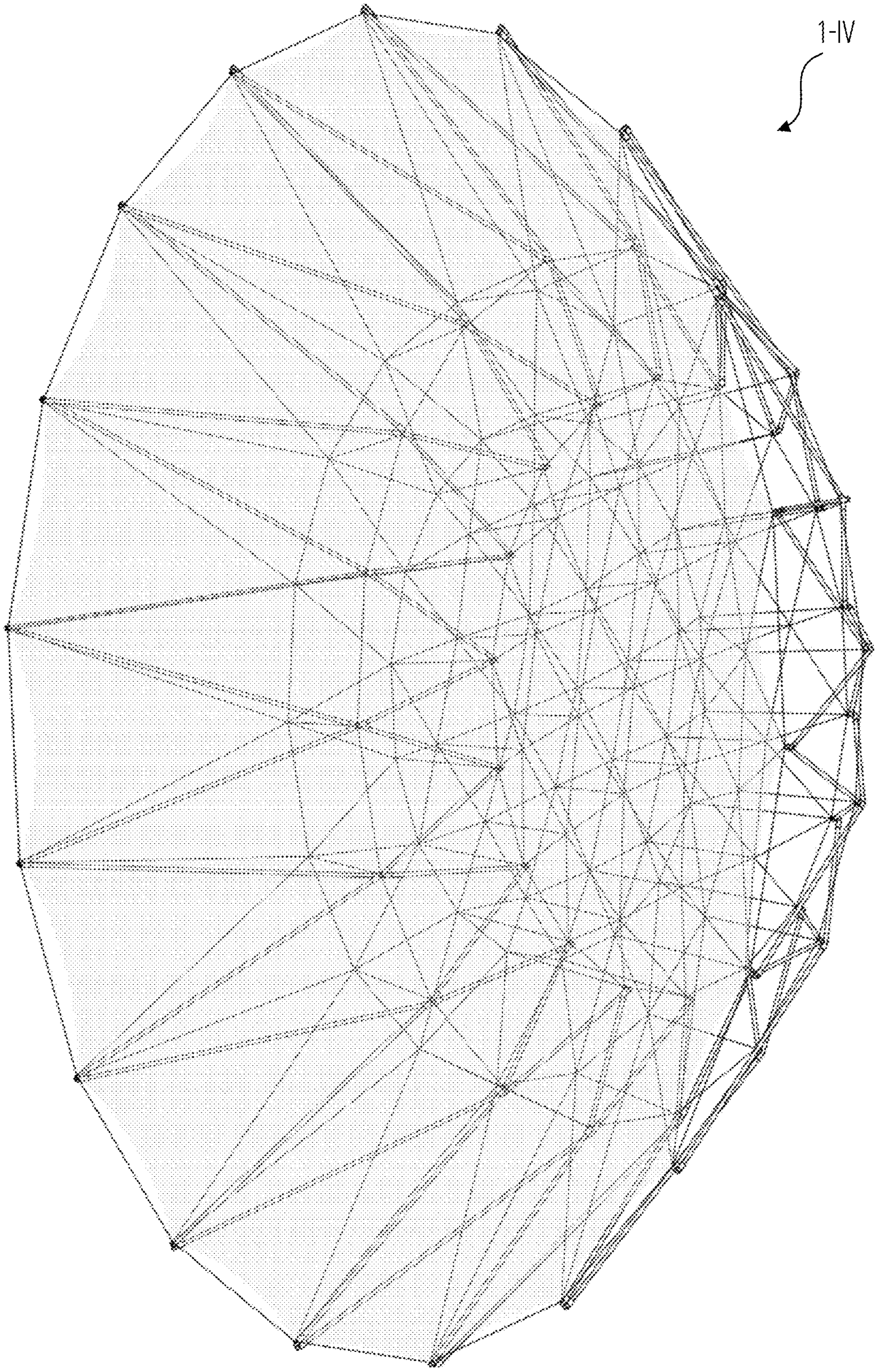

FIG. 45 shows the structure of antenna 1, according to an example embodiment. Antenna 1 of FIG. 45 corresponds to deployable ring 2 in configuration 2-IV.

Figure 46:
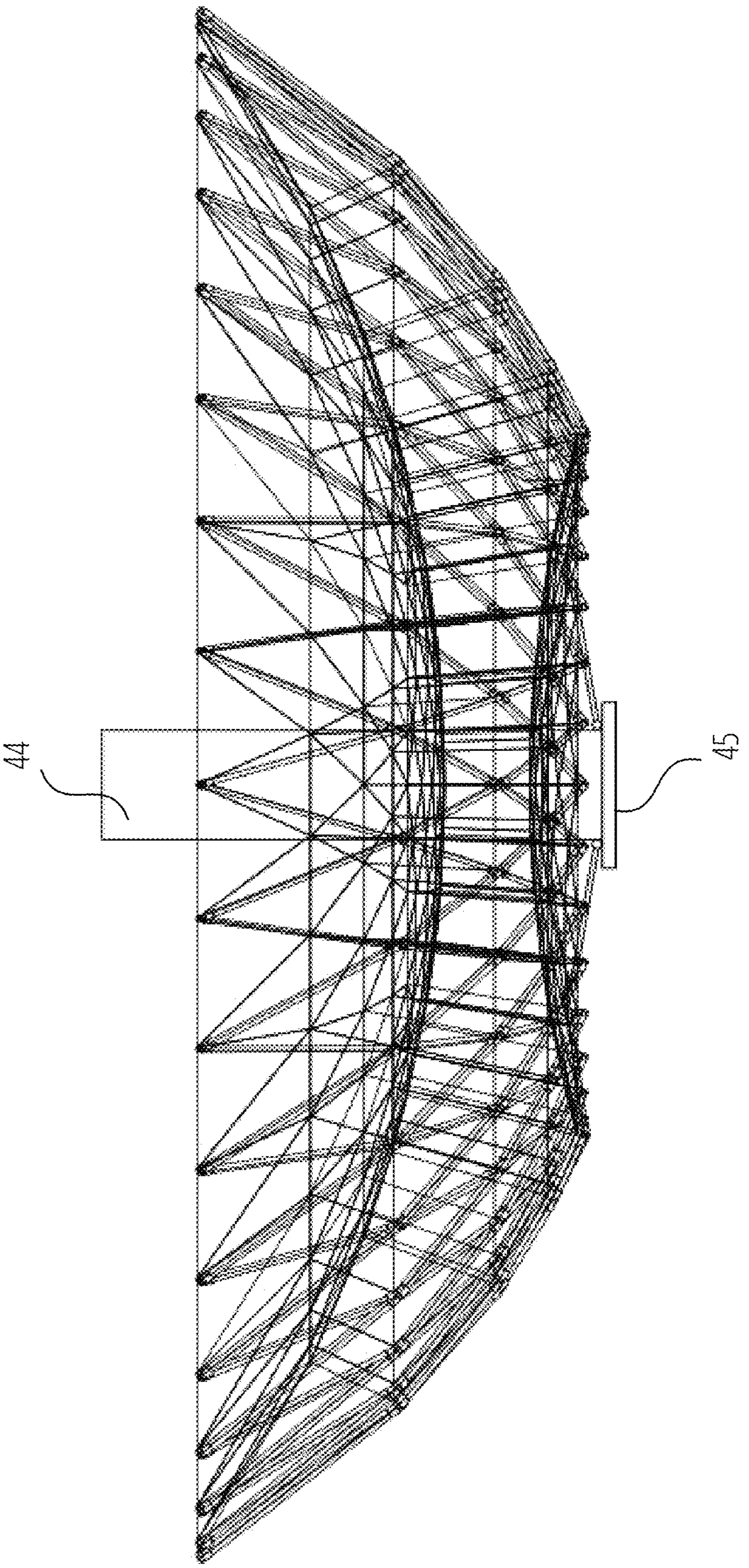
FIG. 46 illustrates mounting of a support post through mesh openings, according to an example embodiment.

FIG. 46 illustrates the mounting of a support post through mesh openings, according to an example embodiment. Specifically, FIG. 46 depicts the following elements: a support post 44 (also referred to as a fixed support post 44) and a platform 45.

Figure 47:
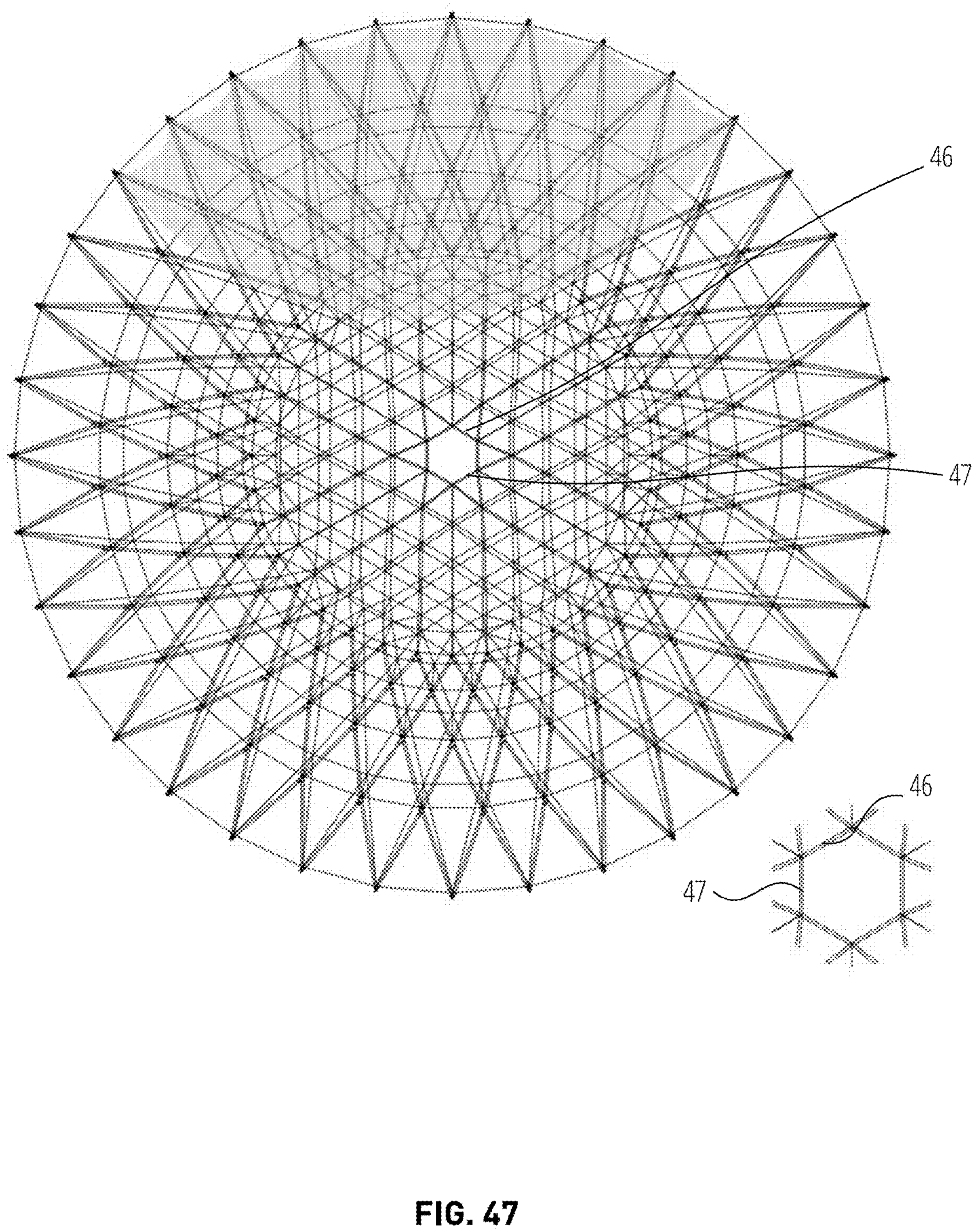
FIG. 47 illustrates mesh openings, according to an example embodiment.

FIG. 47 illustrates mesh openings, according to an example embodiment. Specifically, FIG. 47 depicts the following elements: a first hexagonal opening 46 and a second hexagonal opening 47.

Figure 48:
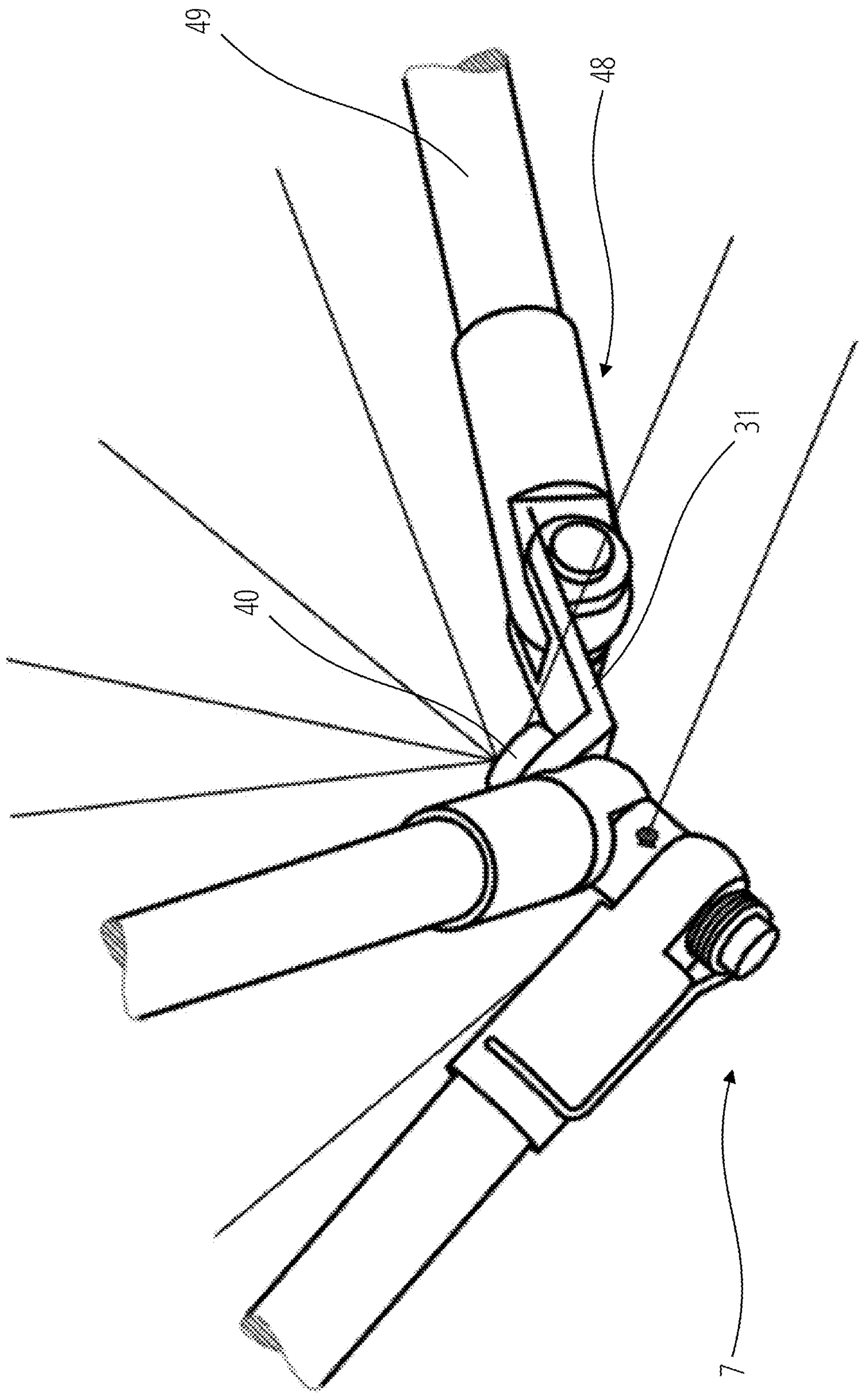
FIGS. 48-49 illustrate a bottom cylindrical joint, according to example embodiments.

FIG. 48 illustrates bottom cylindrical joint 7, according to an example embodiment. Specifically, FIG. 48 depicts the following elements: an edge 40, a bracket 31, a cylindrical joint 48, and an arm 49.

Figure 49:
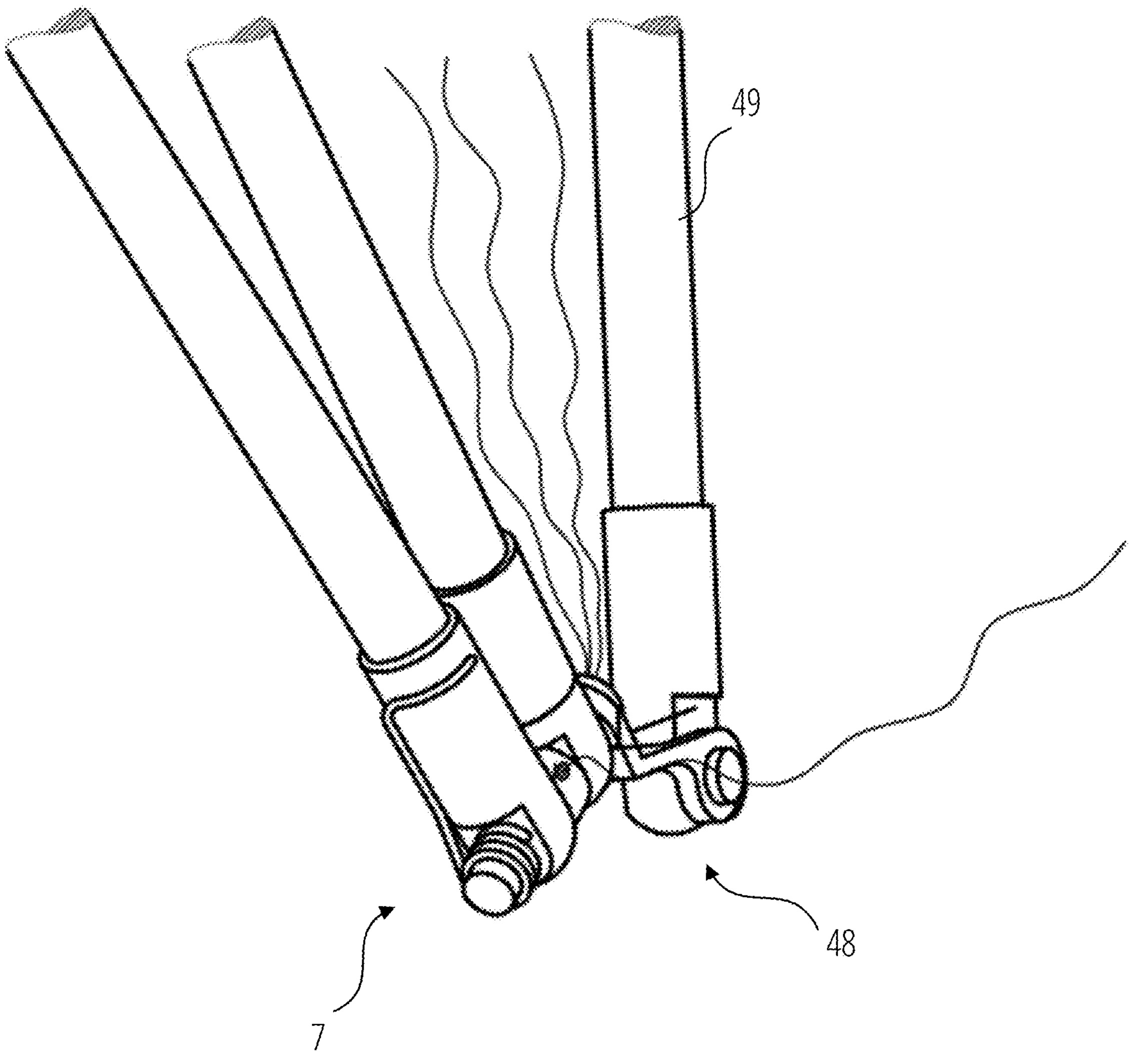

FIG. 49 illustrates bottom cylindrical joint 7, according to an example embodiment. Specifically, FIG. 49 depicts the following elements: a cylindrical joint 48, and an arm 49.

Figure 50:
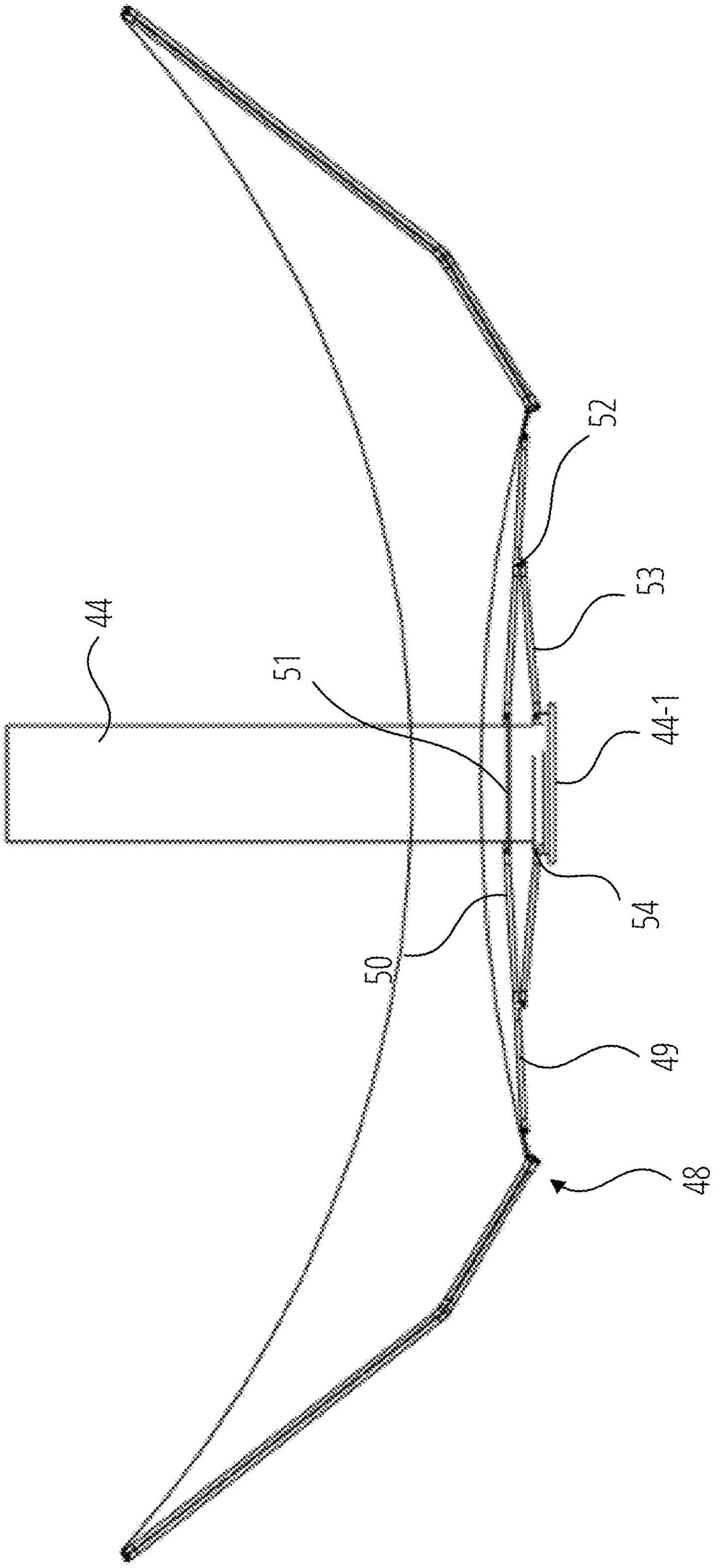
FIGS. 50-51 illustrate the mounting of the deployable ring on the support post, according to example embodiments.

FIG. 50 illustrates the mounting of deployable ring 2 to the support post 44, according to an example embodiment. Specifically, FIG. 50 depicts the following elements: a cylindrical joint 48, an arm 49, a movable cylindrical joint 50, a slider 51, an arm 53, a fixed cylindrical joint 54, an over-arm cylindrical joint 52, and a rigid attachment point 44-1.

Figure 51:
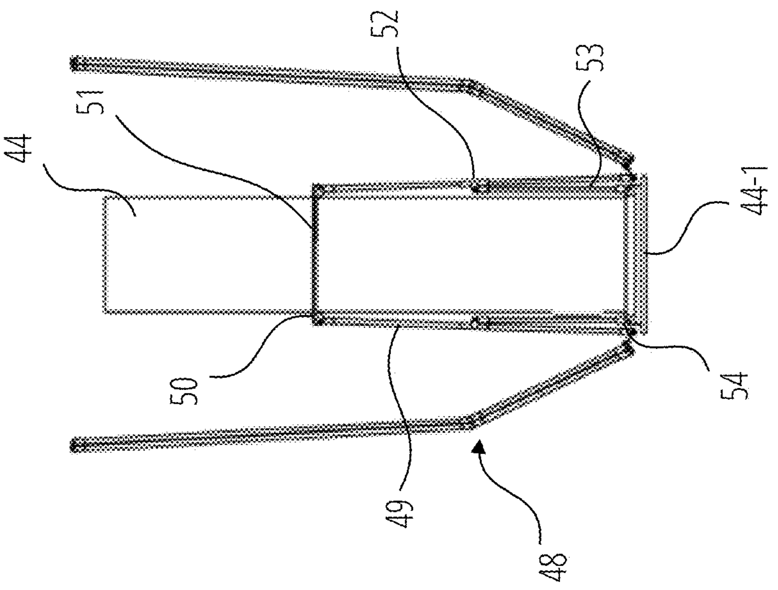

FIG. 51 illustrates the mounting of deployable ring 2 to the support post 44, according to an example embodiment. Specifically, FIG. 50 depicts the following elements: a cylindrical joint 48, an arm 49, a movable cylindrical joint 50, a slider 51, an arm 53, a fixed cylindrical joint 54, an over-arm cylindrical joint 52, and a rigid attachment point 44-1.

Figure 52:
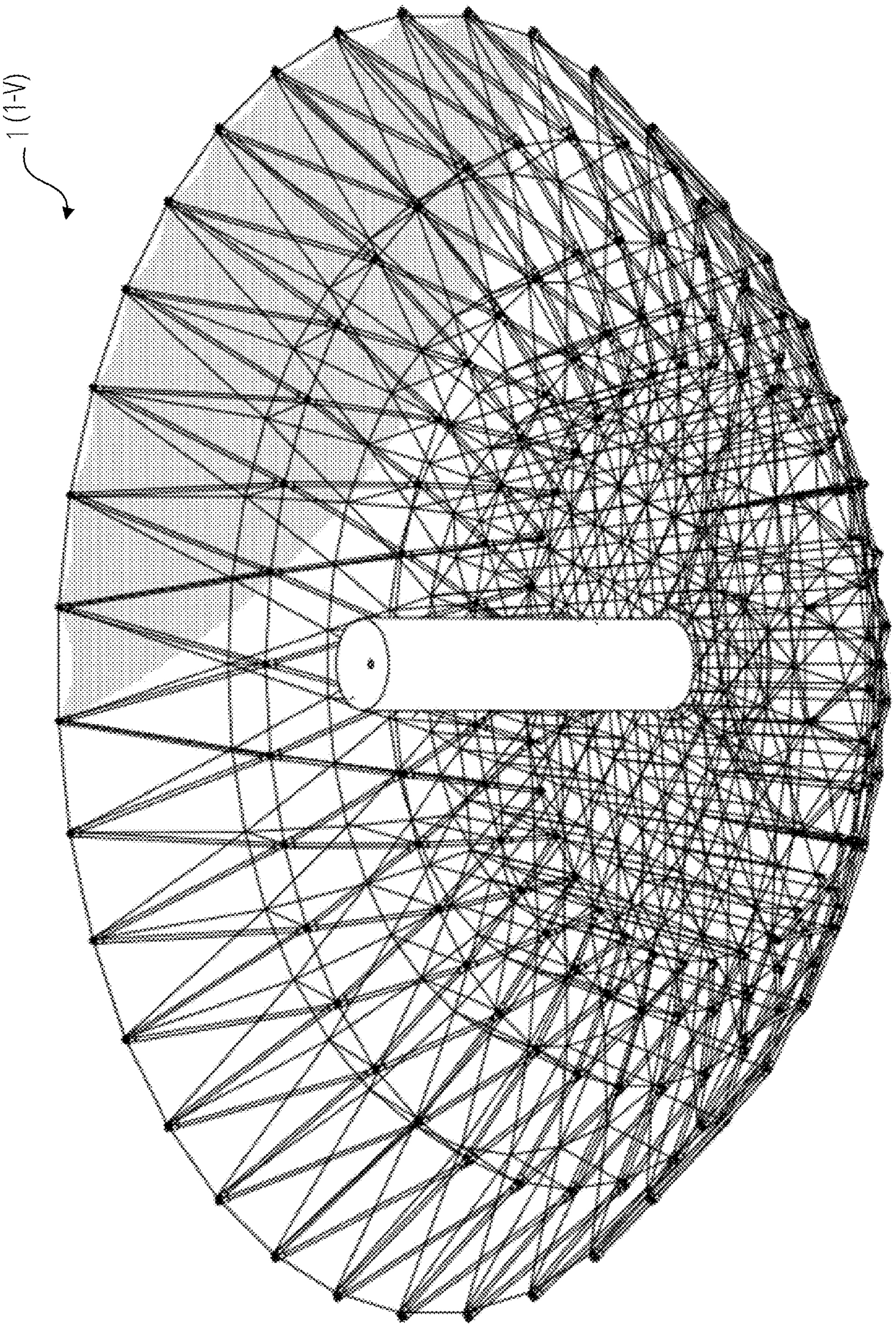
FIG. 52 shows a structure of antenna with a support post, according to an example embodiment.

FIG. 52 shows the structure of antenna 1 with support post 44, according to an example embodiment.

Figure 53:
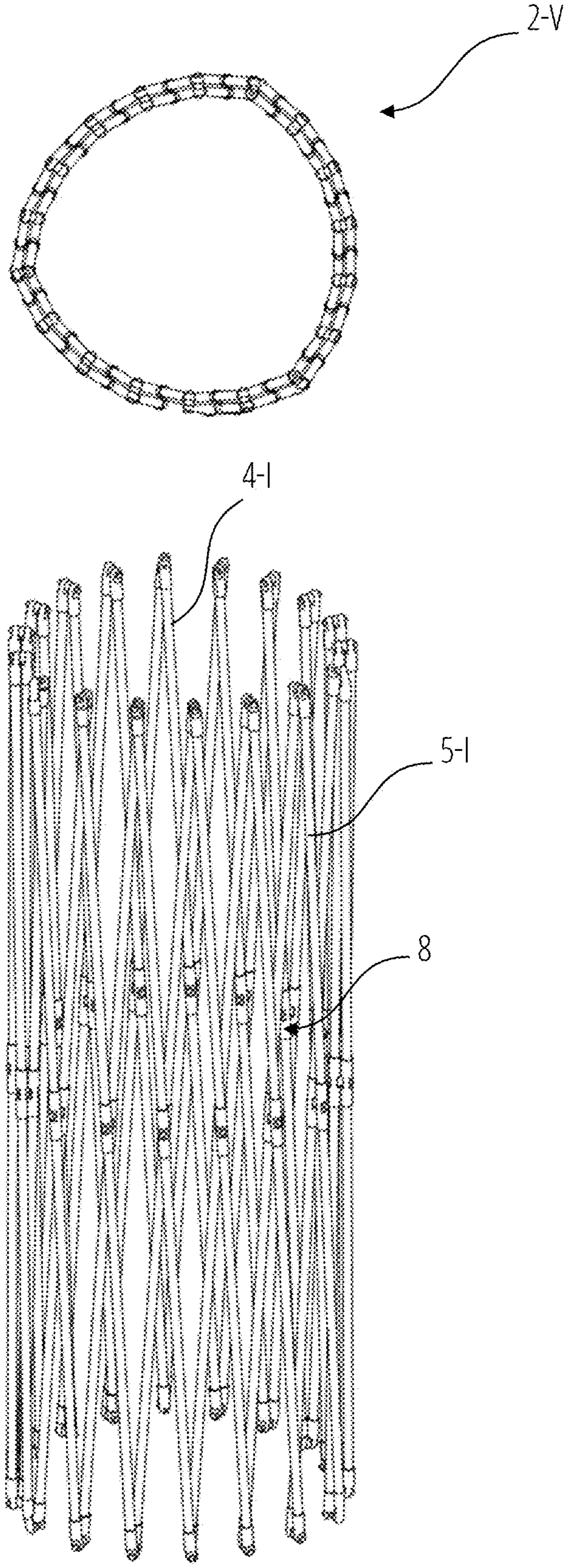
FIG. 53 shows the deployable ring in the folded state, according to an example embodiment.

FIG. 53 shows deployable ring 2 in folded state, according to an example embodiment. Additionally, FIG. 53 depicts an intermediate cylindrical joint 8, a deployable ring 2-V, internal combined arms 4-I, and external combined arms 5-I.

Figure 54:
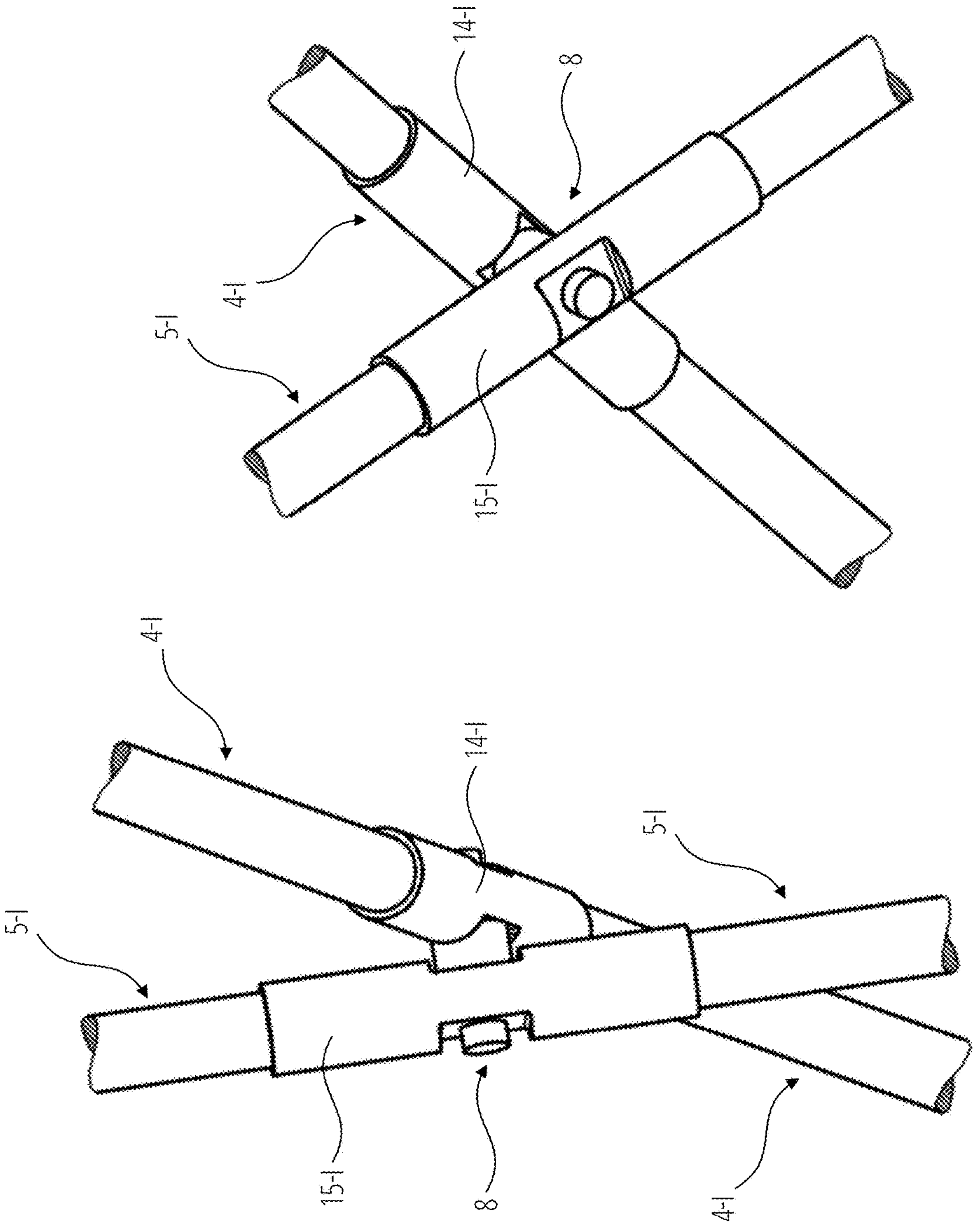
FIGS. 54-55 shows assemblies of intermediate cylindrical joints and arms, according to example embodiments.

FIG. 54 shows the assembly of intermediate cylindrical joints 8 and arms, according to an example embodiment. FIG. 53 depicts the following components: intermediate cylindrical joint 8, internal combined arms 4-I, external combined arms 5-I, a sleeve 14-I, and a sleeve 15-I.

Figure 55:
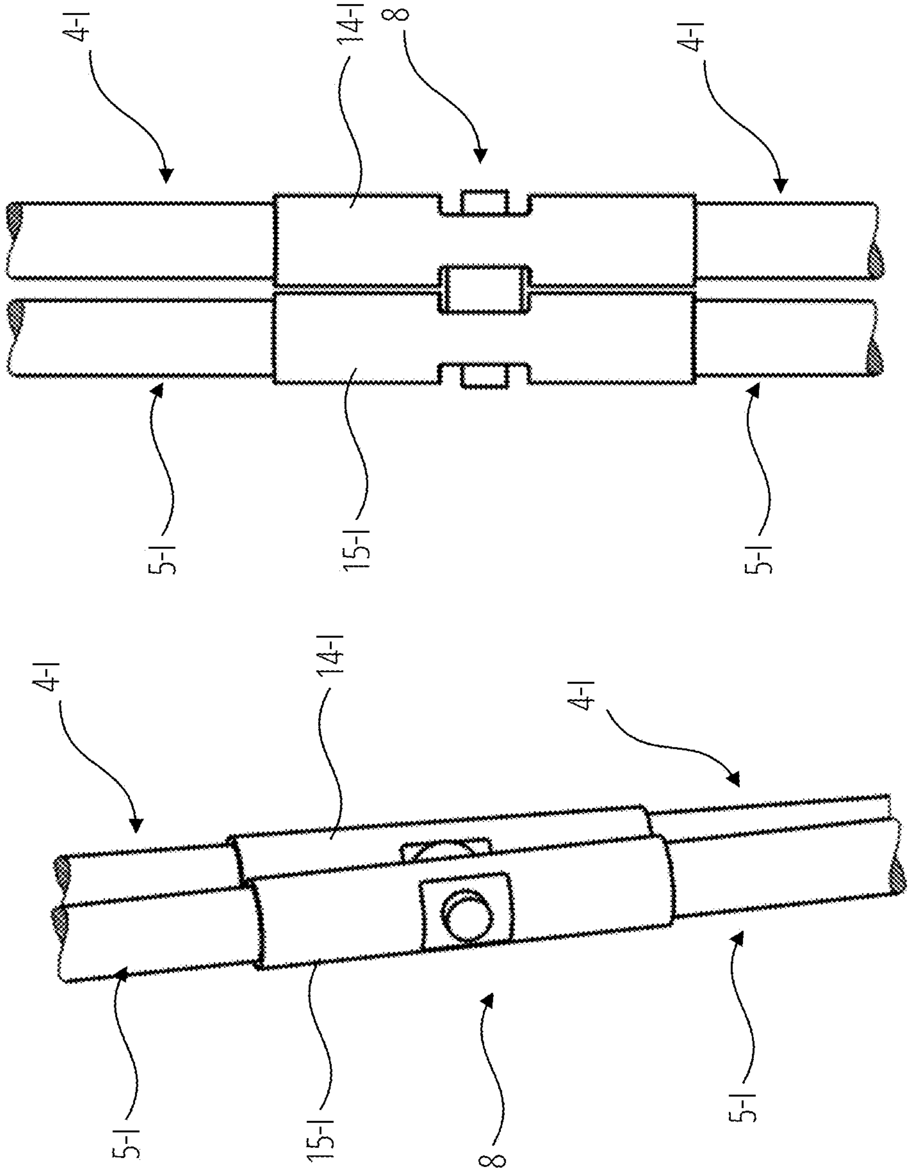

FIG. 55 shows the assembly of intermediate cylindrical joints 8 and arms, according to an example embodiment. FIG. 55 depicts the following components: intermediate cylindrical joint 8, internal combined arms 4-I, external combined arms 5-I, a sleeve 14-I, and a sleeve 15-I.

Figure 56:
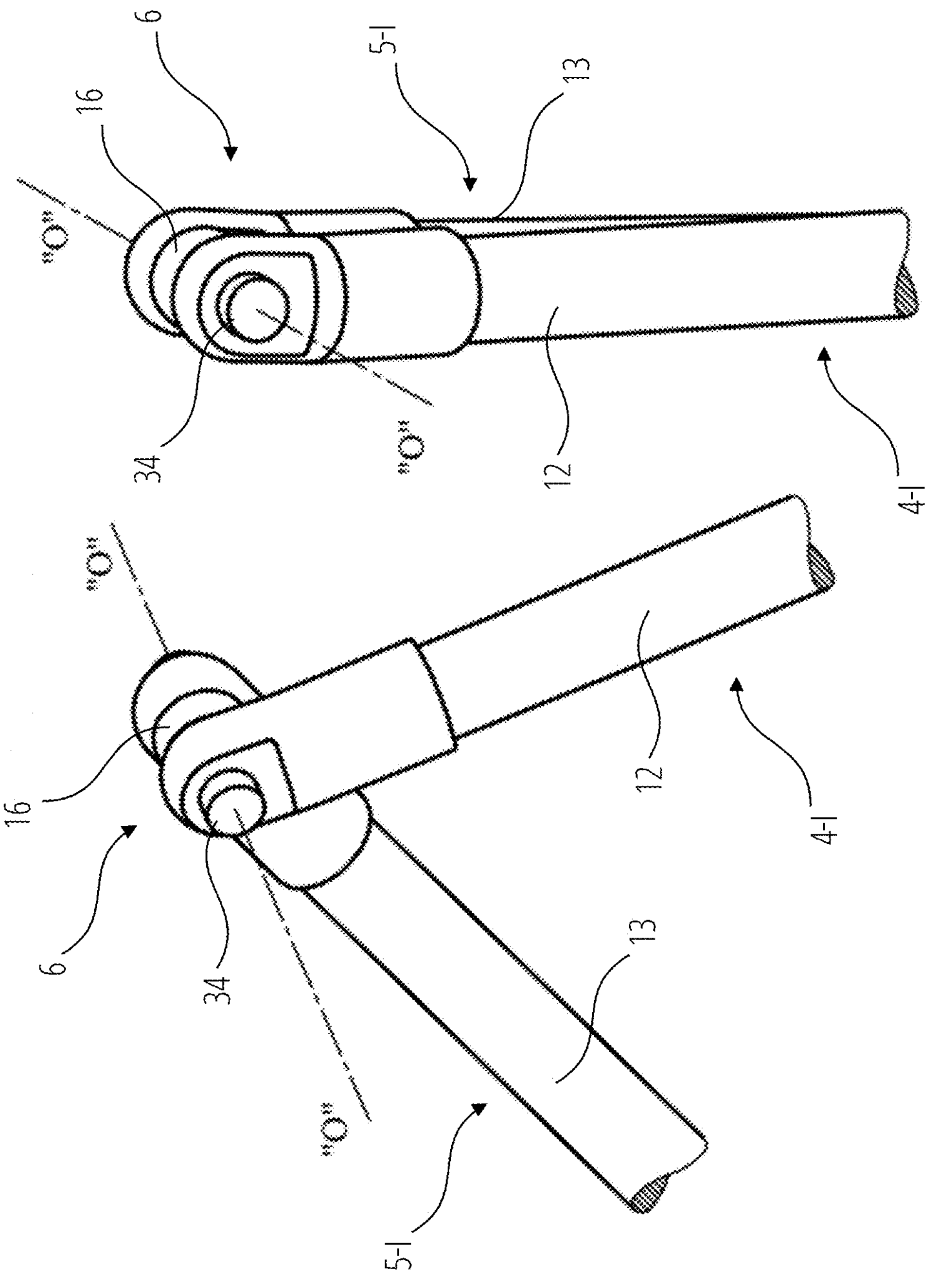
FIGS. 56-57 show assemblies of top cylindrical joints and arms, according to example embodiments.

FIG. 56 shows the assembly of top cylindrical joints 6 and arms, according to an example embodiment. FIG. 56 depicts the following components: an internal arm 12, an external arm 13, a top cylindrical joint 6, an internal pin 16, an edge 34, internal combined arms 4-I, and external combined arms 5-I.

Figure 57:
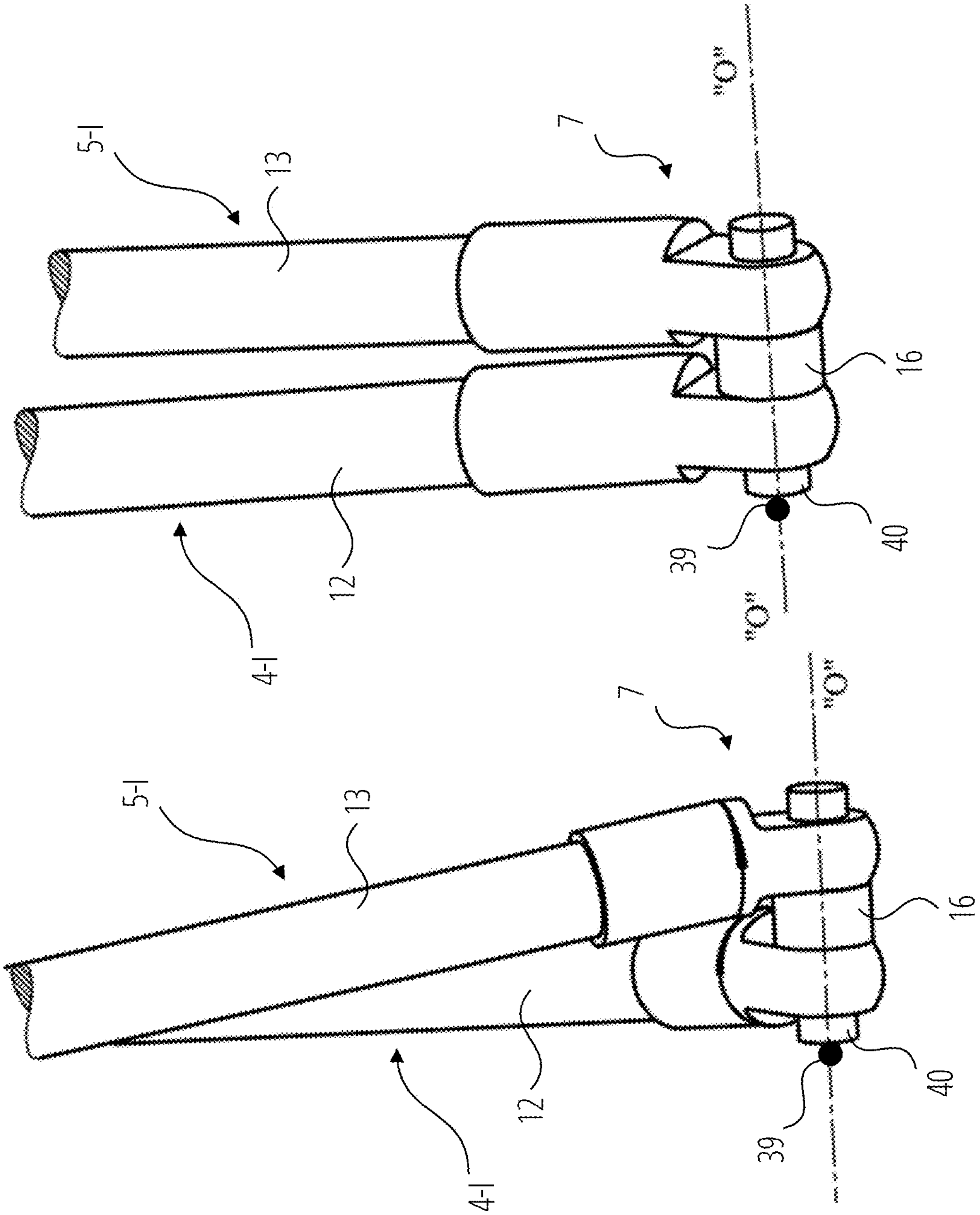

FIG. 57 shows the assembly of bottom cylindrical joints 7 and arms, according to an example embodiment. FIG. 57 depicts the following components: an internal arm 12, an external arm 13, a bottom cylindrical joint 7, an internal pin 16, an edge 40, a holder 39, internal combined arms 4-I, and external combined arms 5-I.

Figure 58:
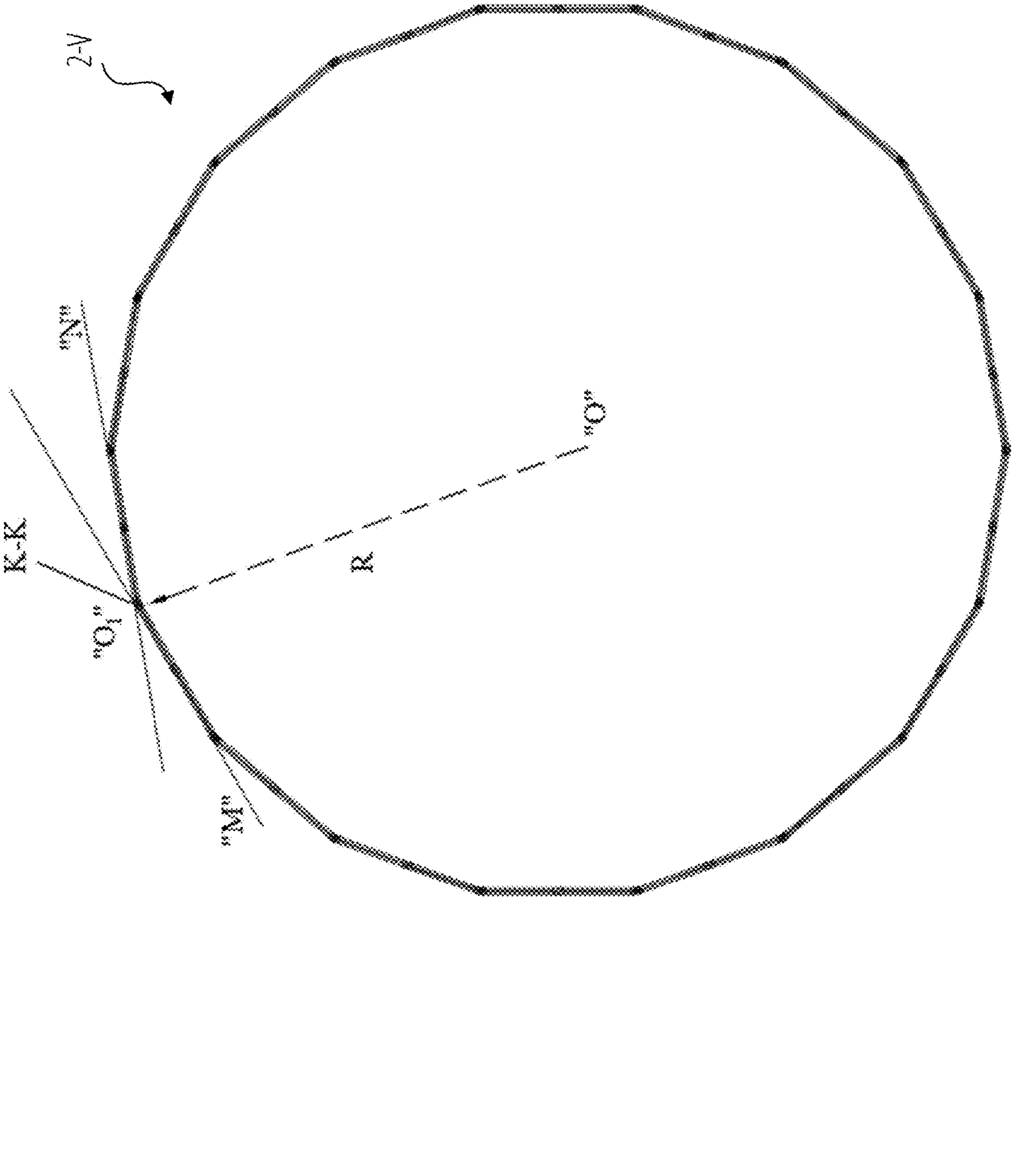
FIGS. 58-59 illustrate spatial relations between adjacent planes formed by arms, according to example embodiments.

FIG. 58 illustrates spatial relations between adjacent planes formed by arms, according to an example embodiment. FIG. 58 depicts deployable ring 2 in configuration 2-V.

Figure 59:
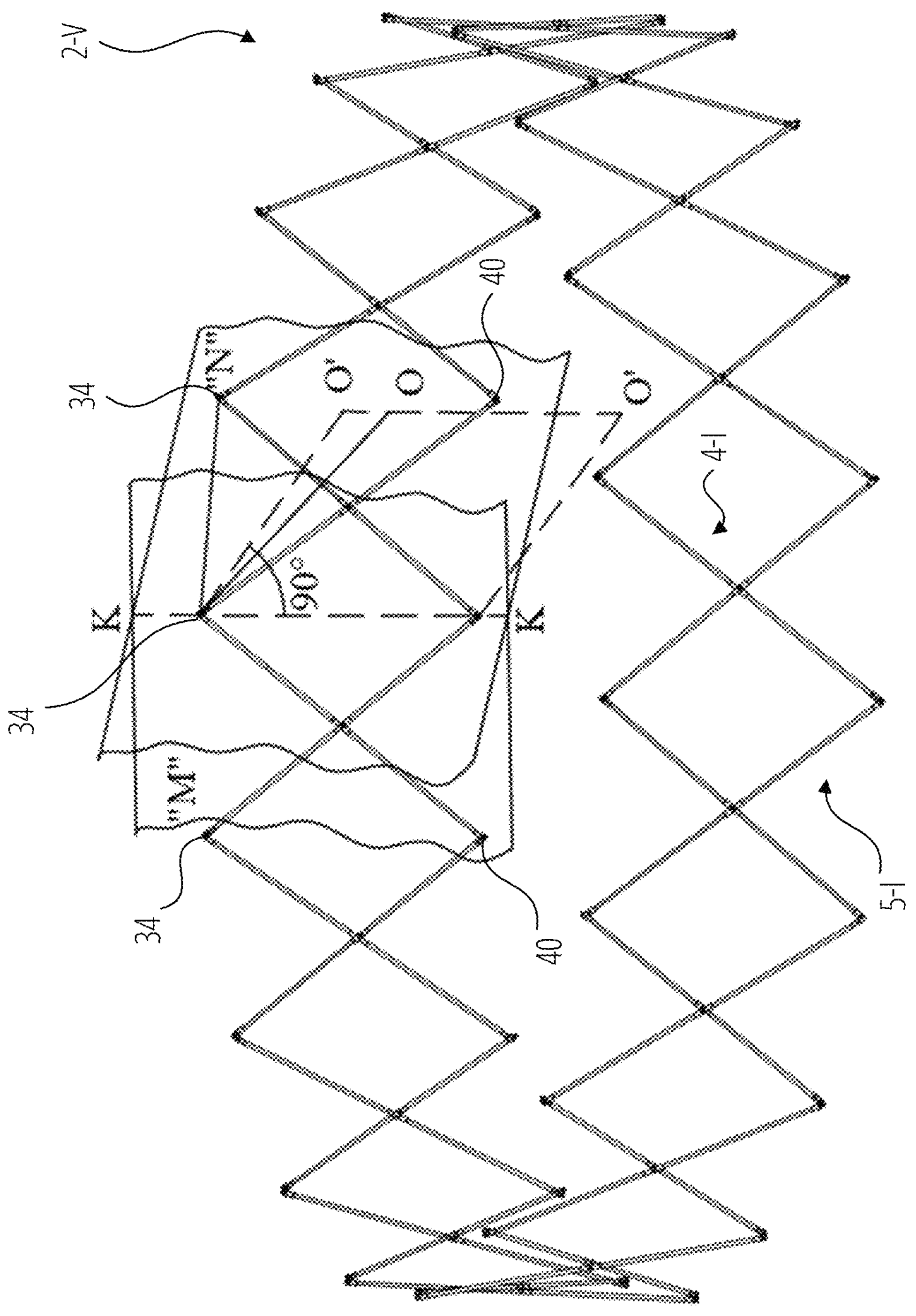

FIG. 59 illustrates spatial relations between adjacent planes formed by arms, according to an example embodiment. FIG. 59 depicts deployable ring 2 in configuration 2-V. Additionally, FIG. 59 shows the following components: an edge 34, an edge 40, internal combined arms 4-I, and external combined arms 5-I.

Figure 60:
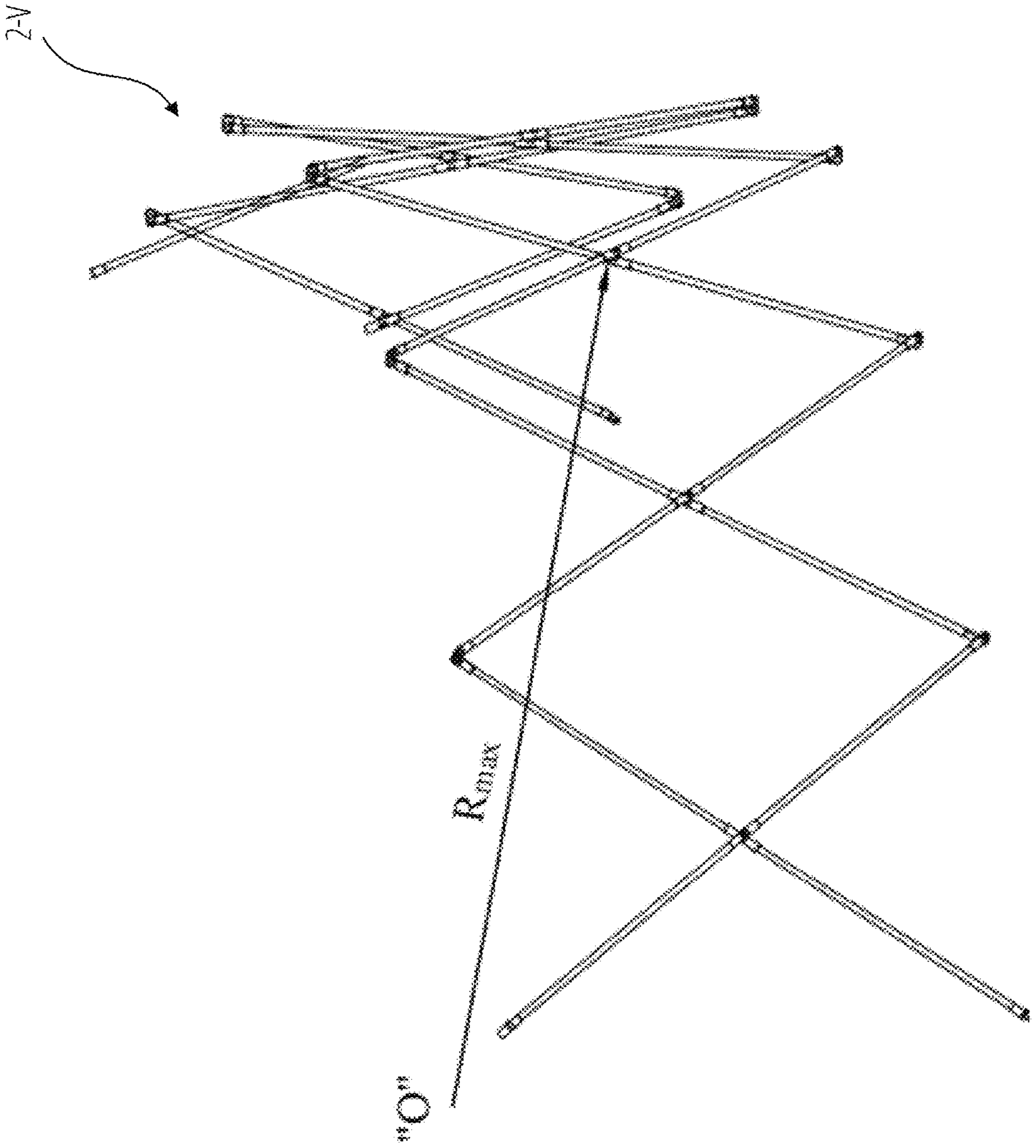
FIG. 60 illustrates an unfolded pantographic system formed by arms, according to an example embodiment.

FIG. 60 illustrates an unfolded pantographic system 21 formed by arms, according to an example embodiment. FIG. 60 depicts a part of deployable ring 2 in configuration 2-V.

Figure 61:
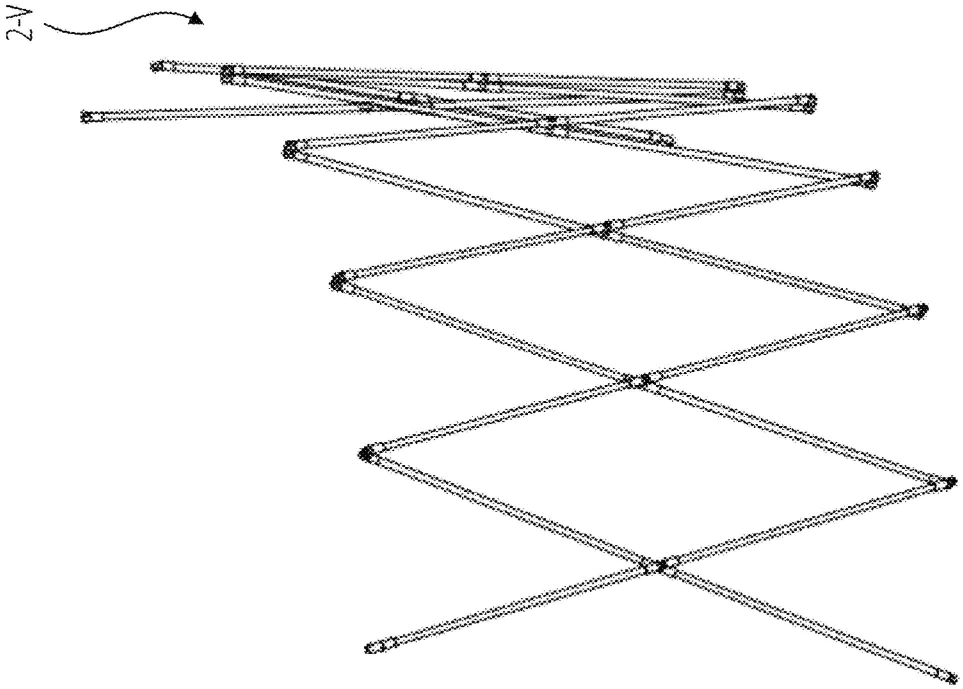
FIG. 61 illustrates pantograph system formed by arms in intermediate folding stage, according to an example embodiment.

FIG. 61 illustrates pantograph system formed by arms in an intermediate folding stage, according to an example embodiment. FIG. 61 depicts a part of deployable ring 2 in configuration 2-V.

Figure 62:
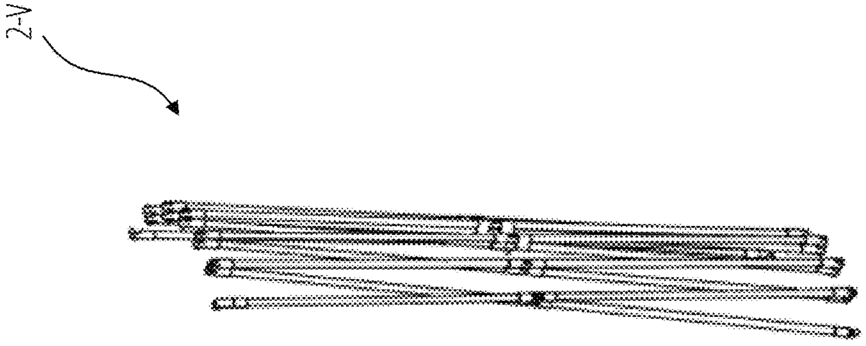
FIG. 62 illustrates a folded pantograph system formed by arms, according to an example embodiment.

FIG. 62 illustrates a folded pantograph system formed by arms, according to an example embodiment. FIG. 61 depicts a part of deployable ring 2 in configuration 2-V.

Figure 63:
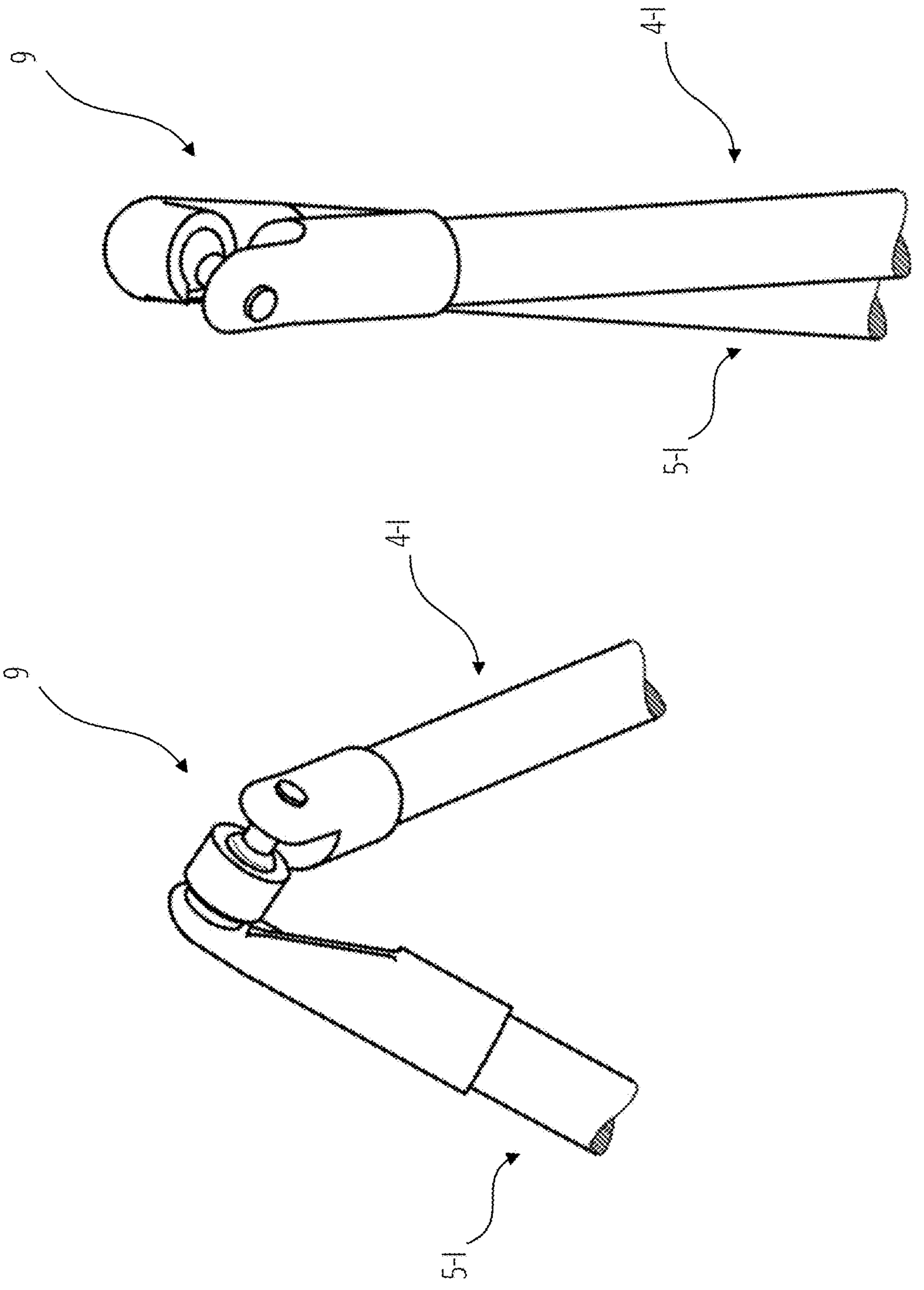
FIG. 63 illustrates the assembly of a top spherical joint and arms, according to an example embodiment.

FIG. 63 illustrates the assembly of a top spherical joint 9 and arms, according to an example embodiment. Specifically, FIG. 63 depicts the following components: internal combined arms 4-I, and external combined arms 5-I.

Figure 64:
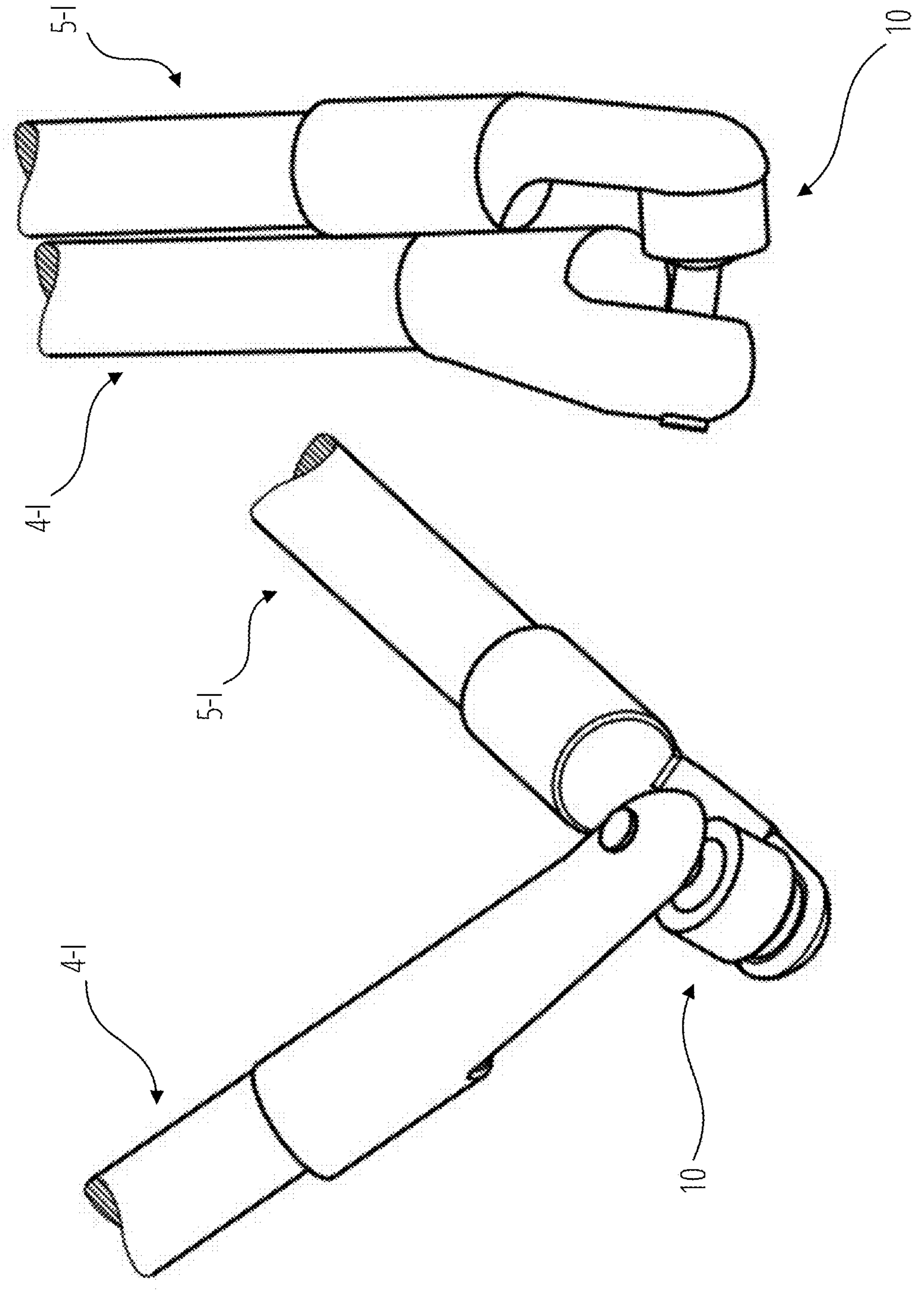
FIG. 64 illustrates the assembly of a bottom spherical joint and arms, according to an example embodiment.

FIG. 64 illustrates the assembly of a bottom spherical joint 10 and arms, according to an example embodiment. Specifically, FIG. 64 depicts the following components: internal combined arms 4-I, and external combined arms 5-I.

Figure 65:
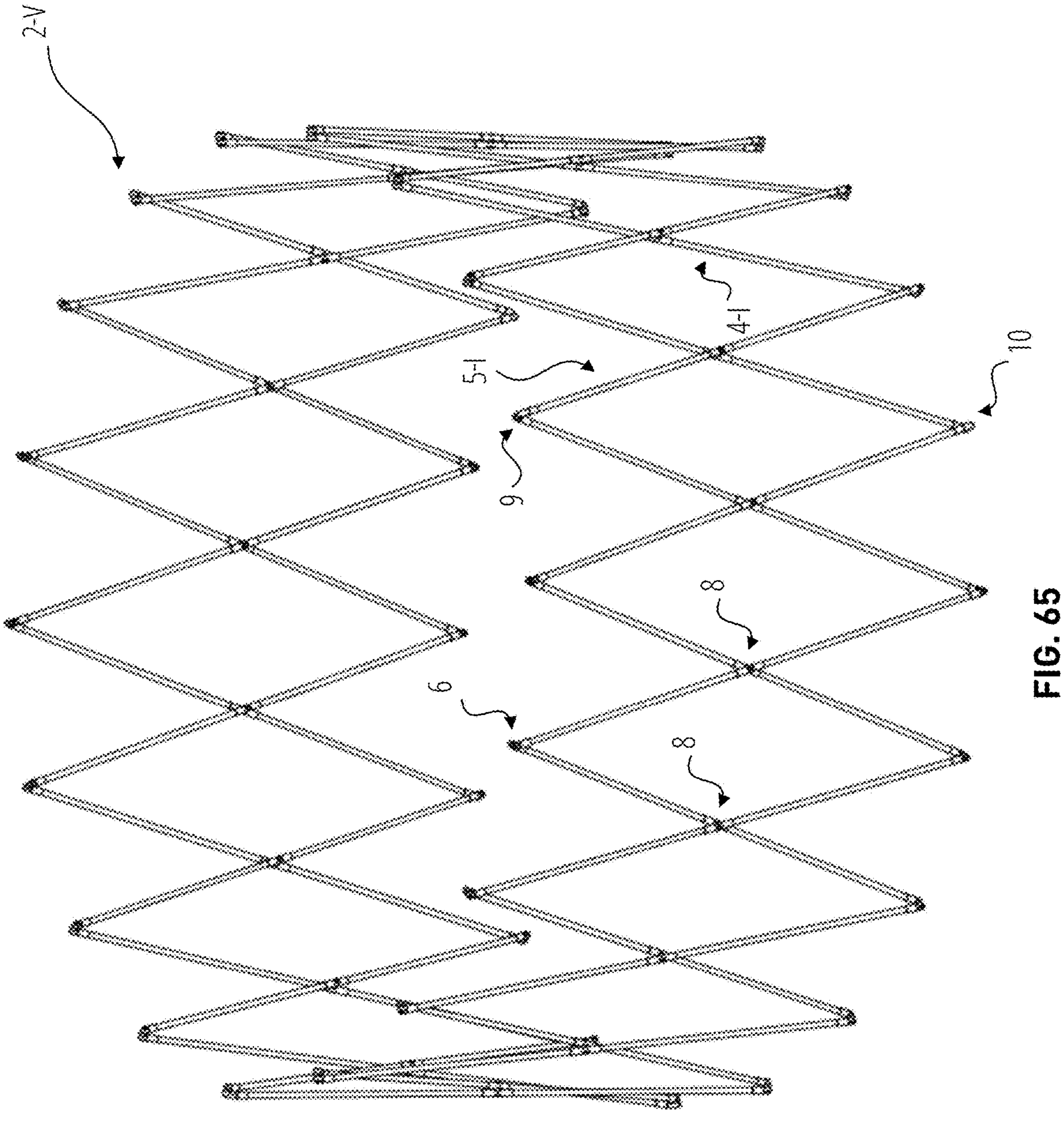
FIG. 65 illustrates positions of joints in the deployable ring, according to an example embodiment.

FIG. 65 illustrates positions of joints in deployable ring 2 in configuration 2-V, according to an example embodiment. Specifically, FIG. 65 depicts the following components: an intermediate cylindrical joint 8, a top cylindrical joint 6, a top spherical joint 9, a bottom spherical joint 10, a deployable ring 2-II, internal combined arms 4-I, and external combined arms 5-I.

Figure 66:
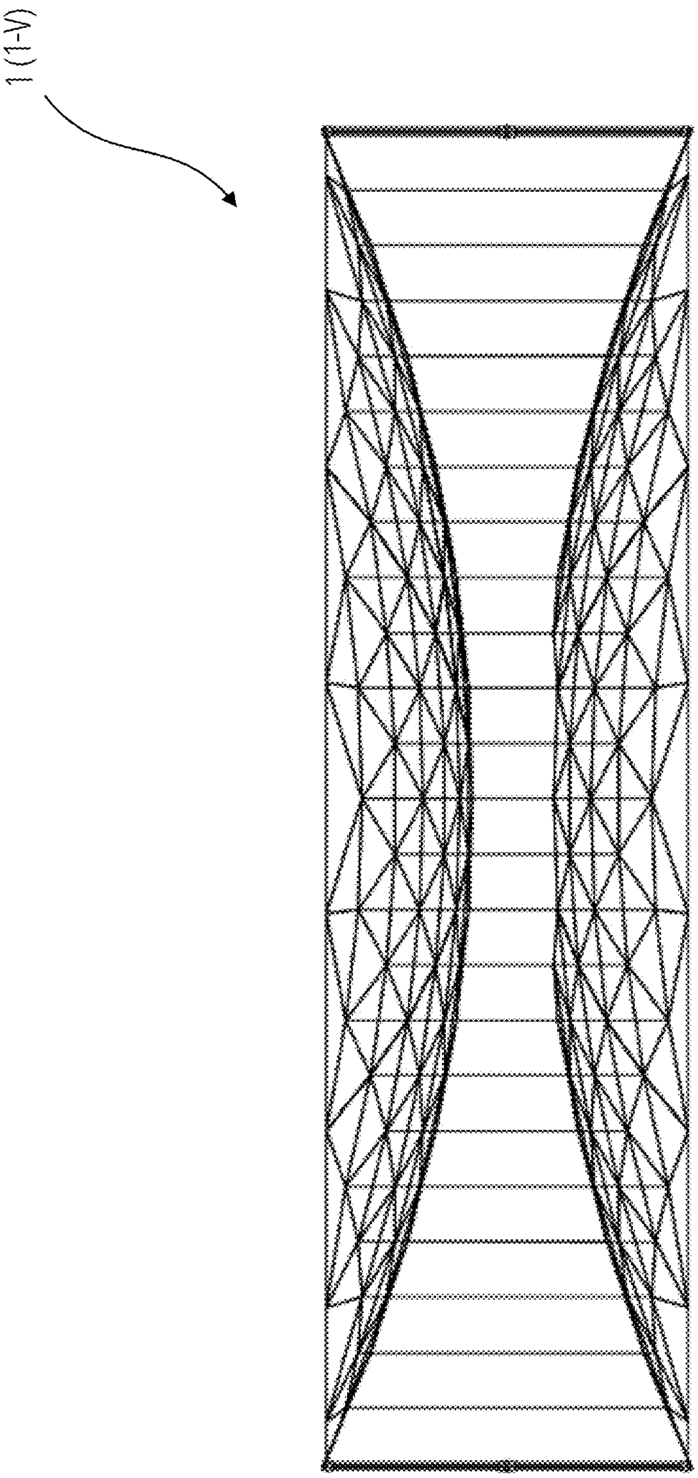
FIGS. 66-67 illustrate structures of antenna, according to example embodiments.

FIG. 66 illustrates the structure of antenna 1, according to an example embodiment. Antenna 1 of FIG. 66 corresponds to deployable rings 2 in configuration 2-V (described below).

Figure 67:
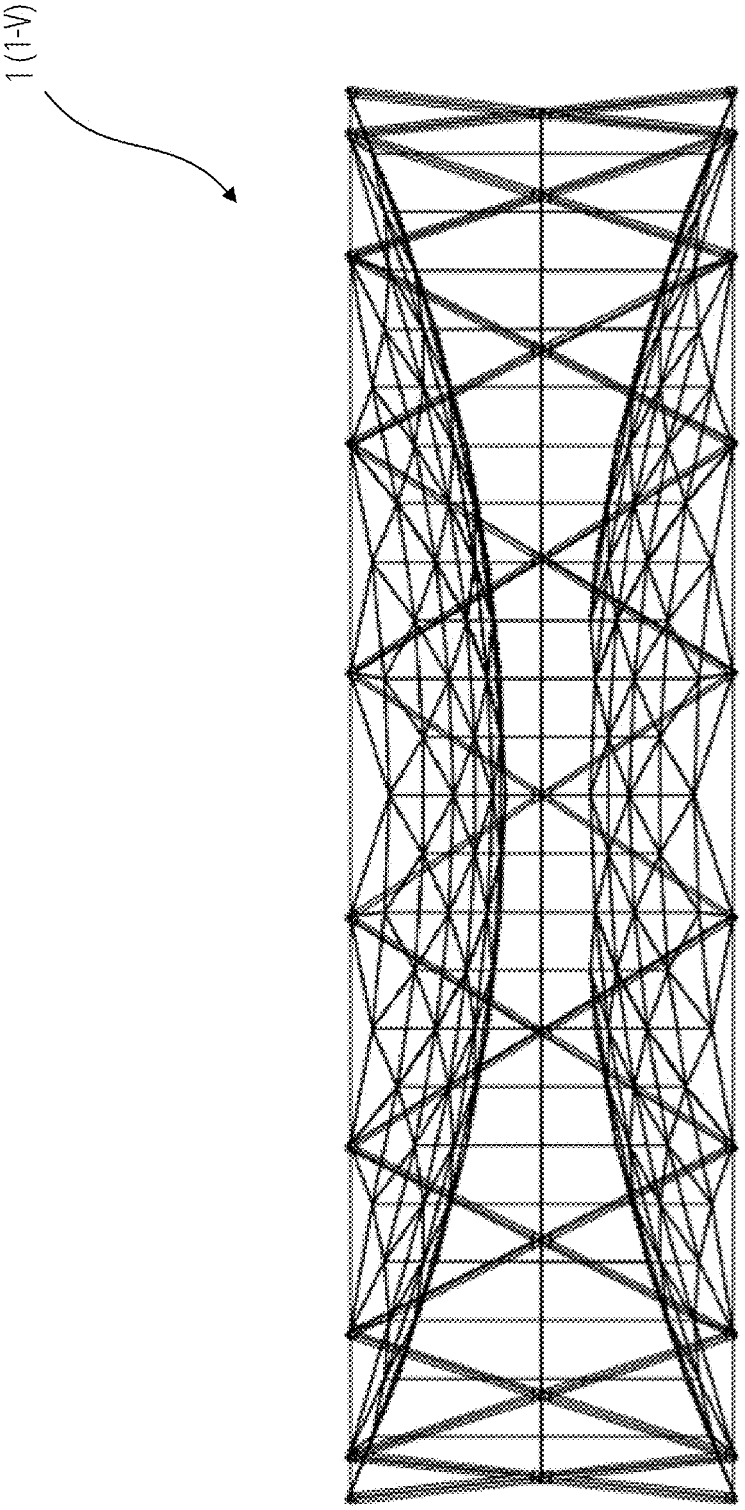

FIG. 67 illustrates the structure of antenna 1, according to an example embodiment. Antenna 1 of FIG. 67 corresponds to deployable rings 2 in configuration 2-V.

Figure 68:
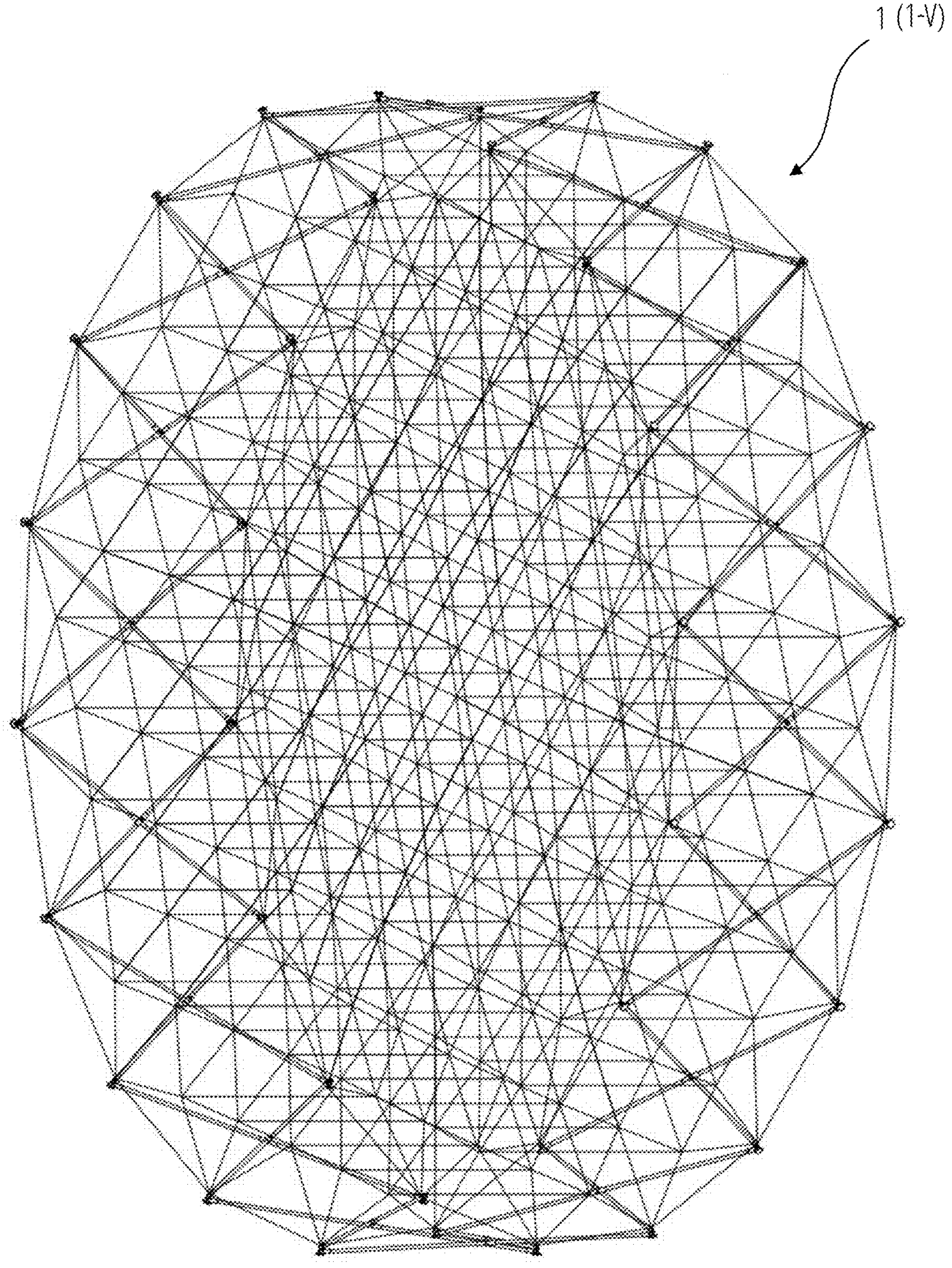
FIG. 68 illustrates a structure of antenna with a flexible reflector, according to an example embodiment.

FIG. 68 illustrates the structure of antenna 1 with a flexible reflector, according to an example embodiment. Antenna 1 of FIG. 68 corresponds to deployable rings 2 in configuration 2-V.

Figure 69:
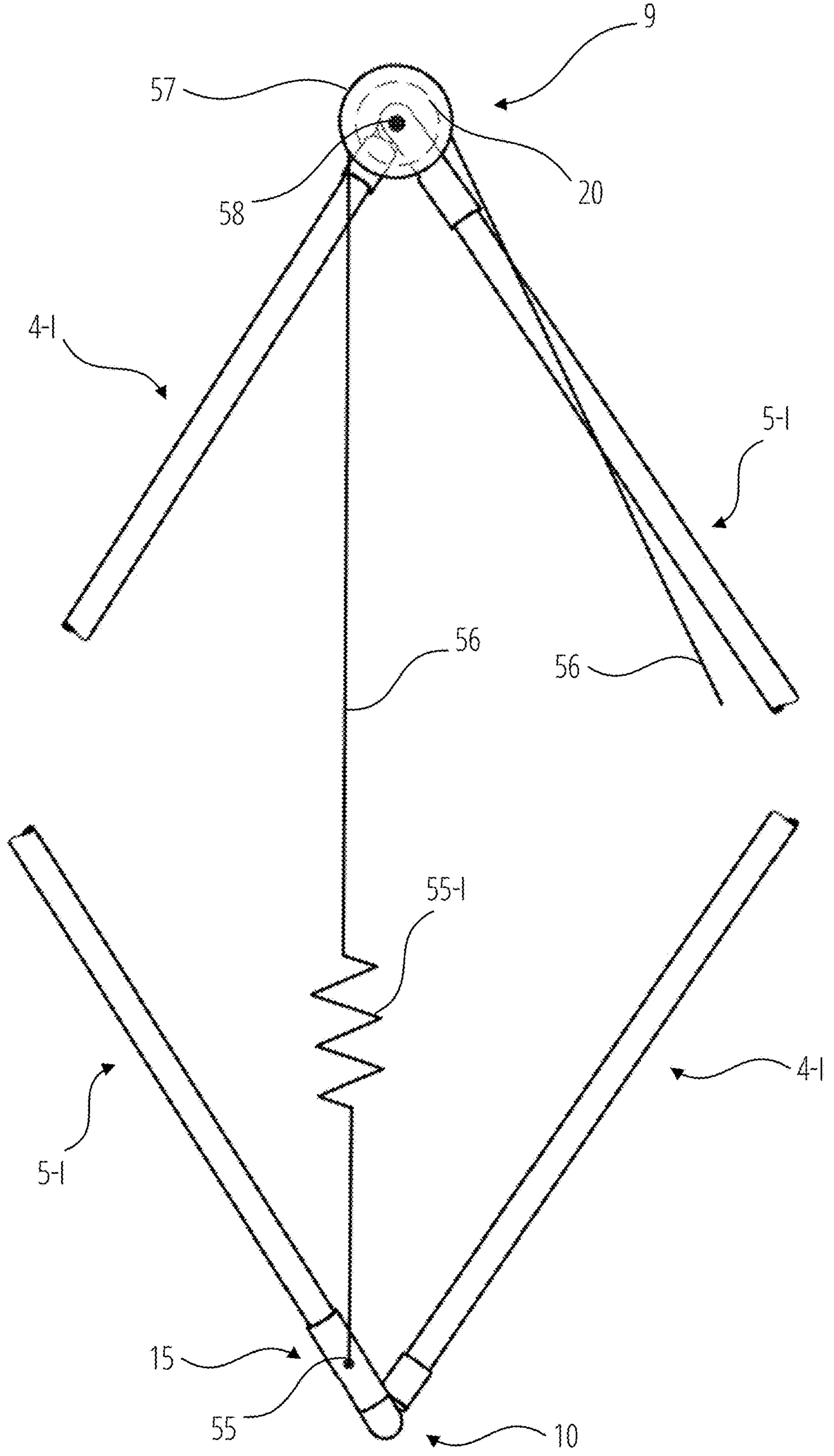
FIGS. 69-71 show tension cables and rollers of an antenna, according to example embodiments.

FIG. 69 shows tension cables and rollers of antenna 1, according to an example embodiment. Specifically, FIG. 69 depicts the following components: a top spherical joint 9, a bottom spherical joint 10, a sleeve 15, an outer housing 20, internal combined arms 4-I, external combined arms 5-I, a roller 57, a pin 58, a tension cable 56, a spring 55-I, and a holder 55.

Figure 70:
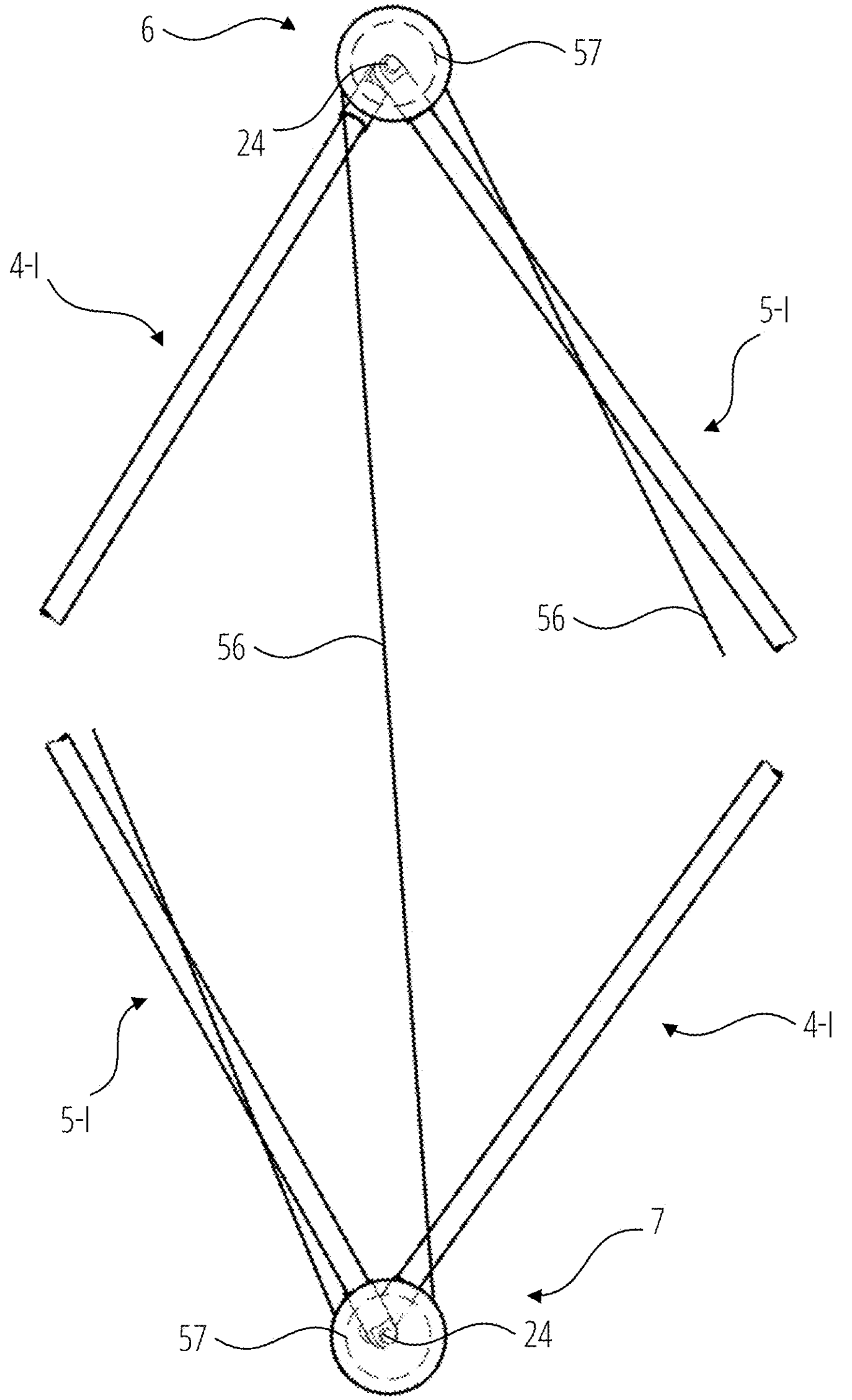

FIG. 70 shows tension cables and rollers of antenna 1, according to an example embodiment. Specifically, FIG. 70 depicts the following components: a bottom cylindrical joint 7, a top cylindrical joint 6, an edge 24, internal combined arms 4-I, external combined arms 5-I, a roller 57, and a tension cable 56.

Figure 71:
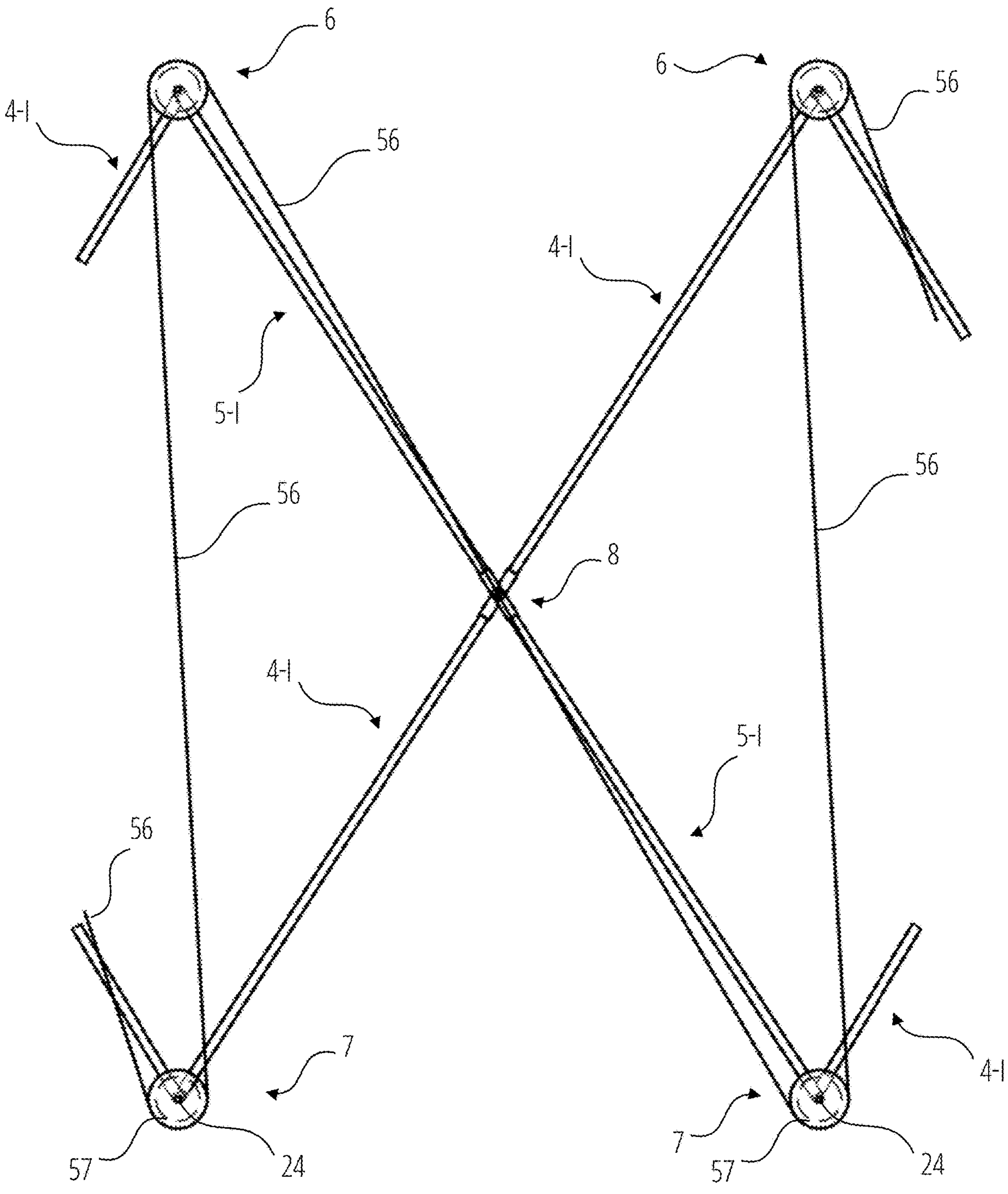

FIG. 71 shows tension cables and rollers of antenna 1, according to an example embodiment. Specifically, FIG. 71 depicts the following components: an intermediate cylindrical joint 8, a bottom cylindrical joint 7, a top cylindrical joint 6, an edge 24, internal combined arms 4-I, external combined arms 5-I, a roller 57, and a tension cable 56.

Figure 72:
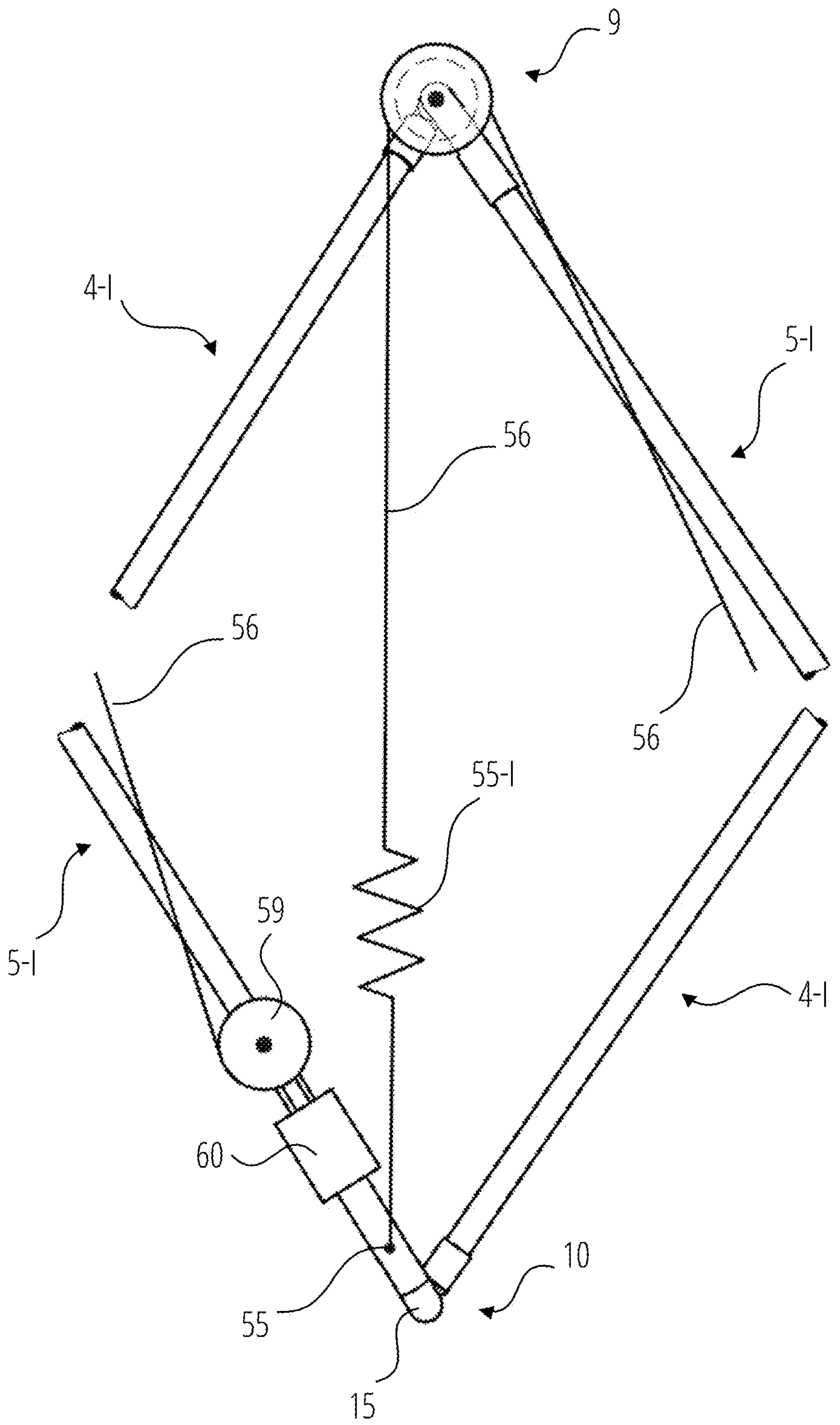
FIG. 72 shows tension cables, electric motor, and rollers of antenna, according to an example embodiment.

FIG. 72 shows tension cables, electric motor, and rollers of antenna 1, according to an example embodiment. Specifically, FIG. 72 depicts the following components: a top spherical joint 9, a bottom spherical joint 10, a sleeve 15, internal combined arms 4-I, external combined arms 5-I, a tension cable 56, a spring 55-I, a holder 55, an electric motor 60, and a drum 59.

Figure 73:
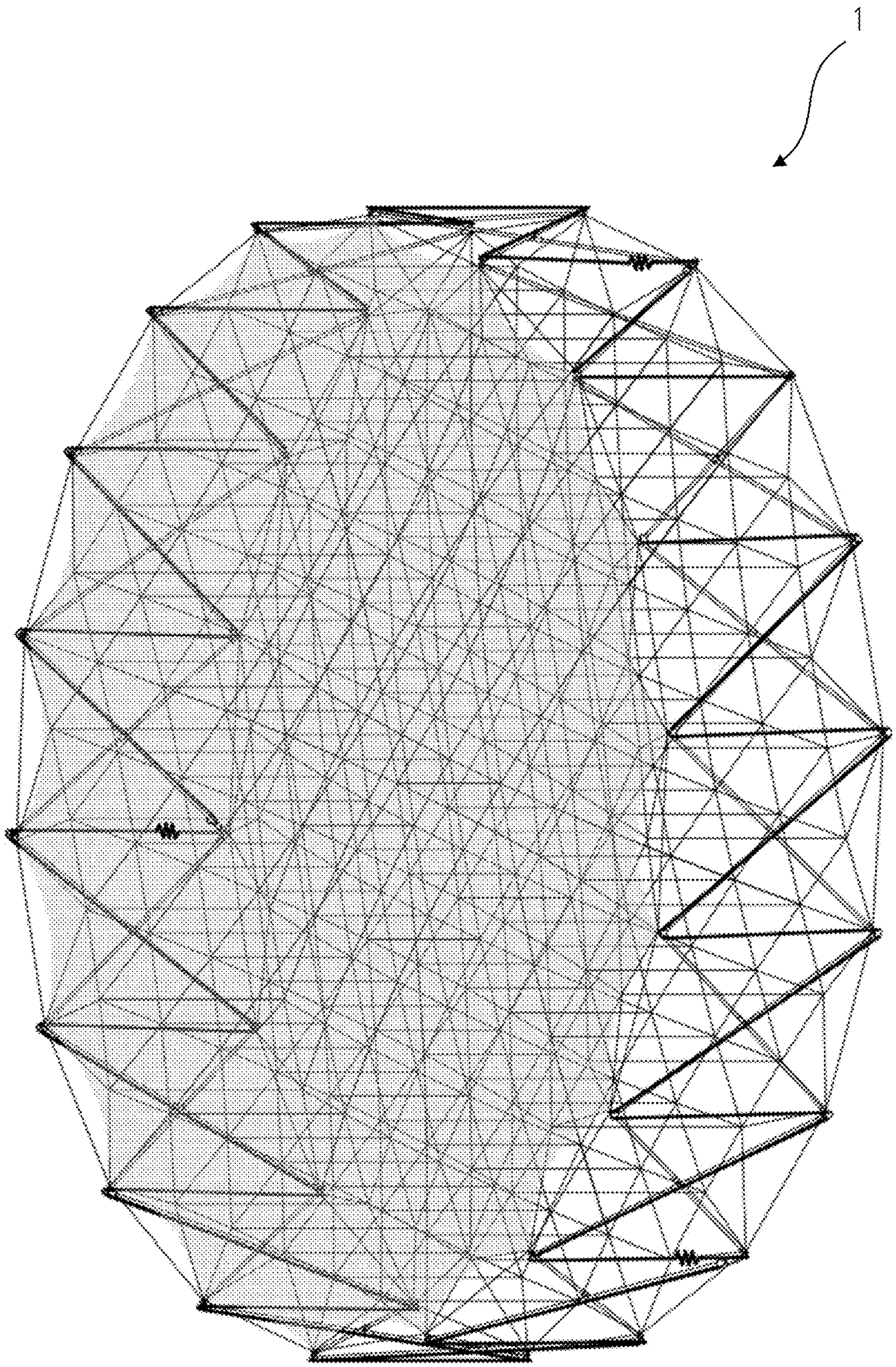
FIG. 73 shows an antenna, according to an example embodiment.

FIG. 73 shows antenna 1, according to an example embodiment.

Figure 74:
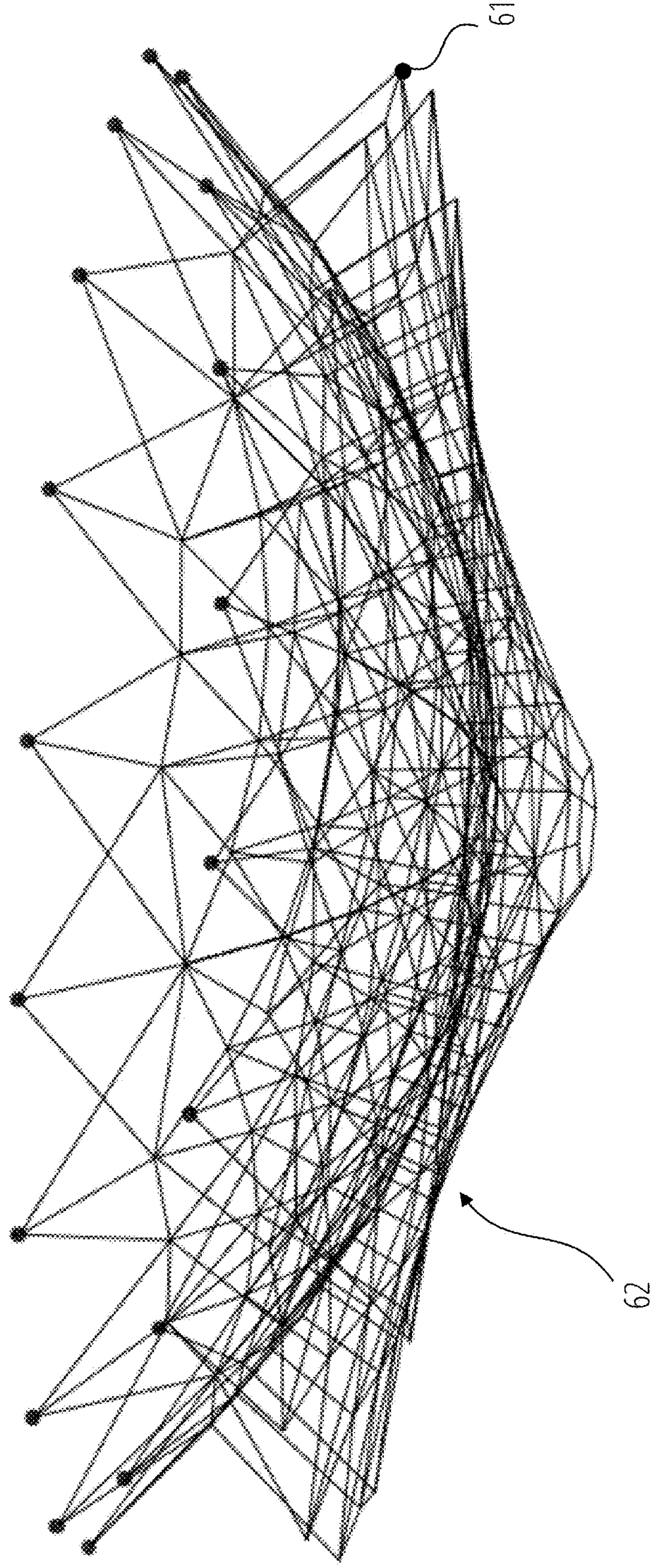
FIG. 74 depicts inclusion of a convex single-sheet hyperbolic mesh in the central portion of an antenna, according to an example embodiment.

FIG. 74 depicts the inclusion of a convex single-sheet hyperbolic mesh in the central portion of antenna 1, according to an example embodiment. FIG. 74 shows peripheral node 61 and a lower single-sheet hyperbolic mesh 62.

Figure 75:
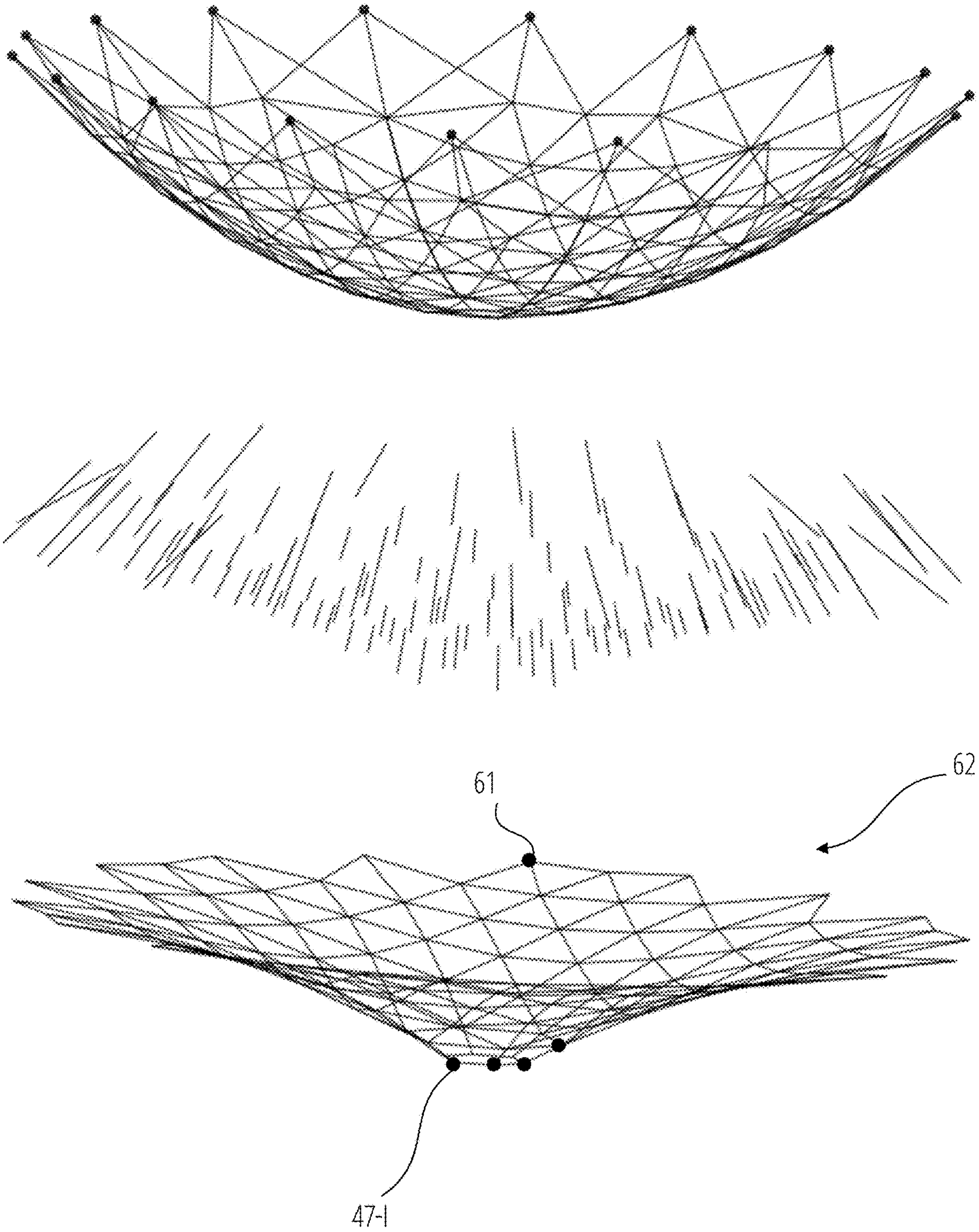
FIG. 75 illustrates holders for tension cables fixed to peripheral nodes, according to an example embodiment.

FIG. 75 illustrates holders for tension cables fixed to peripheral nodes, according to an example embodiment. FIG. 75 depicts the following components: a peripheral node 61, a lower single-sheet hyperbolic mesh 62, and a node 47-I.

Figure 76:
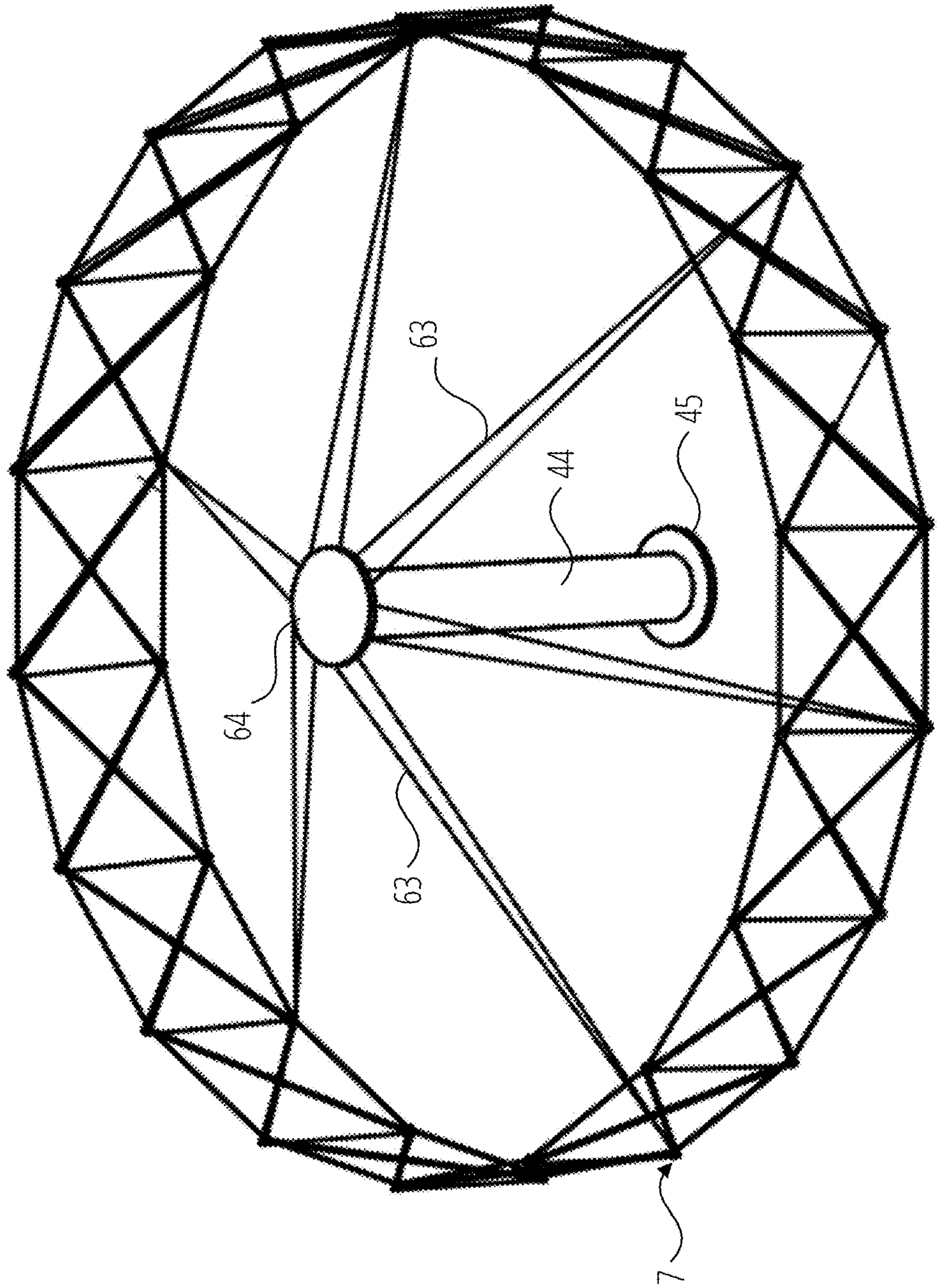
FIG. 76 shows tension cables attached to the roof portion of the support post, according to an example embodiment.

FIG. 76 shows tension cables attached to the roof portion of the support post, according to an example embodiment. FIG. 76 depicts the following components: a bottom cylindrical joint 7, a support post 44, a platform 45, a roof portion 64, and a cable 63.

Figure 77:
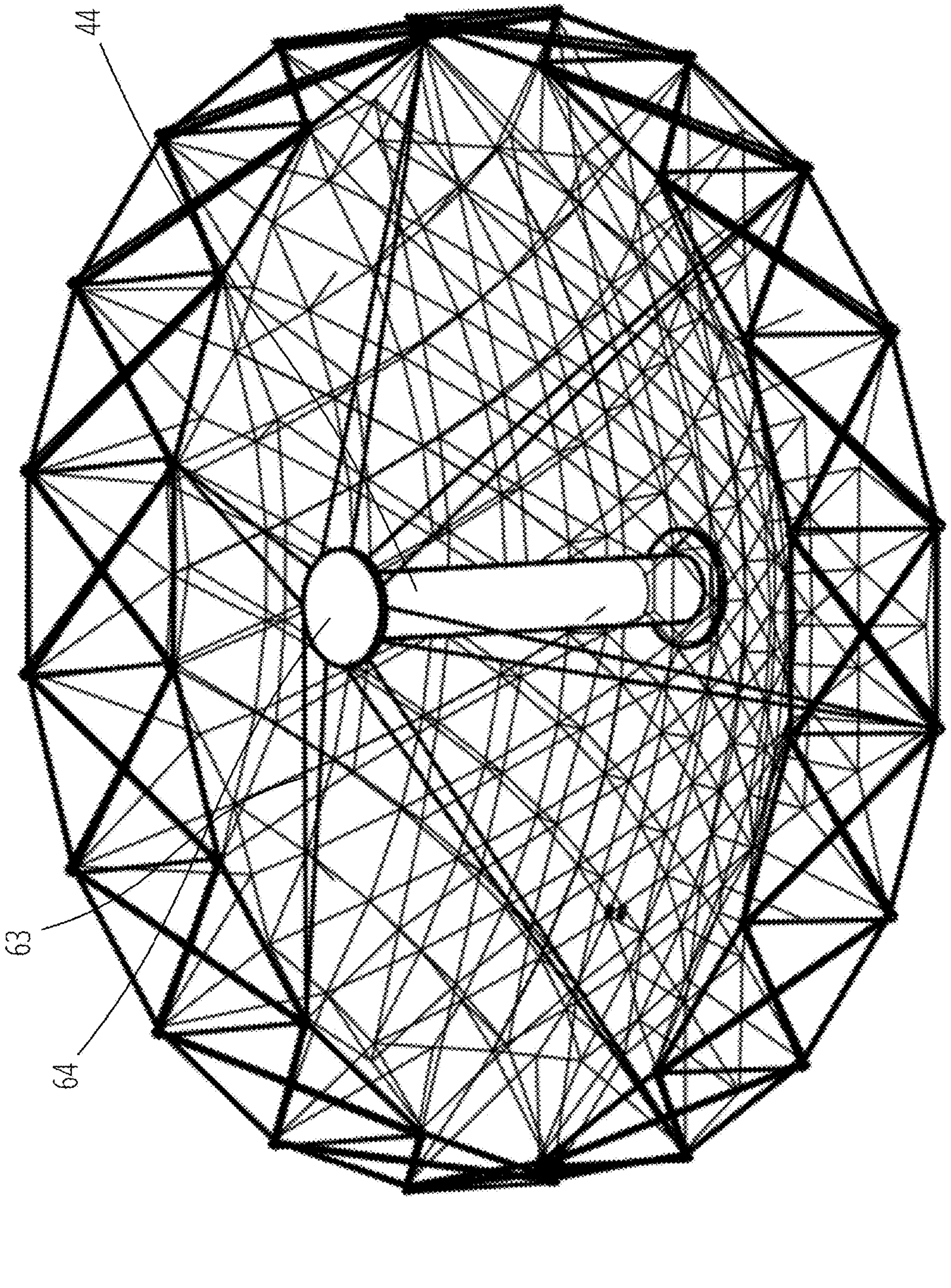
FIG. 77 illustrates a partially deployed state of an antenna, according to an example embodiment.

FIG. 77 illustrates a partially deployed state of antenna 1, according to an example embodiment. FIG. 77 shows the following components: a support post 44, a roof portion 64, and a cable 63.

Figure 78:
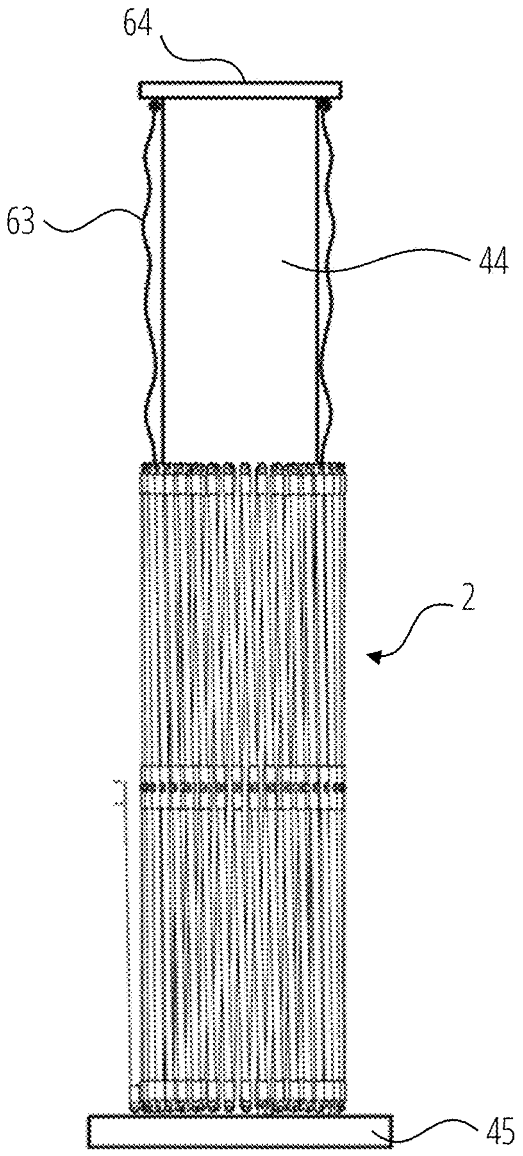
FIG. 78 shows the stowed configuration of the flexible reflector, according to an example embodiment.

FIG. 78 shows the stowed configuration of the flexible reflector, according to an example embodiment. FIG. 78 depicts the following components: a deployable ring 2, a support post 44, a platform 45, a roof portion 64, and a cable 63.

Figure 79:
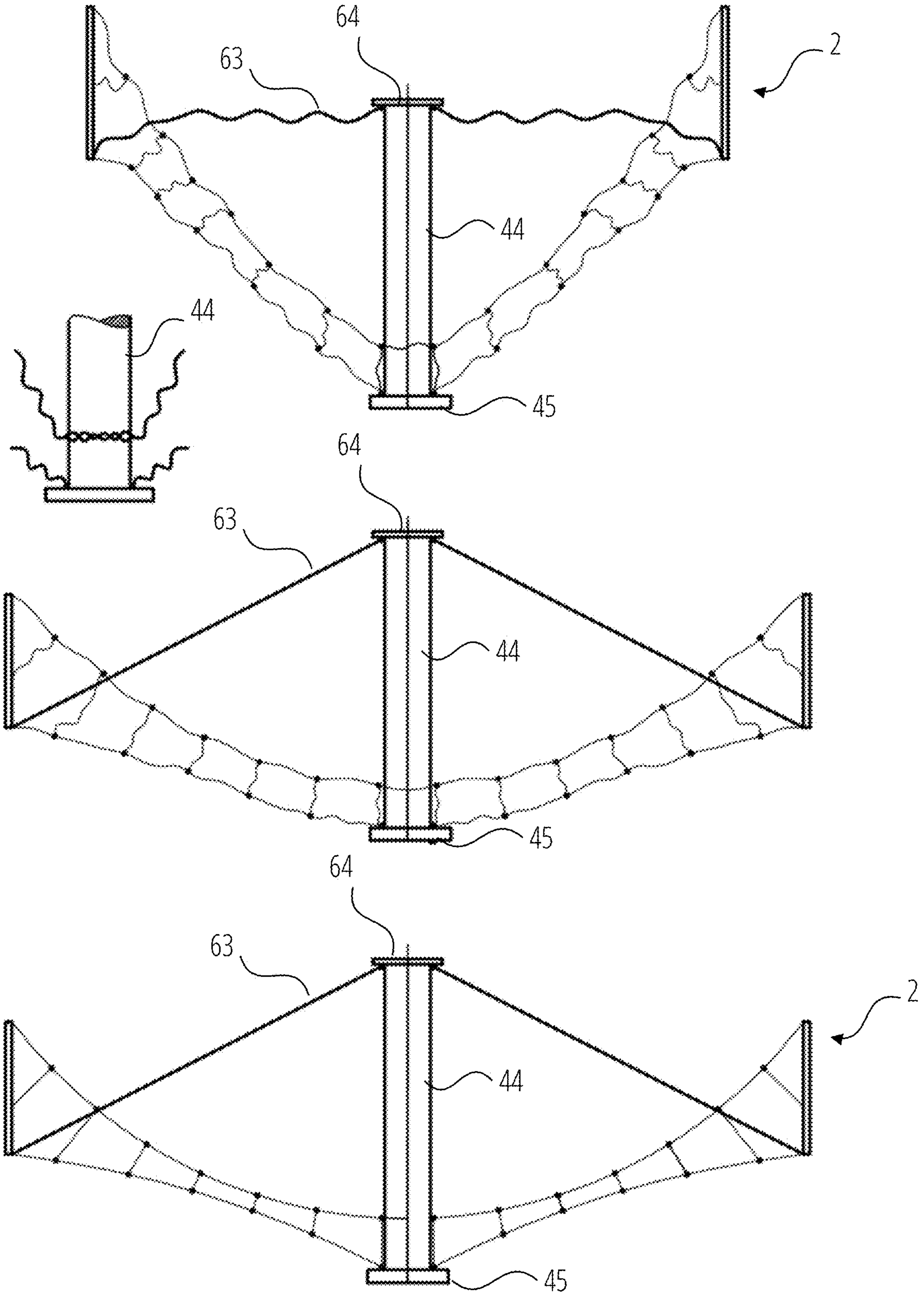
FIG. 79 shows the sequence of deployment of the flexible reflector, according to an example embodiment.

FIG. 79 shows the sequence of deployment of the flexible reflector, according to an example embodiment. FIG. 79 depicts the following components: a deployable ring 2, a support post 44, a platform 45, a roof portion 64, and a cable 63.

Figure 80:
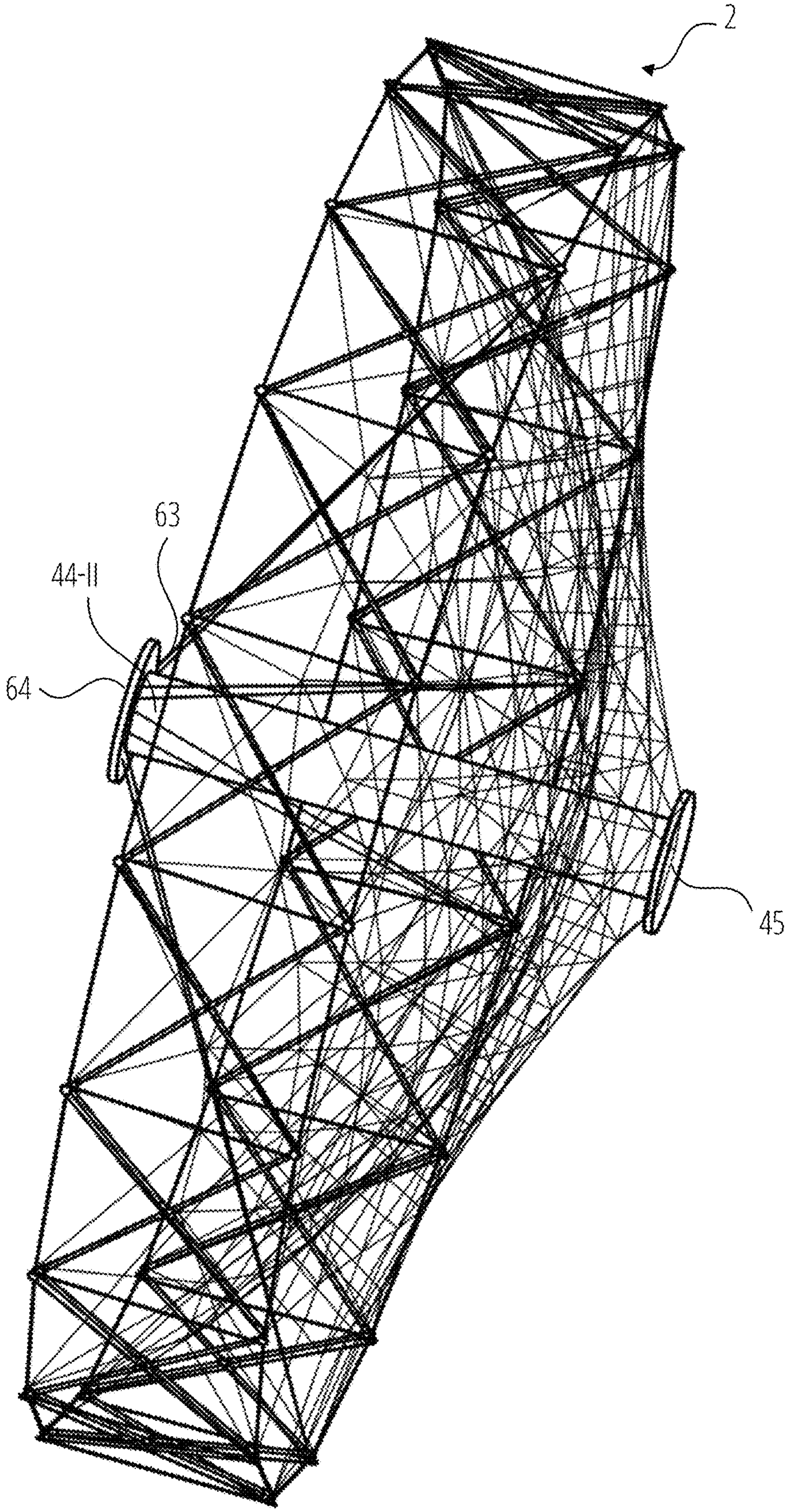
FIG. 80 shows the deployable ring in an unfolded state, according to an example embodiment.

FIG. 80 shows the deployable ring 2 in unfolded state, according to an example embodiment. FIG. 80 depicts the following components: a deployable ring 2, a telescopic emitter support post 44-II, a platform 45, a roof portion 64, and a cable 63.

Figure 81:
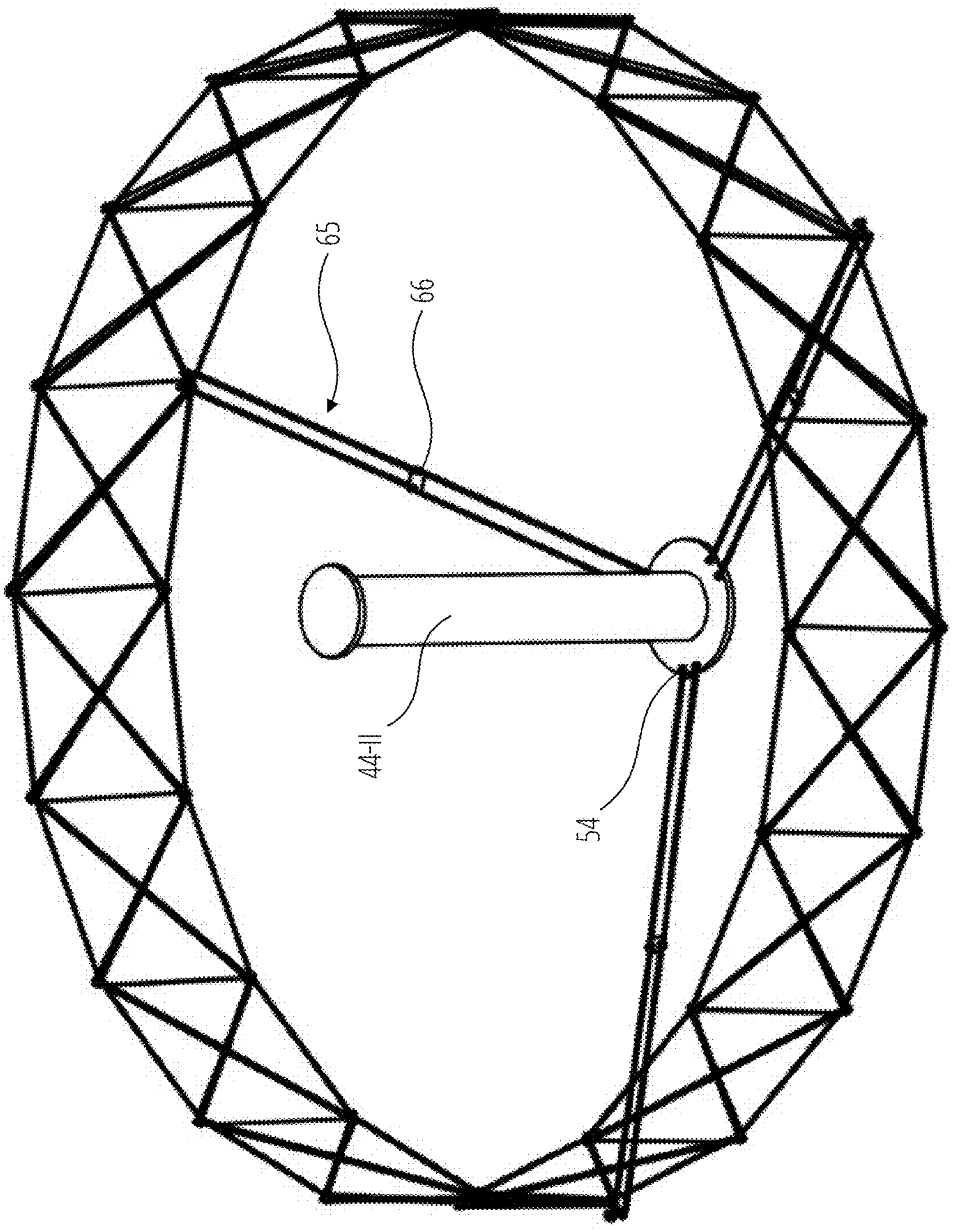
FIG. 81 shows a folding support arm assembly, according to an example embodiment.

FIG. 81 shows a folding support arm assembly, according to an example embodiment. FIG. 81 depicts the following components: a telescopic emitter support post 44-II, a fixed cylindrical joint 54, a cylindrical folding joint 66, and a foldable support arm 65.

Figure 82:
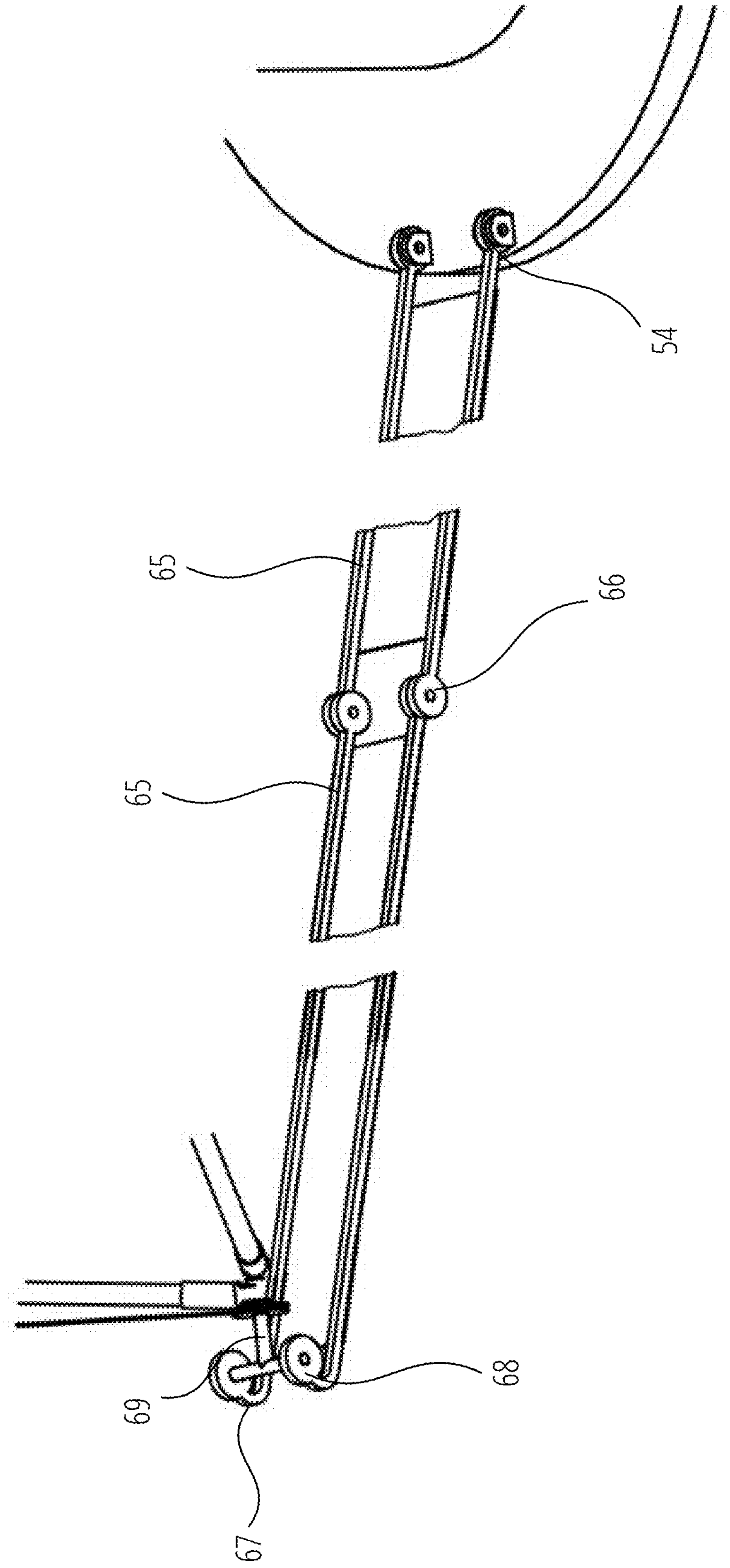
FIGS. 82-83 show details of a folding support arm assembly, according to an example embodiment.

FIG. 82 shows details of a folding support arm assembly, according to an example embodiment. FIG. 82 depicts the following components: a fixed cylindrical joint 54, a cylindrical folding joint 66, a foldable support arm 65, a cylindrical support joint 68, a support hook 67, and a support rod 69.

Figure 83:
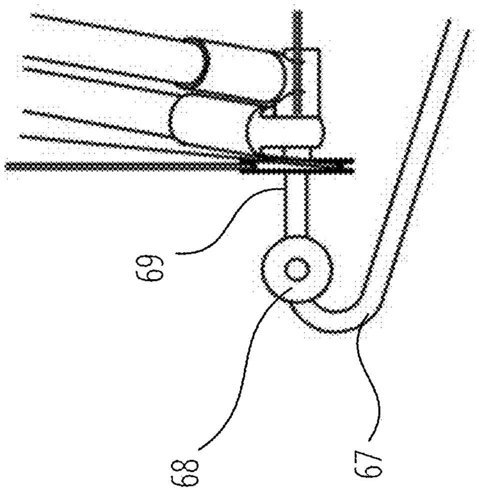

FIG. 83 shows details of a folding support arm assembly, according to an example embodiment. FIG. 83 depicts the following components: a cylindrical support joint 68, a support hook 67, and a support rod 69.

Figure 84:
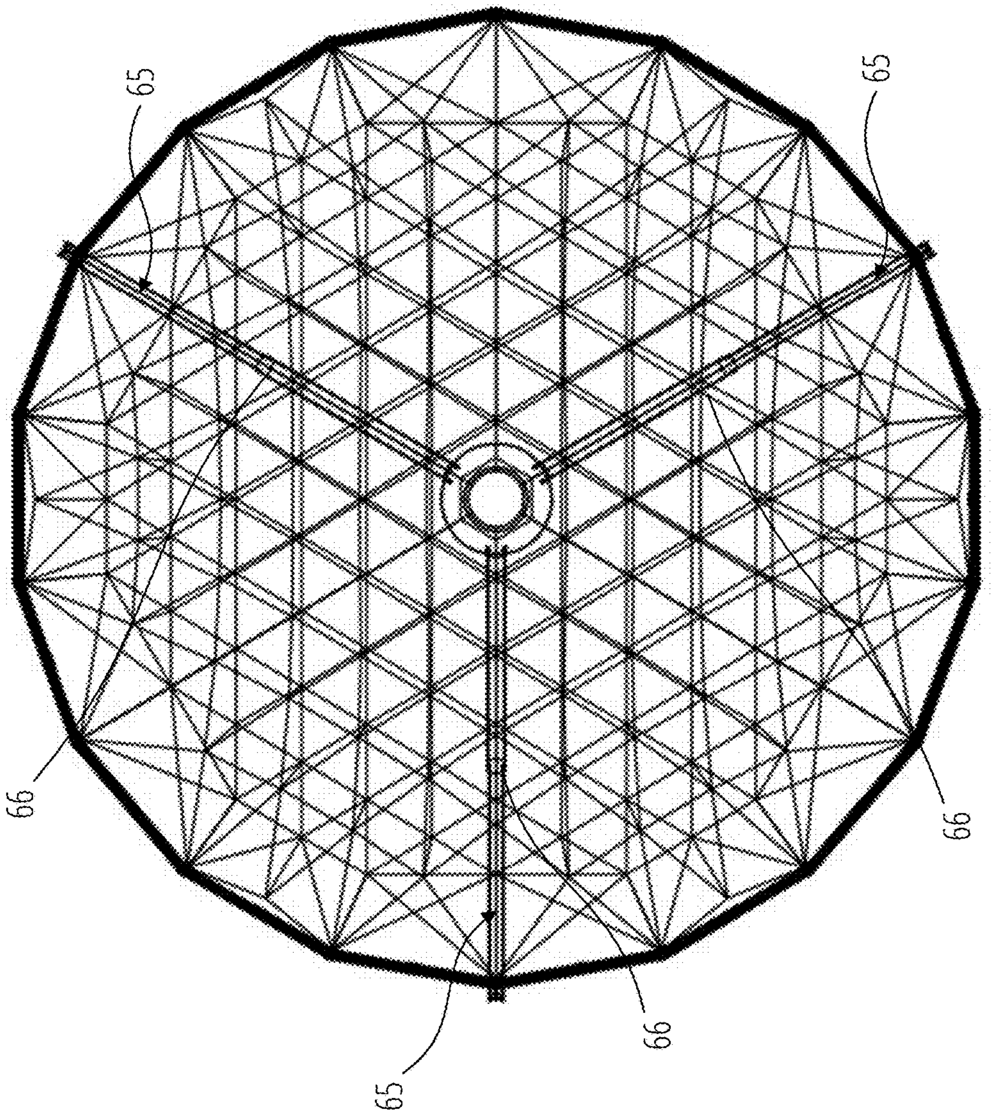
FIGS. 84-86 show positions of a folding support arm assembly in the antenna, according to example embodiments.

FIG. 84 shows positions of folding support arm assembly in the antenna, according to an example embodiment. FIG. 84 depicts the following components: a cylindrical folding joint 66 and a foldable support arm 65.

Figure 85:
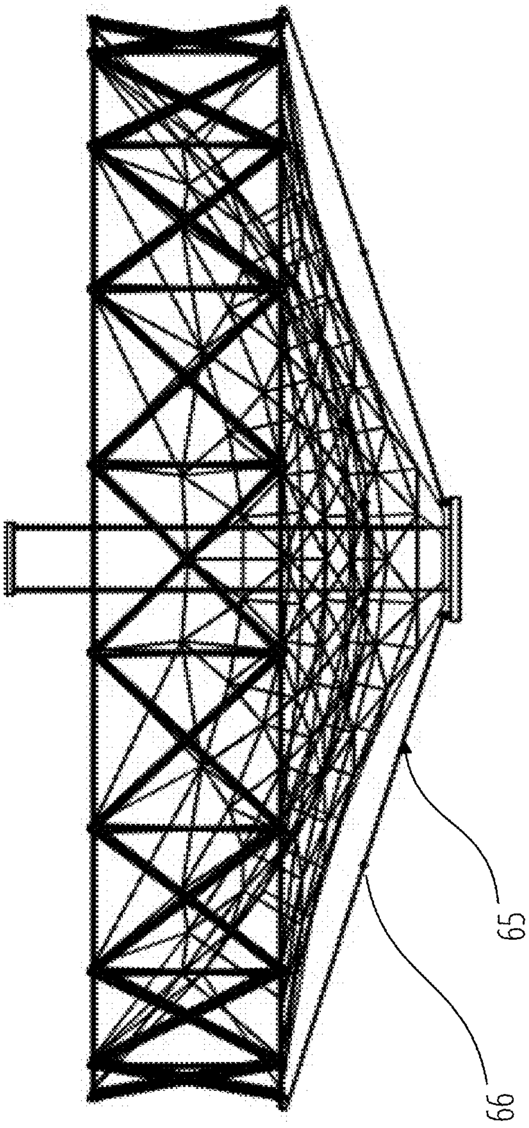

FIG. 85 shows positions of folding support arm assembly in the antenna, according to an example embodiment. FIG. 85 depicts the following components: a cylindrical folding joint 66 and a foldable support arm 65.

Figure 86:
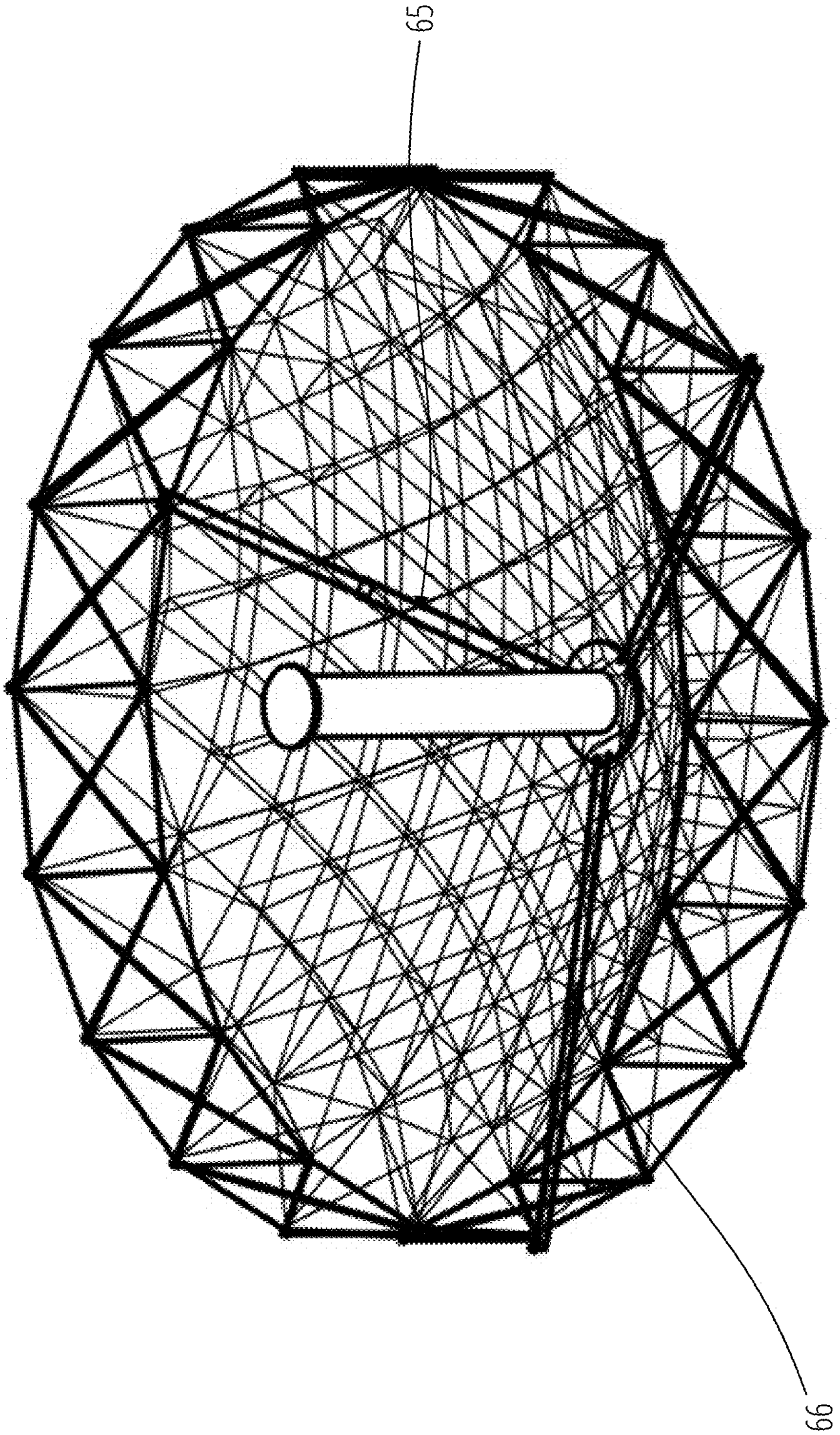

FIG. 86 shows positions of folding support arm assembly in the antenna, according to an example embodiment. FIG. 86 depicts the following components: a cylindrical folding joint 66 and a foldable support arm 65.

Figure 87:
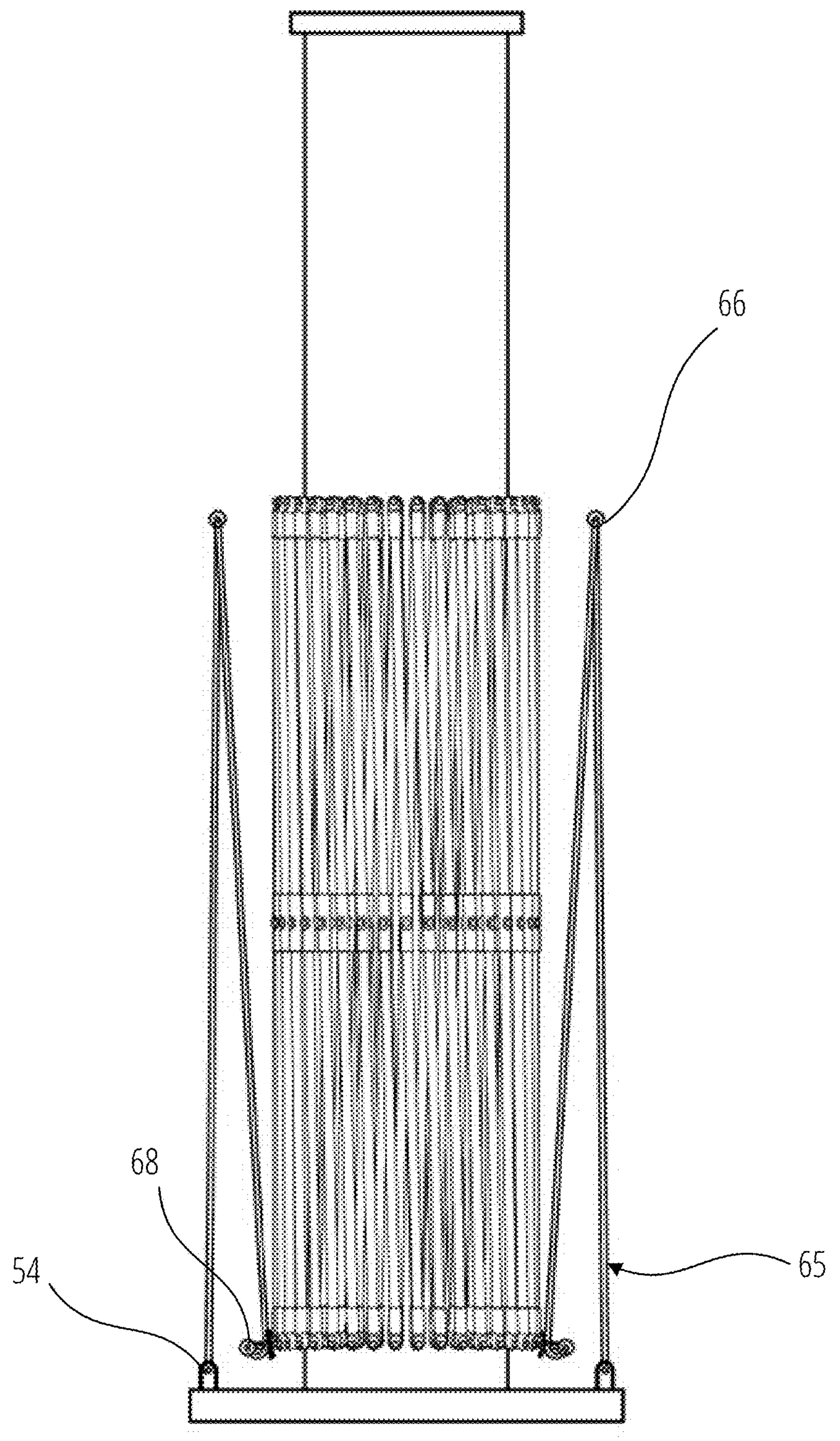
FIG. 87 illustrates the folded stage of a folding support arm assembly, according to an example embodiment.

FIG. 87 illustrates the folded stage of folding support arm assembly, according to an example embodiment. FIG. 87 depicts the following components: a fixed cylindrical joint 54, a cylindrical folding joint 66, a foldable support arm 65, and a cylindrical support joint 68.

Figure 88:
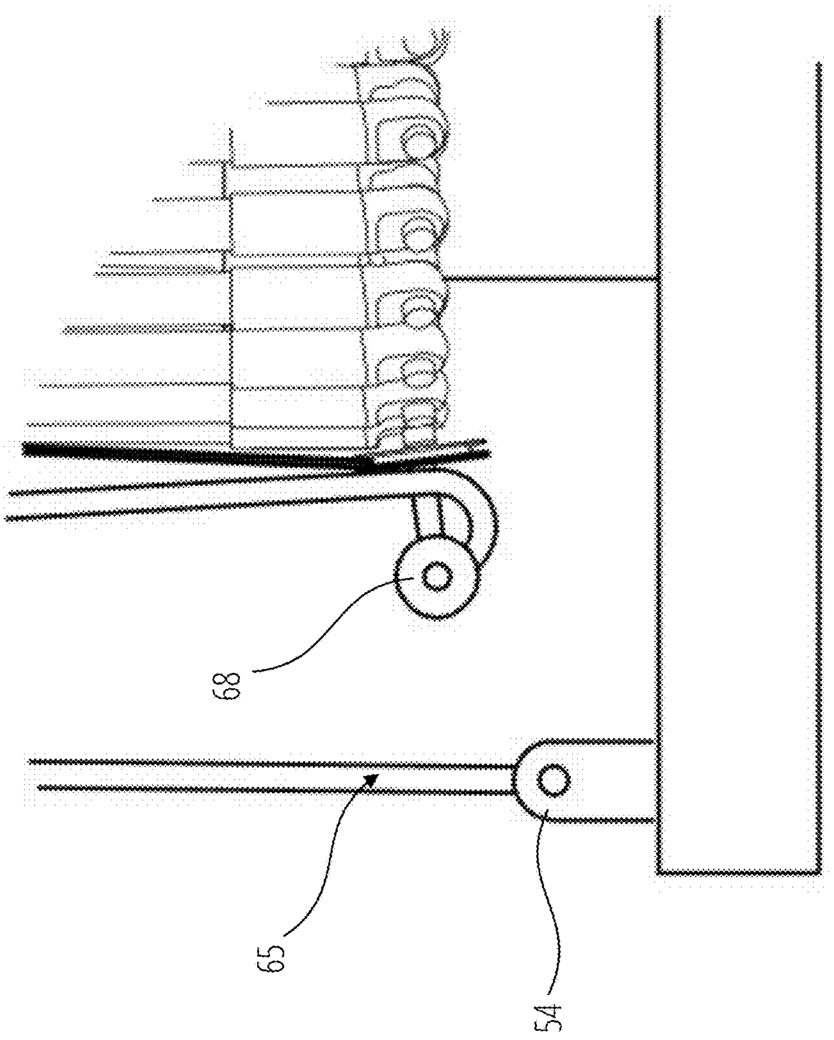
FIGS. 88-92 illustrate the intermediate stage of the folding support arm assembly during deployment of deployable ring, according to example embodiments.

FIG. 88 illustrates the intermediate stage of folding support arm assembly during deployment of deployable ring, according to an example embodiment. FIG. 88 depicts the following components: a fixed cylindrical joint 54, a foldable support arm 65, and a cylindrical support joint 68.

Figure 89:
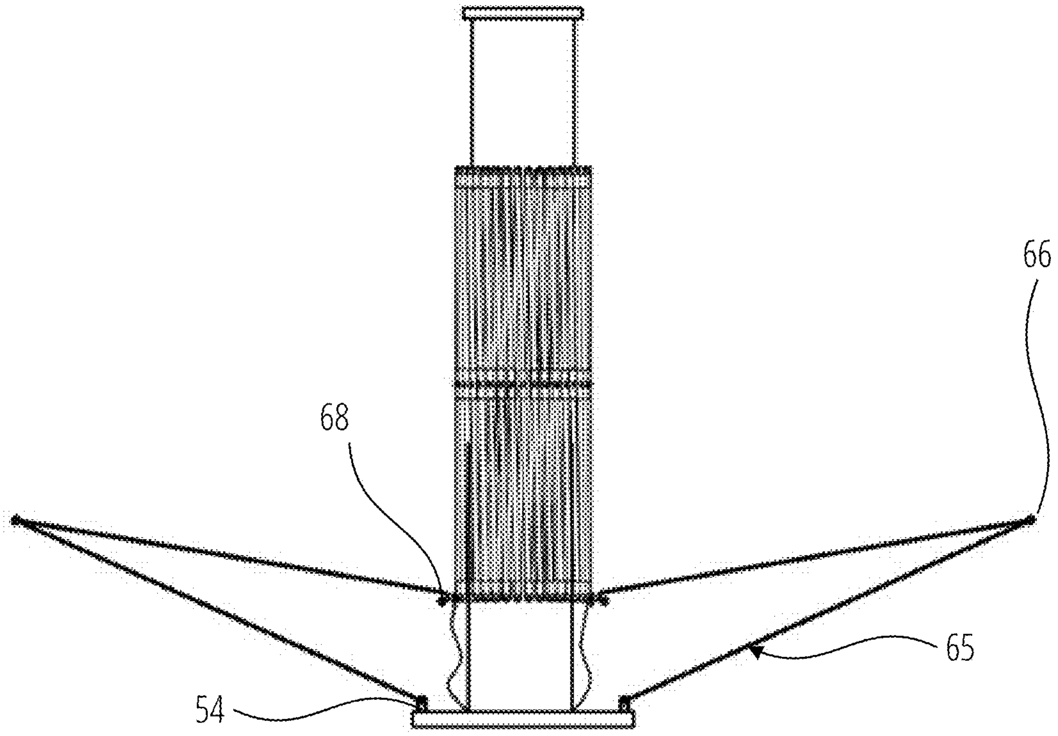

FIG. 89 illustrates the intermediate stage of folding support arm assembly during deployment of deployable ring, according to an example embodiment. FIG. 89 depicts the following components: a fixed cylindrical joint 54, a cylindrical folding joint 66, a foldable support arm 65, and a cylindrical support joint 68.

Figure 90:
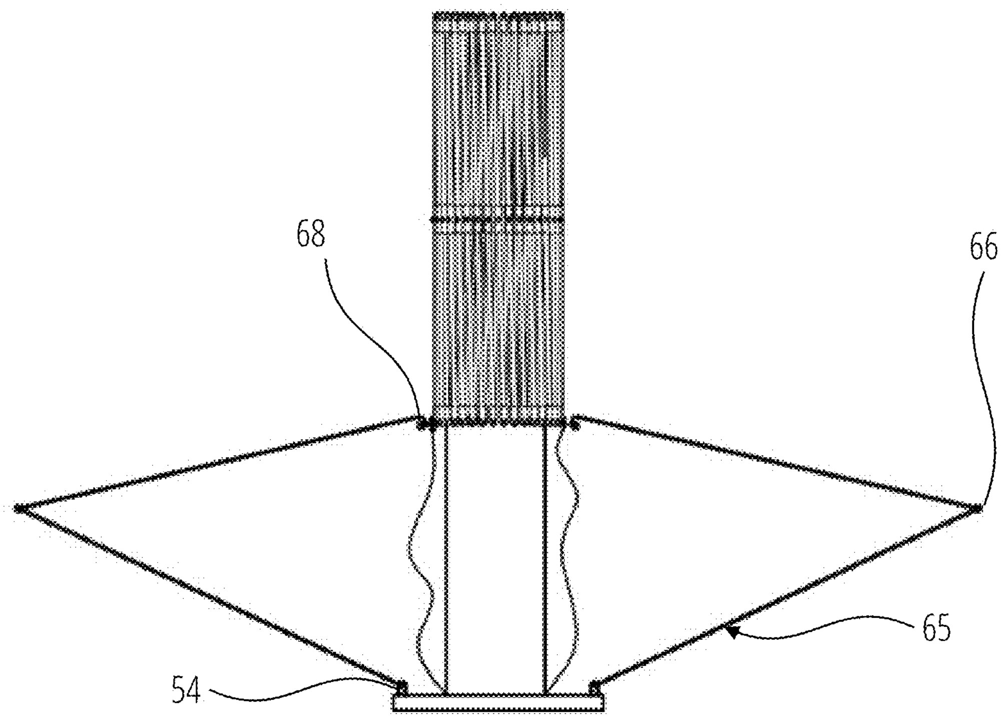

FIG. 90 illustrates the intermediate stage of folding support arm assembly during deployment of deployable ring, according to an example embodiment. FIG. 90 depicts the following components: a fixed cylindrical joint 54, a cylindrical folding joint 66, a foldable support arm 65, and a cylindrical support joint 68.

Figure 91:
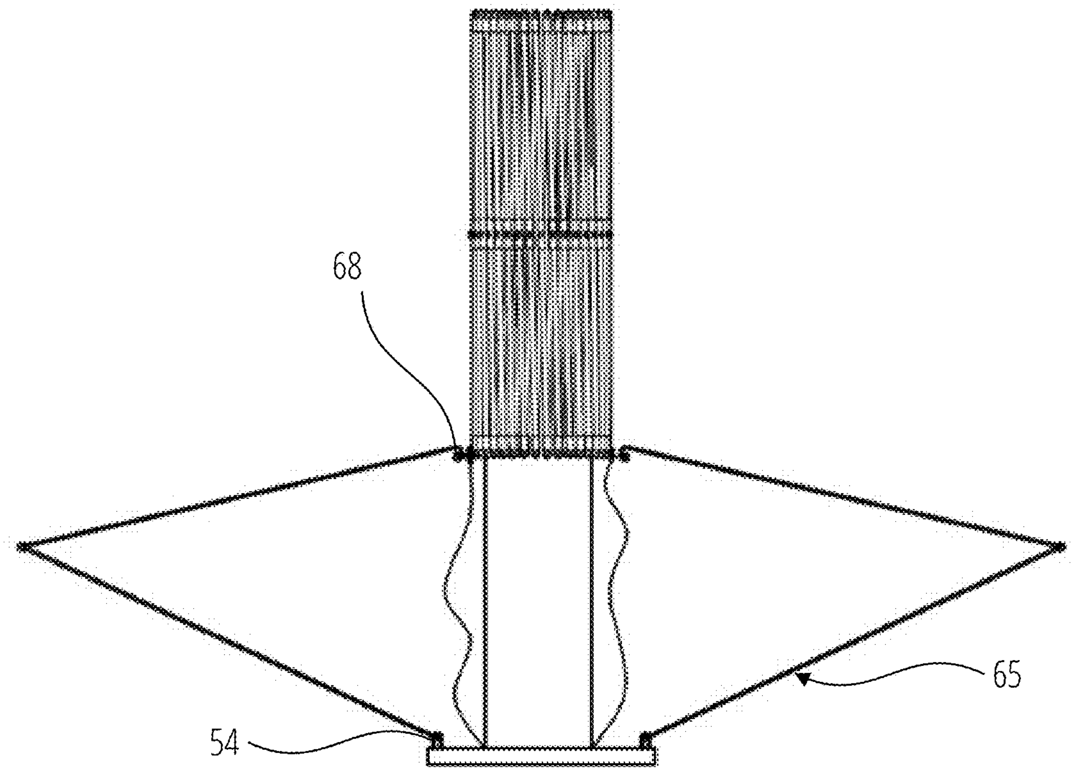

FIG. 91 illustrates the intermediate stage of folding support arm assembly during deployment of deployable ring, according to an example embodiment. FIG. 91 depicts the following components: a fixed cylindrical joint 54, a foldable support arm 65, and a cylindrical support joint 68.

Figure 92:
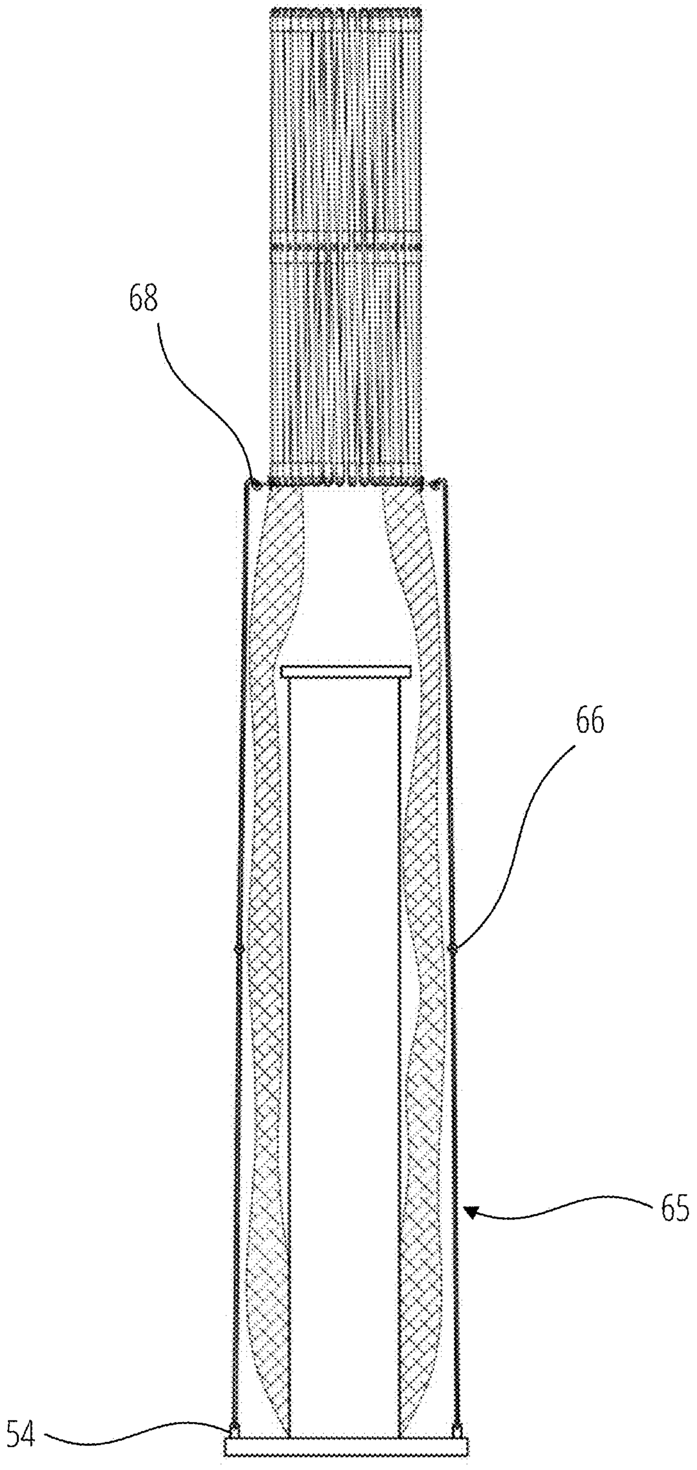

FIG. 92 illustrates the intermediate stage of folding support arm assembly during deployment of deployable ring, according to an example embodiment. FIG. 92 depicts the following components: a fixed cylindrical joint 54, a cylindrical folding joint 66, a foldable support arm 65, and a cylindrical support joint 68.

Figure 93:
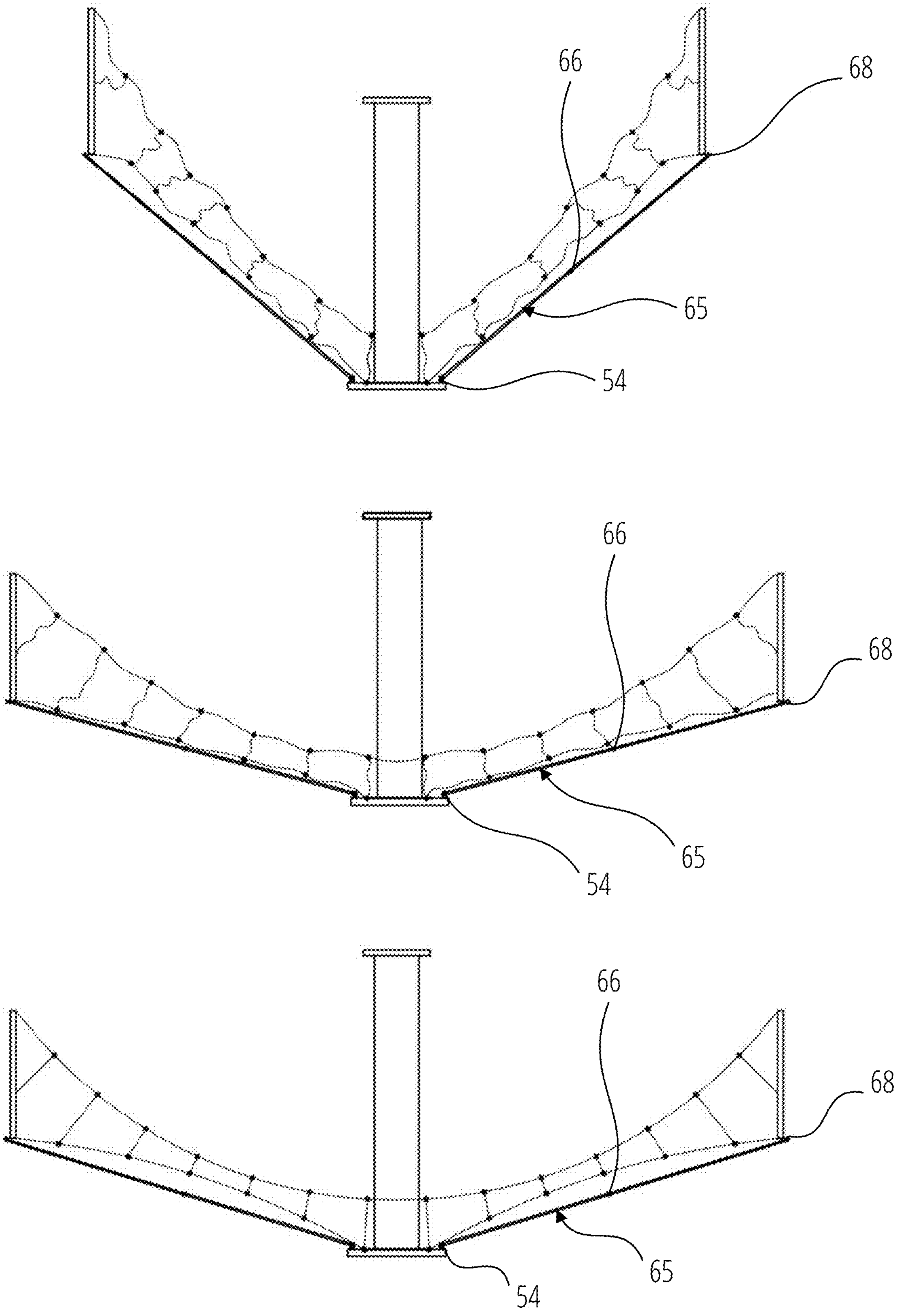
FIG. 93 illustrates a folding support arm assembly in the intermediate stages of deployment of deployable ring, according to an example embodiment.

FIG. 93 illustrates folding support arm assembly in the intermediate stages of deployment of deployable ring, according to an example embodiment. FIG. 93 depicts the following components: a fixed cylindrical joint 54, a cylindrical folding joint 66, a foldable support arm 65, and a cylindrical support joint 68.

Figure 94:
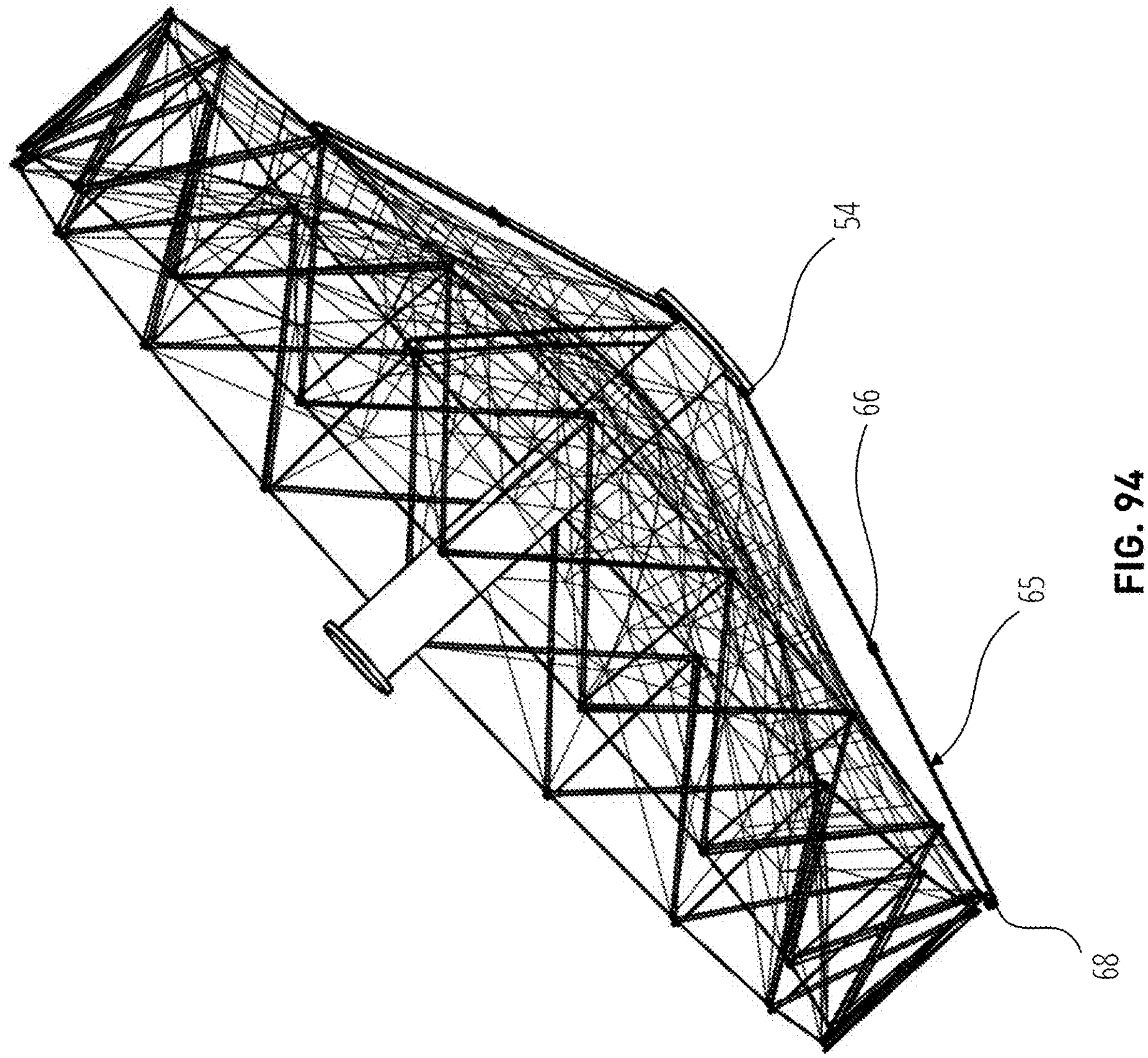
FIG. 94 illustrates a folding support arm assembly in the deployed state of deployable ring, according to an example embodiment.

FIG. 94 illustrates folding support arm assembly in the deployed state of deployable ring, according to an example embodiment. FIG. 94 depicts the following components: a fixed cylindrical joint 54, a cylindrical folding joint 66, a foldable support arm 65, and a cylindrical support joint 68.

Figure 95:
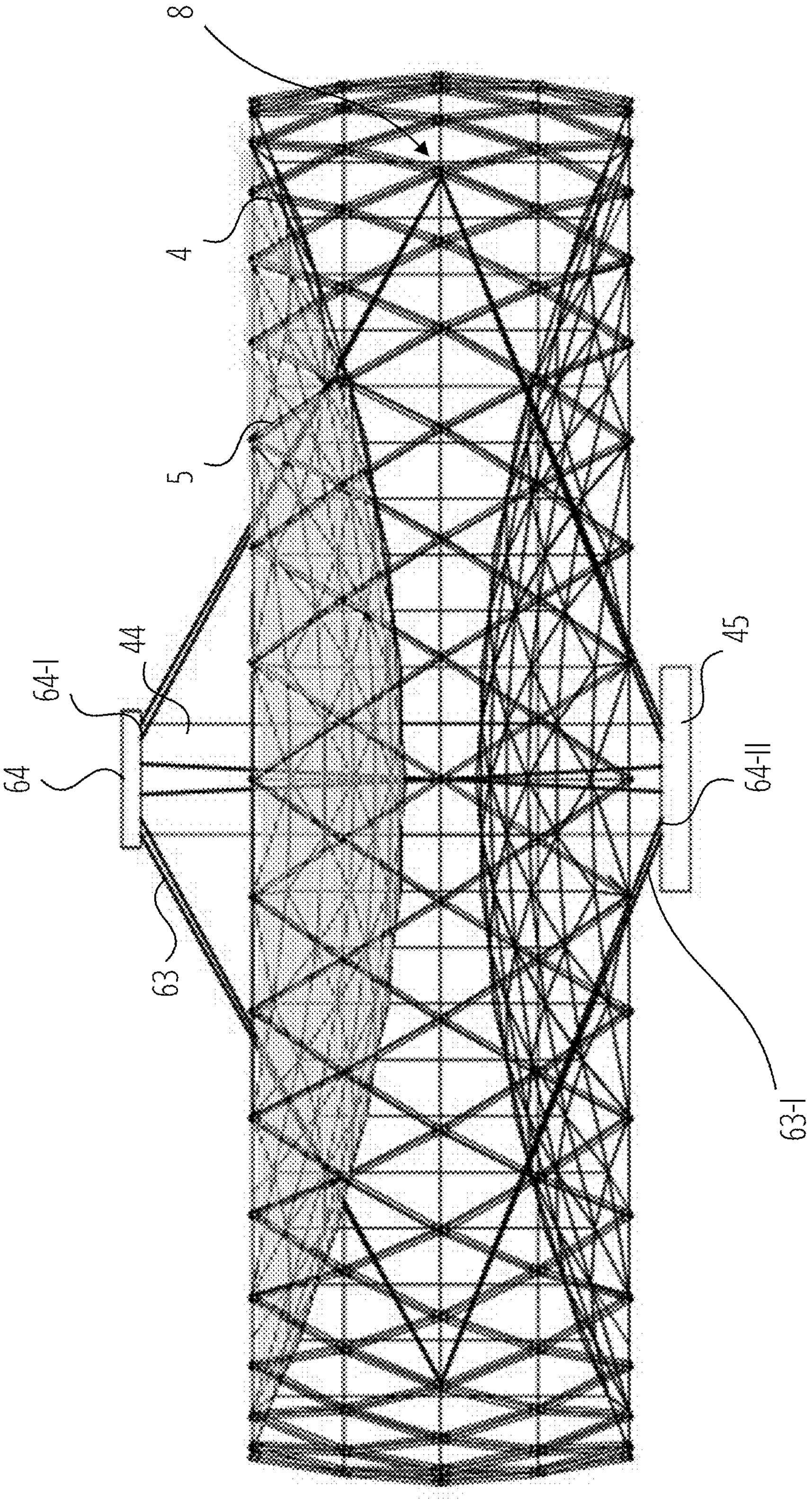
FIGS. 95-98 demonstrate holders for tension cables fixed between the deployable ring and support post, according to example embodiments.

FIG. 95 demonstrates holders for tension cables fixed between the deployable ring 2 and support post 44, according to an example embodiment. FIG. 95 depicts the following components: internal combined arms 4, external combined arms 5, an intermediate cylindrical joint 8, a support post 44, a platform 45, a roof portion 64, a cable 63, a holder 64-I, a holder 64-II, and a cable 63-I.

Figure 96:
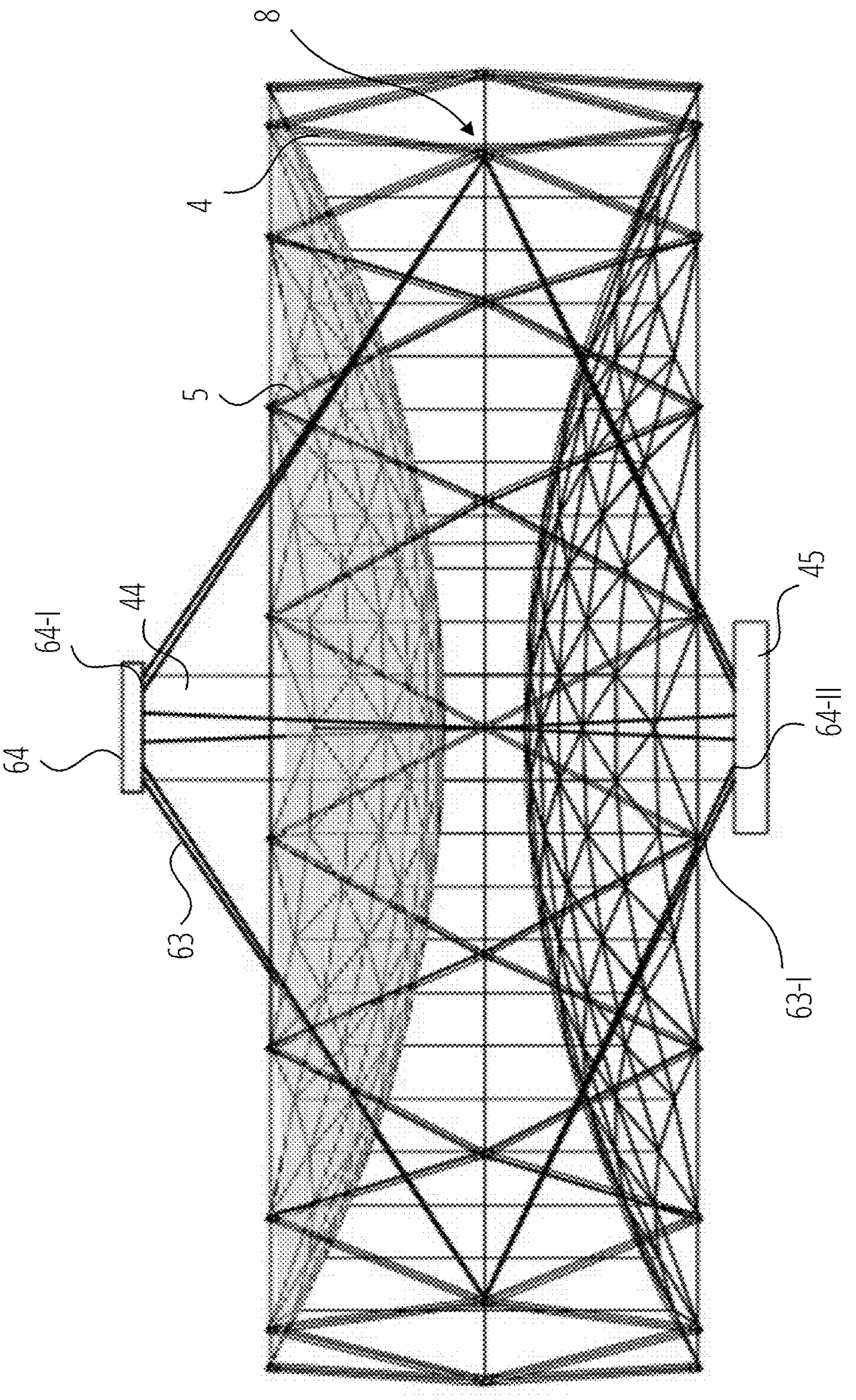

FIG. 96 demonstrates holders for tension cables fixed between the deployable ring 2 and support post 44, according to an example embodiment. FIG. 96 depicts the following components: internal combined arms 4, external combined arms 5, an intermediate cylindrical joint 8, a support post 44, a platform 45, a roof portion 64, a cable 63, a holder 64-I, a holder 64-II, and a cable 63-I.

Figure 97:
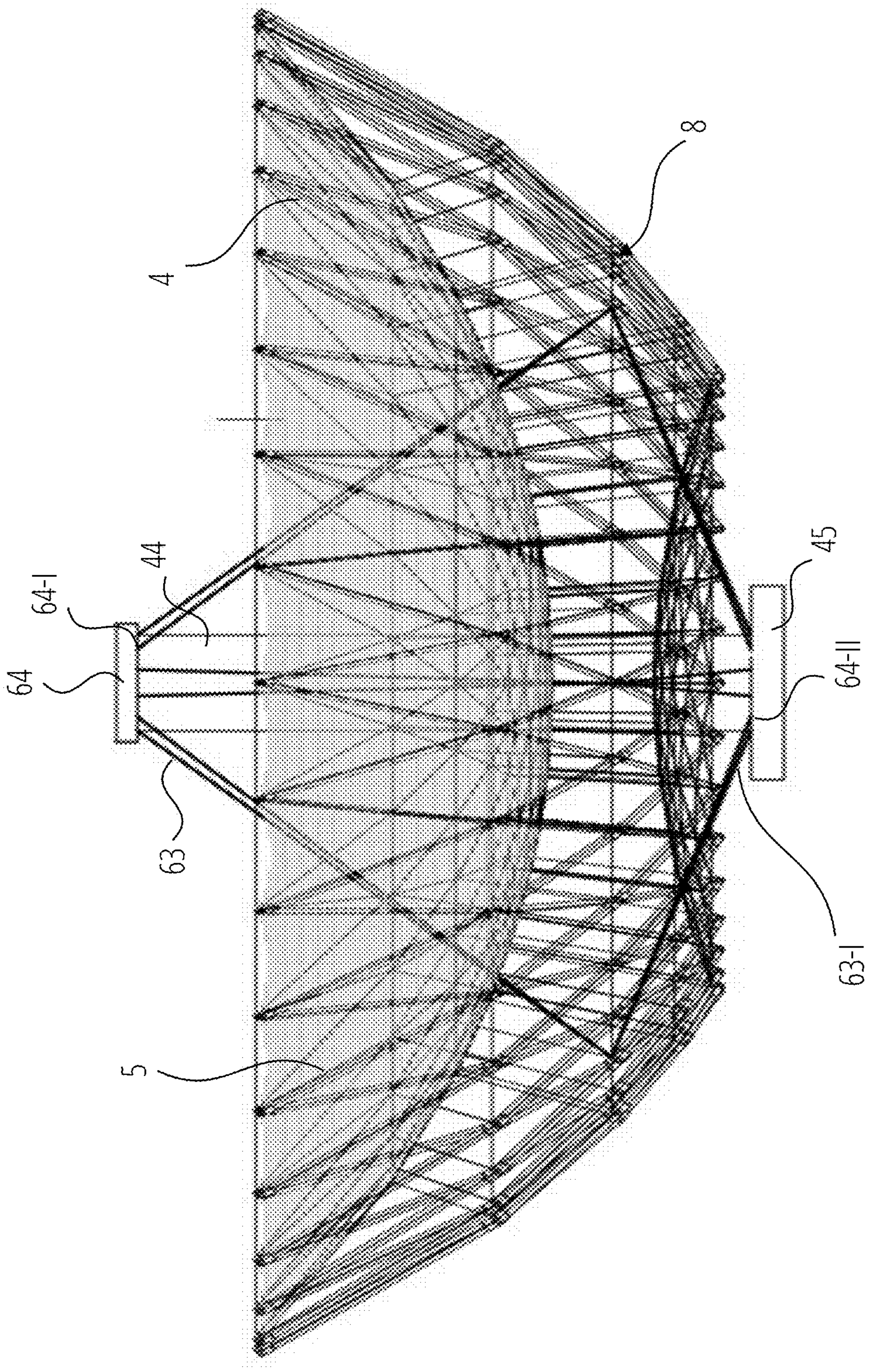

FIG. 97 demonstrates holders for tension cables fixed between the deployable ring 2-III and support post 44, according to an example embodiment. FIG. 97 depicts the following components: internal combined arms 4, external combined arms 5, an intermediate cylindrical joint 8, a support post 44, a platform 45, a roof portion 64, a cable 63, a holder 64-I, a holder 64-II, and a cable 63-I.

Figure 98:
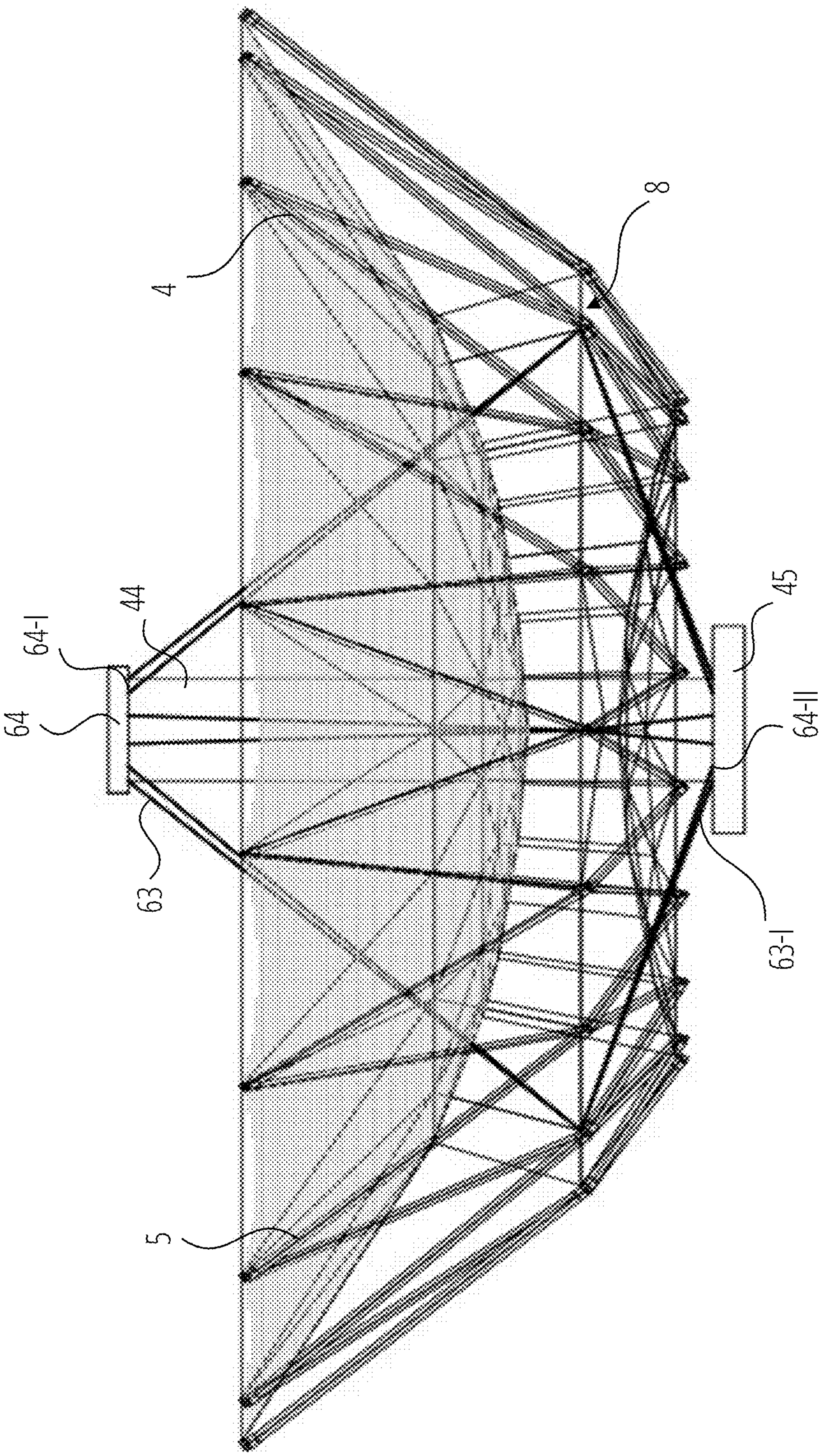

FIG. 98 demonstrates holders for tension cables fixed between the deployable ring 2-IV and support post 44, according to an example embodiment. FIG. 98 depicts the following components: internal combined arms 4, external combined arms 5, an intermediate cylindrical joint 8, a support post 44, a platform 45, a roof portion 64, a cable 63, a holder 64-I, a holder 64-II, and a cable 63-I.

Figure 99:
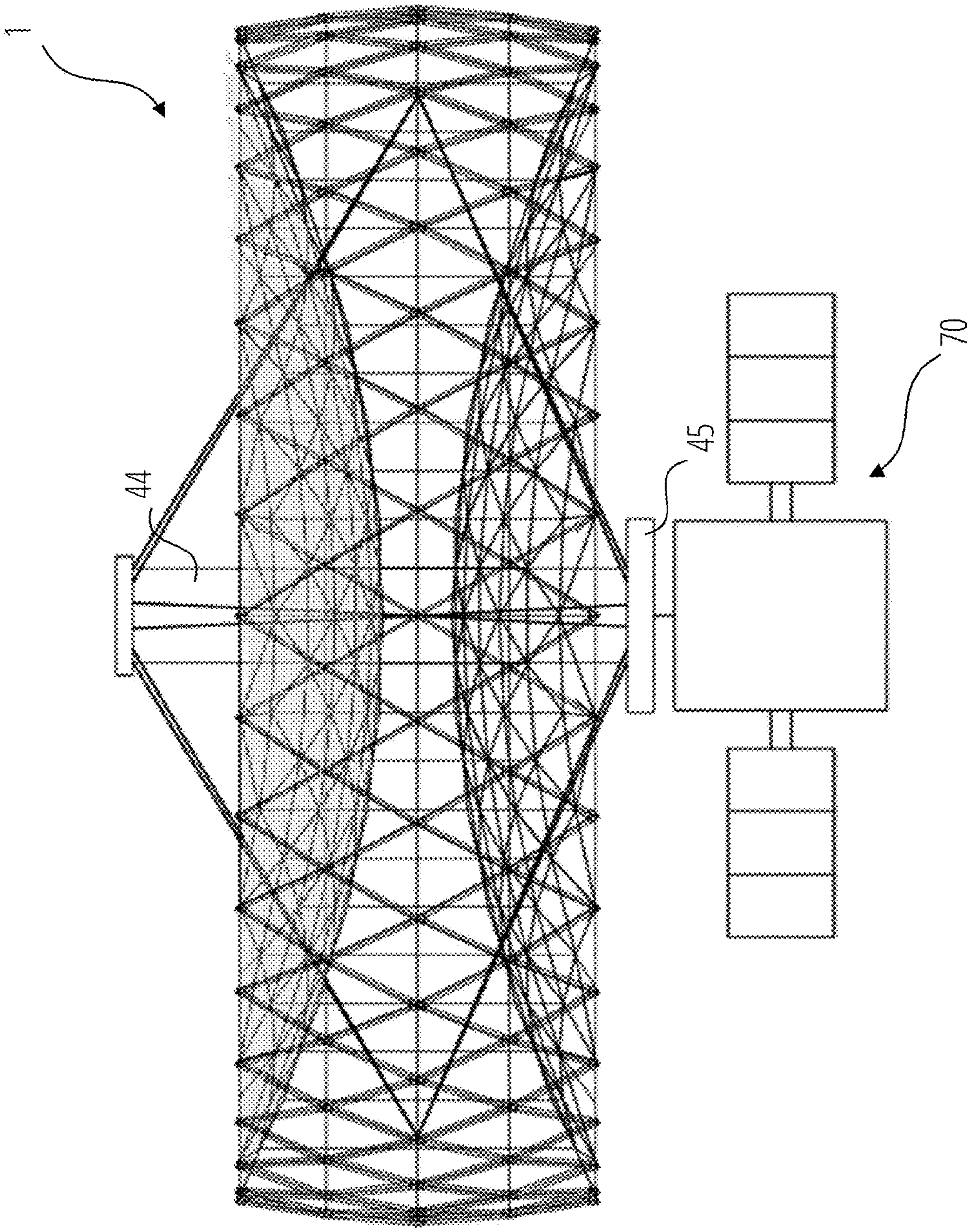
FIGS. 99-116 shows the mounting of an antenna to spacecraft, according to example embodiments.

FIG. 99 shows antenna 1 mounted to spacecraft 70 via platform 45 of support post 44, according to an example embodiment.

Figure 100:
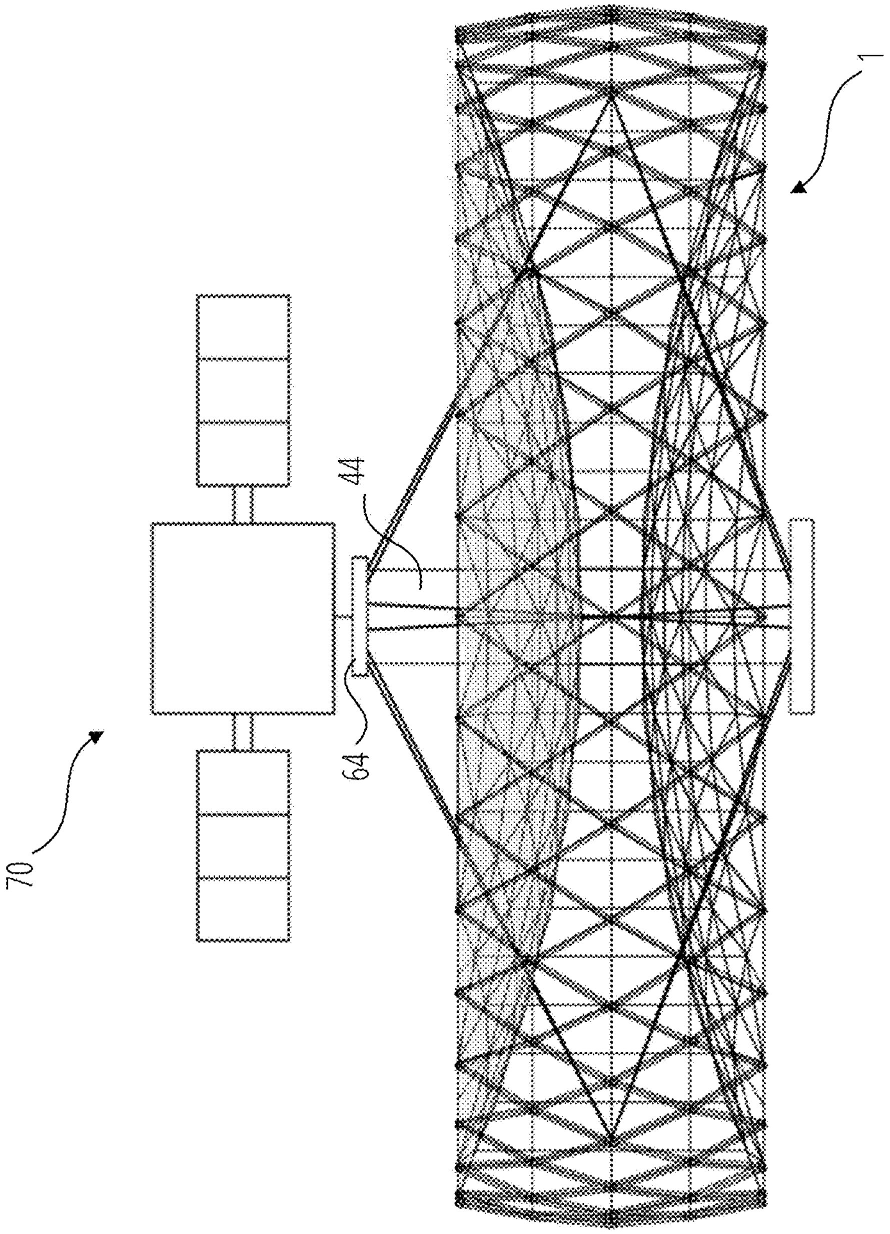

FIG. 100 shows antenna 1 mounted to spacecraft 70 via roof portion 64 of support post 44, according to an example embodiment.

Figure 101:
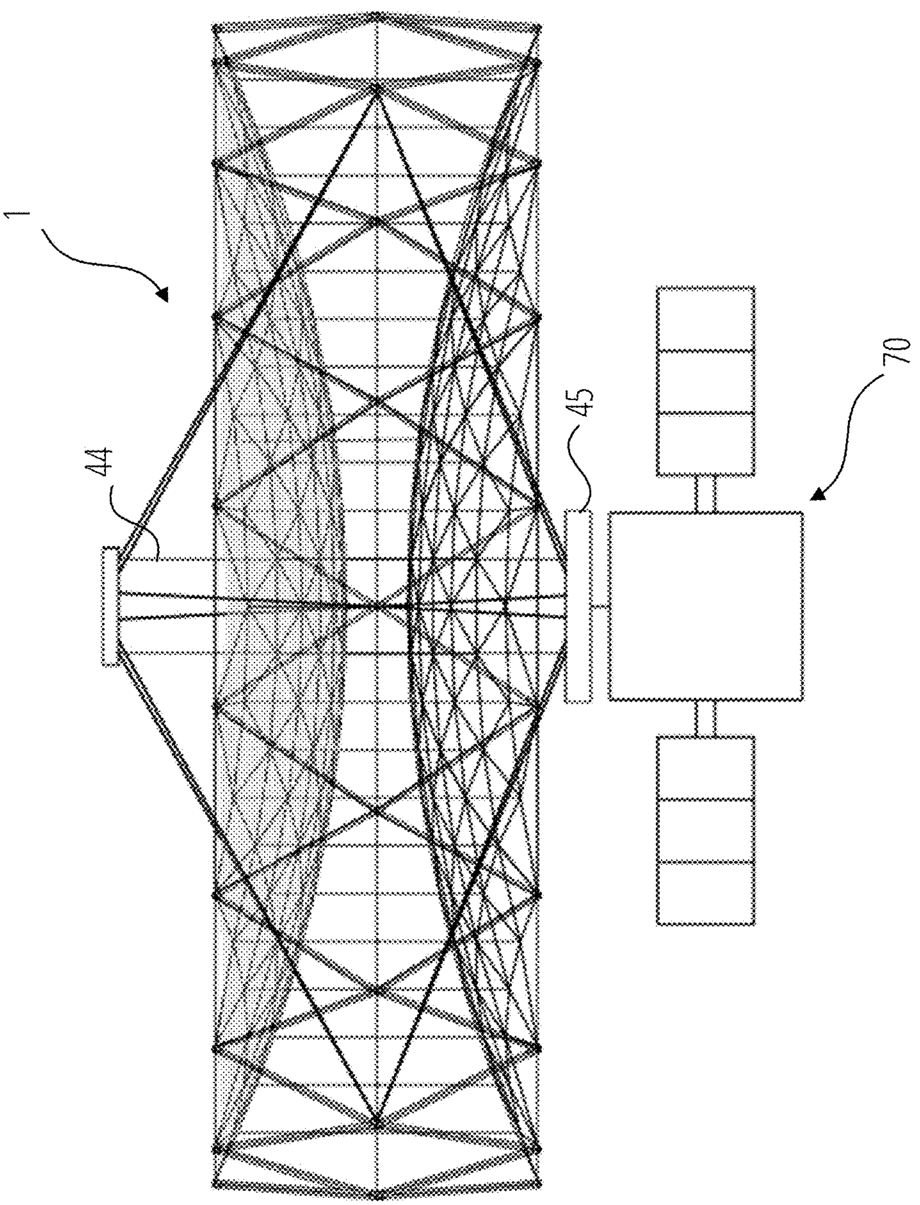

FIG. 101 shows antenna 1 mounted to spacecraft 70 via platform 45 of support post 44, according to an example embodiment.

Figure 102:
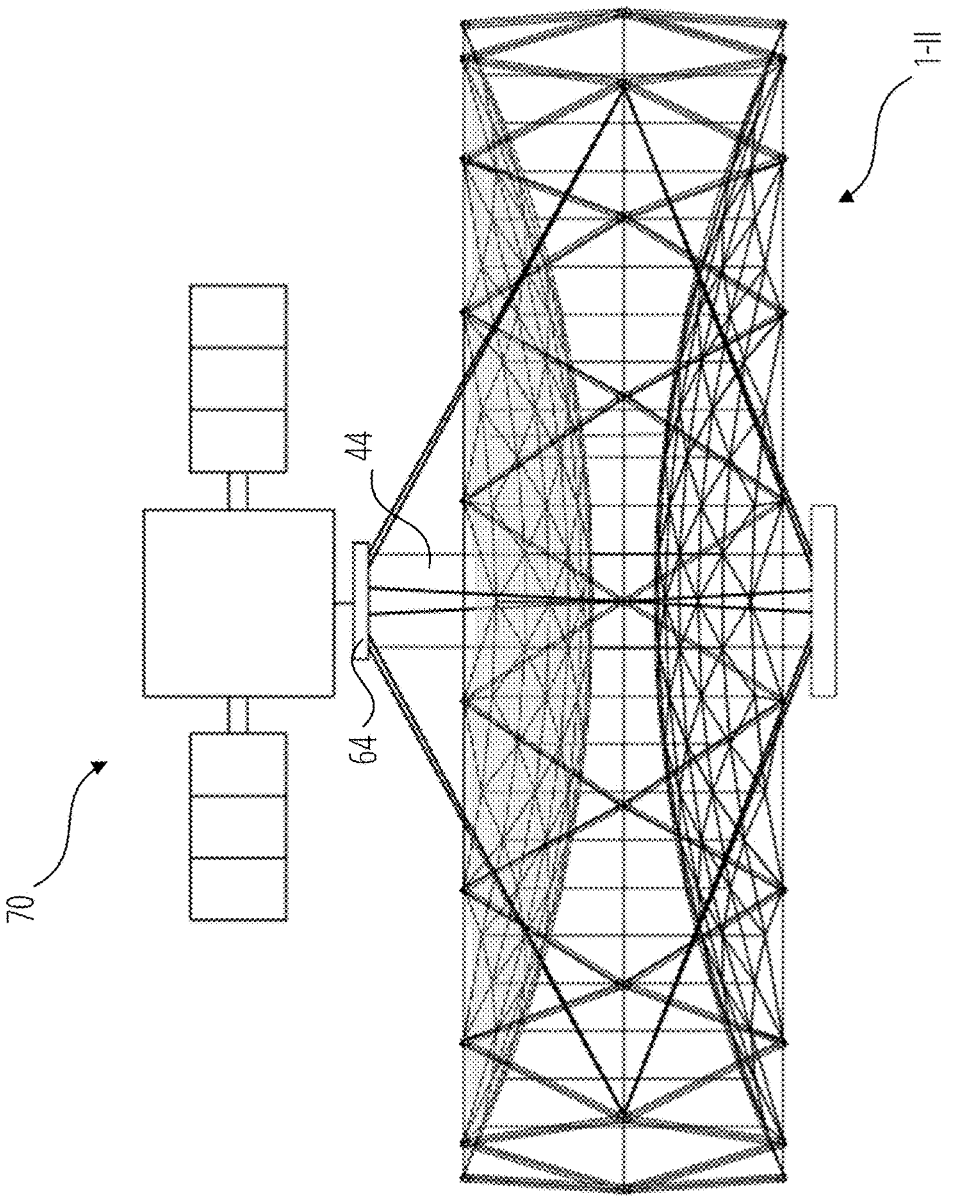

FIG. 102 shows antenna 1 mounted to spacecraft 70 via roof portion 64 of support post 44, according to an example embodiment.

Figure 103:
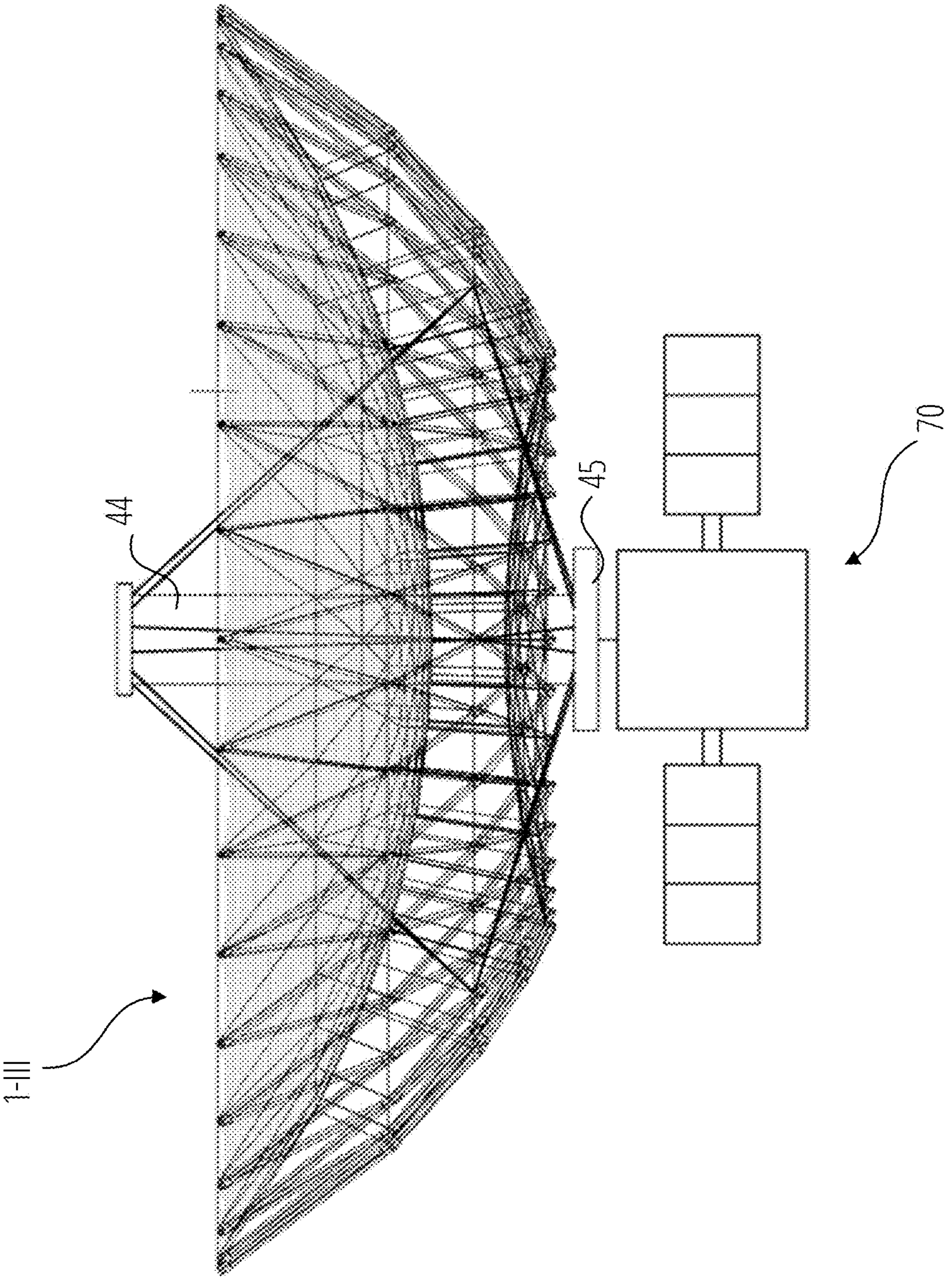

FIG. 103 shows antenna 1 mounted to spacecraft 70 via platform 45 of support post 44, according to an example embodiment.

Figure 104:
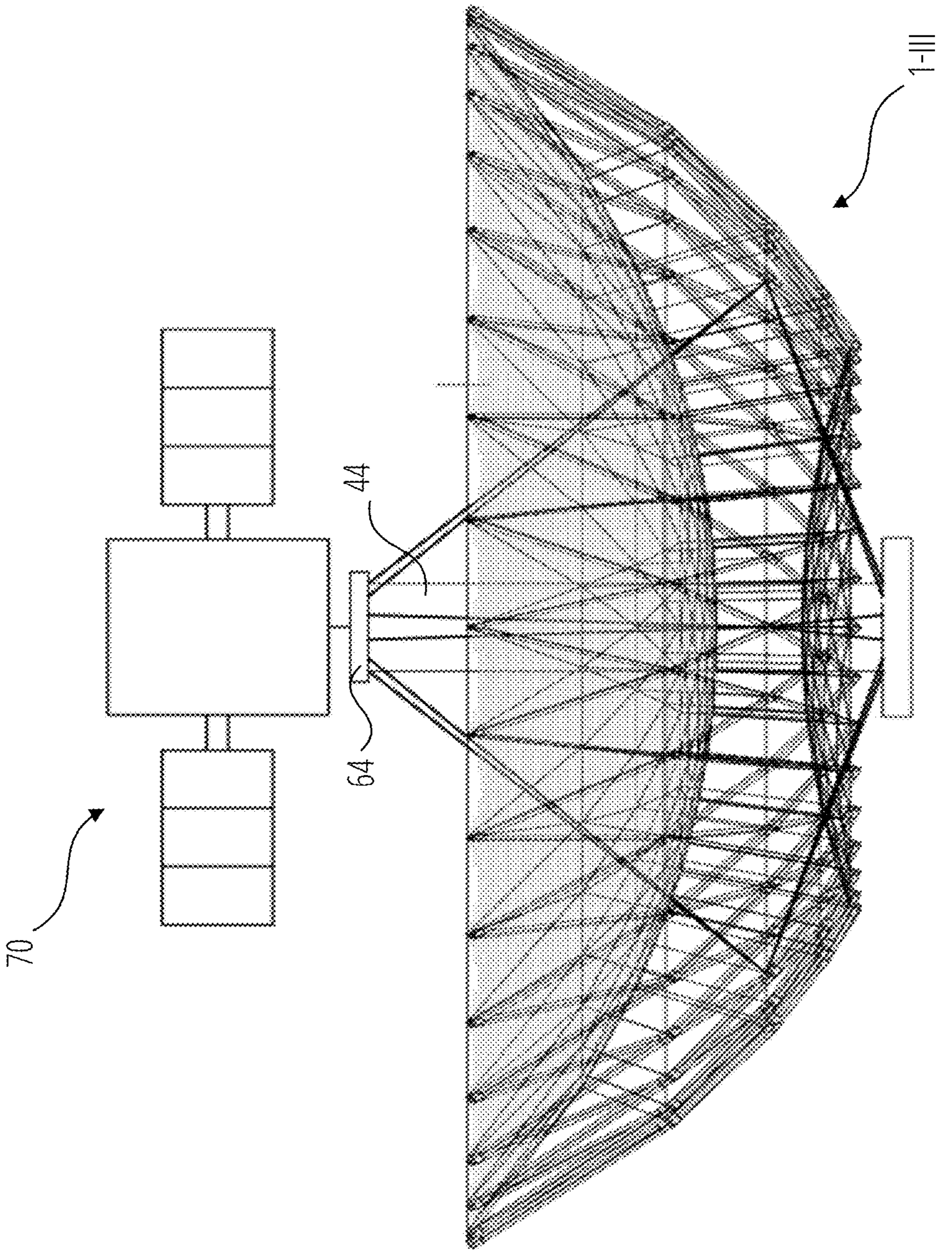

FIG. 104 shows antenna 1 mounted to spacecraft 70 via roof portion 64 of support post 44, according to an example embodiment.

Figure 105:
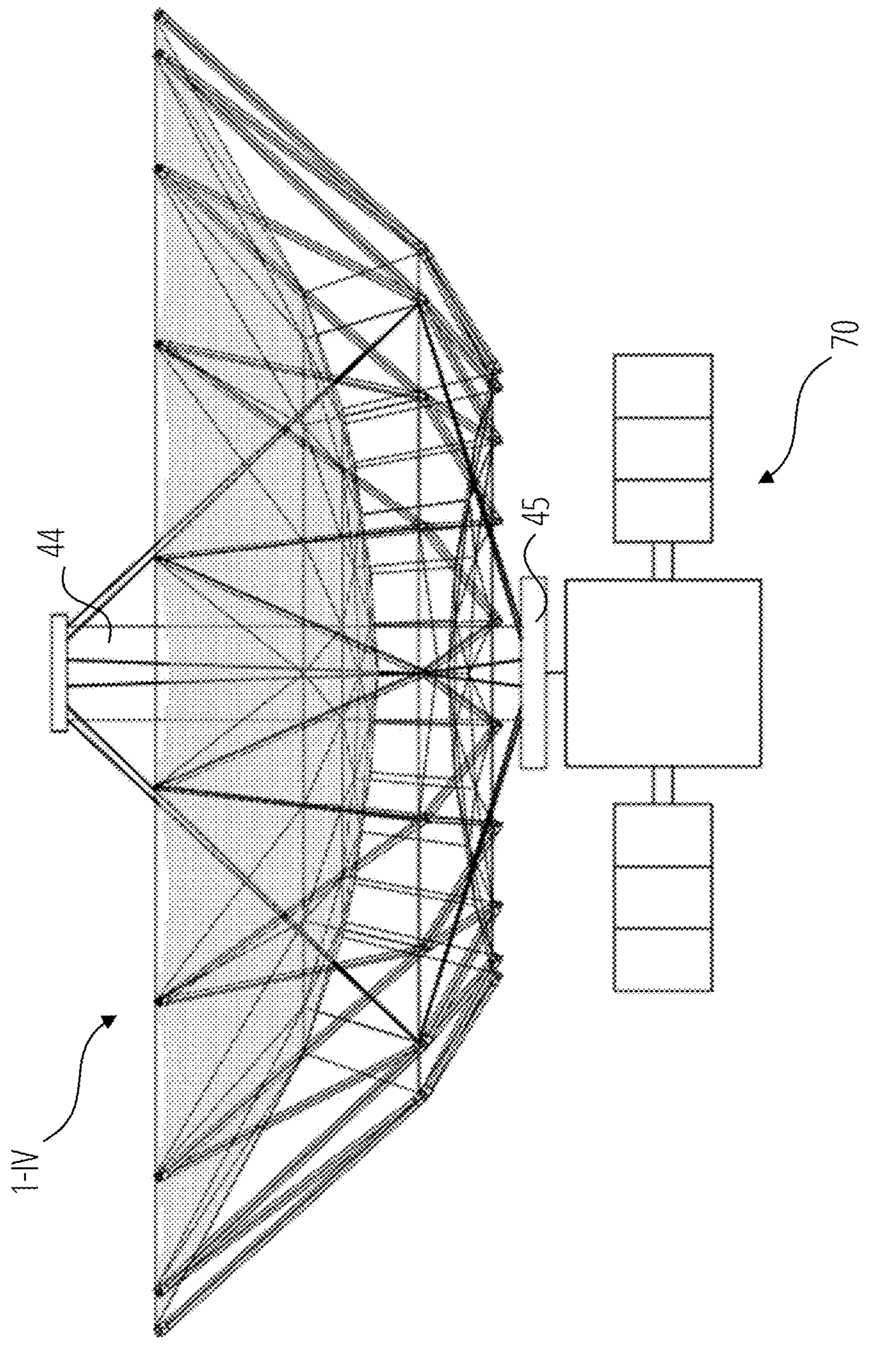

FIG. 105 shows antenna 1 mounted to spacecraft 70 via platform 45 of support post 44, according to an example embodiment.

Figure 106:
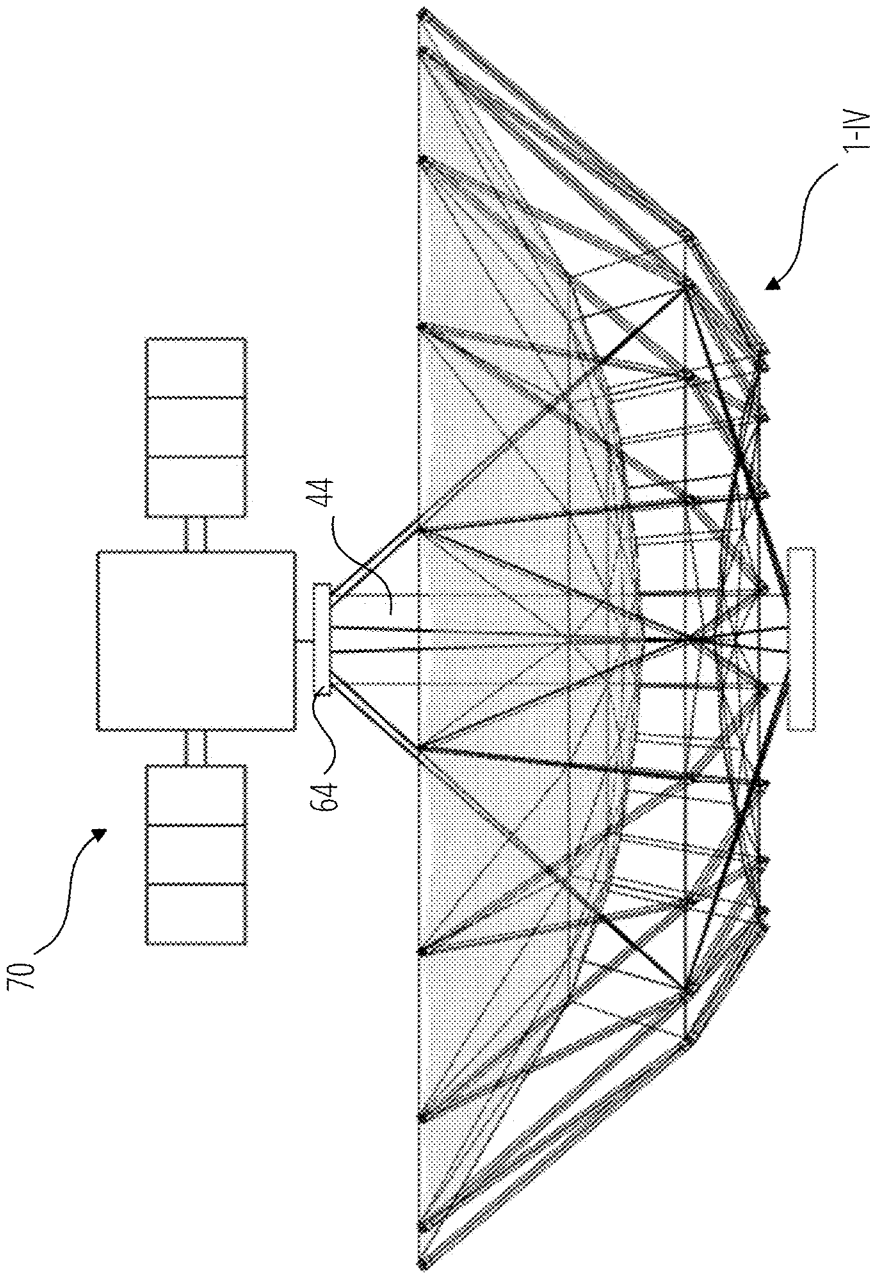

FIG. 106 shows antenna 1 mounted to spacecraft 70 via roof portion 64 of support post 44, according to an example embodiment.

Figure 107:
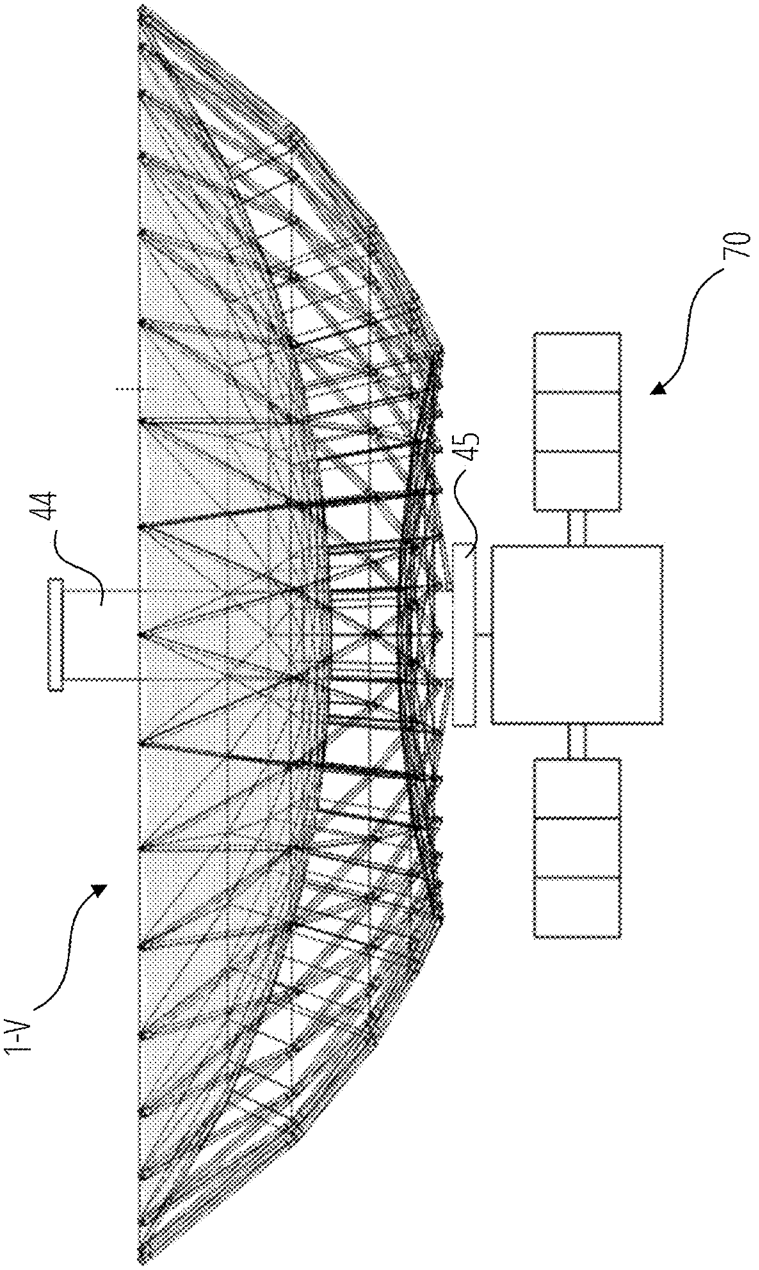

FIG. 107 shows antenna 1 mounted to spacecraft 70 via platform 45 of support post 44, according to an example embodiment.

Figure 108:
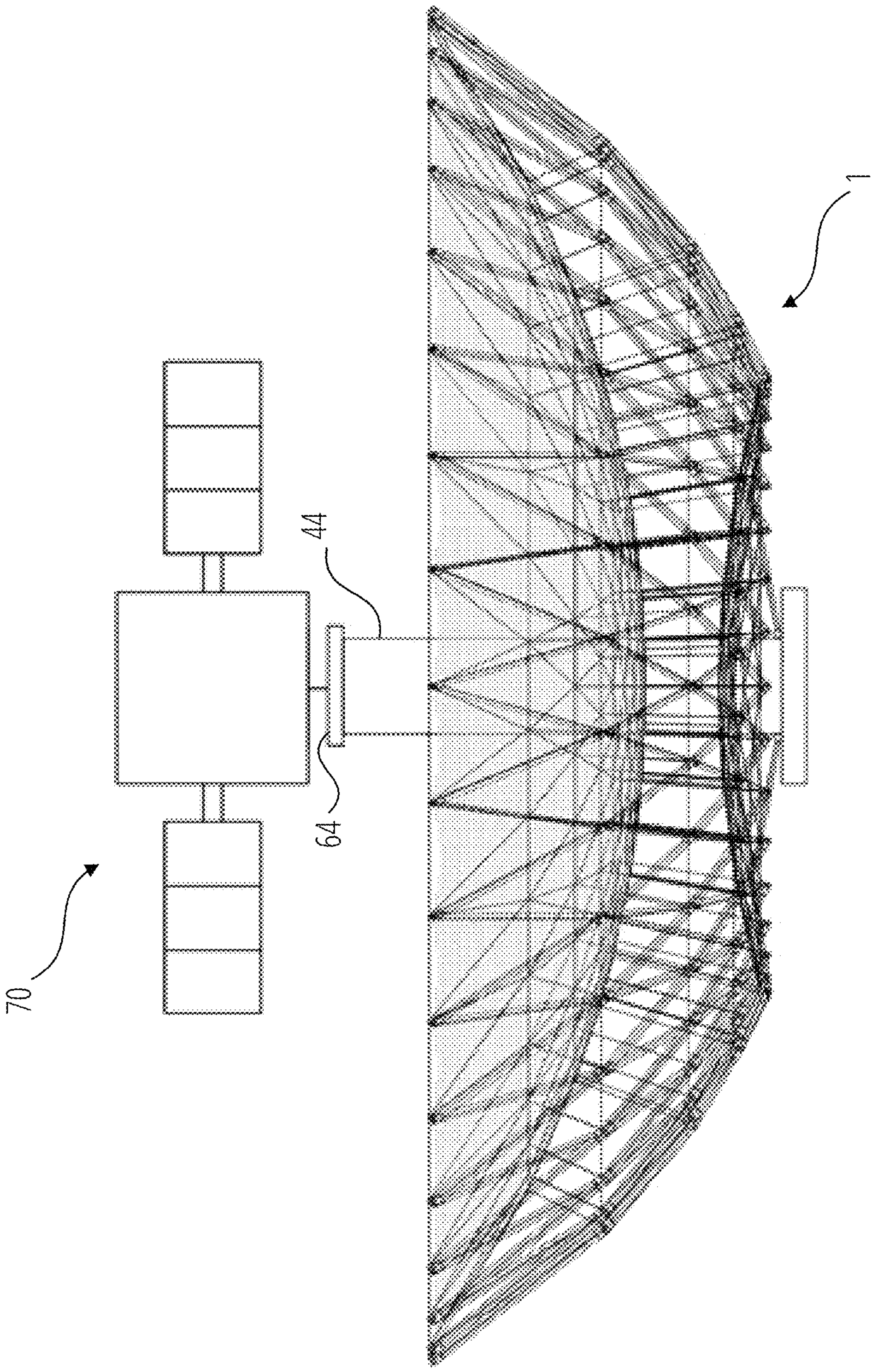

FIG. 108 shows antenna 1 mounted to spacecraft 70 via roof portion 64 of support post 44, according to an example embodiment.

Figure 109:
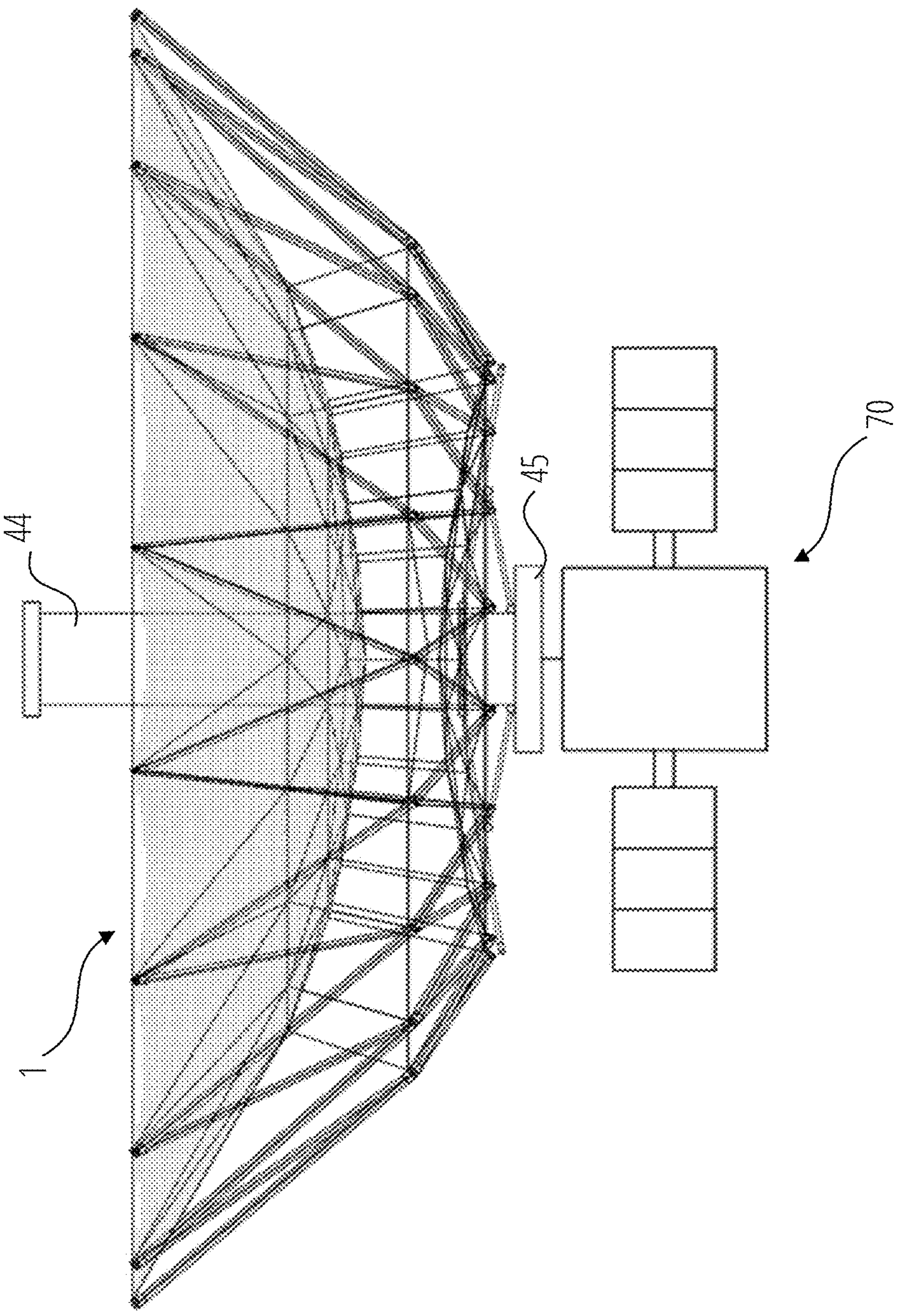

FIG. 109 shows antenna 1 mounted to spacecraft 70 via platform 45 of support post 44.

Figure 110:
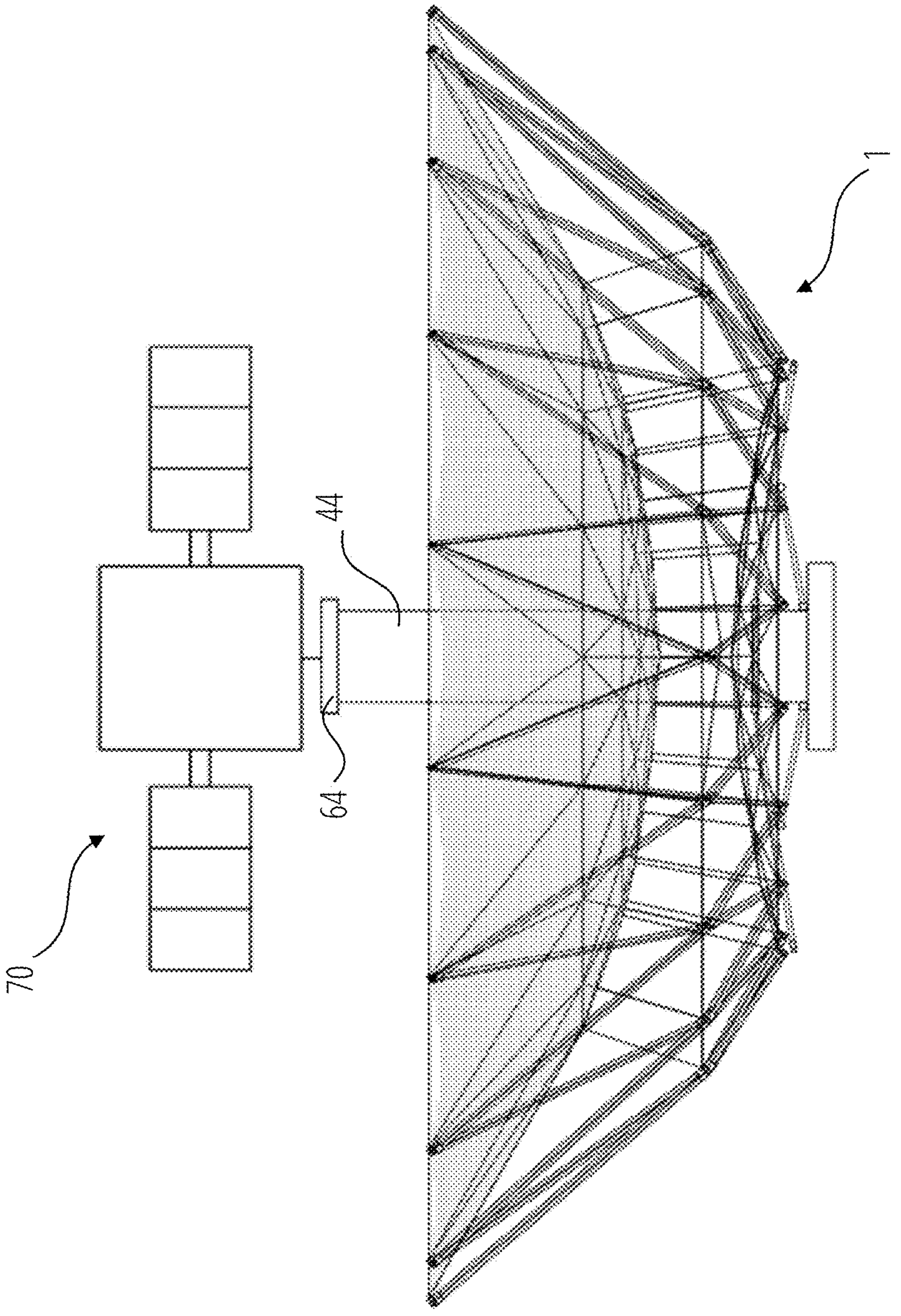

FIG. 110 shows antenna 1 mounted to spacecraft 70 via roof portion 64 of support post 44, according to an example embodiment.

Figure 111:
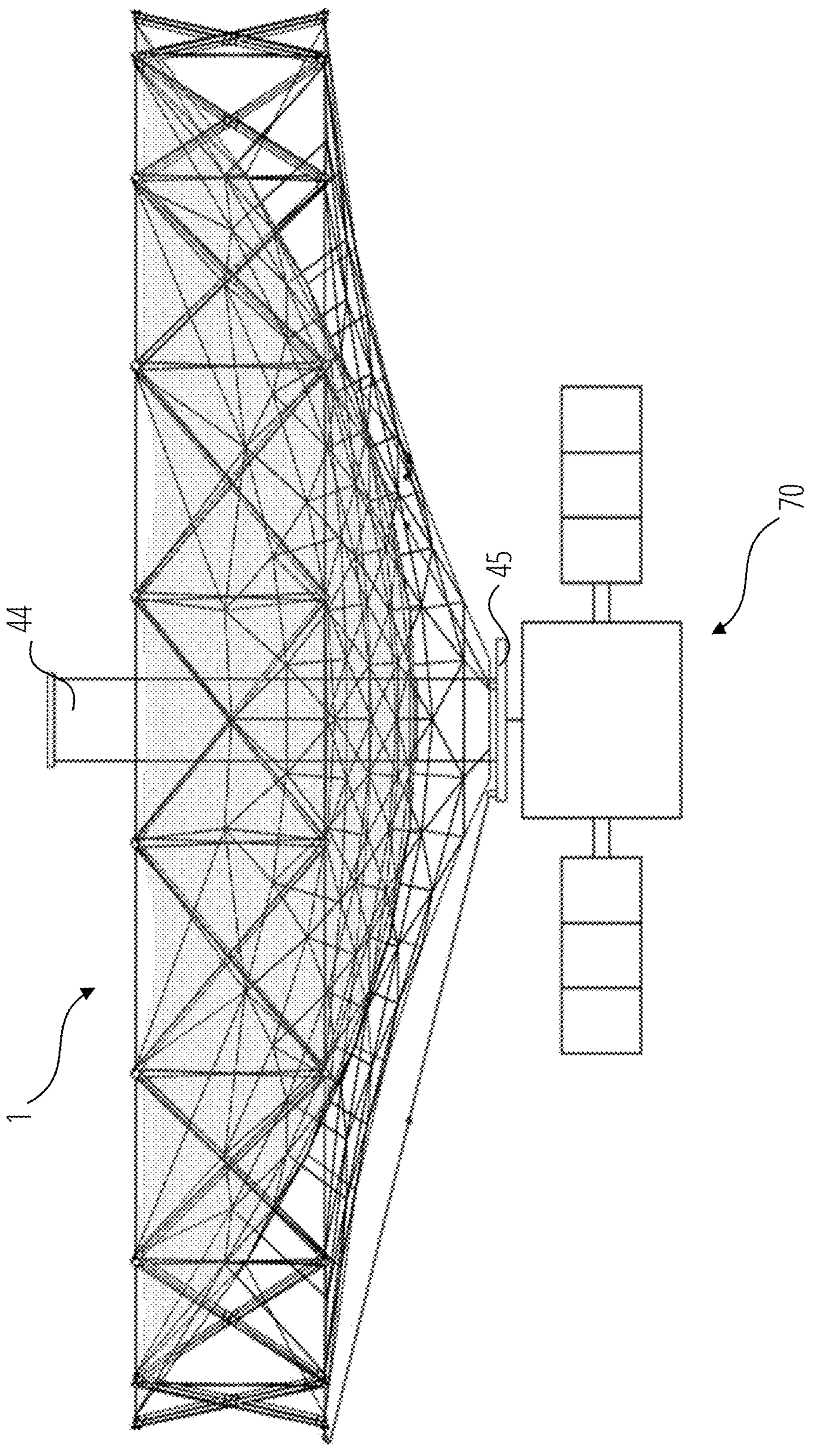

FIG. 111 shows antenna 1 mounted to spacecraft 70 via platform 45 of support post 44, according to an example embodiment.

Figure 112:
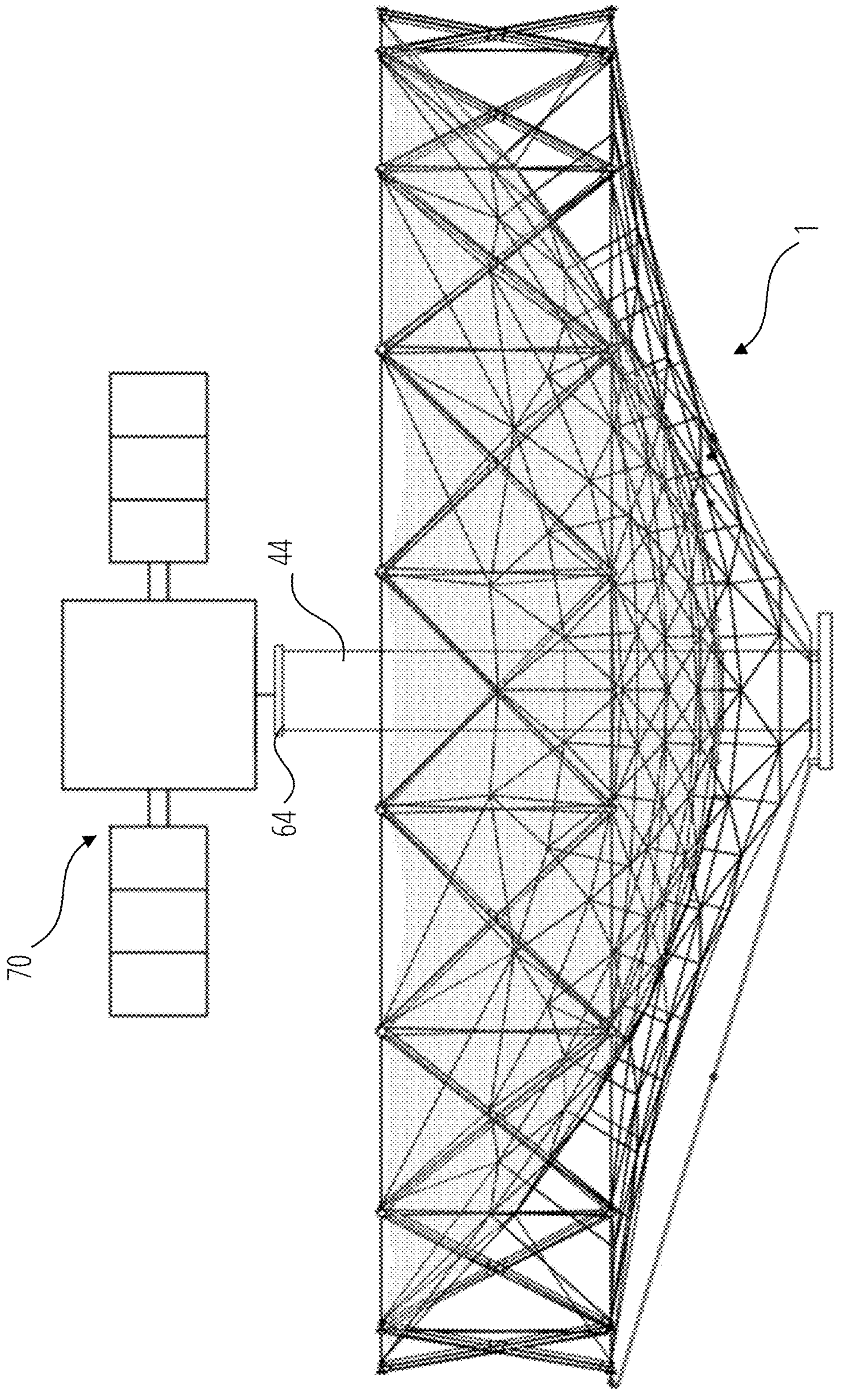

FIG. 112 shows antenna 1 mounted to spacecraft 70 via roof portion 64 of support post 44, according to an example embodiment.

Figure 113:
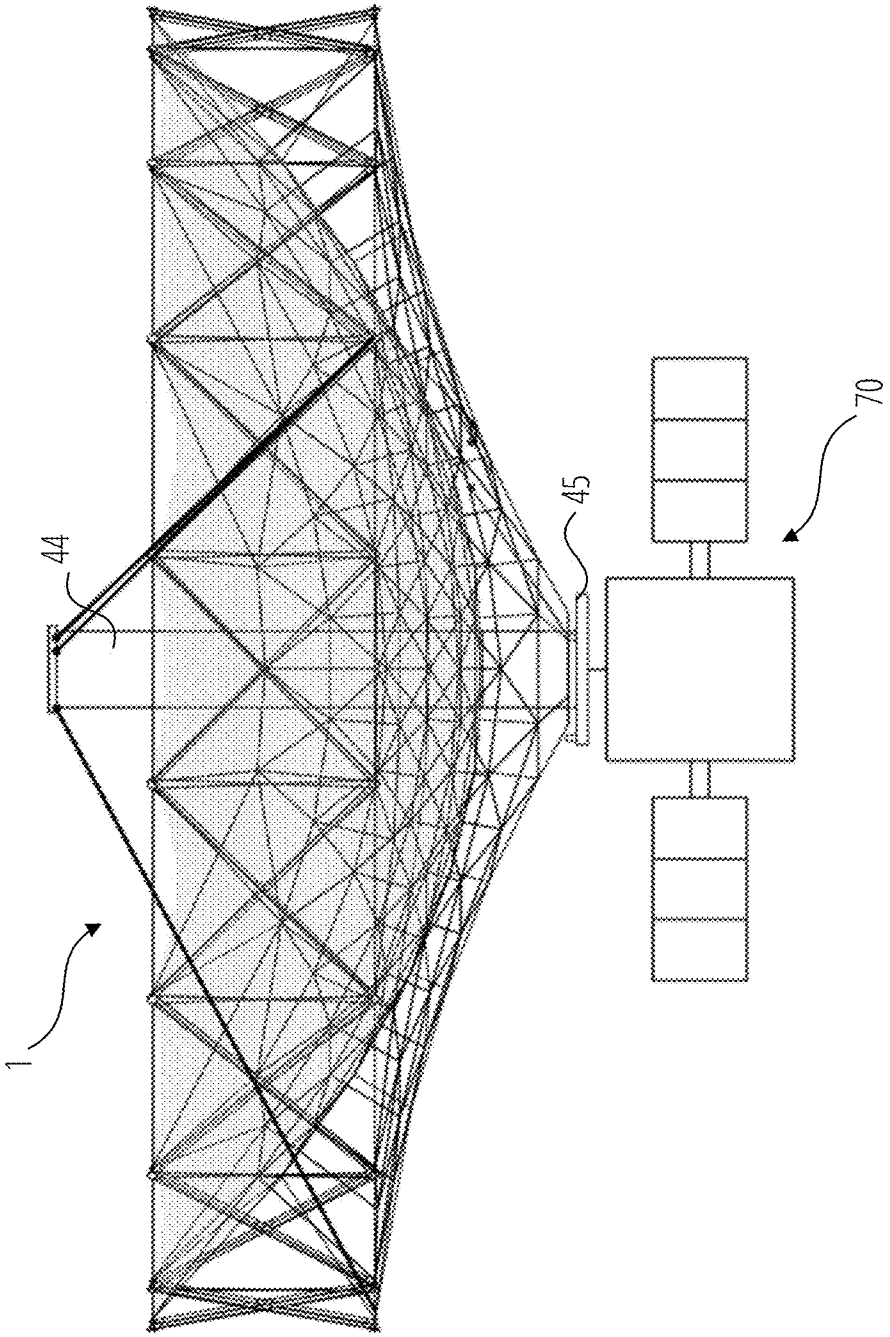

FIG. 113 shows antenna 1 mounted to spacecraft 70 via platform 45 of support post 44, according to an example embodiment.

Figure 114:
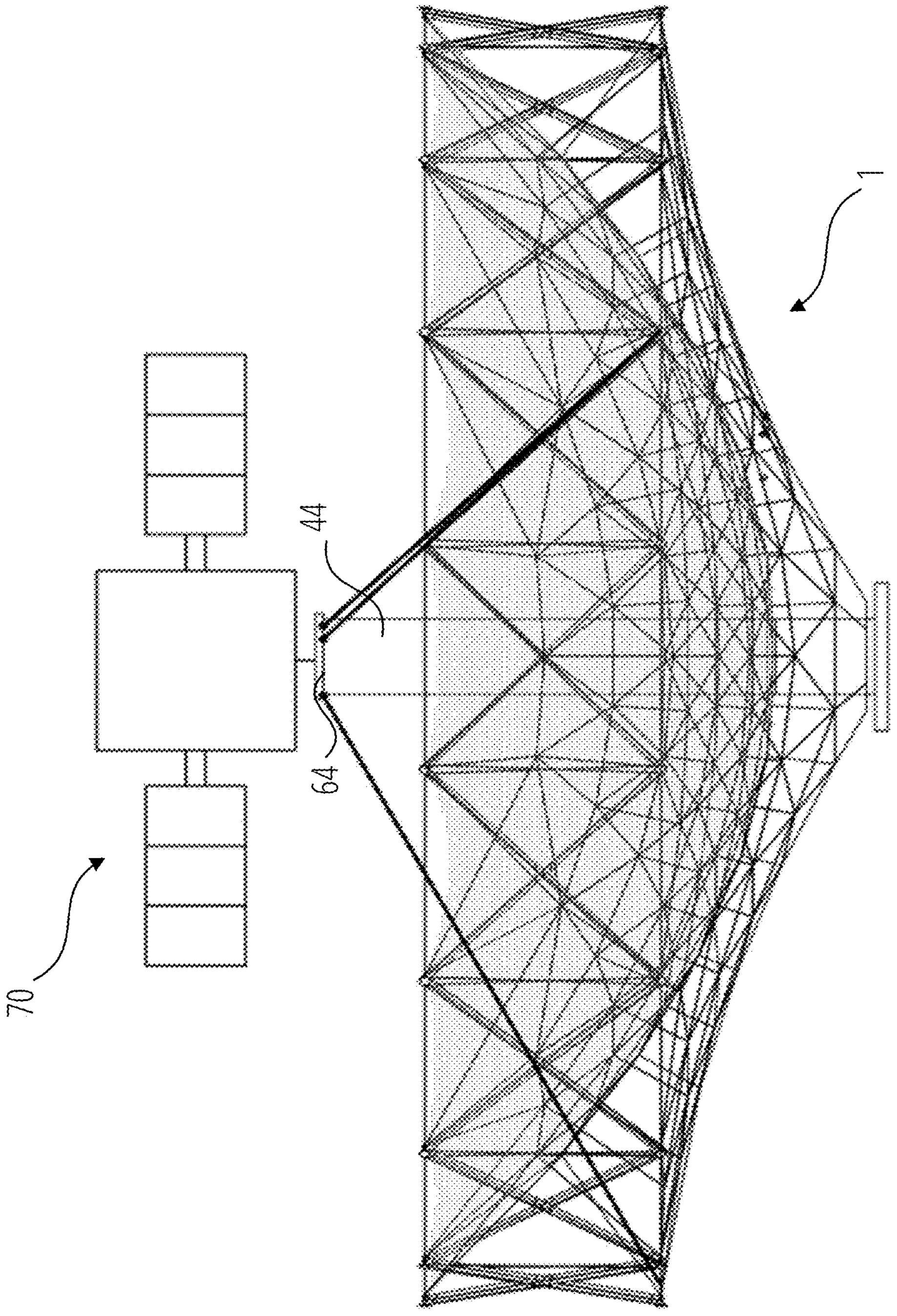

FIG. 114 shows antenna 1 mounted to spacecraft 70 via roof portion 64 of support post 44, according to an example embodiment.

Figure 115:
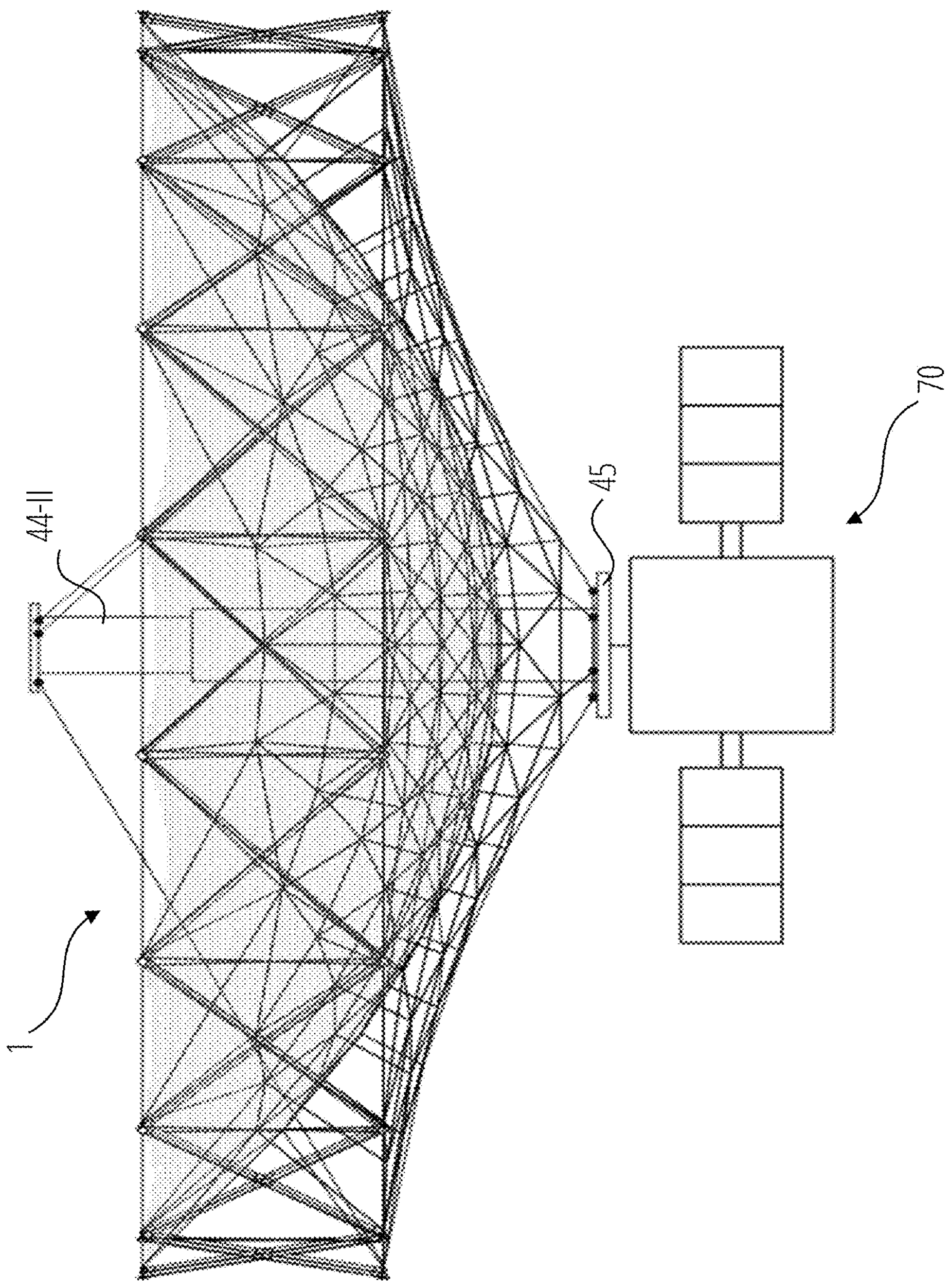

FIG. 115 shows antenna 1 mounted to spacecraft 70 via platform 45 of support post 44, according to an example embodiment.

Figure 116:
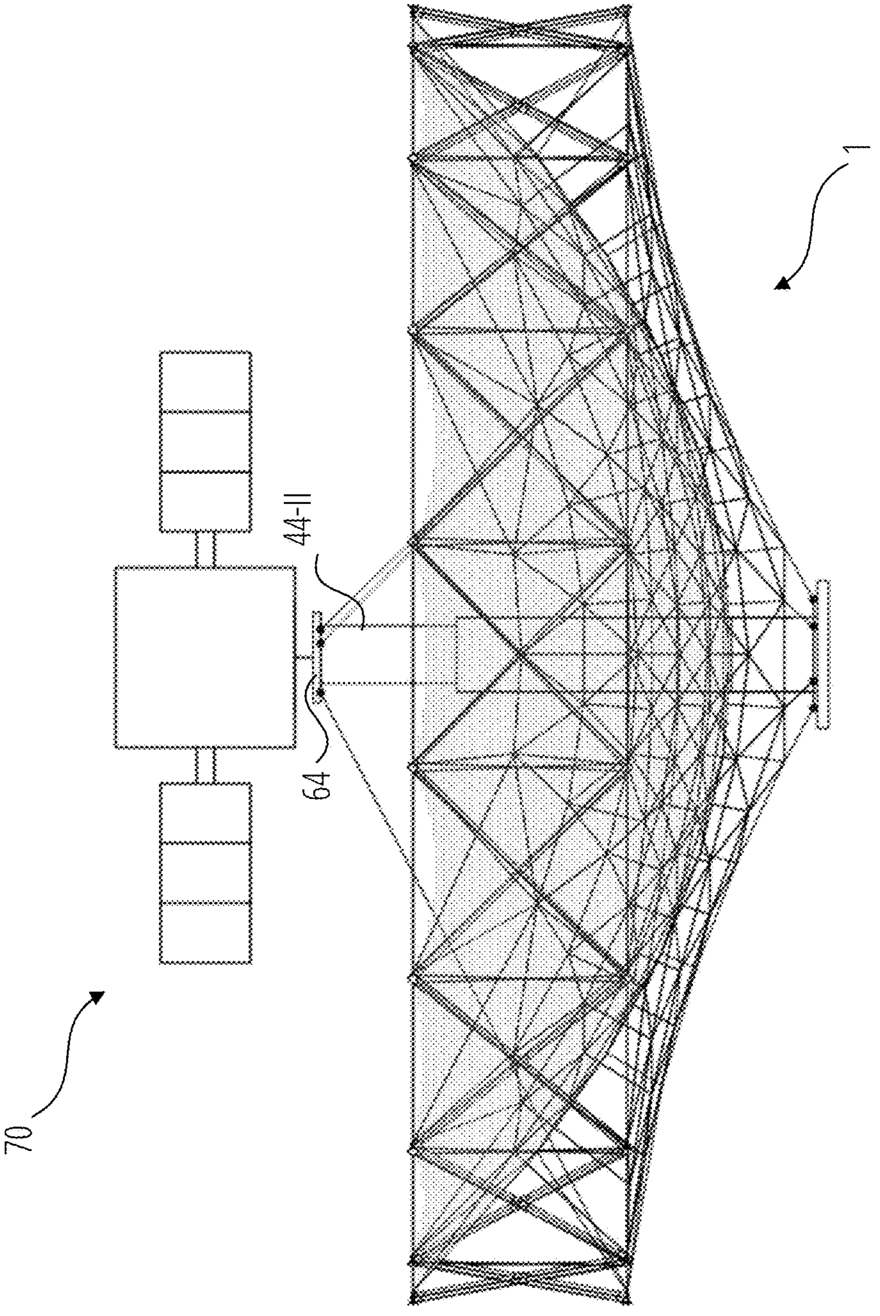

FIG. 116 shows antenna 1 mounted to spacecraft 70 via roof portion 64 of support post 44, according to an example embodiment.

Overall, embodiments of the present disclosure can be organized, but are not limited to, the following groups.

Embodiment Group I

Embodiment Group I describes several configurations of the deployable ring structure that share common pantographic geometry and joint layout. As can been seen from FIG. 1, deployable symmetrical reflector antenna 1 includes a deployable ring 2 and flexible reflector 3.

The structure of the deployable ring 2 (FIG. 2) includes short combined internal combined arms 4 and long combined external combined arms 5. Internal combined arms 4 have a bent profile and are inclined to the right. External combined arms 5 have a bent profile and are inclined to the left.

As shown in FIG. 2, the contact points at the bends "c" and at the ends "a" and "b" of all internal combined arms 4 and external combined arms 5 are positioned along circular tiers. These tiers lie on circles with radius R, which define the contours of spherical belts arranged symmetrically (see FIG. 2, FIG. 3, and FIG. 4) and/or asymmetrically (see FIG. 5 and FIG. 6) relative to the great circle "P" of sphere "O".

With this approach, short internal combined arms 4 and long external combined arms 5 overlap in a crosswise manner, following a Nuremberg scissors configuration. The overlapping of internal combined arms 4 and long external combined arms 5 is formed by use of top cylindrical joints 6, bottom cylindrical joints, and bottom cylindrical joints 7, intermediate cylindrical joints 8 (FIG. 7), top spherical joints 9, bottom spherical joints 10, and/or double intermediate cylindrical joints 11 (FIG. 8). In these joints (FIG. 9, FIG. 10, FIG. 11, FIG. 12, FIG. 13, FIG. 14, FIG. 15, FIG. 16), short internal arms 12 and long external arms 13 are fixed using internal sleeves 14 and external sleeves 15. Sleeves 14 and sleeves 15 are rigidly attached to the corresponding joints.

All joints 6, 7, 8, 9, 10, and/or 11 are positioned at an equal distance R from the center of sphere O (see FIG. 2). The symmetry axes of internal pins 16 of cylindrical joints, short pins 16-I of double intermediate cylindrical joints 11, and rods 9-I of top spherical joints 9, and rods 10-I of bottom spherical joints 10 are directed toward the center of sphere "O" when deployable ring 2 is in the deployed state (see FIG. 2).

Along each tier, adjacent joints, such as bottom cylindrical joints 7, top cylindrical joints 6, bottom spherical joints 10, top spherical joints 9, intermediate cylindrical joints 8, and/or double intermediate cylindrical joints 11 are interconnected by tension cables 17. Tension cable 17 is secured at one end to intern internal pins 16 of cylindrical joints 6, 7, 8 and/or to short pins 16-I of double intermediate cylindrical joints 11, and to rods 9-I and rods 10-I. The other end of tension cable 17 is attached to a ball 19 located inside outer housing 20 of top spherical joints 9 and bottom spherical joints 10.

Two or more separate enlarged pantographic systems 21 (FIG. 17 and FIG. 18) of deployable ring 2, having the same curvature during deployment and folding, are interconnected by spherical joints 9 and 10 (FIG. 19; FIG. 20; FIG. 21; FIG. 22).

When deployable ring 2 is fully deployed and tension cables 17 are tightened (see FIG. 22), the symmetry axes of short pins 16-I of separated intermediate double intermediate cylindrical joint 11, if present, lie along a single straight line (see FIG. 15 and FIG. 16).

deployable ring 2 is deployed by torsion springs 22 (see FIG. 9; FIG. 10; FIG. 11; and FIG. 12). One end 23 of each torsion springs 22 is fixed to an outer projection of edge 24, and the other end 23-I is attached to external sleeve 15. Internal pin 16 is rigidly clamped in inner socket 25 of the cylindrical joints 6, 7, or 8 and pivotally clamped in outer socket 26 of the cylindrical joints 8 (see FIG. 23 and FIG. 24).

Thus, deployable ring 2, based on the described geometry (see FIG. 3; FIG. 4; FIG. 5) and construction (see FIG. 7 to FIG. 24), may include configurations 2-I, 2-II, 2-III, and 2-IV (FIG. 25, FIG. 26, FIG. 27, and FIG. 28). These configurations share identical folding and deployment schemes, including the folded package of deployable ring 2, an intermediate deployment stage, and the fully deployed state of deployable ring 2. Configurations 2-I, 2-II, 2-III, and 2-IV of deployable ring 2 define corresponding configurations 1-I, 1-II, 1-III, and 1-IV of deployable symmetrical reflector antenna 1.

Deployable symmetrical reflector antenna 1 also includes a flexible reflector 3 (see FIG. 1 and FIG. 29). The flexible reflector 3 includes an upper concave mesh 28 in the form of a surface with double positive curvature (FIG. 30). Upper concave mesh 28 is formed by triangularly intersecting flexible rods 29. Intersections create intermediate nodes 30, edge nodes 32-1, and peripheral nodes 32 of the upper concave mesh 28. The peripheral nodes 32 are attached using holders 33 (see FIG. 9) to edge 34 of internal pin 16 of top cylindrical joints 6 and to the ends of rod 9-II (see FIG. 13) of the inner housing of top spherical joints 9.

Flexible reflector 3 also includes a lower convex mesh 35 in the form of a surface with double positive curvature (see FIG. 30). Lower convex mesh 35 has a peripheral length equal to or smaller than that of upper concave mesh 28 (FIG. 31 and FIG. 32).

Lower convex mesh 35 includes triangularly intersecting flexible rods 36. Intersections of flexible rods 36 form intermediate nodes 37 and peripheral nodes 38 of lower convex mesh 35. The peripheral nodes 38 are attached using holders 39 (see FIG. 14) to edge 40 of internal pin 16 of bottom cylindrical joints 7 (see FIG. 10) and to the ends of rod 10-II via holders 39 mounted on the inner housing of bottom spherical joints 10 (see FIG. 14).

Flexible rods 41 are fixed at one end to intermediate nodes 30 of upper concave mesh 28, and at the other end to the nearest intermediate nodes 37 of lower convex mesh 35. Some flexible rods 41 are also fixed at their other ends to corresponding nearby holders 33-I mounted on edge 34 of internal pin 16 of intermediate cylindrical joints 8 of deployable ring 2 (FIG. 12), to holders 39 mounted on edge 40 of internal pin 16 of bottom cylindrical joints 7 (see FIG. 10), and/or to holders 42 mounted on the inner edge 16-II of short pin 16-I of nearby double intermediate cylindrical joint 11, of deployable ring 2, and to edge of rod 10-II on the inner housing of bottom spherical joints 10 via holder 39 (see FIG. 14, FIG. 15, and FIG. 16).

Thus, tensioned screen 43, forming an approximating surface, is secured to intermediate nodes 30 and peripheral nodes 32 of upper concave mesh 28, creating the completed appearance of deployable symmetrical reflector antenna 1 (in configurations 1-I, 1-II, 1-III, 1-IV), shown in FIG. 33 through FIG. 45.

Embodiment Group II

In some embodiments, deployable symmetrical reflector antenna 1 (described under Embodiment Group I) may include a support post 44 (also referred to as a central emitter support), rigidly fixed at one end to platform 45. At the intersections of upper concave mesh 28, tensioned screen 43, and lower convex mesh 35, intersecting flexible rods 29 of upper concave mesh 28 and intersecting flexible rods 36 of lower convex mesh 35 form first hexagonal opening 46 (an upper hexagon) and second hexagonal opening 47 (a lower hexagon). Within the upper hexagon, a cutout is formed in tensioned screen 43, collectively defining an opening for accommodating support post 44 (FIG. 46; FIG. 47).

Additionally, three bottom cylindrical joints 7 of deployable ring 2 are symmetrically fitted with additional cylindrical joints 48 to extended edge 40 using bracket 31. Each additional cylindrical joint 48 includes an arm 49, which is secured at its opposite end to a movable cylindrical joint 50 mounted on a slider 51 of support post 44 (FIG. 48, FIG. 49, FIG. 50, FIG. 51, and FIG. 52).

In the middle section of arm 49, over-arm cylindrical joints 52 are arranged. These joints 52 are connected to additional arms 53, which are fixed at their opposite ends to fixed cylindrical joints 54 on platform 45, located at rigid attachment points 44-1 of central emitter support post 44 (FIG. 54). Arm 49, over-arm cylindrical joint 52, additional arm 53, and fixed cylindrical joint 54 on platform 45 are positioned in the same plane.

Embodiment Group III

In some embodiments, deployable symmetrical reflector antenna 1 (described under Embodiment Group I) may include deployable ring 2, where combined short internal combined arms 4-I and combined long external combined arms 5-I have a straight-line form. Through crosswise overlapping, these arms form a single row of intermediate cylindrical joints 8 with straight internal sleeves 14-I and straight external sleeves 15-I (FIG. 53, FIG. 54, and FIG. 55).

In the deployed state of deployable ring 2, symmetry axes "O1-O1" top cylindrical joints 6 and bottom cylindrical joints 7 are perpendicular to intersection lines "K-K" of adjacent planes "M" and "N". These planes "M" and "N" correspond to edge 34 and edge 40 on adjacent straight overlapping short internal combined arms 4-I and long external combined arms 5-I (FIG. 56, FIG. 57, FIG. 58, and FIG. 59).

Enlarged pantographic systems 21 with straight internal combined arms 4-I and external combined arms 5-I, in the deployed state (FIG. 60), define a curvature with maximum radius $R_{max}$. During folding, the curvature radius gradually decreases (FIG. 61, FIG. 62). When pantographic systems 21 are connected by top spherical joints 9 and bottom spherical joints 10 (FIG. 63, FIG. 64), they form deployable ring 2 (in configuration 2-V). When joined with flexible reflector 3, the deployable ring 2 forms a deployable symmetrical reflector antenna 1 (FIG. 66, FIG. 67, and FIG. 68).

Embodiment Group IV

In some embodiments, deployable symmetrical reflector antenna 1 (under Embodiment Group III) includes a tension cable 56 arranged using node-mounted holders 55 with springs 55-I. Tension cable 56 is fixed to external sleeve 15 at bottom spherical joint 10. From there, tension cable 56 is directed to the nearest top spherical joint 9, where it wraps around a roller 57 mounted on a rigidly attached pin 58 located on the outer housing 20 of top spherical joint 9 (FIG. 69). From that point, tension cable 56 is routed along straight long external combined arm 5-I to bottom cylindrical joint 7 (FIG. 70), where it wraps around a roller 57 mounted on edge 24 of a pin of fixed cylindrical joint 54 mounted on platform 45. Tension cable 56 then continues to the nearest top cylindrical joint 6 (FIG. 71), where it again wraps around a roller 57 mounted on an edge 24 of pin of top cylindrical joint 6. This routing continues in the same pattern around deployable ring 2 until tension cable 56 reaches external sleeve 15 of spherical joint 10 (FIG. 72), where it winds onto a drum 59 of motor 60, mounted on external sleeve 15 of bottom spherical joint 10. Using an identically placed holder 55 on external sleeve 15 of bottom spherical joint 10, tension cable 56 begins a new routing cycle, allowing cable coverage to extend over all deployable ring 2 (FIG. 73).

Embodiment Group V

In some embodiments, deployable symmetrical reflector antenna 1 according to Embodiment Groups II, III, and IV may include a convex lower single-sheet hyperbolic mesh 62. Together with upper concave mesh 28 and flexible tensioned flexible rods 41, lower single-sheet hyperbolic mesh 62 forms a flexible reflector 3 (3-I). As shown in FIG. 74, peripheral nodes 61 of lower single-sheet hyperbolic mesh 62, which defines a surface with both negative and positive curvature, are attached using holders 39 to edges 40 of internal pins 16 of bottom cylindrical joint 7 (see FIG. 57) and to the edges of rods 10-II of bottom spherical joints 10. Nodes of second hexagonal opening 47 (lower central hexagon), formed by intersecting flexible rods 36 of lower single-sheet hyperbolic mesh 62, are fixed at platform 45 (FIG. 74, FIG. 79). To hold deployable ring 2 (in configuration 2-V) symmetrically, a pair of guy cables 63 (FIG. 75)—is secured at bottom cylindrical joints 7 using holders 39. The opposite ends of cables 63 are also symmetrically attached above roof portion 64 of emitter support post 44 (FIG. 76).

With this structure, deployable symmetrical reflector antenna 1 folds (FIG. 78) and deploys step-by-step (FIG. 79), reaching its final deployed configuration (FIG. 80).

Embodiment Group V-1

In some embodiments, deployable symmetrical reflector antenna 1 according to Embodiment Group V may include a telescopic emitter support post 44-II (FIG. 80, FIG. 81) instead of a fixed one. After deployable ring 2 (in configuration 2-V) is fully unfolded (FIG. 80, FIG. 81), telescopic support post 44-II extends to its full length. As a result, using the passive structural form of deployable ring 2 (2-V), a final pre-tensioned shape is established for both flexible reflector 3 (FIG. 80, FIG. 82) and deployable symmetrical reflector antenna 1 (FIG. 80).

It should be noted that in conventional deployable space reflectors, the deployable ring typically serves as a load-bearing structural element that defines the overall shape of the reflector. This "force-driven deployment" requires significant energy input because the ring not only forms the shape of the central flexible surface but also creates substantial internal tension during deployment. This approach leads to large structural loads, higher energy consumption, and the need for increased cross-sections in ring elements, making the design less efficient.

The present disclosure introduces the concept of "non-force-driven deployment" of the ring—an approach not previously implemented in practice. In the present disclosure, the approach is successfully realized: the ring deploys passively, and the final tension and form of the central flexible portion (flexible reflector 3) are achieved by extending a telescopic emitter support post 44-II. The concept of non-force-driven deployment of the ring, as a new method, applies not only to ring 2 disclosed herein, but also to all other existing deployable rings of reflector antennas.

Embodiment Group VI

In some embodiments, deployable symmetrical reflector antenna 1 (as described in Embodiment Group V) includes a foldable support arm 65 mounted in fixed cylindrical joints 54 mounted on platform 45. Foldable support arm 65 folds via paired cylindrical folding joints 66 located at its midpoint. At the opposite end of foldable support arm 65, two support hooks 67 are provided. Ends of support hooks 67 engage a support rod 69 using cylindrical support joints 68. Support rod 69 is oriented perpendicularly and rigidly attached to an extended projection of a pin beyond roller 57 at bottom cylindrical joint 7 (FIG. 81 to FIG. 86). This structure enables step-by-step deployment of deployable symmetrical reflector antenna 1 as shown in FIG. 87 to FIG. 94.

Embodiment Group VII

In some embodiments, deployable symmetrical reflector antenna 1 (as described in either of Embodiment Groups I, II, III, V, and V-1) includes, in deployable ring 2, a set of cables 63 mounted symmetrically to the ring at intermediate cylindrical joints 8. Holders 33-I are placed at the inner edges 34 of pins of intermediate cylindrical joints 8. Two of the cables 63 are individually attached at their opposite ends to roof portion 64 emitter support post 44 by holder 64-I. Another two cables 63-I are attached at their opposite ends to emitter platform 45 by holder 64-III. This structure forms a deployable symmetrical reflector antenna 1 as shown in FIG. 95, FIG. 96, FIG. 97, and FIG. 98. The deployable symmetrical reflector antenna 1 may be mounted to spacecraft 70 either via platform 45 (as shown in FIG. 99, FIG. 100, FIG. 101, FIG. 102) or via roof portion 64 of emitter support post 44 (as shown in FIG. 103, FIG. 104, FIG. 105, FIG. 106). It is worth noting that in this configuration, the spatial arrangement of cables 63 and cables 63-I, and emitter support post 44, and/or telescopic emitter support post 44-II ensures structural geometric stability.

Additionally, securing cables 63 and cables 63-I to intermediate cylindrical joints 8 of deployable ring 2, unlike in conventional rings, does not introduce significant bending moments into the ring elements—specifically, internal combined arms 4 and external combined arms 5. This results from the bent profile of these arms, which induces primarily compressive forces at the locations where bending moments would otherwise occur.

Embodiment Group VIII

In some embodiments, deployable symmetrical reflector antenna 1 (as described under Embodiment Group VII) includes platform 45 mounted to spacecraft 70. The entire system becomes a space-based radio engineering complex built on the basis of the deployable symmetrical reflector antenna 1 (FIG. 99, FIG. 101, FIG. 103, FIG. 105, FIG. 116, FIG. 109, FIG. 111, FIG. 113, and FIG. 115).

Embodiment Group IX

In some embodiments, deployable symmetrical reflector antenna 1 (as described under Embodiment Group VIII) includes spacecraft 70 mounted on roof portion 64 of emitter support post 44. The entire system becomes a space-based radio engineering complex built on the basis of the deployable symmetrical reflector antenna 1 (FIG. 100, FIG. 102, FIG. 104, FIG. 106, FIG. 108, FIG. 110, FIG. 112, FIG. 114, FIG. 116).

Figure 117:
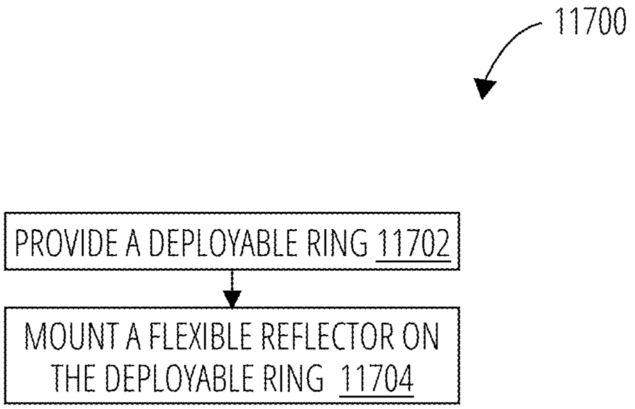
FIG. 117 illustrates a method for manufacturing a deployable symmetrical reflector antenna in accordance with one embodiment.

FIG. 117 illustrates a method for manufacturing a deployable symmetrical reflector antenna in accordance with example embodiments. In other example embodiments, method 11700 may also include additional or fewer operations than those illustrated.

In block 11702, method 11700 includes providing a deployable ring. The deployable ring includes a plurality of internal combined arms and a plurality of external combined arms. A plurality of joints is arranged circumferentially in a predetermined number of tiers extending from the bottom of the deployable ring to the top. At least one joint from the plurality of joints connects, in a scissor linkage configuration, at least one internal arm of the plurality of internal combined arms with at least one external arm of the plurality of external combined arms. The deployable ring also includes a plurality of torsion springs configured to bias the deployable ring toward an open position. At least one torsion spring of the plurality of torsion springs is coupled to one or more joints of the plurality of joints. In addition, a plurality of tension cables is provided. Each tension cable of the plurality of tension cables connects a first joint and a second joint of the plurality of joints that are positioned within a same tier of the predetermined number of tiers.

In block 11704, method 11700 includes mounting a flexible reflector on the deployable ring. The flexible reflector includes an upper concave mesh secured to the top of the deployable ring. The upper concave mesh includes a plurality of first flexible rods and a plurality of first nodes. A lower convex mesh is secured to the bottom of the deployable ring. The lower convex mesh includes a plurality of second flexible rods and a plurality of second nodes. The flexible reflector further includes a plurality of third flexible rods. Each third flexible rod of the plurality of third flexible rods connects a second node of the plurality of second nodes to a first node of the plurality of first nodes.

In certain embodiments, when the deployable ring is opened, the plurality of joints are positioned equidistant from a common center point, thereby conforming to a spherical geometry. This configuration ensures that the deployable symmetrical reflector antenna maintains a consistent spatial arrangement during deployment, with the plurality of joints aligned on a surface that approximates a spherical shape.

In some embodiments, the plurality of joints includes a double cylindrical joint that includes an internal pin, a first external pin having a first axis of symmetry, and a second external pin having a second axis of symmetry. The double cylindrical joint further includes a first sleeve configured to retain the at least one internal arm, and a second sleeve configured to retain the at least one external arm. The tension cable is secured to the internal pin. The torsion spring is wound around the first external pin and secured to the first sleeve. When the deployable ring is deployed, the first axis of symmetry and the second axis of symmetry are colinear.

In certain embodiments, the deployable symmetrical reflector antenna further comprises a support post and a slider movable along the support post. A plurality of first joints is fixed to the support post, and a plurality of second joints is fixed to the slider. The antenna also includes a plurality of intermediate joints and a plurality of further arms including a first arm, a second arm, and a third arm. The upper concave mesh defines a first hexagonal opening through which the support post passes. The lower convex mesh includes a second hexagonal opening through which the support post also passes. The first arm connects an intermediate joint of the plurality of intermediate joints to a bottom joint of the plurality of joints, the bottom joint being located at a lower portion of the deployable ring. The second arm connects the intermediate joint to one of the plurality of first joints, and the third arm connects the intermediate joint to one of the plurality of second joints.

In the deployable symmetrical reflector antenna, a top cylindrical joint of the first row of top cylindrical joints defines a first axis of symmetry, and a bottom cylindrical joint of the third row of bottom cylindrical joints defines a second axis of symmetry. When the deployable ring is deployed, the first axis of symmetry and the second axis of symmetry are orthogonal to a line defined by an intersection of a first plane and a second plane. The first plane is defined by a first edge of a first pin of a first top cylindrical joint adjacent to the top cylindrical joint in the first row, and a second edge of a second pin of a first bottom cylindrical joint adjacent to the bottom cylindrical joint in the third row. The second plane is defined by a second edge of a second pin of a second top cylindrical joint adjacent to the top cylindrical joint in the first row, and a second edge of a second pin of a second bottom cylindrical joint adjacent to the bottom cylindrical joint in the third row.

The deployable symmetrical reflector antenna may also include an electric motor coupled to the bottom spherical joint, and a drum driven by the electric motor. A plurality of rollers is also provided, with at least one of the plurality of rollers mounted on an external surface of one of the following: the top cylindrical joint of the first row of top cylindrical joints; the bottom cylindrical joint of the third row of bottom cylindrical joints; or the top spherical joint. A further tension cable is secured to the bottom spherical joint and routed over the drum and the plurality of rollers. The plurality of rollers includes a first roller, a second roller, and a third roller. The second roller is positioned at the bottom of the deployable ring, while the first roller and the third roller are positioned at the top of the deployable ring, with the third roller located adjacent to the first roller. The further tension cable is routed from the first roller to the second roller and from the second roller to the third roller.

The deployable symmetrical reflector antenna may also include a plurality of fixed cylindrical joints mounted to the support post, and a plurality of paired foldable support arms. At least one of the plurality of paired foldable support arms connects a pair of the plurality of fixed cylindrical joints to at least one of the plurality of rollers. Each of the paired foldable support arms includes a support rod and two support hooks. The support hooks are mounted to the roller via the support rod.

The deployable symmetrical reflector antenna may also include a convex single-sheet hyperbolic mesh including a plurality of peripheral nodes and central nodes. A plurality of first holders is provided, with at least one of the plurality of first holders configured to secure at least one of the peripheral nodes to one of the following: the bottom spherical joint and the bottom cylindrical joint of the third row of bottom cylindrical joints. A plurality of second holders is also provided, with at least one of the plurality of second holders configured to attach at least one of the central nodes to further nodes located on the support post. The antenna further includes a plurality of paired flexible cables, with at least one of the plurality of paired flexible cables securing the bottom cylindrical joint to a roof portion of the support post.

In some embodiments, the support post can be telescopic. When the deployable ring is deployed, the telescopic support is fully extended to define a final tension shape of the flexible reflector. This configuration allows the structure of the deployable symmetrical reflector antenna to achieve and maintain its intended reflective geometry through controlled extension of the telescopic support.

In some embodiments, the deployable symmetrical reflector antenna may include a plurality of first cable holders. At least one of the plurality of first cable holders secures an intermediate cylindrical joint of the second row of intermediate cylindrical joints to a roof portion of the support post. The antenna also includes a plurality of second cable holders. At least one of the plurality of second cable holders secures the intermediate cylindrical joint to a base portion of the support post.

In some embodiments, the support post is secured at the base portion to a spacecraft. This attachment anchors the deployable symmetrical reflector antenna and provides structural stability for the support post during deployment and operation.

In alternative embodiments, the support post is secured at the roof portion to a spacecraft. This configuration enables the deployable symmetrical reflector antenna to be mounted from the upper end of the support post, providing an alternative structural interface with the spacecraft.

Thus, deployable symmetrical reflector antennas have been described. Although embodiments have been described with reference to specific example embodiments, it will be evident that various modifications and changes can be made to these example embodiments without departing from the broader spirit and scope of the present application. Accordingly, the specification and drawings are to be regarded in an example rather than a restrictive sense.

What is claimed is:

1. A deployable symmetrical reflector antenna comprising:
- a deployable ring including:
  - a plurality of internal combined arms;
  - a plurality of external combined arms;
  - a plurality of joints arranged circumferentially in a predetermined number of tiers from a bottom of the deployable ring to a top of the deployable ring, at least one joint of the plurality of joints connecting, in a scissor linkage configuration, at least one internal arm of the plurality of internal combined arms and at least one external arm of the plurality of external combined arms;
  - a plurality of torsion springs configured to bias the deployable ring towards an open position, at least one torsion spring of the plurality of torsion springs being coupled to one or more joints of the plurality of joints;
  - a plurality of tension cables, a tension cable of the plurality of tension cables connecting to a first joint and a second joint of the plurality of joints positioned within a same tier of the predetermined number of tiers; and
- a flexible reflector mounted on the deployable ring, the flexible reflector including:
  - an upper concave mesh secured to the top of the deployable ring, the upper concave mesh including a plurality of first flexible rods and a plurality of first nodes;
  - a lower convex mesh secured to the bottom of the deployable ring, the lower convex mesh including a plurality of second flexible rods and a plurality of second nodes; and
  - a plurality of third flexible rods, a third flexible rod of the plurality of third flexible rods connecting a second node of the plurality of second nodes and a first node of the plurality of second nodes.

2. The deployable symmetrical reflector antenna of claim 1, wherein, when the deployable ring is opened, the plurality of joints are positioned equidistant from a common center point, thereby conforming to a spherical geometry.

3. The deployable symmetrical reflector antenna of claim 1, wherein:
- the plurality of joints includes a double cylindrical joint including:
  - an internal pin;
  - a first external pin having a first axis of symmetry;
  - a second external pin having a second axis of symmetry;
  - a first sleeve configured to retain the at least one internal arm; and
  - a second sleeve configured to retain the at least one external arm;
- the tension cable is secured to the internal pin;
- the at least one torsion spring is wound around the first external pin and secured to the first sleeve; and
- when the deployable ring is deployed, the first axis of symmetry and the second axis of symmetry are colinear.

4. The deployable symmetrical reflector antenna of claim 1, further comprising:
- a support post;
- a slider movable along the support post;
- a plurality of first joints fixed to the support post;
- a plurality of second joints fixed to the slider;
- a plurality of intermediate joints; and
- a plurality of further arms including a first arm, second arm, and a third arm, wherein:
  - the upper concave mesh defines a first hexagonal opening through which the support post passes;
  - the lower convex mesh includes a second hexagonal opening through which the support post passes;
  - the first arm connects an intermediate joint of the plurality of intermediate joints to a bottom joint of the plurality of joints, the bottom joint being located at a lower portion of the deployable ring;
  - the second arm connects the intermediate joint to one of the plurality of first joints; and
  - the third arm connects the intermediate joint to one of the plurality of second joints.

5. The deployable symmetrical reflector antenna of claim 4, wherein the plurality of joints includes:
- a top spherical joint positioned at the top of the deployable ring;
- a bottom spherical joint positioned at the bottom of the deployable ring;
- a first row of top cylindrical joints arranged at the top of the deployable ring;
- a second row of intermediate cylindrical joints positioned between the bottom of the deployable ring and the top of the deployable ring; and
- a third row of bottom cylindrical joints arranged at the bottom of the deployable ring.

6. The deployable symmetrical reflector antenna of claim 5, wherein:
- a top cylindrical joint of the first row of top cylindrical joints defines a first axis of symmetry;
- a bottom cylindrical joint of the third row of bottom cylindrical joints defines a second axis of symmetry; and
- when the deployable ring is deployed:
  - the first axis of symmetry and the second axis of symmetry are orthogonal to a line defined by an intersection of a first plane and a second plane;
  - the first plane is defined by:

a first edge of a first pin of a first top cylindrical joint adjacent to the top cylindrical joint in the first row; and a second edge of a second pin of a first bottom cylindrical joint adjacent to the bottom cylindrical joint in the third row; and the second plane is defined by:

a second edge of a second pin of a second top cylindrical joint adjacent to the top cylindrical joint in the first row; and a second edge of a second pin of a second bottom cylindrical joint adjacent to the bottom cylindrical joint in the third row.

7. The deployable symmetrical reflector antenna of claim 6, further comprising:

an electric motor coupled to the bottom spherical joint;

a drum driven by the electric motor;

a plurality of rollers, at least one roller of the plurality of rollers being mounted on an external surface of one of the following:

the top cylindrical joint of the first row of top cylindrical joints;

the bottom cylindrical joint of the third row of bottom cylindrical joints;

the top spherical joint; and a further tension cable secured to the bottom spherical joint and routed over the drum and the plurality of rollers, wherein:

the plurality of rollers includes a first roller, a second roller, and a third roller, the second roller being positioned at the bottom of the deployable ring, the first roller and the third roller being positioned at the top of the deployable ring, the third roller being adjacent to the first roller; and the further tension cable is routed from the first roller to the second roller and from the second roller to the third roller.

8. The deployable symmetrical reflector antenna of claim 7, further comprising:

a plurality of fixed cylindrical joints mounted to the support post; and a plurality of paired foldable support arms, at least one paired foldable support arm of the plurality of paired foldable support arms connecting a pair of the plurality of fixed cylindrical joints to at least one roller of the plurality of rollers;

wherein the plurality of paired foldable support arms includes:

a support rod; and two support hooks mounted to the at least one roller via the support rod.

9. The deployable symmetrical reflector antenna of claim 6, further comprising:

a convex single-sheet hyperbolic mesh including a plurality of peripheral nodes and central nodes;

a plurality of first holders, at least one first holder of the plurality of first holders configured to secure at least one peripheral node of the plurality of peripheral nodes to one of the following: the bottom spherical joint and the bottom cylindrical joint of the third row of bottom cylindrical joints;

a plurality of second holders, at least one second holder of the plurality of second holders configured to attach at least one central node of the central nodes to further nodes located on the support post; and a plurality of paired flexible cables, at least one paired flexible cable of the plurality of paired flexible cables securing the bottom cylindrical joint to a roof portion of the support post.

10. The deployable symmetrical reflector antenna of claim 6, wherein the support post includes a telescopic support and wherein, when the deployable ring is deployed, the telescopic support is fully extended to define a final tension shape of the flexible reflector.

11. The deployable symmetrical reflector antenna of claim 6, further comprising:

a plurality of first cable holders, at least one first cable holder of the plurality of first cable holders securing an intermediate cylindrical joint of the second row of intermediate cylindrical joints to a roof portion of the support post; and a plurality of second cable holders, at least one second cable holder of the plurality of second cable holders securing the intermediate cylindrical joint to a base portion of the support post.

12. The deployable symmetrical reflector antenna of claim 11, wherein the support post is secured at the base portion to a spacecraft.

13. The deployable symmetrical reflector antenna of claim 11, wherein the support post is secured at the roof portion to a spacecraft.

14. A method for manufacturing a deployable symmetrical reflector antenna, the method comprising:

providing a deployable ring including:

a plurality of internal combined arms;

a plurality of external combined arms;

a plurality of joints arranged circumferentially in a predetermined number of tiers from a bottom of the deployable ring to a top of the deployable ring, at least one joint of the plurality of joints connecting, in a scissor linkage configuration, at least one internal arm of the plurality of internal combined arms and at least one external arm of the plurality of external combined arms;

a plurality of torsion springs configured to bias the deployable ring towards an open position, at least one torsion spring of the plurality of torsion springs being coupled to one or more joints of the plurality of joints;

a plurality of tension cables, a tension cable of the plurality of tension cables connecting to a first joint and a second joint of the plurality of joints positioned within a same tier of the predetermined number of tiers; and mounting a flexible reflector on the deployable ring, the flexible reflector including:

an upper concave mesh secured to the top of the deployable ring, the upper concave mesh including a plurality of first flexible rods and a plurality of first nodes;

a lower convex mesh secured to the bottom of the deployable ring, the lower convex mesh including a plurality of second flexible rods and a plurality of second nodes; and a plurality of third flexible rods, a third flexible rod of the plurality of third flexible rods connecting a second node of the plurality of second nodes and a first node of the plurality of second nodes.

15. The method of claim 14, wherein, when the deployable ring is opened, the plurality of joints are positioned equidistant from a common center point, thereby conforming to a spherical geometry.

16. The method of claim 14, wherein:
the plurality of joints includes a double cylindrical joint including:
an internal pin;
a first external pin having a first axis of symmetry;
a second external pin having a second axis of symmetry;
a first sleeve configured to retain the at least one internal arm; and
a second sleeve configured to retain the at least one external arm;
the tension cable is secured to the internal pin;
the at least one torsion spring is wound around the first external pin and secured to the first sleeve; and
when the deployable ring is deployed, the first axis of symmetry and the second axis of symmetry are colinear.

17. The method of claim 14, further comprising:
providing a support post;
providing a slider movable along the support post;
providing a plurality of first joints fixed to the support post;
providing a plurality of second joints fixed to the slider;
providing a plurality of intermediate joints; and
providing a plurality of further arms including a first arm, second arm, and a third arm, wherein:
the upper concave mesh defines a first hexagonal opening through which the support post passes;
the lower convex mesh includes a second hexagonal opening through which the support post passes;
the first arm connects an intermediate joint of the plurality of intermediate joints to a bottom joint of the plurality of joints, the bottom joint being located at a lower portion of the deployable ring;
the second arm connects the intermediate joint to one of the plurality of first joints; and
the third arm connects the intermediate joint to one of the plurality of second joints.

18. The method of claim 17, wherein the plurality of joints includes:
a top spherical joint positioned at the top of the deployable ring;
a bottom spherical joint positioned at the bottom of the deployable ring;
a first row of top cylindrical joints arranged at the top of the deployable ring;
a second row of intermediate cylindrical joints positioned between the bottom of the deployable ring and the top of the deployable ring; and
a third row of bottom cylindrical joints arranged at the bottom of the deployable ring.

19. The method of claim 18, wherein:
a top cylindrical joint of the first row of top cylindrical joints defines a first axis of symmetry;
a bottom cylindrical joint of the third row of bottom cylindrical joints defines a second axis of symmetry; and
when the deployable ring is deployed:
the first axis of symmetry and the second axis of symmetry are orthogonal to a line defined by an intersection of a first plane and a second plane;
the first plane is defined by:
a first edge of a first pin of a first top cylindrical joint adjacent to the top cylindrical joint in the first row; and
a second edge of a second pin of a first bottom cylindrical joint adjacent to the bottom cylindrical joint in the third row; and
the second plane is defined by:
a second edge of a second pin of a second top cylindrical joint adjacent to the top cylindrical joint in the first row; and
a second edge of a second pin of a second bottom cylindrical joint adjacent to the bottom cylindrical joint in the third row.

20. The method of claim 19, further comprising:
providing an electric motor coupled to the bottom spherical joint;
providing a drum driven by the electric motor;
providing a plurality of rollers, at least one roller of the plurality of rollers being mounted on an external surface of one of the following:
the top cylindrical joint of the first row of top cylindrical joints;
the bottom cylindrical joint of the third row of bottom cylindrical joints;
the top spherical joint; and
providing a further tension cable secured to the bottom spherical joint and routed over the drum and the plurality of rollers, wherein:
the plurality of rollers includes a first roller, a second roller, and a third roller, the second roller being positioned at the bottom of the deployable ring, the first roller and the third roller being positioned at the top of the deployable ring, the third roller being adjacent to the first roller; and
the further tension cable is routed from the first roller to the second roller and from the second roller to the third roller.

* * * * *